United States Patent
Dhara et al.

(10) Patent No.: US 12,529,091 B2
(45) Date of Patent: Jan. 20, 2026

(54) ATAC-ARRAY FOR PREDICTION OF DISEASE-FREE SURVIVAL IN PANCREATIC CANCER

(71) Applicants: Trustees of Dartmouth College, Hanover, NH (US); Memorial Sloan Kettering Cancer Center, New York, NY (US)

(72) Inventors: Surajit Dhara, Hanover, NH (US); Steven D. Leach, Hanover, NH (US); Sagar Chhangawala, New York, NY (US); Christina Leslie, New York, NY (US)

(73) Assignees: Trustees of Dartmouth College, Hanover, NH (US); Memorial Sloan Kettering Cancer Center, New York, NY (US)

( * ) Notice: Subject to any disclaimer, the term of this patent is extended or adjusted under 35 U.S.C. 154(b) by 0 days.

(21) Appl. No.: 18/431,569

(22) Filed: Feb. 2, 2024

(65) Prior Publication Data
US 2024/0240242 A1 Jul. 18, 2024

Related U.S. Application Data

(63) Continuation of application No. 17/324,093, filed on May 18, 2021, now abandoned, which is a continuation-in-part of application No. 17/268,195, filed as application No. PCT/US2019/046301 on Aug. 13, 2019, now abandoned.

(60) Provisional application No. 63/033,565, filed on Jun. 2, 2020, provisional application No. 62/718,499, filed on Aug. 14, 2018.

(51) Int. Cl.
*C12Q 1/6837* (2018.01)
*C12N 15/10* (2006.01)
*G01N 33/574* (2006.01)

(52) U.S. Cl.
CPC ....... *C12Q 1/6837* (2013.01); *C12N 15/1093* (2013.01); *G01N 33/57438* (2013.01)

(58) Field of Classification Search
CPC ........ C12Q 1/68; C12Q 1/6837; C12N 15/10; G01N 33/574
See application file for complete search history.

(56) References Cited

U.S. PATENT DOCUMENTS

| | | | |
|---|---|---|---|
| 2009/0105081 A1 | 4/2009 | Rodesch et al. | |
| 2015/0241436 A1* | 8/2015 | Santagata | G01N 33/5011 435/7.1 |
| 2016/0060691 A1* | 3/2016 | Giresi | G16B 30/00 |
| 2016/0186266 A1* | 6/2016 | Alarcon | G01N 33/57484 702/20 |
| 2018/0057867 A1 | 3/2018 | Wu et al. | |
| 2019/0284603 A1* | 9/2019 | Shema-Yaacoby | C12Q 1/68 |
| 2021/0277454 A1 | 9/2021 | Dhara et al. | |
| 2021/0324376 A1 | 10/2021 | Dhara et al. | |
| 2024/0240242 A1 | 7/2024 | Dhara et al. | |

FOREIGN PATENT DOCUMENTS

| | | |
|---|---|---|
| WO | WO2014189957 | 11/2014 |
| WO | WO 2017/156336 A1 | 9/2017 |
| WO | WO 2020/036929 A1 | 2/2020 |
| WO | WO2021127610 | 6/2021 |

OTHER PUBLICATIONS

Cusanovich et al., Multiplex Single-Cell Profiling of Chromatin Accessibility by Combinatorial Cellular Indexing, Science, May 2015, 910-914. (Year: 2015).*
Cusanovich et al., Multiplex Single-Cell Profiling of Chromatin Accessibility by Combinatorial Cellular Indexing, Science, May 2015, Supplementary Materials, 2015, 1-34. (Year: 2015).*
Konze et al., An Orally Bioavailable Chemical Probe of the Lysine Methyltransferases EZH2 and EZH1, ACS Chemical Biology, Apr. 8, 2013, 8, 1324-1334. (Year: 2013).*
Yu et al., A Review on Hepatocyte Nuclear Factor-1beta and Tumor, Cell & Bioscience, 2015, 5(58), 1-8. (Year: 2015).*
Yao et . al., ZKSCAN1 Gene and its Related Circular RNA (circZKSCAN1) Both Inhibit Hepatocellular Carcinoma Cell Growth, Migration, and Invasion but Through Different Signaling Pathways, Molecular Oncology, 2017, 422-437. (Year: 2017).*
Lomberk et al., Distinct Epigenetic Landscapes Underlie the Pathobiology of Pancreatic Cancer Subtypes, Nature Communications, May 17, 2018, 9(1978), 1-33.
Buenrostro et al., *Nat. Methods,* 10(12): 1213-1218 (Dec. 2013).
Dhara et al., *Cancer Research,* 78(13) (Abstract) (Jul. 2018).
The United States Patent and Trademark Office, International Search Report in International Application No. PCT/US2019/046301 (Dec. 10, 2019).
The United States Patent and Trademark Office, Written Opinion in International Application No. PCT/US2019/046301 (Dec. 10, 2019).
Osmanbeyoglu et al., Chromatin-Informed Inference of Transcriptional Programs in Gynecologic and Basal Breast Cancers, Nature Communications, epub 2018, 4369, 1-12. (Year: 2018).
Osmanbeyoglu et al., Chromatin-Informed Inference of Transcriptional Programs in Gynecologic and Basal Breast Cancers, Supplemental Information, Nature Communications, epub 2018, 4369, 1-23. (Year: 2018).
Dhara, et al., "Pancreatic cancer prognosis is predicted by an ATAC-array technology for assessing chromatin accessibility," Nature Communications, 2021, 9 pp.

(Continued)

*Primary Examiner* — Amy M Bunker
(74) *Attorney, Agent, or Firm* — Neal, Gerber & Eisenberg LLP

(57) ABSTRACT

The present disclosure relates to an array-based assay for transposase-accessible chromatin and prognostic molecular markers of treatment-resistant/early recurrent cancer. The present disclosure also relates to predicting an outcome, such as duration of disease-free survival, in a cancer patient.

2 Claims, 61 Drawing Sheets

(56) References Cited

OTHER PUBLICATIONS

Shin, et al., "Chromatin accessibility of circulating CD8+ T cells predicts treatment response to PD-1 blockade in patients with gastric cancer," Nature Communications, 2021, 11 pp.

Yost, et al., "Clonal replacement of tumor-specific T cells following PD-1 blockade," National Medicine 25(8), Aug. 2019, 44 pp.

* cited by examiner

FIG. 9A

| Chr | Start | End | Annotation | Transcript_id | Gene symbol |
|---|---|---|---|---|---|
| 17 | 52977819 | 52978913 | promoter | ENST00000575909 | TOM1L1 |
| 9 | 27625883 | 27626853 | intergenic | ENST00000400348 | CTAGE12P |
| 22 | 23744503 | 23745176 | promoter | ENST00000420968 | ZDHHC8P1 |
| X | 3615234 | 3616144 | intron | ENST00000262848 | PRKX |
| X | 10087464 | 10087962 | intron | ENST00000454666 | WWC3 |
| 18 | 18970975 | 18971689 | intron | ENST00000584611 | RP11-296E23.1 |
| 18 | 20512914 | 20514073 | promoter | ENST00000578831 | RP11-739L10.1 |
| 1 | 59246541 | 59247091 | exon | ENST00000371222_43680 | |
| 18 | 6413976 | 6415319 | promoter | ENST00000580162 | L3MBTL4 |
| 14 | 67878683 | 67879198 | promoter | ENST00000557388 | PLEK2 |
| 10 | 51566723 | 51567262 | promoter | ENST00000414907 | NCOA4 |
| 4 | 84255872 | 84256464 | promoter | ENST00000513463 | HPSE |
| 6 | 78359808 | 78360616 | intergenic | ENST00000602452 | MEI4 |
| 18 | 21017554 | 21018179 | promoter | ENST00000399707 | TMEM241 |
| 3 | 18799504 | 18799922 | intron | ENST00000425799 | AC144521.1 |
| 8 | 86375420 | 86376638 | promoter | ENST00000517697 | RP11-317J10.2 |
| 22 | 19434714 | 19435523 | promoter | ENST00000333059 | C22orf39 |
| 11 | 102364324 | 102364756 | intron | ENST00000529278 | RP11-315O6.2 |
| 18 | 9474785 | 9475995 | promoter | ENST00000383432 | RALBP1 |
| X | 20396229 | 20397054 | intergenic | ENST00000517169 | RN7SKP183 |
| 4 | 71450043 | 71450658 | intergenic | ENST00000322937 | AMBN |
| 13 | 39210941 | 39211343 | intergenic | ENST00000447765 | PRDX3P3 |
| 5 | 42811882 | 42812507 | promoter | ENST00000508937 | SEPP1 |
| 18 | 8890911 | 8891510 | intergenic | ENST00000359865 | SOGA2 |
| 14 | 64330729 | 64331355 | promoter | ENST00000556725 | SYNE2 |
| 2 | 211054239 | 211055494 | intron | ENST00000412065 | AC006994.2 |
| 14 | 38677991 | 38678610 | promoter | ENST00000267377 | SSTR1 |
| X | 23522303 | 23522698 | intergenic | ENST00000458766 | snoU13 |
| 13 | 108686039 | 108687002 | intergenic | ENST00000375915 | FAM155A |
| 21 | 16512741 | 16513203 | intergenic | ENST00000449746 | AF127577.12 |
| 4 | 69817171 | 69817631 | promoter | ENST00000251566 | UGT2A3 |
| X | 2526973 | 2527761 | promoter | ENST00000527459 | CD99P1 |
| 18 | 21718709 | 21719338 | promoter | ENST00000327201 | CABYR |
| 18 | 21851298 | 21852369 | promoter | ENST00000585247 | OSBPL1A |
| 4 | 170121436 | 170122132 | promoter | ENST00000510225 | RP11-327O17.2 |
| 14 | 77589823 | 77590311 | intron | ENST00000557752 | RP11-463C8.4 |
| 3 | 65938946 | 65939447 | promoter | ENST00000460754 | MAGI1-IT1 |
| 12 | 10826411 | 10827032 | promoter | ENST00000541561 | STYK1 |
| 13 | 76334271 | 76334966 | promoter | ENST00000465261 | LMO7 |
| 4 | 106816201 | 106816854 | promoter | ENST00000503451 | NPNT |
| 8 | 119890394 | 119891274 | intergenic | ENST00000297350 | TNFRSF11B |
| 18 | 3230353 | 3230820 | intron | ENST00000580139 | RP13-270P17.2 |
| 4 | 23789895 | 23790557 | intron | ENST00000509702 | PPARGC1A |

FIG. 9A, cont.

| Chr | Start | End | Annotation | Transcript_id | Gene symbol |
|---|---|---|---|---|---|
| 4 | 72978120 | 72978772 | intron | ENST00000358749 | NPFFR2 |
| 6 | 53719637 | 53720021 | intron | ENST00000370882 | LRRC1 |
| 18 | 59561256 | 59561922 | promoter | ENST00000588396 | RNF152 |
| 5 | 158122586 | 158122909 | intergenic | ENST00000519890 | EBF1 |
| 6 | 43894454 | 43895332 | intergenic | ENST00000422059 | RP5-1120P11.1 |
| 17 | 38439964 | 38440892 | intron | ENST00000323571 | WIPF2 |
| 4 | 103541806 | 103542546 | intergenic | ENST00000226574 | NFKB1 |
| 5 | 170176920 | 170177427 | intron | ENST00000521965 | MIR4454 |
| 4 | 25864064 | 25865011 | promoter | ENST00000513364 | SEL1L3 |
| 12 | 15815552 | 15815954 | promoter | ENST00000540613 | EPS8 |
| 19 | 11545786 | 11546623 | promoter | ENST00000586836 | CCDC151 |
| X | 13006739 | 13007333 | intergenic | ENST00000451311 | TMSB4X |
| 18 | 21692827 | 21693592 | promoter | ENST00000540918 | TTC39C |
| 9 | 27371349 | 27371791 | intron | ENST00000603061 | MOB3B |
| 18 | 29738048 | 29738594 | intron | ENST00000583696 | GAREM |
| 3 | 18699491 | 18700274 | intron | ENST00000595388 | AC144521.1 |
| 12 | 15865506 | 15866240 | promoter | ENST00000543612 | EPS8 |
| 4 | 155547868 | 155548555 | promoter | ENST00000499392 | LRAT |
| 5 | 106810443 | 106811097 | intron | ENST00000505499 | EFNA5 |
| 17 | 39956851 | 39957456 | intergenic | ENST00000355468 | LEPREL4 |
| 18 | 68048808 | 68049145 | exon | ENST00000582251_572674 | |
| 20 | 22471368 | 22471859 | intergenic | ENST00000420070 | LINC00261 |
| 13 | 61989175 | 61989676 | promoter | ENST00000409204 | PCDH20 |
| 5 | 78791005 | 78791692 | intron | ENST00000535690 | HOMER1 |
| 1 | 157210261 | 157210939 | intergenic | ENST00000449345 | RP11-85G21.1 |
| 17 | 56591826 | 56592157 | promoter | ENST00000582390 | MTMR4 |
| 1 | 27240311 | 27240999 | promoter | ENST00000254227 | NR0B2 |
| 4 | 149366324 | 149366956 | promoter | ENST00000344721 | NR3C2 |
| 13 | 74861868 | 74862243 | promoter | ENST00000383890 | RNY1P5 |
| 15 | 53745621 | 53746295 | intergenic | ENST00000567224 | WDR72 |
| 7 | 87198356 | 87198910 | intron | ENST00000543898 | ABCB1 |
| 4 | 38134715 | 38135185 | promoter | ENST00000492180 | TBC1D1 |
| 4 | 42658842 | 42659808 | promoter | ENST00000562054 | RP11-109E24.2 |
| 8 | 128309764 | 128310584 | intron | ENST00000523825 | CASC8 |
| 18 | 25236246 | 25236678 | intergenic | ENST00000584546 | RP11-739N10.1 |
| 4 | 83316004 | 83316436 | intergenic | ENST00000503202 | IGBP1P4 |
| 18 | 3773069 | 3773731 | promoter | ENST00000584060 | RP11-874J12.3 |
| 1 | 65210283 | 65210996 | promoter | ENST00000371072 | RAVER2 |
| 4 | 22970924 | 22971638 | intergenic | ENST00000511453 | RP11-412P11.1 |
| 15 | 29966880 | 29967293 | promoter | ENST00000536835 | RP11-680F8.1 |
| 8 | 4195706 | 4196553 | intron | ENST00000539096 | CSMD1 |
| 18 | 21594009 | 21595594 | promoter | ENST00000579713 | RP11-403A21.2 |
| 18 | 13823915 | 13824237 | promoter | ENST00000390194 | AP001525.1 |

FIG. 9A, cont.

| Chr | Start | End | Annotation | Transcript_id | Gene symbol |
|---|---|---|---|---|---|
| 17 | 48845654 | 48846094 | promoter | ENST00000502517 | LINC00483 |
| 8 | 22601135 | 22601604 | promoter | ENST00000519624 | RP11-459E5.1 |
| X | 19352288 | 19352590 | intergenic | ENST00000379806 | PDHA1 |
| 14 | 65346358 | 65347344 | promoter | ENST00000542895 | SPTB |
| 15 | 64540179 | 64540503 | intron | ENST00000606793 | CTD-2116N17.1 |
| 6 | 82547755 | 82548150 | intergenic | ENST00000418567 | RP11-379B8.1 |
| 11 | 104322692 | 104323628 | intron | ENST00000536529 | RP11-886D15.1 |
| 17 | 46342828 | 46343603 | intron | ENST00000581419 | SKAP1 |
| 2 | 146971789 | 146972404 | intergenic | ENST00000413391 | RPL17P12 |
| X | 24517071 | 24517405 | intron | ENST00000493226 | PDK3 |
| 12 | 15323979 | 15324554 | intron | ENST00000393736 | RERG |
| 14 | 73928913 | 73929398 | promoter | ENST00000561382 | RP1-240K6.3 |
| 12 | 71556548 | 71557645 | intron | ENST00000549421 | TSPAN8 |
| 4 | 77625261 | 77626040 | intron | ENST00000486758 | SHROOM3 |
| 14 | 53167381 | 53167871 | intergenic | ENST00000556039 | ERO1L |
| 15 | 83349039 | 83349480 | promoter | ENST00000543938 | AP3B2 |
| 18 | 28591355 | 28591777 | intron | ENST00000434452 | DSC3 |
| 6 | 30226869 | 30227564 | promoter | ENST00000420110 | HLA-L |
| 12 | 12550932 | 12551724 | intron | ENST00000298571 | LOH12CR1 |
| 18 | 7926531 | 7927006 | intron | ENST00000400053 | PTPRM |
| 5 | 156874176 | 156874688 | intron | ENST00000519499 | CTB-109A12.1 |
| 4 | 105415971 | 105416679 | promoter | ENST00000466963 | CXXC4 |
| 14 | 68205454 | 68206247 | intron | ENST00000394455 | ZFYVE26 |
| 18 | 21977090 | 21978175 | promoter | ENST00000582618 | OSBPL1A |
| 5 | 31020930 | 31021844 | intergenic | ENST00000495944 | RPL19P11 |
| 17 | 73597354 | 73597809 | promoter | ENST00000584323 | MYO15B |
| 1 | 165614855 | 165615573 | promoter | ENST00000461759 | MGST3 |
| 12 | 89466458 | 89467244 | intron | ENST00000549278 | RP11-13A1.3 |
| 4 | 139120636 | 139121025 | intron | ENST00000509248 | SLC7A11 |
| 8 | 103941579 | 103942473 | promoter | ENST00000517996 | KB-1507C5.2 |
| 15 | 36469921 | 36470501 | intron | ENST00000561394 | RP11-184D12.1 |
| 8 | 15397612 | 15398367 | promoter | ENST00000503731 | TUSC3 |
| 7 | 98013278 | 98014497 | promoter | ENST00000398259 | RPS3AP26 |
| 18 | 3051740 | 3052729 | intergenic | ENST00000356443 | MYOM1 |
| 15 | 98491142 | 98491429 | intron | ENST00000538249 | ARRDC4 |
| X | 24167349 | 24168808 | promoter | ENST00000427551 | ZFX-AS1 |
| 13 | 30682897 | 30683442 | promoter | ENST00000432770 | LINC00365 |
| 10 | 65479858 | 65480099 | intron | ENST00000444770 | RP11-170M17.1 |
| 22 | 43336262 | 43336736 | intron | ENST00000453079 | PACSIN2 |
| 18 | 24235854 | 24237453 | promoter | ENST00000584630 | KCTD1 |
| 18 | 29665002 | 29665389 | intron | ENST00000583184 | RP11-53I6.2 |
| X | 123540218 | 123540808 | intron | ENST00000469481 | STAG2 |
| 21 | 29628568 | 29629059 | intergenic | ENST00000453420 | AL035610.2 |

FIG. 9A, cont.

| Chr | Start | End | Annotation | Transcript_id | Gene symbol |
|---|---|---|---|---|---|
| 14 | 24777038 | 24777597 | promoter | ENST00000554411 | CIDEB |
| 7 | 90350197 | 90350681 | intron | ENST00000436577 | CDK14 |
| 3 | 118930104 | 118930466 | intergenic | ENST00000483209 | B4GALT4 |
| 17 | 33759489 | 33760107 | promoter | ENST00000304905 | SLFN12 |
| 6 | 126265396 | 126265975 | intergenic | ENST00000229633 | HINT3 |
| 18 | 8341512 | 8342175 | intron | ENST00000577827 | PTPRM |
| 13 | 60586478 | 60586983 | promoter | ENST00000435636 | DIAPH3-AS1 |
| 2 | 43232429 | 43233212 | promoter | ENST00000457457 | AC016735.1 |
| 4 | 72052163 | 72052582 | promoter | ENST00000264485 | SLC4A4 |
| 18 | 11005554 | 11005954 | intron | ENST00000582913 | PIEZO2 |
| 6 | 52254401 | 52254862 | intron | ENST00000360726 | PAQR8 |
| 16 | 1031471 | 1032054 | promoter | ENST00000565467 | RP11-161M6.2 |
| 14 | 68987627 | 68988132 | intron | ENST00000478014 | RAD51B |
| 4 | 38387157 | 38387752 | intron | ENST00000503465 | RP11-83C7.1 |
| 12 | 18951259 | 18952375 | intergenic | ENST00000317658 | CAPZA3 |
| 8 | 74219833 | 74220352 | intron | ENST00000520894 | RP11-434I12.2 |
| 10 | 108273148 | 108273531 | intergenic | ENST00000399415 | RP11-446H13.2 |
| 2 | 165770474 | 165770888 | promoter | ENST00000483641 | SLC38A11 |
| 9 | 28915264 | 28915864 | intergenic | ENST00000401120 | MIR873 |
| 1 | 244231070 | 244231550 | intron | ENST00000598000 | AL590483.1 |
| 4 | 24384043 | 24384371 | intergenic | ENST00000410330 | AC092846.1 |
| 5 | 103398196 | 103398978 | intergenic | ENST00000514769 | RP11-138J23.1 |
| 8 | 1878704 | 1879351 | intron | ENST00000522435 | ARHGEF10 |
| 8 | 37159582 | 37160492 | intergenic | ENST00000518765 | RP11-527N22.1 |
| 19 | 10859669 | 10860777 | intron | ENST00000586939 | DNM2 |
| 8 | 38124767 | 38125231 | promoter | ENST00000530193 | PPAPDC1B |
| 14 | 100625737 | 100626234 | promoter | ENST00000553834 | DEGS2 |
| 17 | 70514867 | 70515633 | intron | ENST00000580861 | LINC00511 |
| 11 | 22213851 | 22215484 | promoter | ENST00000324559 | ANO5 |
| 11 | 91530137 | 91530591 | promoter | ENST00000581290 | RP11-201M22.1 |
| 4 | 174112844 | 174113342 | intron | ENST00000512285 | GALNT7 |
| 8 | 98861557 | 98862712 | intron | ENST00000521545 | LAPTM4B |
| 10 | 98623698 | 98624364 | intron | ENST00000371097 | LCOR |
| 5 | 67497853 | 67498258 | intergenic | ENST00000520762 | RP11-404L6.2 |
| 8 | 71115117 | 71115743 | intron | ENST00000518287 | NCOA2 |
| 18 | 20695658 | 20696122 | intergenic | ENST00000400473 | CABLES1 |
| 18 | 19577616 | 19577921 | promoter | ENST00000577673 | AC091043.1 |
| 17 | 72746567 | 72746861 | promoter | ENST00000585285 | MIR3615 |
| 18 | 19866602 | 19866925 | intergenic | ENST00000459476 | snoU13 |
| 12 | 15842656 | 15843267 | intron | ENST00000544064 | EPS8 |
| 5 | 54467950 | 54468191 | promoter | ENST00000516047 | MIR449C |
| 12 | 19219371 | 19219904 | intergenic | ENST00000449390 | RPL7P6 |
| 2 | 109002050 | 109002496 | intron | ENST00000409309 | SULT1C4 |

FIG. 9A, cont.

| Chr | Start | End | Annotation | Transcript_id | Gene symbol |
|---|---|---|---|---|---|
| 4 | 40475810 | 40476436 | promoter | ENST00000507180 | RBM47 |
| 4 | 115484596 | 115485293 | intergenic | ENST00000310836 | UGT8 |
| 5 | 56731545 | 56732157 | intron | ENST00000506106 | CTD-2023N9.1 |
| 5 | 98215879 | 98216617 | intron | ENST00000284049 | CHD1 |
| 6 | 155649620 | 155650370 | intergenic | ENST00000475849 | TFB1M |
| 8 | 23039576 | 23039972 | intergenic | ENST00000518308 | RP11-1149O23.2 |
| 14 | 65409340 | 65409856 | promoter | ENST00000557323 | GPX2 |
| 18 | 12659958 | 12660445 | promoter | ENST00000589405 | PSMG2 |
| 16 | 57286027 | 57286608 | promoter | ENST00000564376 | RP11-407G23.3 |
| 12 | 89900906 | 89901589 | intron | ENST00000546830 | POC1B |
| 3 | 172635673 | 172636396 | intron | ENST00000351008 | SPATA16 |
| 6 | 56263991 | 56264896 | intergenic | ENST00000370819 | COL21A1 |
| 8 | 86459177 | 86459730 | intergenic | ENST00000520459 | RP11-317J10.4 |
| 18 | 21699037 | 21699241 | promoter | ENST00000583782 | RP11-799B12.2 |
| 8 | 4188712 | 4189987 | intron | ENST00000539096 | CSMD1 |
| 12 | 7055207 | 7055997 | promoter | ENST00000538318 | PTPN6 |
| 4 | 122791099 | 122792004 | promoter | ENST00000567769 | RP11-63B13.1 |
| 12 | 6387233 | 6388200 | intergenic | ENST00000539998 | RP1-96H9.5 |
| 1 | 237963084 | 237963484 | promoter | ENST00000466626 | RYR2 |
| 4 | 85420209 | 85421036 | promoter | ENST00000295886 | NKX6-1 |
| X | 44731642 | 44733410 | promoter | ENST00000475233 | KDM6A |
| 18 | 21032725 | 21033693 | promoter | ENST00000577501 | RIOK3 |
| 18 | 24060728 | 24061749 | intron | ENST00000578973 | KCTD1 |
| 14 | 56298766 | 56299226 | intergenic | ENST00000560336 | LINC00520 |
| 20 | 22392204 | 22392708 | intron | ENST00000377121 | RP5-1004I9.1 |
| 5 | 89316952 | 89317321 | intergenic | ENST00000584845 | MIR3660 |
| 2 | 102353912 | 102354557 | intron | ENST00000417294 | MAP4K4 |
| 4 | 141264454 | 141264871 | promoter | ENST00000506322 | SCOC |
| 17 | 39686341 | 39686778 | promoter | ENST00000361566 | KRT19 |
| 13 | 42270599 | 42271143 | promoter | ENST00000478987 | VWA8 |
| 12 | 33049306 | 33050344 | promoter | ENST00000546741 | PKP2 |
| X | 1510891 | 1512012 | promoter | ENST00000484026 | SLC25A6 |
| 7 | 86688557 | 86689480 | promoter | ENST00000423294 | KIAA1324L |
| 4 | 99064059 | 99065056 | promoter | ENST00000295268 | STPG2 |
| 4 | 173647115 | 173647791 | intron | ENST00000508122 | GALNTL6 |
| 18 | 21082967 | 21083951 | promoter | ENST00000592119 | C18orf8 |
| 4 | 48946273 | 48946960 | intergenic | ENST00000507399 | RP11-317G22.2 |
| 17 | 40074968 | 40075633 | promoter | ENST00000590735 | ACLY |
| X | 16804037 | 16805127 | promoter | ENST00000398155 | TXLNG |
| 5 | 40679080 | 40680306 | promoter | ENST00000514343 | PTGER4 |
| 11 | 22174396 | 22174976 | intergenic | ENST00000530837 | CTD-2019O4.1 |
| 14 | 60043166 | 60043680 | promoter | ENST00000281581 | CCDC175 |
| 18 | 34408158 | 34409506 | promoter | ENST00000587139 | KIAA1328 |

FIG. 9A, cont.

| Chr | Start | End | Annotation | Transcript_id | Gene symbol |
|---|---|---|---|---|---|
| 17 | 55740045 | 55740953 | intron | ENST00000579505 | MSI2 |
| 17 | 44438927 | 44439708 | promoter | ENST00000450673 | ARL17B |
| 13 | 80055053 | 80055742 | promoter | ENST00000457171 | NDFIP2-AS1 |
| 4 | 40578882 | 40579574 | intron | ENST00000513044 | RBM47 |
| 9 | 140188004 | 140189043 | promoter | ENST00000566954 | RP13-122B23.8 |
| 17 | 70613945 | 70614728 | intron | ENST00000581549 | LINC00511 |
| 5 | 74332978 | 74333338 | intergenic | ENST00000322348 | GCNT4 |
| 4 | 1722559 | 1723411 | promoter | ENST00000536901 | TMEM129 |
| 18 | 21166005 | 21167139 | promoter | ENST00000540608 | NPC1 |
| 17 | 39058236 | 39058611 | intergenic | ENST00000167588 | KRT20 |
| 2 | 167231978 | 167233085 | promoter | ENST00000375387 | SCN9A |
| Y | 297421 | 298266 | intergenic | ENST00000516032 | RNU6-1334P |
| 17 | 70462355 | 70462619 | intron | ENST00000580861 | LINC00511 |
| 22 | 42709789 | 42710226 | intron | ENST00000515426 | TCF20 |
| 13 | 30646504 | 30647236 | intergenic | ENST00000413591 | LINC00365 |
| 17 | 73613416 | 73613713 | promoter | ENST00000578300 | MYO15B |
| 18 | 20558174 | 20558672 | intron | ENST00000585177 | RBBP8 |
| 21 | 18899540 | 18900000 | promoter | ENST00000363884 | Y_RNA |
| 4 | 19557727 | 19558281 | intron | ENST00000511431 | RP11-608O21.1 |
| 4 | 99582947 | 99583241 | exon | ENST00000569927_160528 | |
| 4 | 156679791 | 156681400 | promoter | ENST00000513437 | GUCY1B3 |
| X | 15755897 | 15756576 | promoter | ENST00000380319 | CA5B |
| 4 | 103994568 | 103995223 | intron | ENST00000508136 | SLC9B2 |
| 4 | 7404260 | 7404679 | intron | ENST00000329016 | SORCS2 |
| 17 | 79486482 | 79486780 | promoter | ENST00000442532 | RP13-766D20.2 |
| 18 | 24159844 | 24160367 | intron | ENST00000580191 | KCTD1 |
| 13 | 21277892 | 21278693 | promoter | ENST00000468605 | IL17D |
| 18 | 2654993 | 2656229 | promoter | ENST00000579647 | CBX3P2 |
| 9 | 108081065 | 108081533 | intron | ENST00000607692 | SLC44A1 |
| 18 | 3218007 | 3218215 | promoter | ENST00000261606 | MYOM1 |
| 4 | 41992323 | 41992873 | promoter | ENST00000510460 | SLC30A9 |
| 4 | 122369404 | 122369799 | intergenic | ENST00000512282 | TUBB4BP5 |
| 18 | 6315695 | 6316404 | intron | ENST00000580162 | L3MBTL4 |
| 17 | 29816786 | 29817073 | promoter | ENST00000578694 | RAB11FIP4 |
| 17 | 38501710 | 38502341 | promoter | ENST00000475125 | RARA |
| 13 | 35923722 | 35924281 | intron | ENST00000379939 | NBEA |
| 13 | 103553441 | 103553830 | intergenic | ENST00000605100 | METTL21EP |
| 4 | 62406648 | 62407173 | intron | ENST00000514996 | LPHN3 |
| 17 | 31281498 | 31281947 | intergenic | ENST00000578289 | TMEM98 |
| 8 | 134440828 | 134441594 | intergenic | ENST00000393673 | ST13P6 |
| 5 | 40784185 | 40784659 | intron | ENST00000397006 | PRKAA1 |
| 4 | 185269668 | 185270393 | promoter | ENST00000511465 | RP11-290F5.2 |
| 4 | 164471320 | 164471761 | intron | ENST00000510786 | 1-Mar |

FIG. 9A, cont.

| Chr | Start | End | Annotation | Transcript_id | Gene symbol |
|---|---|---|---|---|---|
| 17 | 45393737 | 45394013 | intron | ENST00000575039 | RP11-290H9.4 |
| 12 | 6873219 | 6873910 | promoter | ENST00000540667 | PTMS |
| 1 | 201374557 | 201374865 | exon | ENST00000361379_57596 | |
| 22 | 41983726 | 41984326 | promoter | ENST00000466645 | PMM1 |
| 18 | 22067707 | 22067934 | promoter | ENST00000583122 | RP11-178F10.2 |
| 17 | 74392058 | 74392341 | exon | ENST00000586409_558822 | |
| 14 | 59296342 | 59296858 | promoter | ENST00000555378 | RP11-112J1.2 |
| 4 | 103701581 | 103701969 | intergenic | ENST00000453744 | UBE2D3 |
| 14 | 88715001 | 88715398 | intron | ENST00000556282 | KCNK10 |
| 4 | 57107532 | 57108067 | intron | ENST00000264229 | KIAA1211 |
| 18 | 52613423 | 52613785 | intron | ENST00000587148 | CCDC68 |
| 4 | 129495033 | 129495556 | intergenic | ENST00000514265 | RP11-184M15.1 |
| 10 | 112835917 | 112837154 | promoter | ENST00000280155 | ADRA2A |
| X | 7894985 | 7896017 | promoter | ENST00000442940 | PNPLA4 |
| 2 | 183956117 | 183956559 | intron | ENST00000444562 | AC064871.3 |
| 18 | 71892391 | 71892807 | promoter | ENST00000480810 | RN7SL551P |
| 6 | 2986172 | 2986575 | promoter | ENST00000450238 | LINC01011 |
| 14 | 38438045 | 38438416 | intron | ENST00000533625 | TTC6 |
| 4 | 30964479 | 30964886 | intron | ENST00000509759 | PCDH7 |
| 18 | 29740444 | 29740915 | intron | ENST00000583696 | GAREM |
| 17 | 57069125 | 57069558 | intron | ENST00000393066 | TRIM37 |
| 12 | 105711706 | 105711997 | intron | ENST00000549251 | RP11-474B16.1 |
| 18 | 20284179 | 20284604 | intron | ENST00000578831 | RP11-739L10.1 |
| 17 | 64382980 | 64383423 | intron | ENST00000284384 | PRKCA |
| 3 | 24640233 | 24640703 | intergenic | ENST00000415266 | EIF3KP2 |
| 18 | 14430668 | 14431655 | intergenic | ENST00000584783 | LONRF2P1 |
| 9 | 79249252 | 79250114 | intron | ENST00000223609 | PRUNE2 |
| 3 | 24565803 | 24566193 | intergenic | ENST00000580344 | MIR4792 |
| 4 | 108729691 | 108730105 | intergenic | ENST00000506462 | SGMS2 |
| 12 | 3982194 | 3982816 | promoter | ENST00000450737 | PARP11 |
| 14 | 50453931 | 50454479 | intron | ENST00000530176 | C14orf182 |
| 2 | 42422735 | 42423150 | intron | ENST00000401738 | EML4 |
| 8 | 8547367 | 8547711 | intergenic | ENST00000519106 | CLDN23 |
| 1 | 28648608 | 28649153 | intergenic | ENST00000479574 | MED18 |
| 12 | 646923 | 647267 | intron | ENST00000535680 | B4GALNT3 |
| 8 | 22222876 | 22223300 | promoter | ENST00000359741 | SLC39A14 |
| 5 | 162110217 | 162110778 | intergenic | ENST00000517722 | RP11-167P20.1 |
| 22 | 50228082 | 50228576 | intron | ENST00000565177 | RP3-522J7.6 |
| 12 | 1779737 | 1779986 | intergenic | ENST00000577921 | MIR3649 |
| 13 | 24758417 | 24758918 | intron | ENST00000382141 | RP11-307N16.6 |
| 4 | 187027154 | 187027446 | promoter | ENST00000508379 | FAM149A |
| 4 | 149908119 | 149908467 | intergenic | ENST00000458836 | RNU7-197P |
| 9 | 90184915 | 90185347 | intron | ENST00000489291 | DAPK1 |

FIG. 9A, cont.

| Chr | Start | End | Annotation | Transcript_id | Gene symbol |
|---|---|---|---|---|---|
| 4 | 154140059 | 154140489 | intron | ENST00000338700 | TRIM2 |
| 12 | 12556572 | 12557059 | intron | ENST00000298571 | LOH12CR1 |
| 4 | 37684752 | 37685026 | intron | ENST00000454158 | RELL1 |
| 17 | 62700725 | 62701052 | intergenic | ENST00000604003 | MINOS1P2 |
| 17 | 79823676 | 79823948 | promoter | ENST00000576021 | RP11-498C9.3 |
| 17 | 30533043 | 30533564 | promoter | ENST00000581148 | RHOT1 |
| 18 | 25185269 | 25185490 | intergenic | ENST00000584546 | RP11-739N10.1 |
| 18 | 2939329 | 2939618 | intron | ENST00000261596 | LPIN2 |
| 18 | 19774213 | 19774529 | intron | ENST00000581694 | GATA6 |
| 18 | 54937345 | 54938049 | intergenic | ENST00000365370 | RNU6-737P |
| 3 | 191194228 | 191194546 | intergenic | ENST00000518817 | PYDC2 |
| 5 | 90184384 | 90184958 | intron | ENST00000425867 | GPR98 |
| 6 | 143160084 | 143160736 | promoter | ENST00000367604 | HIVEP2 |
| 18 | 30050445 | 30051372 | promoter | ENST00000399218 | GAREM |
| 3 | 43255202 | 43255564 | intergenic | ENST00000410399 | AC104434.1 |
| 5 | 98360931 | 98361324 | intergenic | ENST00000513175 | CTD-2007H13.3 |
| 19 | 45198585 | 45199263 | intron | ENST00000590796 | CTB-171A8.1 |
| 17 | 76334969 | 76335254 | intron | ENST00000586321 | AC061992.2 |
| 3 | 24358451 | 24358695 | intron | ENST00000418247 | THRB |
| 4 | 31148080 | 31148352 | exon | ENST00000511884_155940 | |
| 5 | 34212911 | 34213718 | intron | ENST00000512782 | RP11-1023L17.1 |
| 18 | 21453249 | 21453428 | promoter | ENST00000587184 | LAMA3 |
| 18 | 3117490 | 3118235 | intron | ENST00000261606 | MYOM1 |
| 18 | 19770500 | 19771301 | intron | ENST00000581694 | GATA6 |
| 17 | 44656868 | 44657529 | promoter | ENST00000336125 | ARL17A |
| 18 | 29522315 | 29523852 | promoter | ENST00000580420 | RP11-326K13.4 |
| 17 | 60266034 | 60266758 | intergenic | ENST00000577881 | RP11-51L5.3 |
| 14 | 81769514 | 81770277 | intron | ENST00000556280 | STON2 |
| 5 | 34466571 | 34467442 | intergenic | ENST00000503549 | RP11-1325J9.1 |
| 4 | 2420021 | 2420910 | promoter | ENST00000382849 | RP11-503N18.1 |
| 3 | 80745459 | 80745848 | intergenic | ENST00000482003 | RP11-47P18.1 |
| 4 | 125353676 | 125354469 | intergenic | ENST00000506481 | RP11-93I21.2 |
| 2 | 165477406 | 165478493 | promoter | ENST00000446413 | GRB14 |
| X | 2815696 | 2816658 | intergenic | ENST00000381154 | ARSD |
| 12 | 7950400 | 7950813 | intergenic | ENST00000229307 | NANOG |
| 5 | 92414000 | 92415132 | intergenic | ENST00000515153 | CTD-2091N23.1 |
| 18 | 24067372 | 24067793 | intron | ENST00000578973 | KCTD1 |
| X | 15692727 | 15694099 | promoter | ENST00000380333 | CA5BP1 |
| 4 | 120549649 | 120550511 | promoter | ENST00000354960 | PDE5A |
| 5 | 60954962 | 60955315 | exon | ENST00000505623_198864 | |
| 8 | 107630045 | 107630587 | promoter | ENST00000497705 | OXR1 |
| 7 | 16961496 | 16961960 | intergenic | ENST00000419352 | AC098592.7 |
| 4 | 125127833 | 125128704 | intron | ENST00000507299 | CTD-2325B11.1 |

FIG. 9A, cont.

| Chr | Start | End | Annotation | Transcript_id | Gene symbol |
|---|---|---|---|---|---|
| X | 47052740 | 47053352 | promoter | ENST00000335972 | UBA1 |
| 5 | 87564239 | 87565285 | promoter | ENST00000512724 | TMEM161B-AS1 |
| 4 | 124467237 | 124467606 | intergenic | ENST00000508291 | RP11-381N20.1 |
| 15 | 59548285 | 59548587 | intron | ENST00000558571 | MYO1E |
| 16 | 63651192 | 63652144 | promoter | ENST00000563855 | RP11-368L12.1 |
| 4 | 142271254 | 142271697 | intergenic | ENST00000511213 | RP11-362F19.1 |
| X | 7050318 | 7051134 | intron | ENST00000498474 | HDHD1 |
| 4 | 176986570 | 176987383 | promoter | ENST00000280190 | WDR17 |
| 3 | 15900398 | 15901920 | promoter | ENST00000439830 | ANKRD28 |
| 18 | 21408398 | 21408763 | promoter | ENST00000591749 | LAMA3 |
| 4 | 36352766 | 36353045 | intron | ENST00000504344 | RP11-431M7.2 |
| 4 | 26828299 | 26828789 | intergenic | ENST00000494628 | STIM2 |
| 17 | 36507408 | 36508157 | promoter | ENST00000577233 | SOCS7 |
| 4 | 149297345 | 149297623 | intron | ENST00000511528 | NR3C2 |
| 12 | 17795043 | 17795272 | intergenic | ENST00000539105 | RP11-606D9.1 |
| 5 | 156692779 | 156693779 | promoter | ENST00000517634 | CTC-248O19.1 |
| 18 | 21452574 | 21453145 | promoter | ENST00000587184 | LAMA3 |
| 4 | 90226929 | 90227192 | promoter | ENST00000609438 | GPRIN3 |
| 16 | 4464103 | 4464762 | promoter | ENST00000576457 | CORO7 |
| X | 24482963 | 24483767 | promoter | ENST00000441463 | PDK3 |
| 18 | 12657581 | 12658532 | promoter | ENST00000400512 | AP005482.1 |
| 5 | 70743142 | 70743357 | promoter | ENST00000502659 | RP11-136K7.2 |
| 4 | 54457506 | 54458027 | promoter | ENST00000512247 | LNX1 |
| 9 | 114827947 | 114828604 | intron | ENST00000374264 | SUSD1 |
| 17 | 72987700 | 72988299 | intron | ENST00000337231 | CDR2L |
| 17 | 62161429 | 62162290 | intron | ENST00000584041 | ERN1 |
| 18 | 20263110 | 20263735 | intergenic | ENST00000578831 | RP11-739L10.1 |
| 8 | 17658296 | 17659254 | promoter | ENST00000522768 | RP11-156K13.1 |
| 13 | 30122775 | 30123280 | intron | ENST00000450494 | SLC7A1 |
| 17 | 56494818 | 56495318 | promoter | ENST00000580014 | RNF43 |
| 12 | 15427333 | 15427966 | intron | ENST00000393736 | RERG |
| 18 | 19862218 | 19863030 | intergenic | ENST00000459476 | snoU13 |
| 14 | 31697679 | 31698056 | intergenic | ENST00000365532 | Y_RNA |
| 4 | 79548832 | 79549112 | intergenic | ENST00000364128 | Y_RNA |
| 16 | 57298954 | 57299312 | promoter | ENST00000564018 | PLLP |
| 18 | 20679542 | 20679947 | intergenic | ENST00000400473 | CABLES1 |
| 12 | 12223581 | 12224233 | promoter | ENST00000308721 | BCL2L14 |
| 8 | 118958604 | 118959299 | intron | ENST00000436216 | EXT1 |
| 5 | 170184196 | 170184589 | promoter | ENST00000521965 | MIR4454 |
| 15 | 39565852 | 39566905 | promoter | ENST00000561058 | RP11-624L4.1 |
| 5 | 81931049 | 81932003 | intergenic | ENST00000510845 | CTD-2015A6.2 |
| 14 | 87265459 | 87266198 | intergenic | ENST00000557527 | RP11-322L20.1 |
| 4 | 169019178 | 169019931 | intron | ENST00000506926 | RP11-31O9.1 |

FIG. 9A, cont.

| Chr | Start | End | Annotation | Transcript_id | Gene symbol |
|---|---|---|---|---|---|
| 1 | 180126329 | 180127241 | intron | ENST00000367600 | QSOX1 |
| 1 | 68345690 | 68346295 | intron | ENST00000413628 | GNG12-AS1 |
| 5 | 95429064 | 95430289 | intron | ENST00000511775 | CTD-2337A12.1 |
| 14 | 50908246 | 50909117 | intron | ENST00000013125 | MAP4K5 |
| 4 | 98353586 | 98354125 | intron | ENST00000518105 | RP11-681L8.1 |
| X | 17613238 | 17614124 | intron | ENST00000380060 | NHS |
| 7 | 86475603 | 86476697 | intron | ENST00000439827 | GRM3 |
| 13 | 73745224 | 73745935 | intergenic | ENST00000364383 | RNU4-10P |
| 13 | 39260761 | 39261550 | promoter | ENST00000280481 | FREM2 |
| 18 | 14178703 | 14179225 | promoter | ENST00000581181 | ANKRD20A5P |
| 6 | 15949256 | 15950233 | intergenic | ENST00000448802 | ARPC3P5 |
| 5 | 73704005 | 73704568 | intron | ENST00000507781 | CTC-419K13.1 |
| 4 | 184276391 | 184276972 | intergenic | ENST00000514910 | RP11-451F20.1 |
| 18 | 29952163 | 29952949 | intron | ENST00000269209 | GAREM |
| 4 | 120651110 | 120651691 | intergenic | ENST00000503266 | RP11-236P13.1 |
| 4 | 147866860 | 147867427 | promoter | ENST00000502319 | TTC29 |
| 13 | 24606606 | 24607289 | intron | ENST00000382141 | RP11-307N16.6 |
| 9 | 116333099 | 116333705 | intron | ENST00000428429 | RP11-168K11.2 |
| 16 | 52288281 | 52288983 | promoter | ENST00000408588 | AC007333.1 |
| 4 | 168139291 | 168139787 | intron | ENST00000512042 | SPOCK3 |
| 5 | 50728721 | 50729673 | intergenic | ENST00000505723 | CTD-2335O3.2 |
| 4 | 111751532 | 111751971 | intergenic | ENST00000515999 | AC024198.1 |
| X | 64416588 | 64417229 | intergenic | ENST00000451184 | RP11-231N9.1 |
| 13 | 76583584 | 76584230 | intergenic | ENST00000448806 | LINC01034 |
| 18 | 21207297 | 21207674 | intron | ENST00000587763 | ANKRD29 |
| 22 | 32475114 | 32475693 | intron | ENST00000543737 | SLC5A1 |
| 4 | 106830892 | 106831539 | promoter | ENST00000506056 | NPNT |
| 15 | 63343399 | 63343882 | promoter | ENST00000561241 | RP11-244F12.3 |
| 21 | 36391861 | 36392371 | intron | ENST00000416754 | RUNX1 |
| 13 | 103782751 | 103783563 | intergenic | ENST00000245312 | SLC10A2 |
| 5 | 110072468 | 110072845 | promoter | ENST00000512886 | TMEM232 |
| 9 | 89951812 | 89952262 | intergenic | ENST00000391119 | SNORA26 |
| 18 | 8794410 | 8794963 | intron | ENST00000518815 | SOGA2 |
| 17 | 48770069 | 48771000 | promoter | ENST00000574246 | RP11-294J22.6 |
| 5 | 14581642 | 14582228 | promoter | ENST00000274217 | FAM105A |
| 18 | 71007537 | 71008213 | intron | ENST00000583942 | CTD-2354A18.1 |
| 22 | 34142384 | 34142996 | intron | ENST00000416275 | LARGE-AS1 |
| 18 | 7878650 | 7879298 | intron | ENST00000400053 | PTPRM |
| 4 | 67440362 | 67441524 | intergenic | ENST00000470993 | RPS23P3 |
| 15 | 86106408 | 86107073 | intron | ENST00000558811 | AKAP13 |
| 14 | 38063747 | 38065628 | promoter | ENST00000556845 | TTC6 |
| 13 | 74864507 | 74864895 | promoter | ENST00000383890 | RNY1P5 |
| 22 | 40783623 | 40784186 | promoter | ENST00000607915 | RP5-1042K10.10 |

FIG. 9A, cont.

| Chr | Start | End | Annotation | Transcript_id | Gene symbol |
|---|---|---|---|---|---|
| 18 | 23669906 | 23671402 | promoter | ENST00000578595 | SS18 |
| 2 | 228626684 | 228627219 | promoter | ENST00000516537 | RNA5SP121 |
| 14 | 75749392 | 75750562 | intergenic | ENST00000303562 | FOS |
| 19 | 7489776 | 7490370 | intron | ENST00000593531 | CTD-2207O23.3 |
| X | 21816665 | 21817660 | intergenic | ENST00000465888 | MBTPS2 |
| 18 | 60087362 | 60088390 | promoter | ENST00000591796 | RP11-640A1.4 |
| 18 | 21269015 | 21270342 | promoter | ENST00000399516 | LAMA3 |
| 8 | 26165314 | 26165833 | intron | ENST00000523964 | PPP2R2A |
| 6 | 43663358 | 43663937 | intergenic | ENST00000372133 | MRPS18A |
| 10 | 8610021 | 8610921 | intergenic | ENST00000425516 | CHCHD3P1 |
| 10 | 52753171 | 52754401 | intron | ENST00000373985 | PRKG1 |
| 17 | 69325178 | 69326441 | intergenic | ENST00000410631 | RNU6-305P |
| 12 | 22741552 | 22742171 | intergenic | ENST00000535801 | RP11-268P4.2 |
| 4 | 77613059 | 77614188 | intron | ENST00000486758 | SHROOM3 |
| 22 | 42579385 | 42580044 | intron | ENST00000404876 | TCF20 |
| 11 | 102800546 | 102801385 | intergenic | ENST00000260302 | MMP13 |
| 1 | 168769107 | 168770153 | intergenic | ENST00000420691 | LINC00626 |
| 17 | 48968048 | 48968736 | intron | ENST00000514358 | TOB1-AS1 |
| 6 | 131579205 | 131579893 | intron | ENST00000474850 | AKAP7 |
| 5 | 111869063 | 111869538 | intergenic | ENST00000514243 | RP11-159K7.1 |
| 10 | 9866325 | 9867152 | intergenic | ENST00000419836 | RP5-1051H14.2 |
| 21 | 40174479 | 40175013 | intergenic | ENST00000360214 | ETS2 |
| 3 | 169022989 | 169023782 | intron | ENST00000485957 | MECOM |
| 10 | 74209572 | 74210383 | intron | ENST00000489666 | MICU1 |
| 2 | 101441977 | 101442437 | intron | ENST00000430586 | AC092168.2 |
| 15 | 71438884 | 71439471 | intron | ENST00000261862 | THSD4 |
| 18 | 52434366 | 52434770 | intron | ENST00000586570 | RAB27B |
| X | 17027964 | 17029048 | intron | ENST00000380064 | REPS2 |
| 4 | 74889262 | 74890088 | intergenic | ENST00000464637 | RN7SL218P |
| 8 | 127836689 | 127837275 | intergenic | ENST00000519319 | PCAT1 |
| 5 | 60757258 | 60757764 | intron | ENST00000252744 | ZSWIM6 |
| 3 | 151576923 | 151578197 | intron | ENST00000475855 | RP11-454C18.2 |
| X | 17050088 | 17050991 | intron | ENST00000380064 | REPS2 |
| 15 | 54081718 | 54082628 | intergenic | ENST00000383914 | RNU6-449P |
| 4 | 115433283 | 115434630 | intergenic | ENST00000310836 | UGT8 |
| 6 | 131579943 | 131580553 | intron | ENST00000474850 | AKAP7 |
| 7 | 65226259 | 65226827 | promoter | ENST00000384058 | SNORA15 |
| 12 | 22715040 | 22716069 | intergenic | ENST00000542742 | RP11-359J14.3 |
| 8 | 8543551 | 8544101 | intergenic | ENST00000519106 | CLDN23 |
| 17 | 56477290 | 56477780 | intron | ENST00000583841 | BZRAP1-AS1 |
| 4 | 30903182 | 30904207 | intron | ENST00000511884 | PCDH7 |
| 12 | 13539722 | 13539939 | promoter | ENST00000532841 | C12orf36 |
| 12 | 13539993 | 13540519 | promoter | ENST00000531049 | C12orf36 |

FIG. 9A, cont.

| Chr | Start | End | Annotation | Transcript_id | Gene symbol |
|---|---|---|---|---|---|
| 4 | 109875916 | 109876470 | intron | ENST00000399126 | COL25A1 |
| 15 | 97862475 | 97863361 | promoter | ENST00000559394 | RP11-315L6.1 |
| 5 | 32302570 | 32303291 | intron | ENST00000513622 | MTMR12 |
| 15 | 30110396 | 30110856 | intron | ENST00000473741 | TJP1 |
| 4 | 175181121 | 175181620 | intron | ENST00000513696 | FBXO8 |
| 21 | 16513635 | 16514425 | intergenic | ENST00000449746 | AF127577.12 |
| 2 | 66800612 | 66801208 | promoter | ENST00000433396 | AC007392.3 |
| 3 | 169097224 | 169097849 | intron | ENST00000485957 | MECOM |
| 4 | 149352458 | 149353065 | intron | ENST00000511528 | NR3C2 |
| 7 | 116452899 | 116453499 | promoter | ENST00000464223 | CAPZA2 |
| 12 | 122595449 | 122596247 | intron | ENST00000319080 | MLXIP |
| X | 110580244 | 110580776 | intron | ENST00000496551 | DCX |
| 6 | 56558773 | 56559190 | promoter | ENST00000521104 | DST |
| 8 | 71578881 | 71579614 | promoter | ENST00000276590 | LACTB2 |
| 14 | 31503002 | 31503435 | intron | ENST00000555417 | AP4S1 |
| 5 | 55053665 | 55054839 | intron | ENST00000504880 | SLC38A9 |
| 14 | 68631120 | 68631904 | intron | ENST00000557045 | RAD51B |
| 4 | 53728083 | 53728700 | promoter | ENST00000515677 | RASL11B |
| X | 17878644 | 17879810 | promoter | ENST00000545871 | RAI2 |
| 17 | 31121546 | 31122070 | intron | ENST00000583621 | MYO1D |
| 13 | 73899238 | 73900358 | intergenic | ENST00000420129 | MARK2P12 |
| 7 | 117356474 | 117357412 | intron | ENST00000445366 | CTTNBP2 |
| 17 | 71856589 | 71857110 | intergenic | ENST00000580370 | CTD-2532D12.5 |
| 4 | 87863404 | 87863696 | intron | ENST00000511442 | AFF1 |
| 14 | 90114844 | 90115344 | promoter | ENST00000516846 | Y_RNA |
| 13 | 113339543 | 113340006 | intergenic | ENST00000356049 | C13orf35 |
| 18 | 20714210 | 20714563 | promoter | ENST00000579963 | CABLES1 |
| 13 | 106458613 | 106459355 | intergenic | ENST00000415294 | LINC00343 |
| 18 | 10798713 | 10799240 | intron | ENST00000579112 | PIEZO2 |
| 4 | 154110178 | 154111052 | intron | ENST00000437508 | TRIM2 |
| 15 | 74305515 | 74306058 | intron | ENST00000564725 | PML |
| 5 | 60550923 | 60551655 | intron | ENST00000503882 | CTC-436P18.3 |
| 10 | 60228227 | 60229121 | intergenic | ENST00000373886 | BICC1 |
| 2 | 151828282 | 151829233 | intergenic | ENST00000425983 | AC023469.2 |
| 4 | 156625042 | 156625531 | intron | ENST00000513574 | GUCY1A3 |
| 16 | 82061215 | 82061820 | intergenic | ENST00000563491 | HSD17B2 |
| 3 | 27683392 | 27684170 | intergenic | ENST00000607601 | RP11-222K16.1 |
| 8 | 38624299 | 38625022 | intron | ENST00000348567 | TACC1 |
| 17 | 46018633 | 46019210 | promoter | ENST00000433001 | AC003665.1 |
| 5 | 139544548 | 139545540 | exon | ENST00000607850_189600 | |
| 4 | 30954382 | 30954826 | intron | ENST00000509759 | PCDH7 |
| X | 35457520 | 35458562 | intergenic | ENST00000516602 | RNU6-1087P |
| 8 | 17652219 | 17652783 | intron | ENST00000381862 | MTUS1 |

FIG. 9A, cont.

| Chr | Start | End | Annotation | Transcript_id | Gene symbol |
|---|---|---|---|---|---|
| 1 | 172137033 | 172137953 | intron | ENST00000523513 | DNM3 |
| 4 | 155664739 | 155665500 | promoter | ENST00000510733 | LRAT |
| 22 | 39317071 | 39317566 | promoter | ENST00000450216 | CTA-150C2.13 |
| 11 | 22696063 | 22696714 | promoter | ENST00000433790 | GAS2 |
| 5 | 66381100 | 66381787 | intron | ENST00000447738 | MAST4 |
| 4 | 45648854 | 45650096 | intergenic | ENST00000363850 | RNU6-931P |
| 4 | 187564825 | 187565498 | intron | ENST00000441802 | FAT1 |
| 15 | 53746791 | 53747925 | intergenic | ENST00000567224 | WDR72 |
| 4 | 105862880 | 105863326 | intron | ENST00000515649 | RP11-556I14.1 |
| 4 | 77521435 | 77522140 | intron | ENST00000485780 | SHROOM3 |
| 1 | 160512233 | 160512642 | exon | ENST00000534968_54273 | |
| 4 | 25789258 | 25790342 | intron | ENST00000502949 | SEL1L3 |
| 21 | 15588231 | 15588966 | promoter | ENST00000400577 | RBM11 |
| 15 | 23095116 | 23095978 | promoter | ENST00000559762 | RP11-566K19.5 |
| 12 | 43309649 | 43310455 | intergenic | ENST00000603420 | RP11-510P12.1 |
| 2 | 36008748 | 36009185 | intergenic | ENST00000431951 | MRPL50P1 |
| 4 | 175547466 | 175548242 | intergenic | ENST00000274093 | GLRA3 |
| 8 | 42082268 | 42083254 | promoter | ENST00000459183 | snoU13 |
| 5 | 139598938 | 139599611 | intron | ENST00000509789 | CYSTM1 |
| 7 | 121037949 | 121038214 | promoter | ENST00000411715 | CYCSP19 |
| 4 | 94763615 | 94764289 | intergenic | ENST00000306011 | ATOH1 |
| 12 | 12603953 | 12604650 | promoter | ENST00000605743 | RP11-253I19.4 |
| 18 | 21075012 | 21075330 | intergenic | ENST00000269221 | C18orf8 |
| X | 23925684 | 23926349 | promoter | ENST00000490078 | APOO |
| 21 | 36250878 | 36251125 | intron | ENST00000486278 | RUNX1 |
| 18 | 8329209 | 8329564 | intron | ENST00000577827 | PTPRM |
| 2 | 73944031 | 73944360 | intergenic | ENST00000489476 | TPRKB |
| 4 | 37491862 | 37492339 | intron | ENST00000508175 | C4orf19 |
| Y | 2558421 | 2558773 | intergenic | ENST00000516032 | RNU6-1334P |
| 15 | 63969949 | 63970349 | promoter | ENST00000559715 | HERC1 |
| 18 | 19664513 | 19664896 | intergenic | ENST00000579830 | RP11-595B24.2 |
| 4 | 74548559 | 74549428 | intergenic | ENST00000436089 | AC112518.3 |
| 18 | 9422752 | 9423417 | intergenic | ENST00000262120 | TWSG1 |
| 18 | 21464667 | 21465113 | promoter | ENST00000586751 | LAMA3 |
| 4 | 48261077 | 48261668 | intron | ENST00000381501 | TEC |
| 12 | 15305835 | 15306272 | promoter | ENST00000541243 | RERG-AS1 |
| 4 | 105979088 | 105979826 | intron | ENST00000506386 | RP11-556I14.1 |
| X | 2608934 | 2609490 | promoter | ENST00000381180 | CD99 |
| 13 | 73544410 | 73545113 | promoter | ENST00000469712 | PIBF1 |
| 4 | 55896756 | 55897737 | promoter | ENST00000517006 | RNU6-410P |
| 4 | 13703459 | 13704075 | intron | ENST00000510907 | RP11-341G5.1 |
| 14 | 64137369 | 64137812 | intergenic | ENST00000247225 | SGPP1 |
| 12 | 26421726 | 26422408 | intron | ENST00000540392 | RP11-283G6.4 |

FIG. 9A, cont.

| Chr | Start | End | Annotation | Transcript_id | Gene symbol |
|---|---|---|---|---|---|
| 18 | 4004111 | 4004976 | promoter | ENST00000582051 | DLGAP1 |
| X | 16328282 | 16328968 | intergenic | ENST00000516839 | AC078993.1 |
| X | 13012317 | 13012875 | intergenic | ENST00000451311 | TMSB4X |
| 5 | 50521576 | 50522552 | intergenic | ENST00000468490 | CTD-2312P21.1 |
| 4 | 87933836 | 87934323 | intron | ENST00000544085 | AFF1 |
| 15 | 57619201 | 57619605 | promoter | ENST00000567319 | RP11-358M11.4 |
| 8 | 118959719 | 118960347 | intron | ENST00000436216 | EXT1 |
| 4 | 170106361 | 170107215 | intron | ENST00000508685 | SH3RF1 |
| 14 | 23029755 | 23030313 | intergenic | ENST00000557595 | AE000662.92 |
| 13 | 102392011 | 102392599 | intron | ENST00000376143 | FGF14 |
| 4 | 186639663 | 186640609 | intron | ENST00000456060 | SORBS2 |
| 17 | 35281035 | 35281678 | intron | ENST00000529264 | RP11-445F12.1 |
| 18 | 19790101 | 19790813 | intergenic | ENST00000578741 | RP11-627G18.4 |
| 4 | 85432843 | 85433341 | intergenic | ENST00000295886 | NKX6-1 |
| 1 | 40357889 | 40358640 | intergenic | ENST00000397332 | MYCL |
| 13 | 52532098 | 52532856 | intron | ENST00000542656 | ATP7B |
| 12 | 92940036 | 92940836 | promoter | ENST00000459090 | snoU13 |
| 4 | 158954507 | 158955331 | intergenic | ENST00000513850 | RP11-312A15.3 |
| X | 132843583 | 132844339 | intron | ENST00000406757 | GPC3 |
| 5 | 31048491 | 31049119 | intergenic | ENST00000495944 | RPL19P11 |
| 18 | 24337137 | 24337871 | intron | ENST00000579964 | AQP4-AS1 |
| 4 | 151435655 | 151436697 | intron | ENST00000513021 | LRBA |
| 4 | 72003550 | 72004695 | intergenic | ENST00000264485 | SLC4A4 |
| 16 | 52290147 | 52290849 | promoter | ENST00000408588 | AC007333.1 |
| 18 | 19624260 | 19625733 | intron | ENST00000584898 | RP11-595B24.1 |
| 18 | 21209345 | 21209877 | promoter | ENST00000587763 | ANKRD29 |
| 13 | 102399458 | 102399928 | intron | ENST00000376143 | FGF14 |
| 4 | 106772105 | 106772882 | intron | ENST00000510876 | INTS12 |
| 18 | 21290854 | 21291433 | promoter | ENST00000588044 | RPL23AP77 |
| 13 | 108486621 | 108487030 | promoter | ENST00000449551 | FAM155A-IT1 |
| 8 | 135029476 | 135029978 | intergenic | ENST00000605278 | RP11-157E21.2 |
| 13 | 73614637 | 73615691 | intergenic | ENST00000437000 | PSMD10P3 |
| 18 | 60766821 | 60767604 | intergenic | ENST00000398117 | BCL2 |
| 9 | 27385265 | 27386040 | intron | ENST00000603061 | MOB3B |
| 17 | 72970801 | 72971274 | promoter | ENST00000532900 | HID1 |
| X | 24163828 | 24164250 | intergenic | ENST00000427551 | ZFX-AS1 |
| 18 | 70985941 | 70986635 | intergenic | ENST00000563172 | CTD-2354A18.1 |
| 12 | 9880385 | 9880890 | intron | ENST00000327839 | CLECL1 |
| 13 | 60181712 | 60182550 | intergenic | ENST00000400324 | DIAPH3 |
| 15 | 90877324 | 90877942 | intergenic | ENST00000412799 | GABARAPL3 |
| 18 | 59402679 | 59403762 | intron | ENST00000590968 | RP11-879F14.1 |
| 14 | 39308853 | 39309445 | promoter | ENST00000557440 | LINC00639 |
| 4 | 22943322 | 22944138 | intergenic | ENST00000511453 | RP11-412P11.1 |

FIG. 9A, cont.

| Chr | Start | End | Annotation | Transcript_id | Gene symbol |
|---|---|---|---|---|---|
| 4 | 139833077 | 139833445 | intron | ENST00000507038 | RP11-371F15.3 |
| 18 | 19686422 | 19686904 | intergenic | ENST00000579830 | RP11-595B24.2 |
| 10 | 43137085 | 43137382 | intergenic | ENST00000486614 | ZNF33B |
| 20 | 15119226 | 15119713 | intron | ENST00000310348 | MACROD2 |
| 21 | 36168889 | 36169428 | intron | ENST00000399240 | RUNX1 |
| 18 | 4017582 | 4018096 | intron | ENST00000577430 | DLGAP1 |
| 5 | 132208952 | 132209463 | promoter | ENST00000485457 | LEAP2 |
| 7 | 115979679 | 115980039 | intron | ENST00000446355 | AC002066.1 |
| 18 | 55102256 | 55103165 | promoter | ENST00000581316 | AC090340.1 |
| 4 | 170035695 | 170036113 | intron | ENST00000284637 | SH3RF1 |
| X | 15872339 | 15873736 | promoter | ENST00000421527 | AP1S2 |
| 4 | 177114274 | 177114599 | promoter | ENST00000515234 | SPATA4 |
| 18 | 40105871 | 40106286 | intron | ENST00000589068 | LINC00907 |
| 13 | 99300363 | 99300982 | intergenic | ENST00000430810 | CALM2P4 |
| 7 | 12969053 | 12969525 | intergenic | ENST00000441256 | RBMX2P4 |
| X | 117907769 | 117908146 | intron | ENST00000371637 | IL13RA1 |
| 4 | 171147427 | 171147816 | intergenic | ENST00000504509 | RP11-789C1.1 |
| 12 | 13158692 | 13159059 | intron | ENST00000543321 | RP11-377D9.3 |
| 8 | 29595979 | 29596739 | intron | ENST00000506121 | LINC00589 |
| 8 | 22312699 | 22313062 | intron | ENST00000522000 | PPP3CC |
| 4 | 103811017 | 103811934 | intron | ENST00000514972 | SLC9B1 |
| 8 | 8549498 | 8549897 | intergenic | ENST00000519106 | CLDN23 |
| 4 | 106818891 | 106819676 | promoter | ENST00000513430 | NPNT |
| 10 | 6343519 | 6344014 | intron | ENST00000399868 | RP11-563J2.2 |
| 9 | 78528856 | 78529314 | promoter | ENST00000459505 | AL359253.1 |
| 5 | 17114415 | 17114792 | intron | ENST00000606445 | BASP1 |
| X | 15624226 | 15624853 | intron | ENST00000421585 | GS1-594A7.3 |
| 18 | 21189439 | 21189988 | intron | ENST00000591617 | ANKRD29 |
| 10 | 115312349 | 115312929 | promoter | ENST00000541666 | HABP2 |
| 6 | 119915982 | 119916519 | intergenic | ENST00000368468 | MAN1A1 |
| 4 | 157873335 | 157873855 | intron | ENST00000422544 | PDGFC |
| 4 | 77510524 | 77510923 | intron | ENST00000485780 | SHROOM3 |
| 3 | 7246159 | 7246840 | intron | ENST00000435689 | GRM7 |
| 18 | 9673064 | 9673873 | intergenic | ENST00000581937 | KRT18P8 |
| 18 | 71068317 | 71068856 | intergenic | ENST00000563172 | CTD-2354A18.1 |
| 4 | 18814749 | 18815500 | intergenic | ENST00000503815 | RP11-608B3.1 |
| 18 | 9736984 | 9737287 | promoter | ENST00000578806 | RP11-692N5.2 |
| 12 | 21597079 | 21597766 | intron | ENST00000538582 | PYROXD1 |
| 18 | 28981489 | 28981834 | promoter | ENST00000581452 | RP11-534N16.1 |
| 5 | 37165920 | 37166523 | intron | ENST00000511824 | C5orf42 |
| 12 | 60566172 | 60566790 | intergenic | ENST00000551882 | RP11-335M9.1 |
| 18 | 26372413 | 26372889 | intergenic | ENST00000582726 | RP11-510D21.1 |
| X | 3631095 | 3632157 | promoter | ENST00000262848 | PRKX |

FIG. 9A, cont.

| Chr | Start | End | Annotation | Transcript_id | Gene symbol |
|---|---|---|---|---|---|
| 18 | 3250757 | 3251051 | promoter | ENST00000578562 | MYL12A |
| 18 | 65288323 | 65288979 | intron | ENST00000583687 | RP11-638L3.1 |
| 5 | 144843814 | 144844163 | intergenic | ENST00000510259 | PRELID2 |
| 18 | 21544367 | 21545241 | intron | ENST00000582300 | RP11-403A21.1 |
| 12 | 71557965 | 71558303 | intron | ENST00000549421 | TSPAN8 |
| 12 | 13025022 | 13026103 | intergenic | ENST00000459725 | RPL13AP20 |
| 12 | 71555389 | 71555659 | intron | ENST00000549421 | TSPAN8 |
| 5 | 54660393 | 54660916 | intron | ENST00000545714 | SKIV2L2 |
| 6 | 106894847 | 106895225 | intergenic | ENST00000365516 | RNA5SP211 |
| X | 77192772 | 77193146 | intron | ENST00000602791 | RP5-1000K24.2 |
| 18 | 12000289 | 12000722 | promoter | ENST00000588863 | IMPA2 |
| 18 | 3456781 | 3457062 | promoter | ENST00000472042 | TGIF1 |
| 5 | 43893907 | 43894383 | intergenic | ENST00000508829 | RP11-8L21.1 |
| 13 | 35515748 | 35516975 | promoter | ENST00000379939 | NBEA |
| 18 | 26374435 | 26374857 | intergenic | ENST00000582726 | RP11-510D21.1 |
| 15 | 89668375 | 89668644 | intron | ENST00000562073 | ABHD2 |
| 4 | 37978642 | 37979668 | promoter | ENST00000446803 | TBC1D1 |
| 13 | 77498752 | 77499091 | intergenic | ENST00000426582 | BTF3P11 |
| X | 105961933 | 105962318 | intron | ENST00000324342 | RNF128 |
| 14 | 56355837 | 56356276 | intergenic | ENST00000569625 | RP11-1012E15.1 |
| 3 | 66543117 | 66543471 | intron | ENST00000475366 | LRIG1 |
| 4 | 4501198 | 4501552 | intron | ENST00000512780 | STX18 |
| 15 | 90401815 | 90402255 | intron | ENST00000559629 | C15orf38-AP3S2 |
| 7 | 13005419 | 13005842 | intergenic | ENST00000441256 | RBMX2P4 |
| 14 | 37798337 | 37798669 | intron | ENST00000556940 | MIPOL1 |
| 17 | 48774453 | 48774711 | promoter | ENST00000364470 | Y_RNA |
| 13 | 32519681 | 32520190 | intron | ENST00000428783 | EEF1DP3 |
| 17 | 10640501 | 10640980 | intron | ENST00000583012 | CTC-297N7.5 |
| 9 | 45008582 | 45009082 | intron | ENST00000421848 | RP11-374M1.4 |
| 18 | 19748853 | 19749787 | promoter | ENST00000583490 | GATA6-AS1 |
| 8 | 17646298 | 17647375 | intron | ENST00000381862 | MTUS1 |
| 17 | 618801 | 619322 | promoter | ENST00000437048 | VPS53 |
| 13 | 93125967 | 93126657 | intron | ENST00000377067 | GPC5 |
| 10 | 65479061 | 65479739 | intron | ENST00000444770 | RP11-170M17.1 |
| 3 | 19189370 | 19190217 | promoter | ENST00000452398 | KCNH8 |
| 1 | 59245356 | 59246066 | intergenic | ENST00000371222 | JUN |
| 9 | 105629671 | 105630230 | intergenic | ENST00000430854 | RP11-338N12.1 |
| 2 | 134946547 | 134947309 | intron | ENST00000409645 | MGAT5 |
| 13 | 78271260 | 78272125 | promoter | ENST00000466548 | SLAIN1 |
| 14 | 68658282 | 68659082 | intron | ENST00000557045 | RAD51B |
| X | 22003441 | 22003730 | intron | ENST00000415881 | SMS |
| 7 | 38903200 | 38903772 | intron | ENST00000457055 | VPS41 |
| 17 | 53510366 | 53511001 | intergenic | ENST00000262065 | MMD |

FIG. 9A, cont.

| Chr | Start | End | Annotation | Transcript_id | Gene symbol |
|---|---|---|---|---|---|
| 12 | 15373831 | 15374573 | promoter | ENST00000537717 | RERG |
| 15 | 52199610 | 52200183 | promoter | ENST00000606352 | U6 |
| Y | 2476943 | 2477666 | intergenic | ENST00000516032 | RNU6-1334P |
| 17 | 46024345 | 46024764 | promoter | ENST00000580372 | RP11-6N17.6 |
| X | 1710260 | 1710695 | promoter | ENST00000381261 | AKAP17A |
| Y | 2558832 | 2559585 | intergenic | ENST00000516032 | RNU6-1334P |
| 18 | 23806089 | 23807166 | promoter | ENST00000418698 | TAF4B |
| 4 | 69598563 | 69599228 | intergenic | ENST00000509261 | RP11-1267H10.4 |
| 12 | 6419391 | 6420221 | promoter | ENST00000396988 | PLEKHG6 |
| 18 | 2984812 | 2985290 | promoter | ENST00000584915 | LPIN2 |
| X | 20392961 | 20393546 | intergenic | ENST00000517169 | RN7SKP183 |
| 15 | 66124847 | 66125582 | intron | ENST00000568850 | RAB11A |
| 4 | 119273882 | 119274465 | promoter | ENST00000296498 | PRSS12 |
| 3 | 19188141 | 19189179 | promoter | ENST00000328405 | KCNH8 |
| 11 | 94335540 | 94336653 | intron | ENST00000537874 | RP11-867G2.8 |
| 18 | 29665492 | 29665879 | intron | ENST00000583184 | RP11-53I6.2 |
| 5 | 176513355 | 176514471 | promoter | ENST00000513166 | FGFR4 |
| 18 | 12376764 | 12377928 | promoter | ENST00000590811 | AFG3L2 |
| X | 33780627 | 33780788 | intron | ENST00000445233 | RP11-305F18.1 |
| X | 83441953 | 83443818 | promoter | ENST00000460730 | RPS6KA6 |
| 4 | 15679072 | 15679693 | intron | ENST00000514541 | FBXL5 |
| 17 | 36070163 | 36070788 | intron | ENST00000560016 | HNF1B |
| 18 | 28551397 | 28551656 | intron | ENST00000583580 | RP11-25I11.1 |
| 18 | 21795580 | 21796435 | promoter | ENST00000384039 | RNU6-435P |
| 4 | 89897580 | 89898181 | intron | ENST00000509094 | FAM13A |
| 8 | 40013191 | 40014286 | intergenic | ENST00000315792 | C8orf4 |
| 4 | 52883991 | 52884363 | promoter | ENST00000343457 | LRRC66 |
| 3 | 66692481 | 66692862 | intergenic | ENST00000459863 | RPL21P41 |
| 18 | 19748357 | 19748632 | promoter | ENST00000579431 | GATA6-AS1 |
| 5 | 58145773 | 58146112 | intron | ENST00000510198 | CTD-2176I21.2 |
| 5 | 40485204 | 40485821 | intergenic | ENST00000583717 | AC108105.1 |
| 7 | 64532350 | 64532740 | promoter | ENST00000384334 | SNORA15 |
| 18 | 21450963 | 21451245 | promoter | ENST00000269217 | LAMA3 |
| 15 | 57899754 | 57900281 | intron | ENST00000569089 | MYZAP |
| 12 | 27425172 | 27426386 | intron | ENST00000543246 | STK38L |

FIG. 9B

| Chr | Start | End | Annotation | Transcript_id | Gene symbol |
|---|---|---|---|---|---|
| 10 | 134254015 | 134254324 | promoter | ENST00000450206 | RP11-432J24.3 |
| 10 | 1506248 | 1507137 | intron | ENST00000381312 | ADARB2 |
| 14 | 105698636 | 105698888 | intron | ENST00000550208 | BRF1 |
| 7 | 401254 | 401879 | intergenic | ENST00000515213 | AC226118.1 |
| 7 | 4652611 | 4652868 | intergenic | ENST00000446823 | FOXK1 |
| 17 | 104433 | 104716 | intron | ENST00000570638 | RPH3AL |
| 2 | 1420825 | 1421839 | intron | ENST00000382198 | TPO |
| 16 | 12895395 | 12895819 | promoter | ENST00000539677 | CPPED1 |
| 16 | 89495481 | 89495932 | intron | ENST00000566973 | ANKRD11 |
| 16 | 1389753 | 1390364 | intron | ENST00000421665 | BAIAP3 |
| 6 | 2504483 | 2504975 | intergenic | ENST00000606884 | GMDS-AS1 |
| 2 | 2016399 | 2016710 | intron | ENST00000479156 | MYT1L |
| 17 | 75480980 | 75481368 | intron | ENST00000585638 | 9-Sep |
| 22 | 30601850 | 30602161 | promoter | ENST00000432360 | RP3-438O4.4 |
| 1 | 3594879 | 3595126 | intron | ENST00000357733 | TP73 |
| 11 | 460271 | 461039 | promoter | ENST00000526878 | PTDSS2 |
| 9 | 138020994 | 138021355 | intergenic | ENST00000371796 | OLFM1 |
| 12 | 123933887 | 123934119 | intergenic | ENST00000605712 | RP11-972P1.8 |
| 18 | 56179682 | 56180292 | intron | ENST00000361673 | ALPK2 |
| 17 | 106478 | 107040 | intron | ENST00000570638 | RPH3AL |
| 11 | 70454 | 70919 | intergenic | ENST00000519787 | RP11-304M2.1 |
| 2 | 242869770 | 242871341 | intron | ENST00000429947 | AC131097.3 |
| 19 | 40421670 | 40422156 | intron | ENST00000221347 | FCGBP |
| 11 | 92438452 | 92438798 | intron | ENST00000525166 | FAT3 |
| 11 | 128149728 | 128150176 | intergenic | ENST00000608492 | RP11-702B10.1 |
| 20 | 5344571 | 5345402 | intergenic | ENST00000363443 | RNA5-8SP7 |
| 10 | 106087848 | 106088405 | promoter | ENST00000358187 | ITPRIP |
| 20 | 17540069 | 17540372 | promoter | ENST00000377868 | BFSP1 |
| 7 | 66017307 | 66017790 | intron | ENST00000445080 | GS1-124K5.12 |
| 2 | 9445224 | 9446284 | intron | ENST00000315273 | ASAP2 |
| 19 | 4084177 | 4084702 | intergenic | ENST00000262948 | MAP2K2 |
| 7 | 36555230 | 36555979 | promoter | ENST00000471806 | AOAH |
| 16 | 33345278 | 33346583 | promoter | ENST00000568752 | RP11-989E6.10 |
| 7 | 63220603 | 63221633 | intergenic | ENST00000605464 | CICP24 |
| 2 | 87651678 | 87651939 | intergenic | ENST00000444323 | AC068279.3 |
| 3 | 126945866 | 126946636 | intergenic | ENST00000492080 | RP11-305F5.2 |
| 11 | 2011127 | 2011556 | promoter | ENST00000419080 | MRPL23-AS1 |
| 11 | 119612823 | 119613563 | intergenic | ENST00000533253 | CTD-2523D13.2 |
| 1 | 1293633 | 1294442 | promoter | ENST00000445648 | MXRA8 |
| 1 | 117900726 | 117901380 | intergenic | ENST00000604156 | RP11-188D8.1 |
| 7 | 102091876 | 102092500 | exon | ENST00000356387_249477 | |
| 10 | 92690759 | 92691502 | intergenic | ENST00000364734 | RNU6-740P |
| 10 | 135342280 | 135342918 | promoter | ENST00000599428 | AL161645.2 |

FIG. 9B, cont.

| Chr | Start | End | Annotation | Transcript_id | Gene symbol |
|---|---|---|---|---|---|
| 12 | 124857925 | 124858331 | intron | ENST00000448614 | NCOR2 |
| 1 | 2111576 | 2112325 | intron | ENST00000505322 | PRKCZ |
| 11 | 1086528 | 1086937 | intron | ENST00000359061 | MUC2 |
| 2 | 10539305 | 10539660 | intron | ENST00000419810 | HPCAL1 |
| 16 | 33348985 | 33350971 | promoter | ENST00000568752 | RP11-989E6.10 |
| 21 | 47410321 | 47410540 | intron | ENST00000361866 | COL6A1 |
| 19 | 36774890 | 36775141 | intergenic | ENST00000586345 | CTD-3162L10.1 |
| 19 | 36790418 | 36790944 | intergenic | ENST00000586345 | CTD-3162L10.1 |
| 19 | 36791007 | 36791167 | intergenic | ENST00000586345 | CTD-3162L10.1 |
| 16 | 32297453 | 32298796 | intergenic | ENST00000568567 | RP11-17M15.2 |
| 19 | 36785355 | 36785870 | intergenic | ENST00000586345 | CTD-3162L10.1 |
| 12 | 9558298 | 9559027 | intron | ENST00000540982 | RP11-599J14.2 |
| 3 | 125726687 | 125727535 | promoter | ENST00000504118 | SLC41A3 |
| 10 | 129058797 | 129060504 | intron | ENST00000464466 | DOCK1 |
| 2 | 87642804 | 87643025 | intergenic | ENST00000444323 | AC068279.3 |
| 1 | 11296642 | 11297523 | intron | ENST00000361445 | MTOR |
| 12 | 31871662 | 31871945 | intron | ENST00000509386 | AMN1 |
| 5 | 1521927 | 1522688 | promoter | ENST00000514484 | LPCAT1 |
| 1 | 4692485 | 4692949 | intergenic | ENST00000378190 | AJAP1 |
| 1 | 66655817 | 66656717 | intron | ENST00000412480 | PDE4B |
| 1 | 16970486 | 16970660 | promoter | ENST00000362058 | CROCCP2 |
| 19 | 6677696 | 6678735 | promoter | ENST00000601475 | C3 |
| 1 | 56933904 | 56934476 | intergenic | ENST00000371250 | PPAP2B |
| 1 | 4693158 | 4693721 | intergenic | ENST00000378190 | AJAP1 |
| 12 | 123333197 | 123333659 | promoter | ENST00000536772 | HIP1R |
| 1 | 193406539 | 193407729 | intergenic | ENST00000420807 | LINC01031 |
| 3 | 121723306 | 121724477 | promoter | ENST00000462014 | ILDR1 |
| 2 | 209676292 | 209676942 | intron | ENST00000419079 | PTH2R |
| 12 | 3306839 | 3307985 | intron | ENST00000011898 | TSPAN9 |
| 11 | 94615832 | 94616486 | intron | ENST00000545958 | RP11-856F16.2 |
| 1 | 3604957 | 3605264 | promoter | ENST00000378280 | TP73 |
| 2 | 1391878 | 1392649 | intron | ENST00000497517 | TPO |
| 1 | 811189 | 812119 | promoter | ENST00000427857 | FAM41C |
| 19 | 38468627 | 38469128 | intron | ENST00000476317 | SIPA1L3 |
| 1 | 238292984 | 238293512 | intergenic | ENST00000445891 | YWHAQP9 |
| 2 | 1560598 | 1560978 | intron | ENST00000438247 | AC144450.1 |
| 12 | 132815639 | 132815889 | intron | ENST00000328957 | GALNT9 |
| 9 | 115846414 | 115847424 | intergenic | ENST00000439875 | FAM225B |
| 19 | 54613041 | 54613311 | promoter | ENST00000482960 | NDUFA3 |
| 2 | 239204444 | 239205433 | intergenic | ENST00000437372 | AC012485.2 |
| 11 | 397903 | 398909 | promoter | ENST00000526971 | PKP3 |
| 1 | 1912821 | 1913709 | intron | ENST00000468610 | C1orf222 |
| 19 | 37782096 | 37782418 | intergenic | ENST00000586442 | CTD-3220F14.1 |

FIG. 9B, cont.

| Chr | Start | End | Annotation | Transcript_id | Gene symbol |
|---|---|---|---|---|---|
| 2 | 11776847 | 11777488 | intron | ENST00000396123 | GREB1 |
| 12 | 132813440 | 132813985 | intron | ENST00000328957 | GALNT9 |
| 1 | 110663023 | 110663256 | intergenic | ENST00000334179 | UBL4B |
| 7 | 155893958 | 155894405 | intergenic | ENST00000384333 | Y_RNA |
| 20 | 36202030 | 36202951 | intergenic | ENST00000423261 | GLRXP |
| 1 | 228778123 | 228778480 | promoter | ENST00000365055 | RNA5S15 |
| 1 | 4503130 | 4503709 | intergenic | ENST00000423197 | RP5-1166F10.1 |
| 20 | 62781169 | 62781776 | promoter | ENST00000360149 | MYT1 |
| 3 | 195509793 | 195510202 | exon | ENST00000478156_152007 | |
| 11 | 134831292 | 134832253 | intergenic | ENST00000528497 | RP11-555G19.1 |
| 5 | 11443246 | 11443549 | intron | ENST00000508761 | CTNND2 |
| 9 | 140244387 | 140245281 | intron | ENST00000484392 | EXD3 |
| 19 | 39648485 | 39649257 | promoter | ENST00000599657 | PAK4 |
| 10 | 132271970 | 132272400 | intron | ENST00000439421 | RP11-540N6.1 |
| 11 | 41553950 | 41554439 | intron | ENST00000526978 | RP11-124G5.3 |
| 1 | 247292118 | 247293363 | intron | ENST00000476312 | ZNF124 |
| 20 | 61588799 | 61589615 | intron | ENST00000411611 | SLC17A9 |
| 19 | 30056819 | 30058660 | intergenic | ENST00000335523 | VSTM2B |
| 19 | 49337650 | 49338689 | promoter | ENST00000595764 | HSD17B14 |
| 1 | 37259254 | 37259535 | intergenic | ENST00000373091 | GRIK3 |
| 12 | 131780776 | 131781831 | promoter | ENST00000508505 | RP11-495K9.3 |
| 19 | 32223716 | 32224929 | intergenic | ENST00000365024 | RNU6-967P |
| 1 | 37449602 | 37450029 | intron | ENST00000373093 | GRIK3 |
| 1 | 40128961 | 40129465 | intron | ENST00000235628 | NT5C1A |
| 1 | 4769995 | 4770757 | promoter | ENST00000466761 | AJAP1 |
| 21 | 47318748 | 47319014 | promoter | ENST00000468429 | PCBP3 |
| 19 | 34280154 | 34280686 | intergenic | ENST00000587658 | KCTD15 |
| 1 | 224136990 | 224138052 | promoter | ENST00000424045 | CICP5 |
| 11 | 1796937 | 1797410 | intergenic | ENST00000449749 | AC068580.7 |
| 11 | 132947949 | 132948284 | intron | ENST00000529038 | OPCML |
| 1 | 1276059 | 1277202 | intron | ENST00000472445 | DVL1 |
| 14 | 72448205 | 72449425 | intron | ENST00000402788 | RGS6 |
| 7 | 158995654 | 158996480 | intergenic | ENST00000437005 | PIP5K1P2 |
| 18 | 77005558 | 77006476 | intron | ENST00000587878 | ATP9B |
| 1 | 247526375 | 247526698 | intergenic | ENST00000478225 | ZNF496 |
| 11 | 134526444 | 134526989 | intergenic | ENST00000529417 | RP11-469N6.3 |
| 12 | 132401688 | 132401954 | promoter | ENST00000540647 | ULK1 |
| 1 | 2688905 | 2690000 | intron | ENST00000401095 | TTC34 |
| 15 | 41324040 | 41324393 | intron | ENST00000558357 | INO80 |
| 7 | 57265415 | 57265595 | promoter | ENST00000423752 | RP11-1217F2.13 |
| 1 | 73361638 | 73361801 | intron | ENST00000445976 | RP4-660H19.1 |
| 2 | 15499821 | 15500945 | intron | ENST00000442506 | NBAS |
| 6 | 97944099 | 97944304 | intergenic | ENST00000574739 | RP3-418C23.2 |

FIG. 9B, cont.

| Chr | Start | End | Annotation | Transcript_id | Gene symbol |
|---|---|---|---|---|---|
| 19 | 31869090 | 31869843 | intron | ENST00000585336 | AC007796.1 |
| 17 | 80544014 | 80544489 | promoter | ENST00000575578 | FOXK2 |
| 7 | 148469337 | 148470194 | intron | ENST00000325222 | CUL1 |
| 10 | 129595626 | 129595975 | intergenic | ENST00000388920 | FOXI2 |
| 2 | 217237783 | 217238658 | promoter | ENST00000273067 | 4-Mar |
| 19 | 38489929 | 38490545 | intron | ENST00000476317 | SIPA1L3 |
| 10 | 133797280 | 133797729 | promoter | ENST00000368636 | BNIP3 |
| 10 | 133661124 | 133661318 | intergenic | ENST00000341866 | AL450307.1 |
| 2 | 36129295 | 36129643 | intergenic | ENST00000431951 | MRPL50P1 |
| 10 | 96989136 | 96989837 | promoter | ENST00000451737 | RP11-310E22.4 |
| 11 | 117109912 | 117110426 | exon | ENST00000529869_361297 | |
| 9 | 137494257 | 137495098 | intergenic | ENST00000371817 | COL5A1 |
| 19 | 35809800 | 35810562 | promoter | ENST00000601414 | CD22 |
| 19 | 38530496 | 38531253 | intron | ENST00000476317 | SIPA1L3 |
| 12 | 108876411 | 108877044 | intron | ENST00000502160 | RP11-13G14.4 |
| 1 | 210612139 | 210613054 | promoter | ENST00000367009 | HHAT |
| 7 | 157599753 | 157600564 | intron | ENST00000404321 | PTPRN2 |
| 17 | 68185179 | 68185450 | intergenic | ENST00000243457 | KCNJ2 |
| 19 | 30019124 | 30019835 | promoter | ENST00000579268 | CTC-525D6.2 |
| 7 | 154861699 | 154862044 | promoter | ENST00000287907 | HTR5A |
| 7 | 2915618 | 2916223 | intergenic | ENST00000396946 | CARD11 |
| 3 | 168602522 | 168603249 | intergenic | ENST00000484765 | RP11-368I23.2 |
| 2 | 15309734 | 15310359 | intron | ENST00000485694 | NBAS |
| 19 | 33367595 | 33368355 | promoter | ENST00000586628 | CTD-2085J24.4 |
| 11 | 117151727 | 117152451 | promoter | ENST00000524917 | RNF214 |
| 12 | 116400382 | 116401203 | promoter | ENST00000549725 | RP11-493P1.2 |
| 19 | 37793700 | 37794465 | intergenic | ENST00000591471 | HKR1 |
| 3 | 183894085 | 183894896 | promoter | ENST00000431779 | AP2M1 |
| 16 | 86985326 | 86986094 | intergenic | ENST00000566109 | RP11-107C10.1 |
| 3 | 14203211 | 14203401 | intron | ENST00000477324 | XPC |
| 16 | 28394898 | 28395627 | intron | ENST00000398943 | EIF3CL |
| 19 | 42617722 | 42618169 | intron | ENST00000531773 | POU2F2 |
| 1 | 165868016 | 165868540 | promoter | ENST00000463772 | UCK2 |
| 5 | 79715065 | 79715253 | intron | ENST00000510995 | ZFYVE16 |
| 19 | 36095937 | 36096410 | intergenic | ENST00000589603 | AC002115.9 |
| 16 | 28742292 | 28743038 | promoter | ENST00000569005 | EIF3C |
| 11 | 12185010 | 12186343 | promoter | ENST00000379612 | MICAL2 |
| 14 | 76815171 | 76815651 | promoter | ENST00000390772 | AC016543.1 |
| 17 | 21305235 | 21305901 | intron | ENST00000583088 | KCNJ12 |
| 9 | 137394472 | 137395015 | intergenic | ENST00000444936 | RP11-473E2.2 |
| 19 | 38704515 | 38705167 | promoter | ENST00000488378 | DPF1 |
| 8 | 143273979 | 143275177 | intergenic | ENST00000517704 | LINC00051 |
| 11 | 20118774 | 20119500 | intron | ENST00000311043 | NAV2 |

FIG. 9B, cont.

| Chr | Start | End | Annotation | Transcript_id | Gene symbol |
|---|---|---|---|---|---|
| 19 | 39564251 | 39564693 | intergenic | ENST00000601575 | PAPL |
| 3 | 126326051 | 126326334 | promoter | ENST00000519162 | TXNRD3 |
| 11 | 117069701 | 117070445 | promoter | ENST00000278968 | TAGLN |
| 1 | 19586986 | 19587534 | intergenic | ENST00000330263 | MRTO4 |
| 15 | 26020460 | 26021175 | intron | ENST00000555815 | ATP10A |
| 2 | 242054831 | 242055272 | intron | ENST00000493544 | PASK |
| 19 | 33236950 | 33238144 | intron | ENST00000421545 | TDRD12 |
| 10 | 81239097 | 81239352 | intergenic | ENST00000557620 | TPRX1P1 |
| 20 | 36919560 | 36920024 | exon | ENST00000451435_619426 | |
| 10 | 126028465 | 126028958 | intergenic | ENST00000539214 | OAT |
| 11 | 120088623 | 120089064 | intron | ENST00000531220 | OAF |
| 15 | 51369174 | 51369713 | intron | ENST00000559909 | RP11-108K3.1 |
| 16 | 19843028 | 19843331 | intron | ENST00000568061 | IQCK |
| 3 | 71591682 | 71592117 | promoter | ENST00000408337 | MIR1284 |
| 19 | 33963942 | 33964303 | intron | ENST00000590408 | PEPD |
| 17 | 64536177 | 64536808 | intron | ENST00000284384 | PRKCA |
| 11 | 1078428 | 1079839 | intron | ENST00000359061 | MUC2 |
| 12 | 98793216 | 98793758 | intergenic | ENST00000364426 | RNU4-41P |
| 1 | 15322511 | 15323031 | intron | ENST00000400797 | KAZN |
| 2 | 208352490 | 208352976 | intron | ENST00000418850 | AC007879.5 |
| 3 | 128914473 | 128915151 | intergenic | ENST00000422453 | CNBP |
| 6 | 110064994 | 110065287 | intron | ENST00000230124 | FIG4 |
| 3 | 127453590 | 127454743 | promoter | ENST00000398101 | MGLL |
| 9 | 127105090 | 127105743 | intron | ENST00000539416 | NEK6 |
| 11 | 70496478 | 70496740 | intron | ENST00000445654 | SHANK2 |
| 11 | 1691687 | 1692395 | intergenic | ENST00000382167 | FAM99A |
| 14 | 102172379 | 102172956 | intron | ENST00000557778 | RP11-1029J19.5 |
| 7 | 150810759 | 150811221 | promoter | ENST00000335367 | AGAP3 |
| 2 | 74010590 | 74010935 | promoter | ENST00000409561 | C2orf78 |
| 10 | 133759398 | 133760269 | intron | ENST00000472664 | PPP2R2D |
| 8 | 101635463 | 101636150 | intron | ENST00000520661 | SNX31 |
| 13 | 114579128 | 114579433 | promoter | ENST00000449453 | RP11-199F6.4 |
| 12 | 47488676 | 47488915 | intron | ENST00000546455 | PCED1B |
| 15 | 102215274 | 102215634 | intron | ENST00000539112 | TARSL2 |
| 16 | 88840365 | 88840766 | intron | ENST00000301015 | PIEZO1 |
| 2 | 239835989 | 239836732 | intergenic | ENST00000455228 | AC114788.2 |
| 2 | 129063639 | 129064276 | intron | ENST00000494089 | HS6ST1 |
| 1 | 230994632 | 230995105 | intron | ENST00000522201 | C1orf198 |
| 1 | 12100647 | 12101031 | intergenic | ENST00000496974 | RN7SL649P |
| 1 | 178877654 | 178877828 | intron | ENST00000478871 | RALGPS2 |
| 17 | 15917197 | 15917706 | intron | ENST00000497842 | TTC19 |
| 8 | 142157841 | 142158130 | intron | ENST00000523015 | DENND3 |
| 10 | 121010086 | 121010469 | intron | ENST00000392870 | GRK5 |

FIG. 9B, cont.

| Chr | Start | End | Annotation | Transcript_id | Gene symbol |
|---|---|---|---|---|---|
| 7 | 63212550 | 63212945 | intergenic | ENST00000605464 | CICP24 |
| 12 | 131851320 | 131852149 | promoter | ENST00000539209 | RP13-507P19.1 |
| 7 | 63217941 | 63218533 | intergenic | ENST00000605464 | CICP24 |
| 7 | 155199524 | 155200087 | intergenic | ENST00000569431 | RP5-912I13.1 |
| 5 | 628422 | 629006 | intron | ENST00000444221 | CEP72 |
| 17 | 81140434 | 81141322 | intergenic | ENST00000572343 | AC139099.4 |
| 7 | 63216118 | 63216460 | intergenic | ENST00000605464 | CICP24 |
| 17 | 105730 | 106265 | intron | ENST00000570638 | RPH3AL |
| 16 | 86878909 | 86879904 | intergenic | ENST00000566109 | RP11-107C10.1 |
| 21 | 33157360 | 33157791 | intergenic | ENST00000610276 | AP000255.6 |
| 16 | 33293693 | 33295127 | intergenic | ENST00000573021 | RP11-23E10.5 |
| 5 | 2490324 | 2490714 | intergenic | ENST00000560688 | RP11-129I19.2 |
| 19 | 1164280 | 1165046 | intron | ENST00000587655 | SBNO2 |
| 13 | 113680424 | 113680653 | promoter | ENST00000473345 | MCF2L |
| 7 | 206405 | 206816 | intron | ENST00000477004 | FAM20C |
| 7 | 63222975 | 63223858 | intergenic | ENST00000605464 | CICP24 |
| 18 | 77393621 | 77394083 | intergenic | ENST00000317008 | RP11-567M16.3 |
| 15 | 102432818 | 102433991 | intergenic | ENST00000560907 | WBP1LP5 |
| 3 | 195487289 | 195487523 | intron | ENST00000480843 | MUC4 |
| 19 | 2128409 | 2128837 | promoter | ENST00000590683 | AP3D1 |
| 4 | 38735730 | 38736026 | intergenic | ENST00000410298 | RNA5SP158 |
| 19 | 51898699 | 51898961 | promoter | ENST00000600765 | CTD-2616J11.14 |
| 2 | 241564963 | 241565884 | promoter | ENST00000407714 | GPR35 |
| 9 | 115851492 | 115852115 | intergenic | ENST00000439875 | FAM225B |
| 10 | 35838253 | 35839249 | intron | ENST00000497692 | CCNY |
| 16 | 32351227 | 32353593 | intergenic | ENST00000562853 | RP11-17M15.4 |
| 10 | 482220 | 483506 | promoter | ENST00000425723 | RP11-490E15.2 |
| 12 | 132060998 | 132062024 | intergenic | ENST00000541343 | RP11-292I17.1 |
| 20 | 61695692 | 61696532 | intron | ENST00000607802 | RP11-305P22.9 |
| 4 | 7541341 | 7542231 | intron | ENST00000329016 | SORCS2 |
| 16 | 88366497 | 88367260 | intergenic | ENST00000563190 | LA16c-444G7.1 |
| 1 | 30664002 | 30664591 | intergenic | ENST00000442774 | RP3-357I16.1 |
| 16 | 84558648 | 84558989 | intron | ENST00000565079 | TLDC1 |
| 3 | 195542062 | 195542854 | intergenic | ENST00000463781 | MUC4 |
| 15 | 29269492 | 29270164 | promoter | ENST00000560531 | RP13-126C7.1 |
| 8 | 143026250 | 143026924 | promoter | ENST00000408196 | AC104417.1 |
| 2 | 233755631 | 233756268 | promoter | ENST00000461944 | NGEF |
| X | 130712602 | 130713291 | intergenic | ENST00000444577 | OR13K1P |
| 2 | 242838585 | 242839046 | intron | ENST00000429947 | AC131097.3 |
| 19 | 38943593 | 38944148 | intron | ENST00000359596 | RYR1 |
| 19 | 50215579 | 50216042 | promoter | ENST00000598072 | CPT1C |
| 10 | 132897016 | 132897650 | intron | ENST00000368642 | TCERG1L |
| 16 | 10394727 | 10395216 | intergenic | ENST00000564797 | ATF7IP2 |

FIG. 9B, cont.

| Chr | Start | End | Annotation | Transcript_id | Gene symbol |
|---|---|---|---|---|---|
| 19 | 34112310 | 34112461 | promoter | ENST00000591231 | CHST8 |
| 11 | 45149239 | 45150097 | intron | ENST00000530656 | PRDM11 |
| 2 | 60524652 | 60525178 | intergenic | ENST00000457668 | AC007381.3 |
| 2 | 3497474 | 3498028 | intergenic | ENST00000607415 | RP11-1293J14.1 |
| 20 | 55201436 | 55201906 | intergenic | ENST00000201031 | TFAP2C |
| 19 | 39569172 | 39569875 | intergenic | ENST00000601575 | PAPL |
| 19 | 51893704 | 51894598 | promoter | ENST00000570516 | C19orf84 |
| 10 | 133908226 | 133908803 | intergenic | ENST00000298622 | JAKMIP3 |
| 7 | 101321102 | 101321282 | intergenic | ENST00000223167 | MYL10 |
| 3 | 139289513 | 139290376 | intron | ENST00000381790 | RP11-319G6.1 |
| 7 | 6116687 | 6117343 | intergenic | ENST00000436915 | AC004895.4 |
| 1 | 117635514 | 117636236 | promoter | ENST00000492682 | TTF2 |
| 12 | 132816724 | 132819336 | intron | ENST00000328957 | GALNT9 |
| 1 | 16005038 | 16005519 | intergenic | ENST00000606262 | RP4-680D5.9 |
| 1 | 17574935 | 17575827 | promoter | ENST00000375460 | PADI3 |
| 9 | 104053040 | 104053880 | intron | ENST00000463206 | LPPR1 |
| 15 | 80164774 | 80165510 | intron | ENST00000494999 | ST20-MTHFS |
| 20 | 44978838 | 44979690 | exon | ENST00000493599_627499 | |
| 16 | 56641008 | 56641623 | promoter | ENST00000245185 | MT2A |
| 1 | 61105637 | 61106487 | promoter | ENST00000439156 | RP11-776H12.1 |
| 9 | 139240060 | 139240754 | intron | ENST00000354753 | GPSM1 |
| 16 | 53453058 | 53453761 | intergenic | ENST00000567964 | RBL2 |
| 1 | 19724621 | 19725289 | intron | ENST00000482808 | CAPZB |
| 19 | 52645300 | 52645902 | promoter | ENST00000597886 | CTC-471J1.9 |
| 11 | 33202571 | 33203188 | intron | ENST00000500025 | CSTF3-AS1 |
| 11 | 9567258 | 9568184 | intergenic | ENST00000396602 | ZNF143 |
| 2 | 237573927 | 237574674 | intergenic | ENST00000455068 | AC011286.1 |
| 7 | 114670431 | 114671261 | intergenic | ENST00000257724 | MDFIC |
| 19 | 31899364 | 31900164 | intron | ENST00000585336 | AC007796.1 |
| 20 | 45887465 | 45888265 | intron | ENST00000468376 | ZMYND8 |
| 4 | 54342467 | 54343100 | intron | ENST00000507166 | FIP1L1 |
| 1 | 25296870 | 25297681 | promoter | ENST00000568143 | RP11-84D1.2 |
| 1 | 92791916 | 92792644 | intron | ENST00000610020 | RPAP2 |
| 11 | 70270264 | 70270605 | promoter | ENST00000393747 | CTTN |
| 3 | 195890536 | 195890927 | intergenic | ENST00000457079 | LINC00885 |
| 10 | 133849722 | 133850635 | intergenic | ENST00000368636 | BNIP3 |
| 1 | 29839867 | 29840197 | intergenic | ENST00000515851 | RP11-810H18.1 |
| 12 | 132280700 | 132281100 | promoter | ENST00000537582 | SFSWAP |
| 10 | 132892787 | 132893492 | promoter | ENST00000436942 | TCERG1L-AS1 |
| 8 | 142597388 | 142597870 | intergenic | ENST00000427937 | AC138647.1 |
| 2 | 233124653 | 233125150 | exon | ENST00000433430_85344 | |
| 1 | 6305892 | 6306263 | promoter | ENST00000377898 | HES3 |
| 20 | 59832756 | 59833009 | intron | ENST00000360469 | CDH4 |

FIG. 9B, cont.

| Chr | Start | End | Annotation | Transcript_id | Gene symbol |
|---|---|---|---|---|---|
| 2 | 241811517 | 241811995 | promoter | ENST00000476698 | AGXT |
| 16 | 73116469 | 73116806 | intergenic | ENST00000569990 | HCCAT5 |
| 16 | 32639949 | 32640460 | intergenic | ENST00000564327 | RP11-96K14.1 |
| 7 | 151169967 | 151170459 | promoter | ENST00000482053 | RHEB |
| 19 | 30154965 | 30155734 | promoter | ENST00000436066 | PLEKHF1 |
| 7 | 5635384 | 5635656 | promoter | ENST00000405801 | FSCN1 |
| 11 | 2008321 | 2008791 | intron | ENST00000419080 | MRPL23-AS1 |
| 19 | 34760796 | 34761482 | intron | ENST00000585833 | KIAA0355 |
| 3 | 188506277 | 188507139 | intron | ENST00000459897 | LPP |
| 19 | 38538873 | 38540260 | intron | ENST00000476317 | SIPA1L3 |
| 11 | 64512396 | 64512888 | promoter | ENST00000377485 | RASGRP2 |
| 18 | 77679919 | 77680340 | intron | ENST00000478144 | PQLC1 |
| 19 | 38524195 | 38525390 | intron | ENST00000476317 | SIPA1L3 |
| 19 | 36760064 | 36760513 | intergenic | ENST00000355114 | ZNF565 |
| 7 | 534134 | 534368 | promoter | ENST00000434541 | AC147651.1 |
| 7 | 30829073 | 30829346 | intron | ENST00000451002 | INMT-FAM188B |
| 3 | 195510841 | 195511431 | exon | ENST00000478156_152007 |  |
| 16 | 4394345 | 4394677 | promoter | ENST00000575848 | PAM16 |
| 10 | 11927228 | 11927674 | intron | ENST00000445498 | PROSER2-AS1 |
| 22 | 43892550 | 43892910 | intron | ENST00000538182 | MPPED1 |
| 20 | 59950361 | 59951203 | intron | ENST00000360469 | CDH4 |
| 20 | 31208975 | 31209164 | intergenic | ENST00000360785 | C20orf203 |
| 7 | 158995289 | 158995591 | intergenic | ENST00000437005 | PIP5K1P2 |
| 19 | 1144620 | 1144966 | intron | ENST00000587655 | SBNO2 |
| 2 | 97117403 | 97117850 | intergenic | ENST00000310865 | NEURL3 |
| 1 | 245100328 | 245100603 | intergenic | ENST00000364888 | RN7SKP55 |
| 19 | 38735536 | 38736387 | promoter | ENST00000590510 | SPINT2 |
| 19 | 34809126 | 34810741 | intron | ENST00000588338 | KIAA0355 |
| 17 | 854896 | 856177 | intron | ENST00000575171 | NXN |
| 19 | 31830912 | 31831630 | intron | ENST00000558569 | TSHZ3 |
| 19 | 38905395 | 38905919 | promoter | ENST00000588708 | RASGRP4 |
| 3 | 152974102 | 152975125 | intergenic | ENST00000582522 | RN7SL300P |
| 20 | 55363228 | 55363724 | intergenic | ENST00000384429 | RNU6-929P |
| 19 | 36799597 | 36800084 | promoter | ENST00000600983 | CTD-3162L10.1 |
| 19 | 31828906 | 31829306 | intron | ENST00000558569 | TSHZ3 |
| 1 | 148929648 | 148931757 | promoter | ENST00000457390 | RP11-14N7.2 |
| 5 | 170224689 | 170225199 | intron | ENST00000519598 | GABRP |
| 1 | 8800026 | 8800575 | intron | ENST00000480342 | RERE |
| 1 | 165742556 | 165743015 | exon | ENST00000423121_23045 |  |
| 3 | 195627548 | 195627967 | intron | ENST00000468819 | TNK2 |
| 12 | 113342092 | 113342931 | promoter | ENST00000202917 | OAS1 |
| 16 | 56687942 | 56688603 | intergenic | ENST00000334346 | MT1B |
| 1 | 11999122 | 11999719 | intron | ENST00000196061 | PLOD1 |

FIG. 9B, cont.

| Chr | Start | End | Annotation | Transcript_id | Gene symbol |
|---|---|---|---|---|---|
| 2 | 237791572 | 237792049 | intergenic | ENST00000413385 | AC011286.1 |
| 1 | 4016604 | 4017089 | intergenic | ENST00000412674 | RP13-614K11.1 |
| 10 | 14862005 | 14862511 | intron | ENST00000465530 | CDNF |
| 1 | 227947119 | 227947769 | intron | ENST00000478768 | SNAP47 |
| 3 | 126678871 | 126679767 | intron | ENST00000510044 | CHCHD6 |
| 3 | 141133388 | 141134001 | intron | ENST00000513570 | ZBTB38 |
| 10 | 79115617 | 79115970 | promoter | ENST00000418515 | RP11-619F23.2 |
| 19 | 51596977 | 51597664 | intergenic | ENST00000421832 | CTU1 |
| 11 | 68847695 | 68848373 | intron | ENST00000442692 | TPCN2 |
| 5 | 34717596 | 34718270 | promoter | ENST00000502736 | RAI14 |
| 1 | 204616727 | 204616979 | intron | ENST00000496057 | LRRN2 |
| 9 | 132105932 | 132106561 | promoter | ENST00000423122 | RP11-65J3.1 |
| 9 | 131821742 | 131822331 | promoter | ENST00000474639 | FAM73B |
| 2 | 187426114 | 187426881 | intergenic | ENST00000261023 | ITGAV |
| 10 | 3598428 | 3598998 | intergenic | ENST00000426811 | RP11-482E14.2 |
| 12 | 123129219 | 123129801 | intron | ENST00000356987 | HCAR1 |
| 1 | 12050437 | 12051116 | intron | ENST00000412236 | MFN2 |
| 19 | 39646961 | 39647663 | promoter | ENST00000599657 | PAK4 |
| 8 | 142140988 | 142141629 | promoter | ENST00000517908 | RP11-809O17.1 |
| 12 | 113905094 | 113906232 | intron | ENST00000261731 | LHX5 |
| 3 | 194353440 | 194353664 | promoter | ENST00000447139 | AC046143.3 |
| 3 | 194432537 | 194433012 | intron | ENST00000423318 | AC090505.6 |
| 2 | 306486 | 306655 | promoter | ENST00000592090 | AC079779.5 |
| 16 | 83983871 | 83984533 | promoter | ENST00000361711 | OSGIN1 |
| 7 | 591580 | 592225 | promoter | ENST00000517177 | AC147651.2 |

ATAC-ARRAY FOR PREDICTION OF DISEASE-FREE SURVIVAL IN PANCREATIC CANCER

CROSS REFERENCE TO RELATED APPLICATIONS

This patent application is a continuation of U.S. patent application Ser. No. 17/324,093, filed on May 18, 2021, which is a continuation-in-part of U.S. patent application Ser. No. 17/268,195, which was filed as a National Stage Entry of International Patent Application No. PCT/US2019/046301, which was filed on Aug. 13, 2019, which claims priority to U.S. Provisional Patent Application No. 62/718,499, filed on Aug. 14, 2018. This patent application also claims priority to U.S. Provisional Patent Application No. 63/033,565, which was filed on Jun. 2, 2020. Each of the above-mentioned applications are fully incorporated herein by reference.

FEDERALLY SPONSORED RESEARCH OR DEVELOPMENT

This invention was made with government support under R01 CA204228, P30 CA008748, and P30 CA023108 awarded by the National Institutes of Health. The government has certain rights in the invention.

TECHNICAL FIELD

The present invention relates to arrays targeting differentially accessible chromatin regions, methods of using such arrays to, for example, guide cancer (e.g., pancreatic ductal adenocarcinoma) treatment. The present invention also relates to methods and kits for predicting disease-free survival as well methods and kits for guiding treatment of cancer and other malignant diseases, particularly based on a prediction of disease-free survival.

BACKGROUND

Pancreatic ductal adenocarcinoma (PDAC), which constitutes 90% of pancreatic cancers, is the fourth leading cause of cancer-related deaths in the world. PDAC is a lethal malignancy of pancreas, with 60,430 new cases are estimated in 2021 in the United States alone. By 2030, this disease is projected to surpass breast, prostate and colorectal cancer to become the second leading cause of cancer-related deaths in the United States.

Current treatment protocols for PDAC are guided by biopsy and other diagnostic tests. For early-stage (upfront resectable) PDAC, upfront resection, which is typically followed by adjuvant chemotherapy, is considered the standard of care. Available adjuvant chemotherapy treatment options after surgical resection include gemcitabine monotherapy, a combination of gemcitabine and capecitabine (GemCap), or a combination of oxaliplatin, irinotecan, leucovorin, and 5-fluorouracil (e.g., FOLFIRINOX or modified FOLFIRINOX). For intermediate stage (borderline resectable) PDAC, guidelines recommend neoadjuvant chemotherapy, with or without radiotherapy, followed by surgical resection. Options for neoadjuvant chemotherapy include gemcitabine-based or FOLFIRINOX-based regimens. For advanced stage (non-resectable) PDAC, palliative chemotherapy is considered. Options for palliative chemotherapy include gemcitabine-based (e.g., gemcitabine with nab-paclitaxel) or FOLFIRINOX-based regimens.

Only about 20% PDAC patients qualify for an upfront surgery followed by adjuvant chemotherapy. In this resectable subset, the disease recurs in approximately 50% of cases within the first year of surgery in spite of adjuvant chemotherapy, another 30-40% recurs within next 2-5 years, whereas a small subset (15-20%) shows long-term disease-free survival (DFS) of more than 5 years on a 10-year follow up.

According to the American Cancer Society Facts and FIGS. 2021, the estimated total number of newly detected PDAC cases will be 60430, which means >12,000 cases would be resectable (~20%). These resectable patients spend ~$100,000 each for Whipple surgery as their primary modality of intervention, which portends a 50% risk of early recurrence.

Identification of patients at risk for recurrence, and particularly early recurrence, in a timely manner is expected to reduce healthcare costs. Moreover, identification of patients that would or would not respond to the traditional treatment regimens would enable health care providers to make better treatment decisions, particularly with alternate treatments, such as immunotherapy, targeted therapy, and/or epigenetic therapy. Therefore, there is a need for approaches to identify such patients and tailor treatment accordingly.

SUMMARY OF THE INVENTION

In one aspect, this disclosure provides a low-cost and high-throughput array targeting differentially accessible chromatin regions. In certain embodiments, the differentially accessible chromatin regions have been identified using an Assay for Transposase-Accessible Chromatin (ATAC) and, thus, the array may be a "targeted ATAC-array." Such arrays, unlike gene expression or Single Nucleotide Polymorphism (SNP)-arrays, detect only the "targeted" accessible chromatin regions of interest. This is a novel hybridization-based technology to detect chromatin accessibility.

In another aspect, this disclosure provides methods for guiding cancer treatment. In certain embodiments, an array disclosed herein is used to guide cancer treatment. For example, an array can be a prognostic tool in the field of precision oncology, associating a specific set of open chromatin regions of the functional genome with specific disease phenotypes (e.g., post-resection early recurrence of PDAC). A targeted ATAC-array associating disease phenotypes is a novel paradigm in precision oncology, after the era of EST, gene expression signature, SNP-signature and copy number variation.

In certain embodiments, data obtained from the array(s) disclosed herein is supplemented with or confirmed by transcription factor expression and/or nuclear localization data (e.g., obtained by immunohistochemistry for particular transcription factors (TFs)). Without wishing to be bound by any particular theory, one or more transcription factors may be differentially associated with open chromatin peaks, disease progression, and/or responsivity to a particular treatment modality. Indeed, altered nuclear localization of particular TFs that target specific loci may—at least in part—account for changes in chromatin accessibility.

In certain embodiments, the low-cost, high-throughput array technology disclosed herein allows for screening PDAC patients before surgery to assess the risk of post-resection early recurrence, so that the patients with potential risk (~50%) can opt to avoid upfront surgery, and select another treatment modality, such as the neo-adjuvant therapy regimen path instead. An accurate prediction before surgery will contribute to an informed decision of whether or not to opt for upfront surgery as a treatment modality versus opting the surgery followed by neoadjuvant therapy.

In certain embodiments, this chromatin accessibility array technology disclosed herein shows the functional epigenetic status of the cells, summarizing the final effects of all upstream mechanisms, such as DNA methylation, histone modifications and chromatin remodeling etc. Therefore, with this array patients can also be stratified for personalized epigenetic therapies (with a wide range of specific epigenetic drugs that are already approved for clinical use and also the ones which are in the clinical pipeline).

Personalized therapy is the future of cancer care. Although gene expression signatures associated with prognosis have been described in malignant diseases, such gene expression signatures are difficult to translate into therapeutic approaches, in part because it is virtually impossible to target all differentially expressed genes for a desired impact. On the other hand, an epigenetic landscape associated with prognosis, including those epigenetic signatures disclosed herein and/or known through published literature or otherwise, provides a unique therapeutic opportunity to epigenetically reprogram (silencing or de-silencing) the regulatory regions of many genes collectively at the same time using silencing or de-silencing epigenetic drugs. In certain embodiments, an epigenetic landscape provides a personalized biomarker to select likely non-responders (e.g., chemotherapy refractory patients) for treatment with epigenetic drugs (e.g., a DNMT inhibitor or an HDAC inhibitor, or an EZH2 inhibitor).

An epigenetic landscape integrates the entire ensemble of epigenetic silencing events in the genome (through methylation and acetylation together). In certain embodiments, the epigenetic landscape is assessed by a microarray-based platform described herein, generally referred to as "ATAC-array." One exemplary application of the ATAC-array technology is as a diagnostic test that can be performed on tumor biopsies or surgically resected tumor specimens. In some such embodiments, results are provided within 3 days. In some such embodiments, an appropriate epigenetic drug and epigenetic reprogramming regimen can be utilized to, for example, potentially prevent and/or reduce the chemoresistance likely to emerge with first-line chemotherapy.

In an exemplary specific embodiment, an epigenetic landscape is significantly associated with prognosis and, in particular, early disease recurrence (i.e., within 1 year of surgery) in PDAC patients even after apparently complete surgical removal (RO margin-negative resection) of the primary tumor, and in spite of adjuvant chemotherapy (e.g., gemcitabine). The epigenetic landscape may comprise at least 700, and in a particular embodiment 1092, functionally relevant regulatory regions that are differentially accessible in patients who did not respond to their first line of chemotherapy (gemcitabine).

In yet another aspect, this disclosure provides a method for predicting an outcome for a patient, the method comprising: a) providing a biological sample obtained from a treatment-naïve patient having, or suspected of having, cancer or another malignant disease, said biological sample comprising morphologically intact nuclei from cells of the patient; b) assessing chromatin accessibility of a first group of differentially accessible chromatin regions in the sample to obtain a first epigenetic signature value, wherein accessibility of said first group of differentially accessible chromatin regions is associated with a good prognosis; c) optionally, assessing chromatin accessibility of a second group of differentially accessible chromatin regions in the sample to obtain a second epigenetic signature value, wherein accessibility of said second group of differentially accessible chromatin regions is associated with a poor prognosis; and d) predicting the outcome of the cancer treatment based on (i) the first epigenetic signature value and/or (ii) the relative difference between the first epigenetic signature value and the second epigenetic signature value. In certain embodiments, the method comprises determining a prognosis score. In some such embodiments, the prognosis score is determined from the first epigenetic signature value and normalized by the difference between a positive and a negative control.

In another aspect, this disclosure provides a method of predicting a duration of disease-free survival in a patient having, or suspected of having, cancer or another malignant disease, the method comprising: a) determining or having determined a first epigenetic signature value based on chromatin accessibility of a first group of differentially accessible chromatin regions in a biological sample obtained from the patient to obtain an epigenetic signature value; b) normalizing the epigenetic signature value to obtain a normalized epigenetic signature value; and c) predicting a duration of disease-free survival of the patient. In certain embodiments, the method comprises determining a prognosis score. In some such embodiments, the prognosis score is determined from the epigenetic signature value and normalized by the difference between a positive and a negative control.

In still another aspect, this disclosure provides a method of predicting a duration of disease-free survival in a patient having, or suspected of having, cancer or another malignant disease, the method comprising: a) determining or having determined a first epigenetic signature value based on chromatin accessibility of a first group of differentially accessible chromatin regions in a biological sample obtained from the patient and a second epigenetic signature value based on chromatin accessibility of a second group of differentially accessible chromatin regions in the biological sample obtained from the patient; b) comparing the first epigenetic signature value to the second epigenetic signature value to obtain a differential epigenetic value; c) normalizing the differential value to obtain a normalized differential epigenetic value; and d) predicting a duration of disease-free survival of the patient.

BRIEF DESCRIPTION OF THE DRAWINGS

For a better understanding of the invention, reference may be made to embodiments shown in the following drawings. The components in the drawings are not necessarily to scale and related elements may be omitted, or in some instances, proportions may have been exaggerated, so as to emphasize and clearly illustrate the novel features described herein. In addition, system components can be variously arranged, as known in the art.

FIG. 9A is a table listing chromatin regions that were accessible or open in non-recurrent patients (DFS >1 year). FIG. 9B is a table listing chromatin regions that were accessible or open in recurrent patients (disease free survival (DFS)<1 year).

FIG. 10C shows canonical variant allele frequencies of TP53 comparing the EpCAM$^+$ and EpCAM$^-$ subpopulations from each tumor. The lines in FIGS. 10C and 10D depict comparative variant allele frequencies in each individual tumor, confirming high level enrichment of mutant alleles in EpCAM$^+$subpopulations (t-test P<0.05)

DETAILED DESCRIPTION OF EXAMPLE EMBODIMENTS

Figure 1:
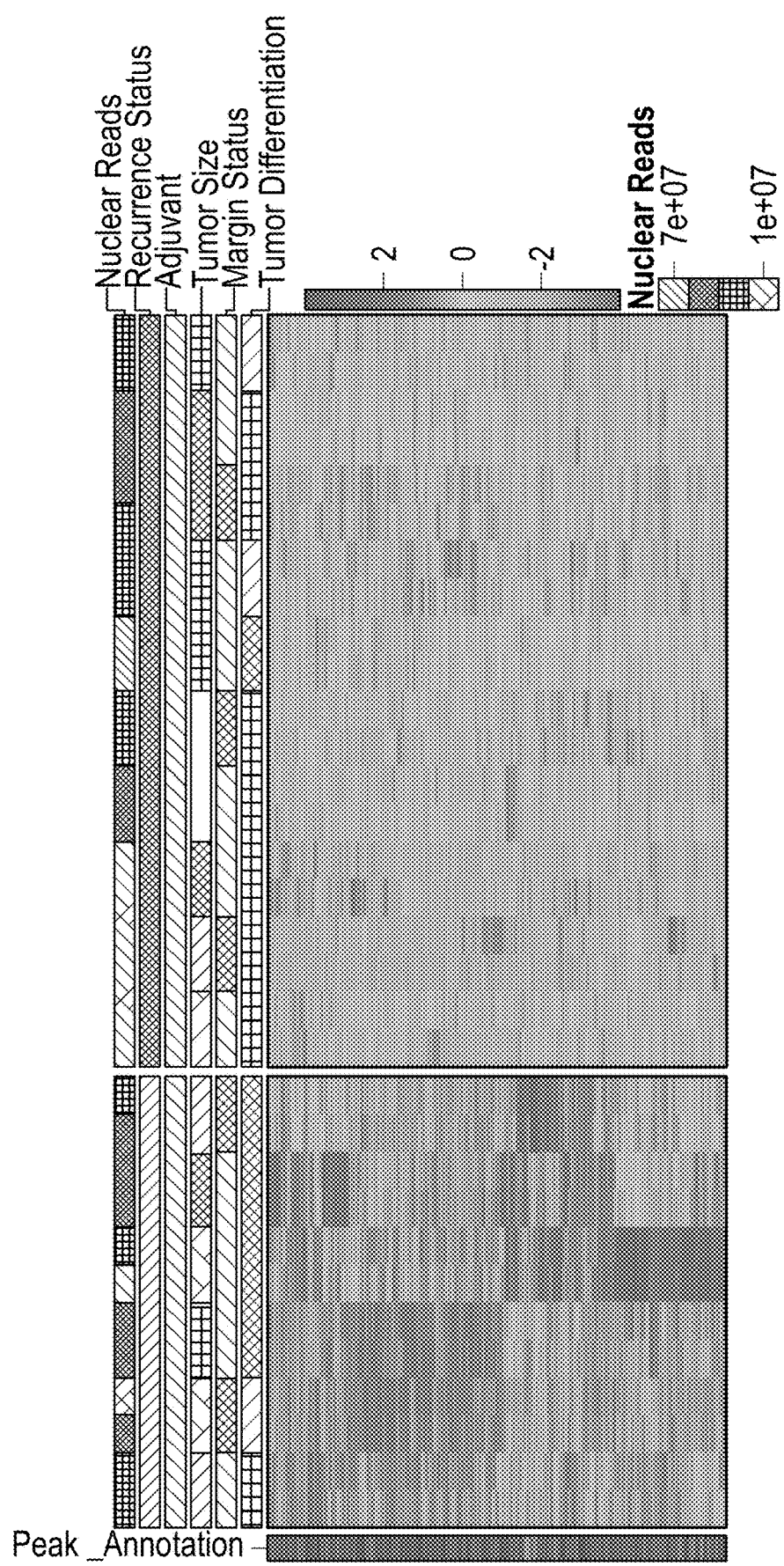
FIG. 1 is a schematic representation of the 1092 differentially accessible chromatin peaks identified by ATAC-seq. Subjects were characterized by recurrence status (yes or no); tumor size (2 to 4.5 cm); margin status (free or positive); and tumor differentiation (moderate to poorly differentiated, poorly differentiated, or moderately differentiated). Differentially accessible chromatin peaks were identified in intron, intergenic, promoter, and exon regions.
Figure 1:
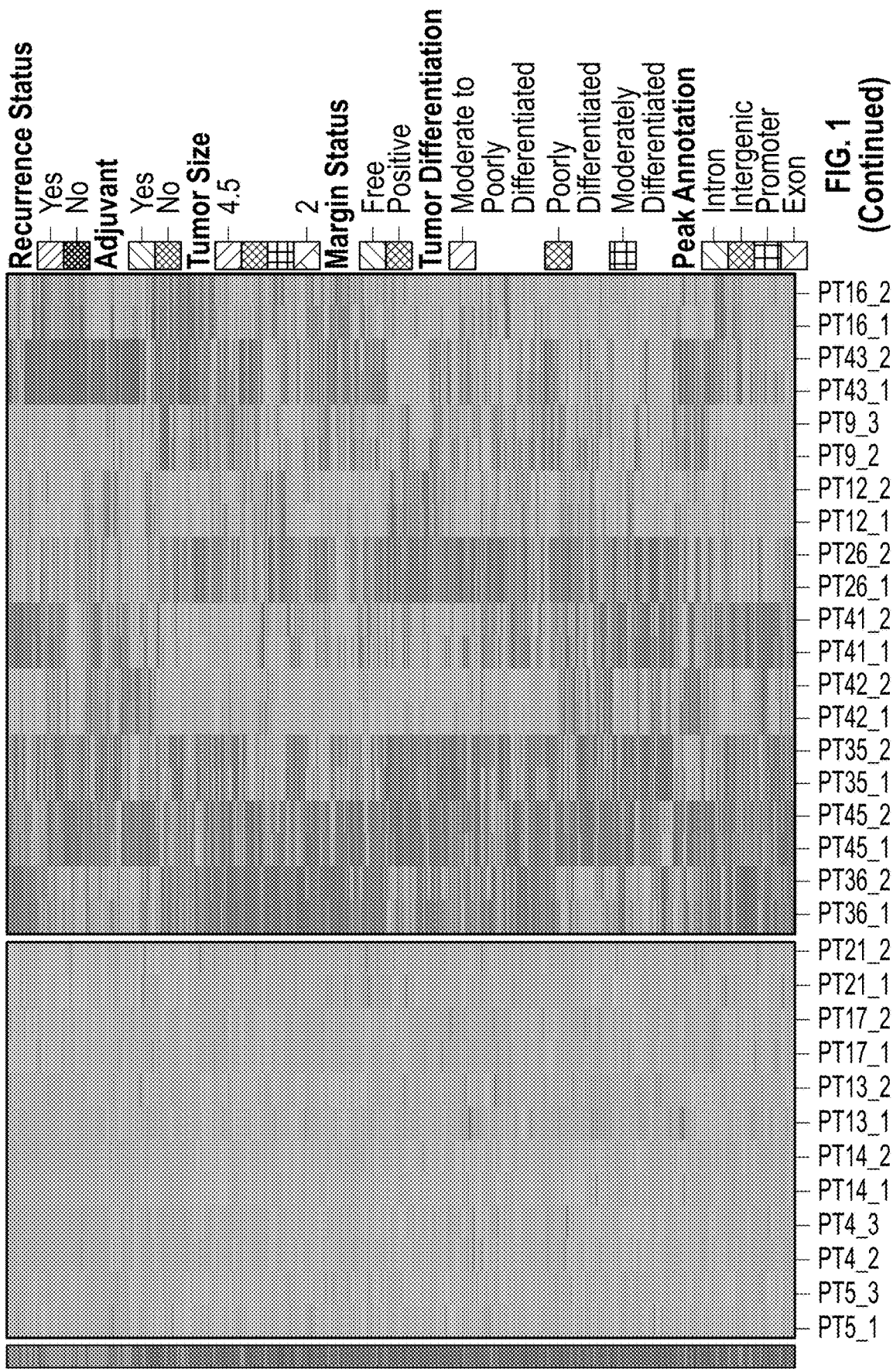

This detailed description is intended only to acquaint others skilled in the art with the present invention, its principles, and its practical application so that others skilled in the art may adapt and apply the invention in its numerous forms, as they may be best suited to the requirements of a particular use. This description and its specific examples are intended for purposes of illustration only. This invention, therefore, is not limited to the embodiments described in this patent application and may be variously modified.

A. DEFINITIONS

As used in the specification and the appended claims, unless specified to the contrary, the following terms have the meaning indicated:

The term "about" as used herein, means approximately, and in most cases within 10% of the stated value.

The term "array" is intended to describe a two-dimensional or three-dimensional arrangement of addressable regions bearing oligonucleotides associated with that region. An "array" may be a bead array, in which case the oligonucleotides are attached to beads and the beads may be optically addressable. In other embodiments, the array may be a planar array, in which case the oligonucleotides are attached to a planar support and spatially addressable. The oligonucleotides of an array may be covalently attached to substrate at any point along the nucleic acid chain, but are generally attached at one terminus (e.g., the 3' or 5' terminus).

An array is "addressable" when it has multiple regions of different moieties (e.g., different polynucleotide sequences) such that a region (i.e., a "feature", "spot" or "area" of the array) is at a particular predetermined location (i.e., an "address") on the array. Array features are typically, but need not be, separated by intervening spaces.

The term "biological sample" is to be understood as any in vivo, in vitro, or in situ sample of one or more cells or cell fragments. This can, for example, be a unicellular or multicellular organism, blood sample, biopsied tissue sample, tissue section, cytological sample, or any derivative of the foregoing (e.g., a subsample, portion, or purified cell population). In certain embodiments, a biological sample is obtained from a mammal, including, but not limited to, a primate (including human), mouse, rat, cat, or dog.

The term "cancer" includes, but is not limited to, breast cancer, colorectal cancer, esophageal cancer, gallbladder cancer, gastric cancer, leukemia, acute myeloid leukemia (AML) or chronic myeloid leukemia (CML)), liver cancer (e.g., hepatocellular carcinoma (HCC)), lung cancer (e.g., non-small cell lung cancer (NSCLC) or small cell lung cancer (SCLC)), lymphoma (e.g., non-Hodgkin lymphoma), ovarian cancer, pancreatic cancer, and prostate cancer, The term "cancer" also includes cancer metastasis of a primary tumor such as primary pancreatic cancer. Thus, if reference is made, for example, to pancreatic cancer, this also includes metastasis of the pancreatic cancer, for example metastasis to the lung, liver and/or lymph nodes.

The term "detectable label" refers to a moiety that can be attached directly or indirectly to an oligomer, such as an oligonucleotide, to thereby render the oligomer detectable by an instrument or method.

The term "hybridization" refers to the process by which a strand of nucleic acid binds to a complementary strand through base pairing as known in the art. A nucleic acid is considered to be "selectively hybridizable" to a reference nucleic acid sequence if the two sequences specifically hybridize to one another under moderate to high stringency hybridization and wash conditions. The term "high stringency hybridization conditions" refers to conditions that are compatible to produce nucleic acid binding complexes on an array surface between complementary binding members, i.e., between the surface-bound oligonucleotide probes and complementary labeled nucleic acids in a sample. Moderate and high stringency hybridization conditions are known (see, e.g., Ausubel, et al., Short Protocols in Molecular Biology, 3rd ed., Wiley & Sons 1995 and Sambrook et al., Molecular Cloning: A Laboratory Manual, Third Edition, 2001 Cold Spring Harbor, N.Y.). One example of high stringency conditions includes hybridization at about 42° C. in 50% formamide, 5×SSC, 5×Denhardt's solution, 0.5% SDS and 100 µg/ml denatured carrier DNA followed by washing two times in 2×SSC and 0.5% SDS at room temperature and two additional times in 0.1×SSC and 0.5% SDS at 42° C.

The term "hybridization process" or "hybridization step" generally refers to an action, time period, or portion of a larger method, in which conditions are provided for one nucleic acid to hybridize to another nucleic acid. A hybridization process can be understood as incorporating both denaturation and re-annealing in a hybridization procedure (such as when the procedure does not include a separate denaturation step) unless otherwise specified. "Hybridization protocol" means a method comprising a hybridization process and one or more other processes, such as preparatory or rinsing processes.

The term "transposase complex" refers to a complex that contains a transposase (which typically exists as a dimer of transposase polypeptides) that is bound to at least one adapter. The term "adapter" refers to a nucleic acid molecule that is capable of being attached to a polynucleotide of interest. An adapter can be single stranded or double stranded, and it can comprise DNA, RNA, and/or artificial nucleotides. The adapter can add one or more functionalities or properties to the polynucleotide of interest, such as providing a priming site for amplification or adding a barcode. By way of example, adapters can include a universal priming site for amplification. By way of further example, adapters can one or more barcode of various types or for various purposes, such as molecular barcodes, sample barcodes and/or target-specific barcodes. In practice, a transposase complex can be used to attach an adapter to the end of a DNA fragment generated by the enzymatic action of the transposase.

The terms "treat", "treating" and "treatment" refer to a method of alleviating or abrogating a condition, disorder, or disease and/or the attendant symptoms thereof.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or." The terms "includes," "including," and "include" are inclusive and have the same scope as "comprises," "comprising," and "comprise" respectively.

B. ARRAY METHODS

In one aspect, the present disclosure provides a method for analyzing chromatin accessibility. Chromatin may be present in morphologically intact nuclei or in samples in which nucleosomal structure has been maintained (e.g., a product of lysed nuclei). In certain embodiments, the method comprises: (a) providing a biological sample comprising chromatin, such as from morphologically intact nuclei; (b) enzymatically fragmenting and tagging accessible chromatin regions (ACRs) to produce tagged fragments; (c) optionally, amplifying the tagged fragments; (d) attaching a detectable label to the tagged fragments or amplicons thereof to produce a labeled, tagged fragment; and (c) contacting the labeled, tagged fragment to a set of oligonucleotide probes bound to a solid support. In certain embodiments, the method further comprises determining the accessibility of at least one chromatin region. In certain embodiments, the set of oligonucleotide probes represent chromatin regions that are differentially accessible between a first phenotype and a second phenotype (e.g., between treatment-resistant disease and treatment-sensitive disease; between a cancer likely to recur within one year following surgical resection and a cancer likely not to recur within one year following surgical resection). In some such embodiments, the set of oligonucleotide probes comprises (i) a first subset of oligonucleotide probes representative of accessible chromatin regions associated with the first phenotype and (ii) a second subset of oligonucleotide probes representative of accessible chromatin regions associated with the second phenotype. Thus, in certain embodiments, the method further comprises comparing the relative hybridization intensities between the first subset of oligonucleotide probes and the second subset of oligonucleotide probes.

In certain embodiments, the method does not include sequencing the tagged fragments or amplicons thereof.

In certain embodiments, at least some of the differentially accessible chromatin regions include a promoter, an enhancer, and/or other regulatory elements. In certain embodiments, the biological sample comprises malignant or diseased tissue. In other embodiments, the biological sample comprises normal tissue.

In certain embodiments, the method comprises providing a biological sample. The biological sample may be, for example, a blood sample, a tissue sample, or a cytological sample. In certain embodiments, the biological sample comprises cancerous cells or cells suspected of being cancerous. In some such embodiments, the biological sample is unprocessed. In other such embodiments, the biological sample is processed to, for example, isolate a specific cell population. For example, a population of EpCAM$^+$ cells may be isolated from a tissue sample such as tissue biopsied from a pancreatic tumor or, more specifically, a pancreatic ductal adenocarcinoma.

In certain embodiments, the biological sample can be obtained from a patient diagnosed with cancer. For example, a patient may be referred to undergo endoscopic ultrasound and fine needle aspiration (EUS-FNA) for tissue diagnosis of a suspected pancreatic mass, which may result in the diagnosis of PDAC. Patients with biopsy-proven pancreatic cancer undergo staging with CT scans of the chest, abdomen and pelvis followed by diagnostic staging laparoscopy. This EUS-FNA or the laparoscopic surgery tissue acquisition process occurs prior to surgery and may provide treatment-naïve malignant cells from all stages of PDAC.

In certain embodiments, the method further comprises isolating morphologically intact nuclei from the biological sample, such as an isolated cell population. In some such embodiments, intact nuclei are isolated and/or lysed in a manner that maintains nucleosome structure.

Morphologically intact nuclei are isolated or collected in such a manner as to ensure that nucleosomal structure is maintained. Thus, morphologically intact nuclei comprise regions of tightly packed or closed chromatin and regions of loosely packed or open chromatin. In certain embodiments, the method comprises fragmenting open chromatin regions of morphologically intact nuclei to obtain a population of fragments representing the open chromatin regions. In certain embodiments, the method comprises tagging such fragments with, for example, an adapter. In certain embodiments, the fragmenting and tagging occurs substantially simultaneously or in rapid succession. Certain transposases such as a hyperactive Tn5 transposase, loaded in vitro with adapters, can substantially simultaneously fragment and tag DNA with the adapters. Thus, in some embodiments, the method may comprise "tagmenting" the open chromatin regions using, for example, a hyperactive Tn5 transposase loaded with one or more adapters.

In certain embodiments, the fragmenting and tagging step comprises contacting morphologically intact nuclei with a transposase complex. In some such embodiments, a transposase complex comprises a transposase enzyme (which is usually in the form of a dimer of transposase polypeptides) and a pair of adapters. In certain embodiments, isolated nuclei are lysed when contacted with a transposase complex and, thus, the method may comprise lysis of intact nuclei.

In certain embodiments, the transposase is prokaryotic, eukaryotic, or from a virus. In certain embodiments, the transposase is a hyperactive transposase. In certain embodiments, the transposase is an RNase transpose, such as a Tn transposase. In some such embodiments, the transposase is a Tn5 transposase or derived from a Tn5 transposase. In certain preferred embodiments, the transposase is a hyperactive Tn5 transposase (e.g., a Tn5 transposase having an L372P mutation). In certain embodiments, the transposase is a MuA transposase or derived from a MuA transposase. In certain embodiments, the transposase is a Vibhar transposase (e.g., from *Vibrio harveyi*) or derived from a Vibhar transposase. In the above examples, a transposase derived from a parent transposase can comprise a peptide fragment with at least about 50%, about 55%, about 60%, about 65%, about 70%, about 75%, about 80%, about 85%, about 90%, about 91%, about 92%, about 93%, about 94%, about 95%, about 96%, about 97%, about 98%, or about 99% amino acid sequence homology and/or identity to a corresponding peptide fragment of the parent transposase. The peptide fragment can be at least about 10, about 15, about 20, about 25, about 30, about 35, about 40, about 45, about 50, about 60, about 70, about 80, about 90, about 100, about 150, about 200, about 250, about 300, about 400, or about 500 amino acids in length. For example, a transposase derived from Tn5 can comprise a peptide fragment that is 50 amino acids in length and about 80% homologous to a corresponding fragment in a parent Tn5 transposase.

In an exemplary method described herein, the transposase complex comprises a transposase loaded with two adapter molecules that each contain a recognition sequence at one end. The transposase catalyzes substantially simultaneous fragmenting of the sample and tagging of the fragments with sequences that are adjacent to the transposon recognition sequence (i.e., "tagmentation"). In some cases, the transposase enzyme can insert the nucleic acid sequence into the polynucleotide in a substantially sequence-independent manner. In certain embodiments, a preliminary step includes loading a transposase with one or more oligonucleotide adapters. Typically, the adapters comprise oligonucleotides that have been annealed together so that at least the transposase recognition sequence is double stranded.

In certain embodiments, the amplifying step comprises an amplification reaction that results in a relatively uniform amplification of substantially all template sequences in a sample (e.g., at least 85%, 90%, or 95% of the template sequences). In certain embodiments, the amplifying step comprises polymerase chain reaction (PCR). In certain embodiments, the amplifying step comprises PCR using primers specific for adapter sequences appended to the fragments during the fragmenting and tagging step. In certain embodiments, the amplifying step comprises PCR using primers described by Buenrostro et al., Nat Methods, 10(12): 1213-1218 (2013).

In certain embodiments, a detectable label may be directly attached to the tagged fragments or amplicons thereof. In certain other embodiments, a detectable label may be indirectly attached to the tagged fragments or amplicons thereof. For example, a detectable label may be attached using a linker. Any labeling method known to those in the art, including enzymatic and chemical processes, can be used for labeling the tagged fragments or amplicons thereof.

In certain embodiments, the detectable label is a fluorochrome, a chromophore, an enzyme, or a chemiluminescence compound, such as acridinione. In some such embodiments, the fluorochrome is a cyanine dye (i.e., Cy2, Cy3, Cy 3.5, Cy5, Cy5.5, Cy 7), fluorescein (i.e., FITC), tetramethylrhodamine, or Texas Red. In some such embodiments, the enzyme is soybean peroxidase, alkaline phosphatase, or horseradish peroxidase.

In certain embodiments, different samples are labeled with different detectable labels (i.e., different samples are distinguishably labeled). For example, a first population of oligonucleotides (e.g., tagged fragments or amplicons thereof) derived from a reference sample and a second population of oligonucleotides derived from a test sample can be labeled with a first detectable label and a second detectable label, respectively. The first detectable label and the second detectable label may be different color fluorochromes, such as Cy3 and Cy5. In this manner, pools of differentially labeled oligonucleotides may be mixed together and added to a substrate, such as an array. These pools of differentially labeled oligonucleotides can be contacted to an array(s) serially, or, in other embodiments, simultaneously (i.e., the labeled nucleic acids are mixed prior to their contacting with the array).

In certain embodiments, different samples are labeled with the same detectable label (i.e., different samples are indistinguishably labeled). In some such embodiments, the indistinguishably labeled samples are contacted with different arrays. Where the populations are contacted with different arrays, the different arrays are substantially, if not completely, identical to each other in terms of target feature content and organization in certain embodiments.

In certain embodiments, the labeled, tagged fragments from the test and the reference sample are subjected to array-based comparative genomic hybridization (aCGH).

In certain embodiments, the contacting step is performed under conditions suitable for hybridizing the labeled, tagged fragment to an oligonucleotide probe bound to a solid support.

In certain embodiments, standard hybridization techniques (such as using high stringency hybridization conditions) are employed. Suitable methods are described in references describing CGH techniques (Kallioniemi et al., Science 258:818-821 (1992) and WO 93/18186). Several guides to general techniques are available, e.g., Tijssen, Hybridization with Nucleic Acid Probes, Parts I and II (Elsevier, Amsterdam 1993). Alternative hybridization conditions are also known.

In certain embodiments, hybridization methods, including comparative hybridization methods, comprise the following steps: (i) hybridization of the labeled, tagged fragments to the array, typically under high stringency hybridization conditions; (ii) post-hybridization washes to remove labeled, tagged fragments not hybridized to the solid support-bound oligonucleotides; and (iii) detection of the hybridized labeled, tagged fragments. The reagents used in each of these steps and their conditions for use vary depending on the particular application.

As indicated above, hybridization is carried out under suitable hybridization conditions, which may vary in stringency as desired. In certain embodiments, high stringency hybridization conditions may be employed.

In certain embodiments, the contacting step includes agitation of the immobilized oligonucleotide probes and the labeled, tagged fragments, where the agitation may be accomplished using any convenient protocol, such as by shaking, rotating, spinning, and the like.

In certain embodiments, a wash step is employed to remove unbound labeled, tagged fragments. Washing may be performed using any convenient washing protocol, where the washing conditions are typically stringent, as described above.

In certain embodiments, the method further comprises a step of detecting a signal emitted by the labeled, tagged fragment. In certain embodiments, detection of the signal emitted by the labeled, tagged fragments is indicative of hybridization of the labeled, tagged fragment to at least one solid support-bound oligonucleotide probe.

In certain embodiments, hybridization of a labeled, tagged fragment to a solid support-bound oligonucleotide probe is detected using standard techniques so that the surface of immobilized oligonucleotide probes (e.g., the array) is read. Reading of the resultant hybridized array may be accomplished by illuminating the array and reading the location and intensity of resulting fluorescence at each feature of the array to detect any binding complexes on the surface of the array. For example, a scanner may be used for this purpose. Other suitable devices and methods are described in U.S. patent applications: Ser. No. 09/846,125 "Reading Multi-Featured Arrays" by Dorsel et al.; and U.S. Pat. No. 6,406,849, which references are incorporated herein by reference. However, arrays may be read by any other method or apparatus than the foregoing, with other reading methods including other optical techniques (for example, detecting chemiluminescent or electroluminescent labels) or electrical techniques (where each feature is provided with an electrode to detect hybridization at that feature in a manner disclosed in U.S. Pat. No. 6,221,583 and elsewhere). In the case of indirect labeling, subsequent treatment of the array with the appropriate reagents may be employed to enable reading of the array. Some methods of detection, such as surface plasmon resonance, do not require any labeling of nucleic acids, and are suitable for some embodiments.

Results from the reading or evaluating may be raw results (such as fluorescence intensity readings for each feature in one or more color channels) or may be processed results (such as those obtained by subtracting a background measurement, or by rejecting a reading for a feature which is below a predetermined threshold, normalizing the results, and/or forming conclusions based on the pattern read from the array (such as whether or not a particular target sequence may have been accessible in the sample, or whether or not a pattern indicates a particular condition of an organism from which the sample came).

In one aspect, the present disclosure provides a method for determining an epigenetic landscape of a biological sample. In certain embodiments, the method comprises: (a) providing a biological sample obtained from a patient, said biological sample comprising morphologically intact nuclei; (b) contacting the morphologically intact nuclei to a transposase complex to produce a population of tagged DNA fragments representing accessible chromatin regions (ACRs) of the morphologically intact nuclei; (c) attaching a detectable label to the tagged DNA fragments to produce labeled fragments; and (d) contacting the labeled fragments to a set of oligonucleotides probes, wherein said set of oligonucleotide probes are bound to a solid support. In certain embodiments, the method further comprises (b') amplifying said tagged DNA fragments. Thus, in certain embodiments, step (c) comprises additionally or alternatively attaching a detectable label to the amplicons (i.e., copies of the template tagged DNA fragments). In certain embodiments, the method does not include sequencing the tagged fragments or amplicons thereof.

In one aspect, the present disclosure provides a method for comparing epigenetic landscapes between a test sample and a reference sample. In certain embodiments, the method comprises: (a) analyzing morphologically intact nuclei from the test sample to produce a first epigenetic landscape; (b) analyzing morphologically intact nuclei from the reference sample to produce a second epigenetic landscape; and (c) comparing the first epigenetic landscape to the second epigenetic landscape. In certain embodiments, the test sample and the reference sample can be obtained from the same individual at different times (e.g., before and after treatment). In other embodiments, the test sample and the reference sample can be obtained from different individuals (e.g., a cancer patient and a subject without cancer; a cancer patient with treatment-resistant cancer and a cancer patient with treatment-sensitive cancer; or a cancer patient with an unknown diagnosis/prognosis and a cancer patient with treatment-resistant—or, alternatively, treatment-sensitive— cancer). In certain embodiments, the morphologically intact nuclei from the test sample and/or from the reference sample are analyzed according to a method described herein, such as by an ATAC-array approach.

In one aspect, the present disclosure provides a method for identifying an epigenetic landscape characteristic of resistance to a cancer treatment modality. In certain embodiments, the method comprises (a) providing a first sample comprising cells from a treatment-resistant tumor (e.g., a recurrent pancreatic ductal adenocarcinoma, where the recurrence is within one year of resection) and a second sample comprising non-cancerous cells or tumor cells from a treatment-sensitive tumor (e.g., a non-recurrent pancreatic ductal adenocarcinoma or a late recurrent pancreatic ductal adenocarcinoma, where the recurrence is beyond 2 and up to 5 years after resection); (b) identifying accessible chromatin regions (ACRs) in both samples; and (c) comparing the ACRs identified in the first sample to the ACRs identified in the second sample. In certain embodiments, the epigenetic landscape characteristic of resistance to treatment comprises one or more ACRs present in first sample and not present in the second sample and/or one or more ACRs present in second sample and not present in the first sample. In certain embodiments, the open chromatin regions are identified using the ATAC-array approach described herein. In certain embodiments, the cancer is pancreatic cancer. Pancreatic cancer includes, for example, adenocarcinomas (tumors exhibiting glandular architecture) arising within the exocrine component of the pancreas and neuroendocrine carcinomas arising from islet cells. Pancreatic ductal adenocarcinoma (PDAC) is the most common form of pancreatic cancer. Other forms of pancreatic cancer include mucinous adenocarcinoma, acinic cell neoplasm, and neuroendocrine carcinoma. In certain embodiments, the treatment modality is selected from the group consisting of surgical resection, chemotherapy, radiation, immunotherapy, and a combination thereof.

In one aspect, the present disclosure provides a method for performing a microarray-based hybridization reaction, and, more particularly, a microarray-based hybridization reaction for transposase-accessible chromatin. The method employs physical steps to generate a plurality of duplexed molecules, wherein each duplexed molecule comprises (i) a tagged DNA fragment or derivative thereof representing an accessible chromatin region (ACR) of a morphologically intact nuclei and (ii) an oligonucleotide probe bound to a solid support, wherein the oligonucleotide probe is complementary to at least a portion of the tagged DNA fragment or derivative thereof.

The method comprises: (a) providing a biological sample obtained from a patient, said biological sample comprising morphologically intact nuclei; (b) contacting the morphologically intact nuclei to a transposase complex to produce a population of tagged DNA fragments representing accessible chromatin regions (ACRs) of the morphologically intact nuclei; (c) attaching a detectable label to the tagged DNA fragments or derivatives thereof (e.g., amplicons) to produce labeled fragments; and (d) contacting the labeled fragments to a set of oligonucleotides probes under conditions sufficient to form a plurality of duplexed molecules, wherein said set of oligonucleotide probes are bound to a solid support.

In certain embodiments, the method further comprises (b') amplifying said tagged DNA fragments. Thus, in certain embodiments, step (c) comprises additionally or alternatively attaching a detectable label to the amplicons (i.e., copies of the template tagged DNA fragments). In certain embodiments, the method does not include sequencing the tagged fragments or amplicons thereof.

In certain embodiments, the morphologically intact nuclei is from a cellular sample obtained from a patient having, or suspected of having, pancreatic cancer and, particularly, pancreatic ductal adenocarcinoma. In certain embodiments, the patient is a treatment-naïve cancer patient.

In certain embodiments, the set of oligonucleotide probes comprises a plurality of unique oligonucleotide probes wherein each unique oligonucleotide probe is hybridizable to a different chromatin region selected from the list of chromatin regions in FIG. 9A or a complement thereof and wherein the set of oligonucleotide probes collectively targets at least two, alternatively at least five, at least ten, at least twenty-five, at least fifty, at least one hundred, at least one hundred fifty, at least two hundred, at least two hundred fifty, at least three hundred, at least three hundred fifty, at least four hundred, at least four hundred fifty, or at least five hundred chromatin regions selected from the list of chromatin regions in FIG. 9A.

In certain embodiments, the set of oligonucleotide probes comprises a plurality of unique oligonucleotide probes wherein each unique oligonucleotide probe is hybridizable to a different chromatin region selected from the list of chromatin regions in FIG. 9B or a complement thereof and wherein the set of oligonucleotide probes collectively targets at least two, alternatively at least five, at least ten, at least twenty-five, at least fifty, at least one hundred, at least one hundred fifty, at least two hundred, or at least two hundred fifty chromatin regions selected from the list of chromatin regions in FIG. 9B.

C. DIAGNOSIS, PROGNOSIS, AND TREATMENT OF CANCER

In one aspect, the present disclosure provides a method for predicting an outcome for a patient, particularly a pancreatic cancer patient. In certain embodiments, the cancer patient is a treatment-naïve cancer patient. The method comprises the steps of providing a biological sample obtained from a patient having, or suspected of having, cancer, said biological sample comprising morphologically intact nuclei from cells of the patient; assessing chromatin accessibility of a first group of differentially accessible chromatin regions in the sample to obtain a first epigenetic signature value, wherein accessibility of said first group of differentially accessible chromatin regions is associated with a good prognosis; optionally, assessing chromatin accessibility of a second group of differentially accessible chromatin regions in the sample to obtain a second epigenetic signature value, wherein accessibility of said second group of differentially accessible chromatin regions is associated with a poor prognosis; and predicting the outcome of the cancer treatment based on (i) the first epigenetic signature value and/or (ii) the relative difference between the first epigenetic signature value and the second epigenetic signature value. In some such embodiments, the first epigenetic signature value and the second epigenetic signature value are signal intensities (e.g., fluorescence intensities) obtained from, for example, a sequencing reaction, such as a massively parallel sequencing reaction, or a microarray-based hybridization reaction, such as an array-based comparative genomic hybridization (aCGH). For example, the first epigenetic signature value and the second epigenetic signature value may be median signal intensities obtained from an array-based comparative genomic hybridization (aCGH) and, more particularly, from the ATAC-array approach described herein.

In certain embodiments, the method further comprises comparing the first epigenetic signature value to the second epigenetic signature value to obtain a differential value. In some such embodiments, the method further comprises normalizing the differential value with a control value.

In certain embodiments, a positive differential value is indicative of a good prognosis (e.g., a long duration of disease-free survival). In certain embodiments, a negative differential value is indicative of a poor prognosis (e.g., a short duration of disease-free survival). In certain embodiments, a differential value of approximately zero (i.e., the first epigenetic signature value and the second epigenetic signature value are not significantly different) is indicative of an intermediate prognosis.

In certain embodiments, the outcome is expressed as a prognosis score (PS). In some such embodiments, the PS is calculated using Cox regression of proportional hazards. In some such embodiments, the PS ranges from 0.3 to 0.9, with the median being 0.6. For example, any patient having PS<0.6 can be predicted as poor prognosis; any patient having >0.6 can be predicted as good prognosis. As mentioned herein, data obtained from the ATAC-array approach disclosed herein can be supplemented with or confirmed by transcription factor expression and/or nuclear localization data (e.g., obtained by immunohistochemistry for particular transcription factors (TFs), such as HNF1b). As a further example, any patient having PS<0.6 with HNF1b negative can be predicted as poor prognosis; any patient having >0.6 with HNF1b positive can be predicted as good prognosis; and any patient either PS<0.6 with HNF1b positive or PS >0.6 with HNF1b negative can be predicted as intermediate prognosis.

In certain embodiments, the outcome is duration of disease-free survival. In some such embodiments, duration of disease-free survival is expressed as a number of days (+10%). In some such embodiments, duration of disease-free survival is expressed as a range of days. In some such embodiments, the duration of disease-free survival (e.g., the number of days of disease-free survival) is predicted using a regression model.

In certain embodiments, the method further comprises selecting a treatment modality for treating the patient. In some such embodiments, the selection of the treatment modality is based on the predicted outcome.

For example, if the patient is predicted to have a poor outcome (e.g., a low number of days of disease-free survival), an appropriate treatment modality may be selected. Treatment modalities for a patient predicted to have a poor outcome may include, but are not limited to, (i) surgical resection; (ii) chemotherapy; (iii) an immunotherapy agent; (iv) an epigenetic drug; or (v) a combination of any of the foregoing. In one particular embodiment, the treatment modality may comprise a combination of chemotherapy and an epigenetic drug. In another particular embodiment, the treatment modality may comprise neo-adjuvant chemotherapy followed by surgical resection. As another example, if the patient is predicted to have a good outcome (e.g., a high number of days of disease-free survival), an appropriate treatment modality may be selected. Treatment modalities for a patient predicted to have a good outcome may include, but are not limited to, upfront surgical resection followed by adjuvant chemotherapy.

In one aspect, the present disclosure provides a method for predicting a duration of disease-free survival in a patient having, or suspected of having, cancer or another malignant disease. The method comprises (a) determining or having determined a first epigenetic signature value based on chromatin accessibility of a first group of differentially accessible chromatin regions in a biological sample obtained from the patient and a second epigenetic signature value based on chromatin accessibility of a second group of differentially accessible chromatin regions in the biological sample obtained from the patient; (b) comparing the first epigenetic signature value to the second epigenetic signature value to obtain a differential epigenetic value; (c) normalizing the differential value to obtain a normalized differential epigenetic value; and (d) predicting a duration of disease-free survival of said patient.

In certain embodiments, the method includes comparing the normalized differential epigenetic value to a value or set of values derived from a population of confirmed recurred patients.

In certain embodiments, the method comprises solving a linear regression equation using the normalized differential epigenetic value. In some such embodiments, the linear regression equation is derived from a training set. In some such embodiments, the training set comprises normalized differential epigenetic values and actual disease-free survival from a population of patients, such as a population of patients having recurred pancreatic cancer after having undergone surgical resection and adjuvant chemotherapy.

In certain embodiments, the first group of differentially accessible chromatin regions comprises at least two, alternatively at least five, at least ten, at least twenty-five, at least fifty, at least one hundred, at least one hundred fifty, at least two hundred, at least two hundred fifty, at least three hundred, at least three hundred fifty, at least four hundred, at least four hundred fifty, or at least five hundred chromatin regions selected from the list of chromatin regions in FIG. 9A, which provides >700 loci that were accessible or open in non-recurrent patients (DFS >1 year).

In certain embodiments, the second group of differentially accessible chromatin regions comprises at least two, alternatively at least five, at least ten, at least twenty-five, at least fifty, at least one hundred, at least one hundred fifty, at least two hundred, or at least two hundred fifty chromatin regions selected from the list of chromatin regions in FIG. 9B, which provides >350 loci that were accessible or open in recurrent patients (disease free survival (DFS)<1 year).

In one aspect, the present disclosure provides a treatment method comprising: a) providing a biological sample obtained from a patient having, or suspected of having, cancer, said biological sample comprising morphologically intact nuclei from cells of the patient; b) determining, or having determined, a first epigenetic signature value based on chromatin accessibility of a first group of differentially accessible chromatin regions in the biological sample obtained from the patient and, optionally, a second epigenetic signature value based on chromatin accessibility of a second group of differentially accessible chromatin regions in the biological sample obtained from the patient, wherein accessibility of said first group of differentially accessible chromatin regions is associated with a good prognosis and accessibility of said second group of differentially accessible chromatin regions is associated with a poor prognosis; c) predicting duration of disease-free survival based on (i) the first epigenetic signature value and/or (ii) the relative difference between the first epigenetic signature value and the second epigenetic signature value; and d) providing a treatment to the patient.

In certain embodiments, the treatment comprises surgical resection followed by administration of adjuvant chemotherapy. In some such embodiments, surgical resection of cancerous tissue followed by administration of adjuvant chemotherapy is the treatment when the patient is predicted to have a long duration of disease-free survival.

In certain embodiments, the method further comprises administration of neo-adjuvant chemotherapy prior to surgical resection of cancerous tissue. In some such embodiments, administration of neo-adjuvant chemotherapy prior to surgical resection of cancerous tissue is the treatment when the patient is predicted to have a short duration of disease-free survival. In some such embodiments, administration of neo-adjuvant chemotherapy prior to surgical resection of cancerous tissue is the treatment when the patient is predicted to have a long duration of disease-free survival.

In certain embodiments, the method further comprises administering an epigenetic drug to the patient. In some such embodiments, the epigenetic drug is administered to the patient when the patient is predicted to have a short duration of disease-free survival.

In certain embodiments, the cancer patient is a treatment-naïve cancer patient.

In certain embodiments, duration of disease-free survival is expressed as a number of days (+10%). In some such embodiments, duration of disease-free survival is expressed as a range of days.

In certain embodiments, the first epigenetic signature value and the second epigenetic signature value are signal intensities (e.g., fluorescence intensities) obtained from, for example, a sequencing reaction, such as a massively parallel sequencing reaction, or a microarray-based hybridization reaction, such as an array-based comparative genomic hybridization (aCGH). For example, the first epigenetic signature value and the second epigenetic signature value may be median signal intensities obtained from an array-based comparative genomic hybridization (aCGH) and, more particularly, from the ATAC-array approach described herein.

In certain embodiments, the method further comprises comparing the first epigenetic signature value to the second epigenetic signature value to obtain a differential value. In some such embodiments, the method further comprises normalizing the differential value with a control value.

In certain embodiments, the first group of differentially accessible chromatin regions comprises at least two, alternatively at least five, at least ten, at least twenty-five, at least fifty, at least one hundred, at least one hundred fifty, at least two hundred, at least two hundred fifty, at least three hundred, at least three hundred fifty, at least four hundred, at least four hundred fifty, or at least five hundred chromatin regions selected from the list of chromatin regions in FIG. 9A, which provides >700 loci that were accessible or open in non-recurrent patients (DFS >1 year).

In certain embodiments, the second group of differentially accessible chromatin regions comprises at least two, alternatively at least five, at least ten, at least twenty-five, at least fifty, at least one hundred, at least one hundred fifty, at least two hundred, or at least two hundred fifty chromatin regions selected from the list of chromatin regions in FIG. 9B, which provides >350 loci that were accessible or open in recurrent patients (disease free survival (DFS)<1 year).

In one aspect, the present disclosure provides a method for treating a disease or condition such as cancer, particularly pancreatic cancer, in a patient in need thereof. In certain embodiments, the patient is a treatment-naïve patient.

In certain embodiments, the method comprises performing surgical resection to remove cancerous tissue from the patient, wherein prior to said resection a biological sample from the patient has been tested to determine chromatin accessibility of a first group of differentially accessible chromatin regions and, optionally, a second group of differentially accessible chromatin regions, wherein accessibility of said first group of differentially accessible chromatin regions is associated with a good prognosis and accessibility of said second group of differentially accessible chromatin regions is associated with a poor prognosis. In some such embodiments, the cancerous tissue is a pancreatic ductal adenocarcinoma.

In certain embodiments, the method comprises administering neo-adjuvant chemotherapy to the patient followed by performing surgical resection to remove cancerous tissue from the patient, wherein prior to administering the neo-adjuvant chemotherapy, a biological sample from the patient has been tested to determine chromatin accessibility of a first group of differentially accessible chromatin regions and, optionally, a second group of differentially accessible chromatin regions, wherein accessibility of said first group of differentially accessible chromatin regions is associated with a good prognosis and accessibility of said second group of differentially accessible chromatin regions is associated with a poor prognosis. In some such embodiments, the cancerous tissue is a pancreatic ductal adenocarcinoma.

In certain embodiments, the method comprises administering chemotherapy alone, wherein prior to administering the chemotherapy alone, a biological sample from the patient has been tested to determine chromatin accessibility of a first group of differentially accessible chromatin regions and, optionally, a second group of differentially accessible chromatin regions, wherein accessibility of said first group of differentially accessible chromatin regions is associated with a good prognosis and accessibility of said second group of differentially accessible chromatin regions is associated with a poor prognosis.

In certain embodiments, the method comprises administering an immunotherapy agent to the patient, wherein prior to administering the immunotherapy agent, a biological sample from the patient has been tested to determine chromatin accessibility of a first group of differentially accessible chromatin regions and, optionally, a second group of differentially accessible chromatin regions, wherein accessibility of said first group of differentially accessible chromatin regions is associated with a good prognosis and accessibility of said second group of differentially accessible chromatin regions is associated with a poor prognosis. In some such embodiments, the patient has been identified as having a tumor (e.g., pancreatic ductal adenocarcinoma) likely to recur within one year following surgical resection and adjuvant chemotherapy.

In certain embodiments, the method comprises administering an epigenetic drug to the patient, wherein prior to administering the epigenetic drug, a biological sample from the patient has been tested to determine chromatin accessibility of a first group of differentially accessible chromatin regions and, optionally, a second group of differentially accessible chromatin regions, wherein accessibility of said first group of differentially accessible chromatin regions is associated with a good prognosis and accessibility of said second group of differentially accessible chromatin regions is associated with a poor prognosis. In some such embodiments, the patient has been identified as having a tumor (e.g., pancreatic ductal adenocarcinoma) likely to recur within one year following surgical resection and adjuvant chemotherapy.

In certain embodiments, the first group of differentially accessible chromatin regions comprises at least two, alternatively at least five, at least ten, at least twenty-five, at least fifty, at least one hundred, at least one hundred fifty, at least two hundred, at least two hundred fifty, at least three hundred, at least three hundred fifty, at least four hundred, at least four hundred fifty, or at least five hundred chromatin regions selected from the list of chromatin regions in FIG. 9A, which provides >700 loci that were accessible or open in non-recurrent patients (DFS >1 year).

In certain embodiments, the second group of differentially accessible chromatin regions comprises at least two, alternatively at least five, at least ten, at least twenty-five, at least fifty, at least one hundred, at least one hundred fifty, at least two hundred, or at least two hundred fifty chromatin regions selected from the list of chromatin regions in FIG. 9B, which provides >350 loci that were accessible or open in recurrent patients (disease free survival (DFS)<1 year).

In one aspect, the present disclosure provides a method for treating a disease or condition such as cancer, particularly pancreatic cancer, in a patient in need thereof. In certain embodiments, the patient is a treatment-naïve patient. The method comprises determining or having determined a first epigenetic signature value based on chromatin accessibility of a first group of differentially accessible chromatin regions in a biological sample obtained from the patient and, optionally, a second epigenetic signature value based on chromatin accessibility of a second group of differentially accessible chromatin regions in the biological sample obtained from the patient.

In certain embodiments, the method comprises performing surgical resection to remove cancerous tissue from the patient. In some such embodiments, the cancerous tissue is a pancreatic ductal adenocarcinoma.

In certain embodiments, the method comprises administering neo-adjuvant chemotherapy to the patient followed by performing surgical resection to remove cancerous tissue from the patient. In some such embodiments, the cancerous tissue is a pancreatic ductal adenocarcinoma.

In certain embodiments, the method comprises administering chemotherapy alone.

In certain embodiments, the method comprises administering an immunotherapy agent to the patient.

In certain embodiments, the method comprises administering an epigenetic drug to the patient.

In certain embodiments, accessibility of said first group of differentially accessible chromatin regions is associated with a good prognosis and accessibility of said second group of differentially accessible chromatin regions is associated with a poor prognosis.

In certain embodiments, the method further comprises identifying the patient as (i) likely to have a long duration of disease-free survival when treated with upfront surgical resection followed by adjuvant chemotherapy if the first epigenetic value is significantly higher than the second epigenetic value or (ii) likely to have a short duration of disease-free survival when treated with upfront surgical resection followed by adjuvant chemotherapy if the second epigenetic value is significantly higher than the first epigenetic value.

In certain embodiments, the method further comprises comparing the first epigenetic signature value to the second epigenetic signature value to obtain a differential value. In some such embodiments, the method further comprises normalizing the differential value with a control value.

In certain embodiments, a positive differential value is indicative of a good prognosis (e.g., a long duration of disease-free survival). In certain embodiments, a negative differential value is indicative of a poor prognosis (e.g., a short duration of disease-free survival). In certain embodiments, a differential value of approximately zero (i.e., the first epigenetic signature value and the second epigenetic signature value are not significantly different) is indicative of an intermediate prognosis.

In certain embodiments, the first group of differentially accessible chromatin regions comprises at least two, alternatively at least five, at least ten, at least twenty-five, at least fifty, at least one hundred, at least one hundred fifty, at least two hundred, at least two hundred fifty, at least three hundred, at least three hundred fifty, at least four hundred, at least four hundred fifty, or at least five hundred chromatin regions selected from the list of chromatin regions in FIG. 9A, which provides >700 loci that were accessible or open in non-recurrent patients (DFS >1 year).

In certain embodiments, the second group of differentially accessible chromatin regions comprises at least two, alternatively at least five, at least ten, at least twenty-five, at least fifty, at least one hundred, at least one hundred fifty, at least two hundred, or at least two hundred fifty chromatin regions selected from the list of chromatin regions in FIG. 9B, which provides >350 loci that were accessible or open in recurrent patients (disease free survival (DFS)<1 year).

In any aspect or embodiment described herein, the biological sample obtained from the patient may be a specimen containing cancer cells, such as a biopsy sample, preferably a fine needle biopsy sample, or a bodily fluid sample. In some such embodiments, the bodily fluid sample is a blood sample.

In any aspect or embodiment described herein, the method may comprise treating a patient and, in particular, treating the patient based on a predicted outcome. In some such embodiments, the predicted outcome is a duration of disease-free survival. In some such embodiments, the predicted outcome is obtained using methods described herein, including using the ATAC-array approach.

In some such embodiments, the patient is treated by administration of one or more anticancer agents, which may be administered in conjunction with (i.e., prior to and/or following) surgical resection. Anticancer agents include, but are not limited to, chemotherapeutic agents, kinase inhibitors, PARP (poly-ADP (adenosine diphosphate)-ribose polymerase) inhibitors, and epigenetic drugs. In some such embodiments, the patient is treated by administration of a combination of anticancer agents. In some such embodiments, the patient is treated by administration of a combination of chemotherapeutic agents. In some such embodiments, the patient is treated by administration of an epigenetic drug, optionally in combination with one or more chemotherapeutic agents.

Chemotherapeutic agents that may be used to treat cancer, particularly pancreatic cancer, include platinum compounds, such as cisplatin, carboplatin and oxaliplatin; taxanes, such as paclitaxel; nucleoside analogs, such as fluorouracil (5-FU) and/or gemcitabine; and DNA enzyme topoisomerase inhibitors, such as irinotecan.

Cisplatin is chemically described as cis-diamminedichloroplatinum(II) (CDDP) and has following formula:

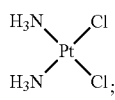

carboplatin is chemically described as platinum, diammine [1,1-cyclobutanedicarboxylato(2-)-O,O']-, (SP-4-2) and has following formula:

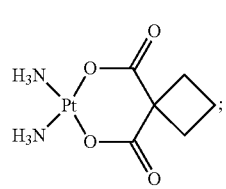

and oxaliplatin is chemically described as cis-[(1R,2R)-1,2-cyclohexanediamine-N,N'] [oxalato(2-)-O,O'] platinum and has following formula:

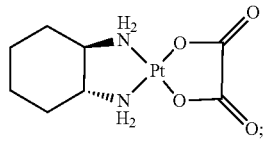

Paclitaxel, which is sold under the brand name Taxol, is chemically described as 5,20-Epoxy-1,2a,4,7β,10B, 13α-hexahydroxytax-11-en-9-one 4,10-diacetate 2-benzoate 13-ester with (2R,3S)-N-benzoyl-3-phenylisoserine and has following formula:

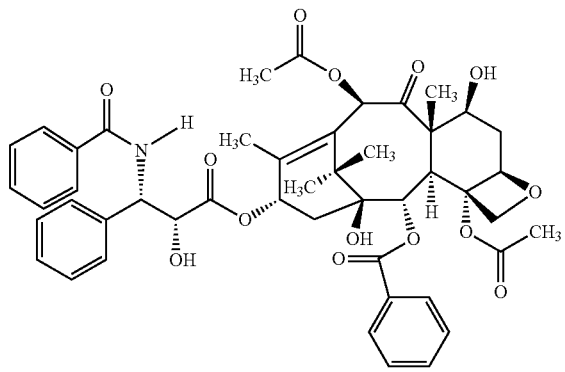

The term "nucleoside analog" refers to a structural analog of a nucleoside, a category that includes both purine analogs and pyrimidine analogs.

The term "nucleoside analog" includes fluoropyrimidine derivatives such as 5-fluorouracil (5-FU) and prodrugs thereof. 5-FU, which is sold under the brand names Adrucil, Carac, Efudix, Efudex and Fluoroplex, is a pyrimidine analog that is chemically described as 5-fluoro-2,4 (1H,3H)-pyrimidinedione and has following formula:

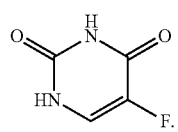

Gemcitabine, which is sold under the brand name Gemzar, is chemically described as 2'-deoxy-2',2'-difluorocytidine and has following formula:

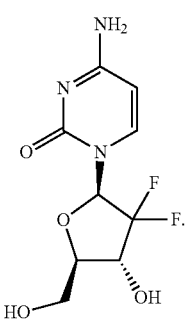

Capecitabine, which is sold under the brand name Zeloda, is chemically described as 5'-deoxy-5-fluoro-N-[(pentyloxy)carbonyl]-cytidine and has following formula:

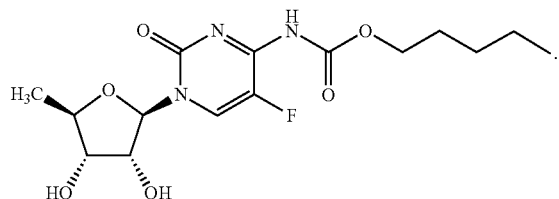 [SMILES: CCCCCOC(=O)Nc1nc(=O)n([C@@H]2O[C@H](C)[C@@H](O)[C@H]2O)cc1F]

Irinotecan is a semisynthetic analogue of the natural alkaloid camptothecin. Irinotecan is chemically described as (S)-4,11-diethyl-3,4,12,14-tetrahydro-4-hydroxy-3,14-dioxo1H-pyrano[3',4':6,7]-indolizino[1,2-b]quinolin-9-yl-[1,4'-bipiperidine]-1'-carboxylate and has the following formula:

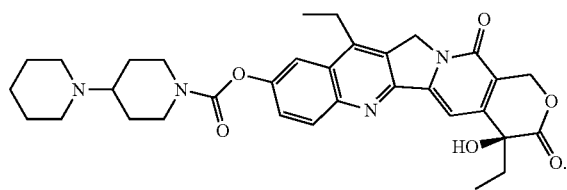 [SMILES: CCc1c2c(nc3ccc(OC(=O)N4CCC(N5CCCCC5)CC4)cc13)-c1cc3c(c(=O)n1C2)COC(=O)[C@]3(O)CC]

Folinic acid is chemically described as 5-formyl-5,6,7,8-tetrahydrofolic acid and has the following formula:

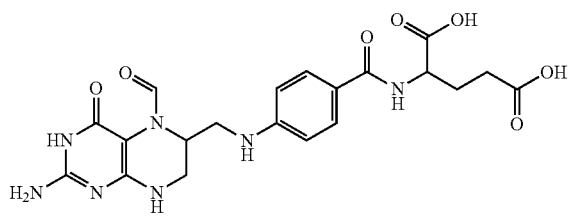 [SMILES: Nc1nc2c(c(=O)[nH]1)N(C=O)C(CNc1ccc(C(=O)NC(CCC(=O)O)C(=O)O)cc1)CN2]

Chemotherapeutic combinations that may be used to treat cancer, particularly pancreatic cancer, include gemcitabine and cisplatin, gemcitabine and oxaliplatin, FOLFIRINOX, and OFF. The drug combination used in FOLFIRINOX comprises folinic acid (also called leucovorin), 5FU, irinotecan, and oxaliplatin. The drug combination used in OFF comprises oxaliplatin, 5FU, and folinic acid (also called leucovorin).

In combination therapy, chemotherapeutic agents may be administered at any suitable frequency and may be administered substantially simultaneous with, or independent from, each other.

Kinase inhibitors that may be used to treat cancer, particularly pancreatic cancer, include EGFR inhibitors such as erlotinib and receptor tyrosine kinase inhibitors such as sunitinib. Other targeted therapies that may be used to treat cancer, particularly pancreatic cancer, include poly ADP ribose polymerase (PARP) inhibitors, such as olaparib.

Epigenetic drugs that may be used to treat cancer include histone deacetylase (HDAC) inhibitors, such as romidepsin, vorinostat, belinostat, panobinostat, entinostat, mocetinostat, CUDC-101, tefinostat, abexinostat, quisinostat, or givinostat; DNA methyltransferase (DNMT) inhibitors, such as azacitidine, decitabine, or guadecitabine; bromodomain and extra-terminal motif (BET) inhibitors, such as JQ1 or OTX015; Enhancer of Zeste Homolog 2 (EZH2) inhibitors such as UNC1999, GSK126, EPZ005687, or tazemetostat; histone acetyltransferase (HAT) inhibitors; histone lysine methyltransferase (KMT) inhibitors, such as pinometostat; protein arginine methyltransferase (PRMT) inhibitors; proteolysis-targeting chimera (PROTAC) comprising a HDAC inhibitor, a DNMT inhibitor, a BET inhibitor, a EZH2 inhibitor, a HAT inhibitor, a KMT inhibitor, or a PRMT inhibitor such as ARV-771, ARV-825, and MZP-61.

In any aspect or embodiment described herein, adjuvant chemotherapy may comprise administration of one or more chemotherapeutic agents and, in particular, administration of one or more chemotherapeutic agents following surgical resection. For example, adjuvant chemotherapy may comprise administration of one or more nucleoside analogs, such as gemcitabine, capecitabine, and 5-fluorouracil. In a particular embodiment, adjuvant chemotherapy comprises a combination of gemcitabine and capecitabine.

In any aspect or embodiment described herein, neo-adjuvant chemotherapy may comprise administration of one or more chemotherapeutic agents and, in particular, administration of one or more chemotherapeutic agents prior to surgical resection. For example, neo-adjuvant chemotherapy may comprise administration of one or more nucleoside analogs, such as gemcitabine, capecitabine, and 5-fluorouracil. In a particular embodiment, neo-adjuvant chemotherapy comprises administration of gemcitabine. In another particular embodiment, neo-adjuvant chemotherapy comprises administration of 5-fluorouracil. In certain embodiments, gemcitabine or 5-fluorouracil is administered in combination with other chemotherapeutic agents, particularly a platinum-based compound, such as cisplatin or oxaliplatin, or a taxane, such as paclitaxel. In some such embodiments, the taxane is nab-paclitaxel.

In any aspect or embodiment described herein, treatment with an epigenetic drug may comprise administration one or more compounds selected from the group consisting of histone deacetylase (HDAC) inhibitors; DNA methyltransferase (DNMT) inhibitors; bromodomain and extra-terminal motif (BET) inhibitors; Enhancer of Zeste Homolog 2 (EZH2) inhibitors; histone acetyltransferase (HAT) inhibitors; histone lysine methyltransferase (KMT) inhibitors; protein arginine methyltransferase (PRMT) inhibitors; and proteolysis-targeting chimera (PROTAC) comprising a HDAC inhibitor, a DNMT inhibitor, a BET inhibitor, a EZH2 inhibitor, a HAT inhibitor, a KMT inhibitor, or a PRMT inhibitor. The epigenetic drug(s) may be administered alone or in combination with one or more chemotherapeutic agents.

In one aspect, the present disclosure provides a diagnostic or prognostic method. In certain embodiments, the diagnostic or prognostic method may distinguish between treatment-resistant and treatment-sensitive cancers. In certain embodiments, the diagnostic or prognostic method may distinguish between rapidly recurrent and non-recurrent tumors. In some such embodiments, the tumors are pancreatic tumors, such as pancreatic ductal adenocarcinoma.

In certain embodiments, the diagnostic or prognostic method comprises determining a epigenetic landscape from a biological sample obtained from a patient, wherein the epigenetic landscape comprises at least two, alternatively at least five, at least ten, at least twenty, at least thirty, at least forty, at least fifty, at least one hundred, at least two hundred, at least three hundred, at least four hundred, at least five hundred, at least six hundred, at least seven hundred, at least eight hundred, at least nine hundred, or at least one thousand chromatin regions selected from the list of chromatin regions in Table 1; and providing a diagnosis or prognosis based on the determination.

In certain embodiments, the diagnostic or prognostic method comprises determining nuclear localization of a transcription factor in a biological sample obtained from a patient, wherein the transcription factor is selected from the lists of transcription factors in Table 2A and 2B; and providing a diagnosis or prognosis based on the determination. In certain embodiments, the transcription factor is HNF1b. In some such embodiments, strong nuclear localization of HNF1b is indicative of response to treatment, particularly non-recurrence of PDAC within one year following resection and adjuvant chemotherapy (e.g., gemcitabine). In some such embodiments, absent or weak nuclear localization of HNF1b is indicative of resistance to treatment, particularly recurrence of PDAC within one year following resection and adjuvant chemotherapy (e.g., gemcitabine). In certain embodiments, the biological sample comprises an isolated or enriched cell population, such as EpCAM+ cells. In certain embodiments, two or more, alternatively three or more, four or more, five or more, six or more, seven or more, eight or more, nine or more, or ten or more transcription factors are selected from the lists of transcription factors in Table 2A and 2B.

In one aspect, the present disclosure provides a method for treating a disease or condition such as cancer, particularly pancreatic cancer. In certain embodiments, the method comprises performing surgical resection to remove a pancreatic ductal adenocarcinoma from a patient, wherein prior to said resection a biological sample from the patient has been tested to determine an epigenetic landscape of the biological sample. In some such embodiments, the epigenetic landscape comprises a plurality of pre-selected differentially accessible chromatin regions and the plurality of pre-selected differentially accessible chromatin regions comprise at least two, alternatively at least five, at least ten, at least twenty, at least thirty, at least forty, at least fifty, at least one hundred, at least two hundred, at least three hundred, at least four hundred, at least five hundred, at least six hundred, at least seven hundred, at least eight hundred, at least nine hundred, or at least one thousand chromatin regions selected from the list of chromatin regions in Table 1, which provides a signature of >1000 loci that were differentially accessible between recurrent (disease free survival (DFS)<1 year) and non-recurrent patients (DFS >1 year). In certain embodiments, the method comprises performing surgical resection to remove a pancreatic ductal adenocarcinoma from a patient, wherein prior to said resection a biological sample from the patient has been tested to determine nuclear localization of one or more transcription factors. In some such embodiments, the transcription factor is selected from the list of transcription factors in Table 2A and strong nuclear localization of the transcription factor was detected; in an exemplary embodiment, the transcription factor is HNF1b. In some such embodiments, the transcription factor is selected from the list of transcription factors in Table 2B and no or weak nuclear localization of the transcription factor was detected; in an exemplary embodiment, the transcription factor is ZKSCAN1.

In one aspect, the present disclosure provides a method for treating a disease or condition such as cancer, particularly pancreatic cancer. In certain embodiments, the method comprises administering an epigenetic drug to the patient, wherein prior to administering the epigenetic drug, a biological sample from the patent has been tested to determine an epigenetic landscape of the biological sample In certain embodiments, the epigenetic drug is a histone deacetylase (HDAC) inhibitor, such as romidepsin, vorinostat, belinostat, panobinostat, entinostat, mocetinostat, abexinostat, quisinostat, or givinostat. In certain embodiments, the epigenetic drug is a DNA methyltransferase (DNMT) inhibitor, such as azacitidine, decitabine, or guadecitabine. In certain embodiments, the epigenetic drug is a bromodomain and extra-terminal motif (BET) inhibitor, such as JQ1 or OTX015. In certain embodiments, the epigenetic drug is an Enhancer of Zeste Homolog 2 (EZH2) inhibitor such as UNC1999, GSK126, EPZ005687, or tazemetostat. In certain embodiments, the epigenetic drug is a histone acetyltransferase (HAT) inhibitor. In certain embodiments, the epigenetic drug is a histone lysine methyltransferase (KMT) inhibitor. In certain embodiments, the epigenetic drug is a protein arginine methyltransferase (PRMT) inhibitor. In certain embodiments, the epigenetic drug is a proteolysis-targeting chimera (PROTAC) comprising a HDAC inhibitor, a DNMT inhibitor, a BET inhibitor, a EZH2 inhibitor, a HAT inhibitor, a KMT inhibitor, or a PRMT inhibitor such as ARV-771, ARV-825, and MZP-61.

In certain embodiments, the patient is identified as likely being a non-responder to a treatment modality. In some such embodiments, the treatment modality is surgical resection with or without adjuvant chemotherapy. In certain embodiments, the patient is identified as having a tumor likely to recur within one year following surgical resection and adjuvant chemotherapy. In some such embodiments, the tumor is a pancreatic ductal adenocarcinoma.

In certain embodiments, the epigenetic landscape comprises a plurality of pre-selected differentially accessible chromatin regions and the plurality of pre-selected differentially accessible chromatin regions comprise at least two, alternatively at least five, at least ten, at least twenty, at least thirty, at least forty, at least fifty, at least one hundred, at least two hundred, at least three hundred, at least four hundred, at least five hundred, at least six hundred, at least seven hundred, at least eight hundred, at least nine hundred, or at least one thousand chromatin regions selected from the list of chromatin regions in Table 1, which provides a signature of >1000 loci that were differentially accessible between recurrent (disease free survival (DFS)<1 year) and non-recurrent patients (DFS >1 year).

In certain embodiments, the method comprises administering the epigenetic drug to the patient, wherein prior to said administration a biological sample from the patient has been tested to determine nuclear localization of one or more transcription factors. In some such embodiments, the transcription factor is selected from the list of transcription factors in Table 2A and strong nuclear localization of the transcription factor was detected; in an exemplary embodiment, the transcription factor is HNF1b. In some such embodiments, the transcription factor is selected from the list of transcription factors in Table 2B and no or weak nuclear localization of the transcription factor was detected; in an exemplary embodiment, the transcription factor is ZKSCAN1.

In one aspect, the present disclosure provides a method for treating cancer in a patient in need thereof. In certain embodiments, the method comprises (a) assessing if the patient is likely to be a responder or a non-responder to a first treatment modality by determining or having determined an epigenetic landscape of a biological sample obtained from the cancer patient; and (b) treating the cancer patient with a second treatment modality if the patient is determined to be a likely non-responder to the first treatment modality.

In some such embodiments, the first treatment modality comprises surgical resection with or without adjuvant chemotherapy.

In some such embodiments, the second treatment modality comprises an epigenetic drug. For example, step (b) may comprise administering to the patient an epigenetic drug selected from the group consisting of a HDAC inhibitor, a DNMT inhibitor, a BET inhibitor, a EZH2 inhibitor, a HAT inhibitor, a KMT inhibitor, a PRMT inhibitor, conjugates thereof, and combinations thereof.

In certain embodiments, the epigenetic landscape comprises a plurality of pre-selected differentially accessible chromatin regions and the plurality of pre-selected differentially accessible chromatin regions comprise at least two, alternatively at least five, at least ten, at least twenty, at least thirty, at least forty, at least fifty, at least one hundred, at least two hundred, at least three hundred, at least four hundred, at least five hundred, at least six hundred, at least seven hundred, at least eight hundred, at least nine hundred, or at least one thousand chromatin regions selected from the list of chromatin regions in Table 1, which provides a signature of >1000 loci that were differentially accessible between recurrent (disease free survival (DFS)<1 year) and non-recurrent patients (DFS >1 year).

D. SYSTEMS, KITS, AND COMPOSITIONS

This disclosure provides a microarray-based technology for reading chromatin accessibility patterns.

In one aspect, this disclosure provides a microarray. In certain embodiments, the microarray comprises a solid support having a plurality of oligonucleotide probes attached thereto. In some such embodiments, the oligonucleotide probes are capable of hybridization to one or more pre-selected differentially accessible chromatin regions. In some such embodiments, at least one of the one or more pre-selected differentially accessible chromatin regions are differentially accessible between a first condition and a second condition. For example, at least one pre-selected differentially accessible chromatin region may be open in a tissue sample from a patient having treatment-resistant disease and closed in a tissue sample from a patient having treatment-sensitive disease. Conversely, at least one pre-selected differentially accessible chromatin region may be closed in a tissue sample from a patient having treatment-resistant disease and open in a tissue sample from a patient having treatment-sensitive disease. In another example, at least one pre-selected differentially accessible chromatin region may be open in a tissue sample from a PDAC that recurs or is likely to recur within one year following resection and closed (silenced) in patients having PDAC that does not recur or is unlikely to recur within one year following resection. Conversely, at least one pre-selected differentially accessible chromatin region may be open in a tissue sample from a PDAC that does not recur or is unlikely to recur within one year following resection and closed (silenced) in patients having PDAC that recurs or is likely to recur within one year following resection.

In certain embodiments, the microarray comprises at least 100, at least 200, at least 300, at least 400, at least 500, at least 600, at least 700, at least 800, at least 900, at least 1000, or alternatively, 1092 unique oligonucleotide probes (e.g., each unique probe may correspond to a particular differentially accessible chromatin region such that 1092 unique probes cover all 1092 differentially accessible chromatin region identified in Table 1).

In one aspect, the present disclosure provides a kit for use in determining an epigenetic landscape of a biological sample. In certain embodiments, the kit comprises (i) a transposase enzyme, wherein the transposase enzyme is optionally loaded with one or more adapters; (ii) one or more detectable labels suitable for attaching to an oligonucleotide; and (iii) a microarray comprising a set of oligonucleotide probes anchored to a solid support.

In one aspect, this disclosure provides a solid support comprising a set of oligonucleotide probes bound thereto, wherein the set of oligonucleotide probes comprises a plurality of unique oligonucleotide probes wherein each unique oligonucleotide probe is hybridizable to a different chromatin region selected from the list of chromatin regions in FIG. 9A or a complement thereof and wherein the set of oligonucleotide probes collectively targets at least two, alternatively at least five, at least ten, at least twenty-five, at least fifty, at least one hundred, at least one hundred fifty, at least two hundred, at least two hundred fifty, at least three hundred, at least three hundred fifty, at least four hundred, at least four hundred fifty, or at least five hundred chromatin regions selected from the list of chromatin regions in FIG. 9A.

In certain embodiments, the solid support comprises a glass slide or silicon thin-film cell.

In certain embodiments, each unique oligonucleotide probe comprises DNA.

In certain embodiments, each unique oligonucleotide probe is complementary to at least a portion of a chromatin region selected from the list of chromatin regions in FIG. 9A or a complement thereof.

In certain embodiments, the plurality of unique oligonucleotide probes comprises at least one unique oligonucleotide probe that is hybridizable to a chromatin region selected from the list of chromatin regions in FIG. 9B or a complement thereof and wherein the set of oligonucleotide probes collectively targets at least one, alternatively at least two, alternatively at least five, at least ten, at least twenty-five, at least fifty, at least one hundred, at least one hundred fifty, at least two hundred, or at least two hundred fifty chromatin regions selected from the list of chromatin regions in FIG. 9B.

In certain embodiments, the plurality of unique oligonucleotide probes comprises at least one unique oligonucleotide probe that is not hybridizable with any chromatin region listed in Table 9A, but is hybridizable with another nucleic acid sequence (e.g., a control sequence).

In one aspect, this disclosure provides a solid support comprising a set of oligonucleotide probes bound thereto, wherein the set of oligonucleotide probes comprises a plurality of unique oligonucleotide probes wherein each unique oligonucleotide probe is hybridizable to a different chromatin region selected from the list of chromatin regions in FIG. 9B or a complement thereof and wherein the set of oligonucleotide probes collectively targets at least two, alternatively at least five, at least ten, at least twenty-five, at least fifty, at least one hundred, at least one hundred fifty, at least two hundred, or at least two hundred fifty chromatin regions selected from the list of chromatin regions in FIG. 9B.

In certain embodiments, the solid support comprises a glass slide or silicon thin-film cell.

In certain embodiments, each unique oligonucleotide probe comprises DNA.

In certain embodiments, each unique oligonucleotide probe is complementary to at least a portion of a chromatin region selected from the list of chromatin regions in FIG. 9B or a complement thereof.

In certain embodiments, the plurality of unique oligonucleotide probes comprises at least one unique oligonucleotide probe that is hybridizable to a chromatin region selected from the list of chromatin regions in FIG. 9A or a complement thereof and wherein the set of oligonucleotide probes collectively targets at least one, alternatively at least two, alternatively at least five, at least ten, at least twenty-five, at least fifty, at least one hundred, at least one hundred fifty, at least two hundred, at least two hundred fifty, at least three hundred, at least three hundred fifty, at least four hundred, at least four hundred fifty, or at least five hundred chromatin regions selected from the list of chromatin regions in FIG. 9A.

In certain embodiments, the plurality of unique oligonucleotide probes comprises at least one unique oligonucleotide probe that is not hybridizable with any chromatin region listed in Table 9B, but is hybridizable with another nucleic acid sequence (e.g., a control sequence).

In one aspect, this disclosure provides a system or kit comprising a solid support disclosed herein.

In one aspect, this disclosure provides a method for forming a plurality of duplexed molecules. The method employs physical steps to generate a plurality of duplexed molecules, wherein each duplexed molecule comprises (i) a tagged DNA fragement or derivative thereof representing an accessible chromatin region (ACR) of a morphologically intact nuclei and (ii) an oligonucleotide probe bound to a solid support disclosed herein.

The method comprises contacting labeled nucleic acid fragments to the set of oligonucleotides probes bound to a solid support disclosed herein under conditions sufficient to form a plurality of duplexed molecules.

In certain embodiments, the steps of preparing the labeled nucleic acid fragments include one or more of the following: (a) providing a biological sample obtained from a patient, said biological sample comprising morphologically intact nuclei; (b) contacting the morphologically intact nuclei to a transposase complex to produce a population of tagged DNA fragments representing accessible chromatin regions (ACRs) of the morphologically intact nuclei; and (c) attaching a detectable label to the tagged DNA fragments or derivatives thereof (e.g., amplicons) to produce labeled fragments.

In certain embodiments, the method of preparing the labeled nucleic acid fragments further comprises (b') amplifying said tagged DNA fragments. Thus, in certain embodiments, step (c) comprises additionally or alternatively attaching a detectable label to the amplicons (i.e., copies of the template tagged DNA fragments).

In certain embodiments, the morphologically intact nuclei is from a cellular sample obtained from a patient having, or suspected of having, pancreatic cancer and, particularly, pancreatic ductal adenocarcinoma. In certain embodiments, the patient is a treatment-naïve cancer patient.

In one aspect, this disclosure provides a system or kit comprising a solid support, wherein the solid support comprises a set of oligonucleotide probes bound thereto, wherein the set of oligonucleotide probes comprises a plurality of unique oligonucleotide probes wherein each unique oligonucleotide probe is hybridizable to a different chromatin region selected from the list of chromatin regions in FIG. 9A of FIG. 9B or a complement thereof and wherein the set of oligonucleotide probes collectively targets at least two, alternatively at least five, at least ten, at least twenty-five, at least fifty, at least one hundred, at least one hundred fifty, at least two hundred, at least two hundred fifty, at least three hundred, at least three hundred fifty, at least four hundred, at least four hundred fifty, at least five hundred, at least five hundred fifty, at least six hundred, at least six hundred fifty, at least seven hundred, at least seven hundred fifty, at least eight hundred, at least eight hundred fifty, or at least nine hundred chromatin regions selected from the list of chromatin regions in FIG. 9A and FIG. 9B.

In certain embodiments, the solid support comprises a glass slide or silicon thin-film cell.

In certain embodiments, each unique oligonucleotide probe comprises DNA.

In certain embodiments, each unique oligonucleotide probe is complementary to at least a portion of a chromatin region selected from the list of chromatin regions in FIG. 9A of FIG. 9B or a complement thereof.

In certain embodiments, the kit or system further comprises a reagent for detection of HNF1b and, in particular, nuclear localization of HNF1b. In some such embodiments, detection of HNF1b is by immunohistochemistry or immunofluorescence. In some such embodiments, the reagent is an antibody or fragment thereof that specifically binds to HNF1b. In some such embodiments, the reagent is a monoclonal antibody or fragment thereof that specifically binds to HNF1b. In other such embodiments, the reagent is a polyclonal antibody or fragment(s) thereof that specifically binds to HNF1b. Exemplary anti-HNF1b antibodies include, but are not limited to, a polyclonal anti-HNF1b antibody such as that available from Sigma as HPA002083 or monoclonal anti-HNF1b antibody such as clone CL0374 (Abnova).

E. EXAMPLES

Example 1: PDAC Recurrence

A prospective cohort of treatment-naïve, surgically resected tumors from 54 PDAC patients was collected (n=54). PDAC malignant cells from freshly resected tumors were sorted using EpCAM-conjugated magnetic beads. Both EpCAM$^+$ and EpCAM$^-$ cells from each of the tumors were collected. The canonical variant allele frequencies (VAF) of pancreatic cancer driver genes KRAS and TP53 in the EpCAM$^+$ cells were both dramatically higher than that of the EpCAM$^-$ cells (P<0.001, t-test) confirming the effective enrichment of malignant epithelial cells in EpCAM$^+$ subpopulation of the same tumor. This enrichment was further confirmed by transcriptome analysis, which demonstrated overexpression of epithelial genes in the EpCAM+ subpopulation, with corresponding expression of immune cell and collagen genes in the EpCAM-subpopulation.

Assay for Transposase-Accessible Chromatin sequencing (ATAC-seq) was performed on the EpCAM$^+$ cells to interrogate genome-wide chromatin accessibility and associated differentially accessible TF binding sites. A global atlas of 121,697 peaks with median width of 505 bp, where each peak was reproducible in replicate ATAC-seq libraries for at least one patient was assembled. Saturation analysis was performed to estimate incremental new peak discovery associated with stepwise increases in sample size and confirmed that a sample size of n=40 approached saturating coverage.

Figure 13A:
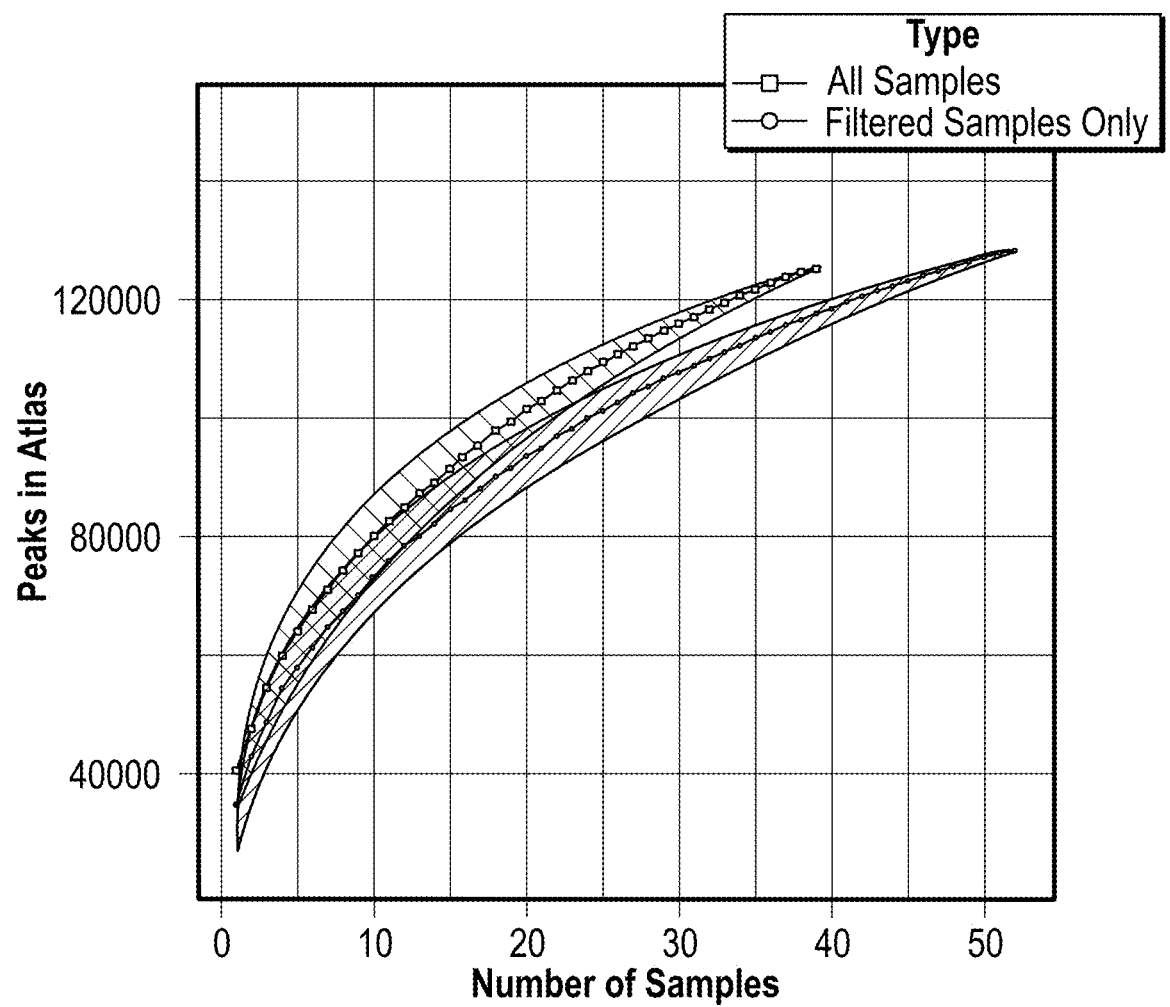
FIG. 13A shows cohort-level saturation of the peaks on all the patients (n=54, grey) and the patients included in the global atlas (n=40, orange).
Figure 13B:
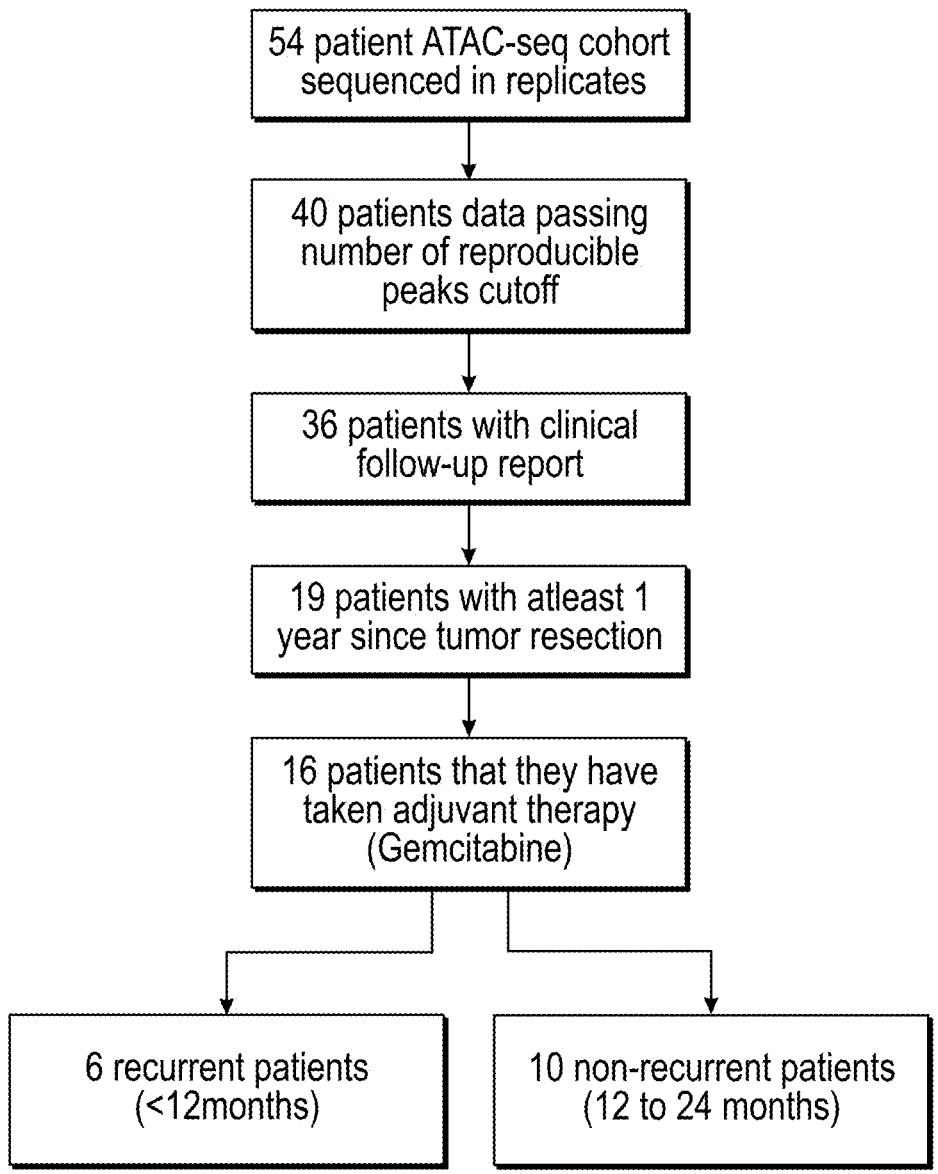
FIG. 13B is a flowchart showing selection of patients used for training set (n=16).

Follow-up clinical data were available for 36 out of 40 patients included in the atlas (see remarks in FIG. 13B). Nineteen (19) of 36 patients were at least 365 days post-treatment, among whom 9 patients (47.4%) had recurred (DFS≤1 year, referred to as the recurrent group), and 10 patients had no recurrence (DFS >1 year; maximum of 660 days, referred to as the non-recurrent group). The latter group, however, was expected to be mixture of long-term survivors and others who will recur in 2-5 years. For the discovery analyses, 3 patients who did not receive any adjuvant chemotherapy were excluded, leaving 16 patients (6 recurrent and 10 non-recurrent). A multi-factor generalized linear model was then used to identify significant differential chromatin accessibility events between the recurrent versus non-recurrent groups, while controlling for the effects of read depth and margin status.

More than one thousand (1092) open chromatin peaks were identified as being differentially accessible (absolute log 2 fold change >1 and FDR-adjusted P<0.001) between the patients who recurred within a year of surgery and the patients who did not recur (maximum follow-up of 660 days) by ATAC-seq as in FIG. 1. The differentially accessible chromatin regions are listed in Table 1.

TABLE 1

| Chr | Start | End | Annotation | Transcript_id | Gene symbol | Fold Change | P-value (adj) | Peak width (bp) |
|---|---|---|---|---|---|---|---|---|
| 17 | 52977819 | 52978913 | promoter | ENST00000575909 | TOM1L1 | −1.01 | 2.2E−06 | 1094 |
| 10 | 134254015 | 134254324 | promoter | ENST00000450206 | RP11-432J24.3 | 1.56 | 9.0E−04 | 309 |
| 10 | 1506248 | 1507137 | intron | ENST00000381312 | ADARB2 | 1.30 | 5.1E−05 | 889 |
| 9 | 27625883 | 27626853 | intergenic | ENST00000400348 | CTAGE12P | −1.38 | 2.1E−08 | 970 |
| 14 | 105698636 | 105698888 | intron | ENST00000550208 | BRF1 | 1.35 | 1.6E−05 | 252 |
| 7 | 401254 | 401879 | intergenic | ENST00000515213 | AC226118.1 | 1.31 | 5.8E−04 | 625 |
| 7 | 4652611 | 4652868 | intergenic | ENST00000446823 | FOXK1 | 1.05 | 8.9E−04 | 257 |
| 22 | 23744503 | 23745176 | promoter | ENST00000420968 | ZDHHC8P1 | −1.04 | 7.1E−04 | 673 |
| X | 3615234 | 3616144 | intron | ENST00000262848 | PRKX | −1.12 | 7.8E−04 | 910 |
| 17 | 104433 | 104716 | intron | ENST00000570638 | RPH3AL | 1.45 | 9.4E−04 | 283 |
| 2 | 1420825 | 1421839 | intron | ENST00000382198 | TPO | 1.08 | 8.6E−05 | 1014 |
| 16 | 12895395 | 12895819 | promoter | ENST00000539677 | CPPED1 | 1.20 | 1.6E−04 | 424 |
| 16 | 89495481 | 89495932 | intron | ENST00000566973 | ANKRD11 | 1.11 | 6.9E−04 | 451 |
| 16 | 1389753 | 1390364 | intron | ENST00000421665 | BAIAP3 | 1.24 | 3.3E−04 | 611 |
| 6 | 2504483 | 2504975 | intergenic | ENST00000606884 | GMDS-AS1 | 1.18 | 2.4E−04 | 492 |
| 2 | 2016399 | 2016710 | intron | ENST00000479156 | MYT1L | 1.82 | 3.4E−08 | 311 |
| 17 | 75480980 | 75481368 | intron | ENST00000585638 | 9 Sep | 1.29 | 2.8E−04 | 388 |
| 22 | 30601850 | 30602161 | promoter | ENST00000432360 | RP3-438O4.4 | 1.44 | 6.3E−04 | 311 |
| 1 | 3594879 | 3595126 | intron | ENST00000357733 | TP73 | 1.36 | 1.2E−04 | 247 |
| 11 | 460271 | 461039 | promoter | ENST00000526878 | PTDSS2 | 1.32 | 1.2E−04 | 768 |
| 9 | 138020994 | 138021355 | intergenic | ENST00000371796 | OLFM1 | 1.35 | 2.4E−04 | 361 |
| 12 | 123933887 | 123934119 | intergenic | ENST00000605712 | RP11-972P1.8 | 1.34 | 2.2E−04 | 232 |
| X | 10087464 | 10087962 | intron | ENST00000454666 | WWC3 | −1.50 | 7.4E−05 | 498 |
| 18 | 56179682 | 56180292 | intron | ENST00000361673 | ALPK2 | 1.07 | 2.5E−04 | 610 |
| 18 | 18970975 | 18971689 | intron | ENST00000584611 | RP11-296E23.1 | −1.05 | 2.6E−04 | 714 |
| 17 | 106478 | 107040 | intron | ENST00000570638 | RPH3AL | 1.30 | 1.9E−04 | 562 |
| 18 | 20512914 | 20514073 | promoter | ENST00000578831 | RP11-739L10.1 | −1.03 | 3.8E−04 | 1159 |
| 11 | 70454 | 70919 | intergenic | ENST00000519787 | RP11-304M2.1 | 1.54 | 5.0E−04 | 465 |
| 2 | 242869770 | 242871341 | intron | ENST00000429947 | AC131097.3 | 1.15 | 3.2E−04 | 1571 |
| 19 | 40421670 | 40422156 | intron | ENST00000221347 | FCGBP | 1.56 | 4.3E−04 | 486 |
| 11 | 92438452 | 92438798 | intron | ENST00000525166 | FAT3 | 1.03 | 5.5E−04 | 346 |
| 1 | 59246541 | 59247091 | exon | ENST00000371222_43680 | | −1.40 | 4.0E−04 | 550 |
| 18 | 6413976 | 6415319 | promoter | ENST00000580162 | L3MBTL4 | −1.20 | 3.9E−04 | 1343 |
| 14 | 67878683 | 67879198 | promoter | ENST00000557388 | PLEK2 | −1.06 | 2.8E−05 | 515 |
| 10 | 51566723 | 51567262 | promoter | ENST00000414907 | NCOA4 | −1.18 | 2.3E−04 | 539 |
| 11 | 128149728 | 128150176 | intergenic | ENST00000608492 | RP11-702B10.1 | 1.57 | 1.7E−04 | 448 |
| 20 | 5344571 | 5345402 | intergenic | ENST00000363443 | RNA5-8SP7 | 1.23 | 1.0E−04 | 831 |
| 10 | 106087848 | 106088405 | promoter | ENST00000358187 | ITPRIP | 1.27 | 1.3E−05 | 557 |
| 20 | 17540069 | 17540372 | promoter | ENST00000377868 | BFSP1 | 1.24 | 2.4E−04 | 303 |
| 7 | 66017307 | 66017790 | intron | ENST00000445080 | GS1-124K5.12 | 1.08 | 1.2E−04 | 483 |
| 2 | 9445224 | 9446284 | intron | ENST00000315273 | ASAP2 | 1.04 | 9.6E−04 | 1060 |
| 4 | 84255872 | 84256464 | promoter | ENST00000513463 | HPSE | −1.06 | 8.7E−05 | 592 |
| 6 | 78359808 | 78360616 | intergenic | ENST00000602452 | MEI4 | −1.49 | 2.7E−04 | 808 |
| 18 | 21017554 | 21018179 | promoter | ENST00000399707 | TMEM241 | −1.15 | 3.3E−04 | 625 |
| 19 | 4084177 | 4084702 | intergenic | ENST00000262948 | MAP2K2 | 1.05 | 2.6E−04 | 525 |
| 7 | 36555230 | 36555979 | promoter | ENST00000471806 | AOAH | 1.10 | 1.5E−04 | 749 |
| 3 | 18799504 | 18799922 | intron | ENST00000425799 | AC144521.1 | −1.11 | 1.4E−10 | 418 |
| 8 | 86375420 | 86376638 | promoter | ENST00000517697 | RP11-317J10.2 | −1.13 | 3.7E−09 | 1218 |
| 16 | 33345278 | 33346583 | promoter | ENST00000568752 | RP11-989E6.10 | 1.14 | 2.9E−04 | 1305 |
| 7 | 63220603 | 63221633 | intergenic | ENST00000605464 | CICP24 | 1.21 | 1.2E−04 | 1030 |
| 2 | 87651678 | 87651939 | intergenic | ENST00000444323 | AC068279.3 | 1.16 | 2.8E−04 | 261 |
| 22 | 19434714 | 19435523 | promoter | ENST00000333059 | C22orf39 | −1.03 | 9.5E−04 | 809 |
| 3 | 126945866 | 126946636 | intergenic | ENST00000492080 | RP11-305F5.2 | 1.05 | 4.0E−04 | 770 |
| 11 | 2011127 | 2011556 | promoter | ENST00000419080 | MRPL23-AS1 | 1.54 | 1.0E−05 | 429 |
| 11 | 119612823 | 119613563 | intergenic | ENST00000533253 | CTD-2523D13.2 | 1.14 | 2.5E−04 | 740 |
| 1 | 1293633 | 1294442 | promoter | ENST00000445648 | MXRA8 | 1.33 | 1.9E−08 | 809 |
| 11 | 102364324 | 102364756 | intron | ENST00000529278 | RP11-315O6.2 | −1.07 | 2.8E−05 | 432 |

TABLE 1-continued

| Chr | Start | End | Annotation | Transcript_id | Gene symbol | Fold Change | P-value (adj) | Peak width (bp) |
|---|---|---|---|---|---|---|---|---|
| 1 | 117900726 | 117901380 | intergenic | ENST00000604156 | RP11-188D8.1 | 1.38 | 1.1E−04 | 654 |
| 7 | 102091876 | 102092500 | exon | ENST00000356387_249477 | | 1.38 | 3.5E−04 | 624 |
| 10 | 92690759 | 92691502 | intergenic | ENST00000364734 | RNU6-740P | 1.09 | 6.7E−04 | 743 |
| 10 | 135342280 | 135342918 | promoter | ENST00000599428 | AL161645.2 | 1.69 | 7.1E−06 | 638 |
| 12 | 124857925 | 124858331 | intron | ENST00000448614 | NCOR2 | 1.14 | 4.6E−04 | 406 |
| 18 | 9474785 | 9475995 | promoter | ENST00000383432 | RALBP1 | −1.03 | 3.7E−04 | 1210 |
| X | 20396229 | 20397054 | intergenic | ENST00000517169 | RN7SKP183 | −1.25 | 4.1E−04 | 825 |
| 1 | 2111576 | 2112325 | intron | ENST00000505322 | PRKCZ | 1.32 | 4.8E−04 | 749 |
| 4 | 71450043 | 71450658 | intergenic | ENST00000322937 | AMBN | −1.15 | 9.9E−05 | 615 |
| 11 | 1086528 | 1086937 | intron | ENST00000359061 | MUC2 | 1.19 | 7.0E−05 | 409 |
| 2 | 10539305 | 10539660 | intron | ENST00000419810 | HPCAL1 | 1.24 | 6.7E−05 | 355 |
| 16 | 33348985 | 33350971 | promoter | ENST00000568752 | RP11-989E6.10 | 1.18 | 4.8E−05 | 1986 |
| 21 | 47410321 | 47410540 | intron | ENST00000361866 | COL6A1 | 1.19 | 3.5E−04 | 219 |
| 19 | 36774890 | 36775141 | intergenic | ENST00000586345 | CTD-3162L10.1 | 1.18 | 9.4E−04 | 251 |
| 19 | 36790418 | 36790944 | intergenic | ENST00000586345 | CTD-3162L10.1 | 1.40 | 1.8E−05 | 526 |
| 19 | 36791007 | 36791167 | intergenic | ENST00000586345 | CTD-3162L10.1 | 1.61 | 2.0E−04 | 160 |
| 16 | 32297453 | 32298796 | intergenic | ENST00000568567 | RP11-17M15.2 | 1.16 | 3.0E−05 | 1343 |
| 19 | 36785355 | 36785870 | intergenic | ENST00000586345 | CTD-3162L10.1 | 1.28 | 7.8E−04 | 515 |
| 12 | 9558298 | 9559027 | intron | ENST00000540982 | RP11-599J14.2 | 1.17 | 4.1E−04 | 729 |
| 3 | 125726687 | 125727535 | promoter | ENST00000504118 | SLC41A3 | 1.08 | 6.4E−04 | 848 |
| 10 | 129058797 | 129060504 | intron | ENST00000464466 | DOCK1 | 1.09 | 3.6E−04 | 1707 |
| 2 | 87642804 | 87643025 | intergenic | ENST00000444323 | AC068279.3 | 1.10 | 3.8E−04 | 221 |
| 1 | 11296642 | 11297523 | intron | ENST00000361445 | MTOR | 1.43 | 9.5E−04 | 881 |
| 12 | 31871662 | 31871945 | intron | ENST00000509386 | AMN1 | 1.78 | 8.9E−05 | 283 |
| 5 | 1521927 | 1522688 | promoter | ENST00000514484 | LPCAT1 | 1.23 | 2.7E−06 | 761 |
| 1 | 4692485 | 4692949 | intergenic | ENST00000378190 | AJAP1 | 1.15 | 9.3E−04 | 464 |
| 1 | 66655817 | 66656717 | intron | ENST00000412480 | PDE4B | 1.25 | 5.2E−04 | 900 |
| 1 | 16970486 | 16970660 | promoter | ENST00000362058 | CROCCP2 | 1.01 | 7.5E−05 | 174 |
| 19 | 6677696 | 6678735 | promoter | ENST00000601475 | C3 | 1.13 | 5.3E−04 | 1039 |
| 1 | 56933904 | 56934476 | intergenic | ENST00000371250 | PPAP2B | 1.32 | 2.7E−04 | 572 |
| 1 | 4693158 | 4693721 | intergenic | ENST00000378190 | AJAP1 | 1.10 | 2.8E−04 | 563 |
| 12 | 123333197 | 123333659 | promoter | ENST00000536772 | HIP1R | 1.13 | 9.0E−04 | 462 |
| 1 | 193406539 | 193407729 | intergenic | ENST00000420807 | LINC01031 | 1.07 | 5.6E−04 | 1190 |
| 3 | 121723306 | 121724477 | promoter | ENST00000462014 | ILDR1 | 1.05 | 9.6E−04 | 1171 |
| 2 | 209676292 | 209676942 | intron | ENST00000419079 | PTH2R | 1.38 | 3.6E−04 | 650 |
| 12 | 3306839 | 3307985 | intron | ENST00000011898 | TSPAN9 | 1.42 | 5.2E−04 | 1146 |
| 11 | 94615832 | 94616486 | intron | ENST00000545958 | RP11-856F16.2 | 1.10 | 6.5E−04 | 654 |
| 1 | 3604957 | 3605264 | promoter | ENST00000378280 | TP73 | 1.32 | 3.3E−04 | 307 |
| 2 | 1391878 | 1392649 | intron | ENST00000497517 | TPO | 1.05 | 5.7E−04 | 771 |
| 1 | 811189 | 812119 | promoter | ENST00000427857 | FAM41C | 1.07 | 4.0E−04 | 930 |
| 19 | 38468627 | 38469128 | intron | ENST00000476317 | SIPA1L3 | 1.28 | 8.3E−04 | 501 |
| 1 | 238292984 | 238293512 | intergenic | ENST00000445891 | YWHAQP9 | 1.34 | 6.1E−05 | 528 |
| 13 | 39210941 | 39211343 | intergenic | ENST00000447765 | PRDX3P3 | −1.33 | 4.0E−04 | 402 |
| 5 | 42811882 | 42812507 | promoter | ENST00000508937 | SEPP1 | −1.05 | 1.9E−05 | 625 |
| 2 | 1560598 | 1560978 | intron | ENST00000438247 | AC144450.1 | 1.15 | 1.5E−04 | 380 |
| 12 | 132815639 | 132815889 | intron | ENST00000328957 | GALNT9 | 1.20 | 9.9E−04 | 250 |
| 9 | 115846414 | 115847424 | intergenic | ENST00000439875 | FAM225B | 1.27 | 1.8E−04 | 1010 |
| 19 | 54613041 | 54613311 | promoter | ENST00000482960 | NDUFA3 | 1.72 | 2.1E−06 | 270 |
| 2 | 239204444 | 239205433 | intergenic | ENST00000437372 | AC012485.2 | 1.28 | 1.9E−04 | 989 |
| 11 | 397903 | 398909 | promoter | ENST00000526971 | PKP3 | 1.04 | 2.5E−04 | 1006 |
| 1 | 1912821 | 1913709 | intron | ENST00000468610 | C1orf222 | 1.43 | 3.6E−06 | 888 |
| 19 | 37782096 | 37782418 | intergenic | ENST00000586442 | CTD-3220F14.1 | 1.63 | 6.4E−04 | 322 |
| 2 | 11776847 | 11777488 | intron | ENST00000396123 | GREB1 | 1.34 | 6.0E−05 | 641 |
| 12 | 132813440 | 132813985 | intron | ENST00000328957 | GALNT9 | 1.07 | 6.4E−04 | 545 |
| 11 | 110663023 | 110663664 | intron | ENST00000334179 | UBL4B | 1.20 | 8.9E−04 | 233 |
| 7 | 155893958 | 155894405 | intergenic | ENST00000384333 | Y_RNA | 1.04 | 4.3E−04 | 447 |
| 20 | 36202030 | 36202951 | intergenic | ENST00000423261 | GLRXP | 1.04 | 5.1E−04 | 921 |
| 1 | 228778123 | 228778480 | promoter | ENST00000365055 | RNA5S15 | 1.08 | 1.6E−05 | 357 |
| 1 | 4503130 | 4503709 | intergenic | ENST00000423197 | RP5-1166F10.1 | 1.15 | 8.4E−04 | 579 |
| 20 | 62781169 | 62781776 | promoter | ENST00000360149 | MYT1 | 1.23 | 6.1E−04 | 607 |
| 18 | 8890911 | 8891510 | intergenic | ENST00000359865 | SOGA2 | −1.21 | 4.2E−04 | 599 |
| 14 | 64330729 | 64331355 | promoter | ENST00000556725 | SYNE2 | −1.09 | 1.1E−06 | 626 |
| 3 | 195509793 | 195510202 | exon | ENST00000478156_152007 | | 1.45 | 8.0E−05 | 409 |
| 11 | 134831292 | 134832253 | intergenic | ENST00000528497 | RP11-555G19.1 | 1.30 | 3.1E−04 | 961 |
| 5 | 11443246 | 11443549 | intron | ENST00000508761 | CTNND2 | 1.41 | 3.7E−04 | 303 |
| 9 | 140244387 | 140245281 | intron | ENST00000484392 | EXD3 | 1.09 | 6.4E−04 | 894 |
| 19 | 39648485 | 39649257 | promoter | ENST00000599657 | PAK4 | 1.37 | 6.4E−04 | 772 |
| 10 | 132271970 | 132272400 | intron | ENST00000439421 | RP11-540N6.1 | 1.08 | 5.1E−04 | 430 |
| 11 | 41553950 | 41554439 | intron | ENST00000526978 | RP11-124G5.3 | 1.17 | 9.1E−04 | 489 |
| 1 | 247292118 | 247293363 | intron | ENST00000476312 | ZNF124 | 1.35 | 3.0E−06 | 1245 |
| 20 | 61588799 | 61589615 | intron | ENST00000411611 | SLC17A9 | 1.10 | 7.6E−04 | 816 |
| 19 | 30056819 | 30058660 | intergenic | ENST00000335053 | VSTM2B | 1.09 | 6.4E−04 | 1841 |
| 19 | 49337650 | 49338689 | promoter | ENST00000595764 | HSD17B14 | 1.14 | 4.5E−04 | 1039 |
| 1 | 37259254 | 37259535 | intergenic | ENST00000373091 | GRIK3 | 1.12 | 9.6E−04 | 281 |
| 12 | 131780776 | 131781831 | promoter | ENST00000508505 | RP11-495K9.3 | 1.00 | 9.5E−04 | 1055 |
| 19 | 32223716 | 32224929 | intergenic | ENST00000365024 | RNU6-967P | 1.19 | 4.6E−04 | 1213 |
| 2 | 211054239 | 211055494 | intron | ENST00000412065 | AC006994.2 | −1.02 | 8.6E−04 | 1255 |

TABLE 1-continued

| Chr | Start | End | Annotation | Transcript_id | Gene symbol | Fold Change | P-value (adj) | Peak width (bp) |
|---|---|---|---|---|---|---|---|---|
| 1 | 37449602 | 37450029 | intron | ENST00000373093 | GRIK3 | 1.00 | 9.5E−04 | 427 |
| 1 | 40128961 | 40129465 | intron | ENST00000235628 | NT5C1A | 1.12 | 2.4E−04 | 504 |
| 14 | 38677991 | 38678610 | promoter | ENST00000267377 | SSTR1 | −1.26 | 6.9E−04 | 619 |
| 1 | 4769995 | 4770757 | promoter | ENST00000466761 | AJAP1 | 1.13 | 4.4E−04 | 762 |
| 21 | 47318748 | 47319014 | promoter | ENST00000468429 | PCBP3 | 1.07 | 5.3E−04 | 266 |
| 19 | 34280154 | 34280686 | intergenic | ENST00000587658 | KCTD15 | 1.16 | 3.4E−04 | 532 |
| X | 23522303 | 23522698 | intergenic | ENST00000458766 | snoU13 | −1.03 | 9.0E−04 | 395 |
| 13 | 108686039 | 108687002 | intergenic | ENST00000375915 | FAM155A | −1.67 | 1.9E−10 | 963 |
| 21 | 16512741 | 16513203 | intergenic | ENST00000449746 | AF127577.12 | −1.46 | 1.2E−05 | 462 |
| 4 | 69817171 | 69817631 | promoter | ENST00000251566 | UGT2A3 | −1.81 | 3.2E−07 | 460 |
| 1 | 224136990 | 224138052 | promoter | ENST00000424045 | CICP5 | 1.03 | 3.7E−04 | 1062 |
| 11 | 1796937 | 1797410 | intergenic | ENST00000449749 | AC068580.7 | 1.36 | 3.0E−04 | 473 |
| 11 | 132947949 | 132948284 | intron | ENST00000529038 | OPCML | 1.09 | 6.7E−04 | 335 |
| 1 | 1276059 | 1277202 | intron | ENST00000472445 | DVL1 | 1.09 | 6.2E−04 | 1143 |
| X | 2526973 | 2527761 | promoter | ENST00000527459 | CD99P1 | −1.15 | 1.8E−04 | 788 |
| 14 | 72448205 | 72449425 | intron | ENST00000402788 | RGS6 | 1.05 | 1.9E−04 | 1220 |
| 18 | 21718709 | 21719338 | promoter | ENST00000327201 | CABYR | −1.41 | 1.3E−05 | 629 |
| 18 | 21851298 | 21852369 | promoter | ENST00000585247 | OSBPL1A | −1.02 | 9.0E−05 | 1071 |
| 4 | 170121436 | 170122132 | promoter | ENST00000510225 | RP11-327O17.2 | −1.07 | 2.8E−04 | 696 |
| 14 | 77589823 | 77590311 | intron | ENST00000557752 | RP11-463C8.4 | −1.04 | 2.7E−04 | 488 |
| 3 | 65938946 | 65939447 | promoter | ENST00000460754 | MAGI1-IT1 | −1.18 | 1.7E−04 | 501 |
| 12 | 10826411 | 10827032 | promoter | ENST00000541561 | STYK1 | −1.10 | 3.7E−04 | 621 |
| 13 | 76334271 | 76334966 | promoter | ENST00000465261 | LMO7 | −1.05 | 1.4E−04 | 695 |
| 4 | 106816201 | 106816854 | promoter | ENST00000503451 | NPNT | −1.33 | 3.6E−07 | 653 |
| 8 | 119890394 | 119891274 | intergenic | ENST00000297350 | TNFRSF11B | −1.32 | 3.8E−05 | 880 |
| 18 | 3230353 | 3230820 | intron | ENST00000580139 | RP13-270P17.2 | −1.94 | 8.6E−05 | 467 |
| 4 | 23789895 | 23790557 | intron | ENST00000509702 | PPARGC1A | −1.28 | 2.2E−05 | 662 |
| 4 | 72978120 | 72978772 | intron | ENST00000358749 | NPFFR2 | −1.41 | 3.0E−10 | 652 |
| 6 | 53719637 | 53720021 | intron | ENST00000370882 | LRRC1 | −1.16 | 1.3E−04 | 384 |
| 18 | 59561256 | 59561922 | promoter | ENST00000588396 | RNF152 | −1.14 | 5.4E−05 | 666 |
| 5 | 158122586 | 158122909 | intergenic | ENST00000519890 | EBF1 | −1.36 | 6.3E−04 | 323 |
| 6 | 43894454 | 43895332 | intergenic | ENST00000422059 | RP5-1120P11.1 | −1.20 | 7.8E−06 | 878 |
| 17 | 38439964 | 38440892 | intron | ENST00000323571 | WIPF2 | −1.26 | 1.2E−04 | 928 |
| 4 | 103541806 | 103542546 | intergenic | ENST00000226574 | NFKB1 | −1.01 | 1.9E−07 | 740 |
| 5 | 170176920 | 170177427 | intron | ENST00000521965 | MIR4454 | −1.15 | 1.7E−04 | 507 |
| 4 | 25864064 | 25865011 | promoter | ENST00000513364 | SEL1L3 | −1.12 | 1.5E−04 | 947 |
| 12 | 15815552 | 15815954 | promoter | ENST00000540613 | EPS8 | −1.00 | 7.9E−05 | 402 |
| 19 | 11545786 | 11546623 | promoter | ENST00000586836 | CCDC151 | −1.05 | 9.7E−05 | 837 |
| X | 13006739 | 13007333 | intergenic | ENST00000451311 | TMSB4X | −1.36 | 1.0E−05 | 594 |
| 18 | 21692827 | 21693592 | promoter | ENST00000540918 | TTC39C | −1.64 | 1.9E−06 | 765 |
| 9 | 27371349 | 27371791 | intron | ENST00000603061 | MOB3B | −1.44 | 3.6E−09 | 442 |
| 18 | 29738048 | 29738594 | intron | ENST00000583696 | GAREM | −1.59 | 4.8E−04 | 546 |
| 3 | 18699491 | 18700274 | intron | ENST00000595388 | AC144521.1 | −1.65 | 5.8E−06 | 783 |
| 7 | 158995654 | 158996480 | intergenic | ENST00000437005 | PIP5K1P2 | 1.08 | 5.5E−04 | 826 |
| 12 | 15865506 | 15866240 | promoter | ENST00000543612 | EPS8 | −1.41 | 7.0E−07 | 734 |
| 4 | 155547868 | 155548555 | promoter | ENST00000499392 | LRAT | −1.02 | 6.5E−04 | 687 |
| 5 | 106810443 | 106811097 | promoter | ENST00000505499 | EFNA5 | −1.08 | 3.5E−04 | 654 |
| 17 | 39956851 | 39957456 | intergenic | ENST00000355468 | LEPREL4 | −1.11 | 8.9E−04 | 605 |
| 18 | 68048808 | 68049145 | exon | ENST00000582251_572674 |  | −1.16 | 1.3E−05 | 337 |
| 20 | 22471368 | 22471859 | intergenic | ENST00000420070 | LINC00261 | −1.14 | 8.0E−04 | 491 |
| 13 | 61989175 | 61989676 | promoter | ENST00000409204 | PCDH20 | −1.39 | 1.7E−05 | 501 |
| 5 | 78791005 | 78791692 | intron | ENST00000535690 | HOMER1 | −1.57 | 1.1E−08 | 687 |
| 1 | 157210261 | 157210939 | intergenic | ENST00000449345 | RP11-85G21.1 | −1.09 | 5.7E−04 | 678 |
| 17 | 56591826 | 56592157 | promoter | ENST00000582390 | MTMR4 | −1.12 | 3.1E−04 | 331 |
| 1 | 27240311 | 27240999 | promoter | ENST00000254227 | NR0B2 | −1.34 | 2.6E−04 | 688 |
| 4 | 149366324 | 149366956 | promoter | ENST00000344721 | NR3C2 | −1.25 | 2.5E−05 | 632 |
| 13 | 74861868 | 74862243 | promoter | ENST00000383890 | RNY1P5 | −1.51 | 9.2E−07 | 375 |
| 15 | 53745621 | 53746295 | intergenic | ENST00000567224 | WDR72 | −1.62 | 2.4E−08 | 674 |
| 7 | 87198356 | 87198910 | intron | ENST00000543898 | ABCB1 | −1.22 | 3.7E−05 | 554 |
| 4 | 38134715 | 38135185 | promoter | ENST00000492180 | TBC1D1 | −1.18 | 4.6E−05 | 470 |
| 18 | 77005558 | 77006476 | intron | ENST00000587878 | ATP9B | 1.10 | 2.1E−04 | 918 |
| 4 | 42658842 | 42659808 | promoter | ENST00000562054 | RP11-109E24.2 | −1.11 | 1.3E−05 | 966 |
| 8 | 128309764 | 128310584 | intron | ENST00000523825 | CASC8 | −1.23 | 2.4E−04 | 820 |
| 18 | 25236246 | 25236678 | promoter | ENST00000584546 | RP11-739N10.1 | −1.75 | 1.4E−05 | 432 |
| 4 | 83316004 | 83316436 | intergenic | ENST00000503202 | IGBP1P4 | −1.15 | 3.0E−05 | 432 |
| 18 | 3773069 | 3773731 | promoter | ENST00000584060 | RP11-874J12.3 | −2.08 | 3.4E−08 | 662 |
| 1 | 65210283 | 65210996 | promoter | ENST00000371072 | RAVER2 | −1.16 | 7.6E−05 | 713 |
| 4 | 22970924 | 22971638 | intergenic | ENST00000511453 | RP11-412P11.1 | −1.27 | 2.9E−07 | 714 |
| 15 | 29966880 | 29967293 | promoter | ENST00000536835 | RP11-680F8.1 | −1.31 | 5.6E−05 | 413 |
| 8 | 4195706 | 4196553 | intron | ENST00000539096 | CSMD1 | −2.07 | 1.4E−09 | 847 |
| 18 | 21594009 | 21595594 | promoter | ENST00000579713 | RP11-403A21.2 | −1.10 | 8.6E−05 | 1585 |
| 18 | 13823915 | 13824237 | promoter | ENST00000390240 | AP001525.1 | −1.11 | 4.8E−05 | 322 |
| 17 | 48845654 | 48846094 | promoter | ENST00000502517 | LINC00483 | −1.26 | 3.3E−04 | 440 |
| 8 | 22601135 | 22601604 | promoter | ENST00000519624 | RP11-459E5.1 | −1.06 | 1.5E−04 | 469 |
| X | 19352288 | 19352590 | intergenic | ENST00000379806 | PDHA1 | −1.30 | 5.2E−04 | 302 |
| 14 | 65346358 | 65347344 | promoter | ENST00000542895 | SPTB | −1.01 | 2.5E−04 | 986 |
| 15 | 64540179 | 64540503 | intron | ENST00000606793 | CTD-2116N17.1 | −1.00 | 3.2E−04 | 324 |

TABLE 1-continued

| Chr | Start | End | Annotation | Transcript_id | Gene symbol | Fold Change | P-value (adj) | Peak width (bp) |
|---|---|---|---|---|---|---|---|---|
| 6 | 82547755 | 82548150 | intergenic | ENST00000418567 | RP11-379B8.1 | −1.18 | 2.1E−05 | 395 |
| 11 | 104322692 | 104323628 | intron | ENST00000536529 | RP11-886D15.1 | −1.28 | 9.9E−05 | 936 |
| 17 | 46342828 | 46343603 | intron | ENST00000581419 | SKAP1 | −1.10 | 2.3E−04 | 775 |
| 2 | 146971789 | 146972404 | intergenic | ENST00000413391 | RPL17P12 | −1.68 | 2.1E−08 | 615 |
| X | 24517071 | 24517405 | intron | ENST00000493226 | PDK3 | −1.04 | 8.8E−04 | 334 |
| 12 | 15323979 | 15324554 | intron | ENST00000393736 | RERG | −2.21 | 7.2E−14 | 575 |
| 14 | 73928913 | 73929398 | promoter | ENST00000561382 | RP1-240K6.3 | −1.13 | 4.9E−07 | 485 |
| 12 | 71556548 | 71557645 | intron | ENST00000549421 | TSPAN8 | −1.66 | 4.2E−05 | 1097 |
| 4 | 77625261 | 77626040 | intron | ENST00000486758 | SHROOM3 | −1.47 | 1.7E−09 | 779 |
| 14 | 53167381 | 53167871 | intergenic | ENST00000556039 | ERO1L | −1.06 | 1.8E−04 | 490 |
| 15 | 83349039 | 83349480 | promoter | ENST00000543938 | AP3B2 | −1.68 | 4.4E−05 | 441 |
| 18 | 28591355 | 28591777 | intron | ENST00000434452 | DSC3 | −1.70 | 3.6E−04 | 422 |
| 6 | 30226869 | 30227564 | promoter | ENST00000420110 | HLA-L | −1.04 | 4.9E−07 | 695 |
| 12 | 12550932 | 12551724 | intron | ENST00000298571 | LOH12CR1 | −1.06 | 7.7E−04 | 792 |
| 18 | 7926531 | 7927006 | intron | ENST00000400053 | PTPRM | −1.56 | 9.3E−07 | 475 |
| 5 | 156874176 | 156874688 | intron | ENST00000519499 | CTB-109A12.1 | −1.29 | 6.0E−05 | 512 |
| 4 | 105415971 | 105416679 | promoter | ENST00000466963 | CXXC4 | −1.12 | 2.8E−07 | 708 |
| 1 | 247526375 | 247526698 | intergenic | ENST00000478225 | ZNF496 | 1.35 | 3.8E−04 | 323 |
| 14 | 68205454 | 68206247 | intron | ENST00000394455 | ZFYVE26 | −1.09 | 1.8E−05 | 793 |
| 18 | 21977090 | 21978175 | promoter | ENST00000582618 | OSBPL1A | −1.13 | 5.8E−04 | 1085 |
| 5 | 31020930 | 31021844 | intergenic | ENST00000495944 | RPL19P11 | −1.60 | 3.8E−06 | 914 |
| 17 | 73597354 | 73597809 | promoter | ENST00000584323 | MYO15B | −1.01 | 3.9E−04 | 455 |
| 1 | 165614855 | 165615573 | promoter | ENST00000461759 | MGST3 | −1.15 | 2.6E−04 | 718 |
| 12 | 89466458 | 89467244 | intron | ENST00000549278 | RP11-13A1.3 | −1.99 | 6.4E−04 | 786 |
| 4 | 139120636 | 139121025 | intron | ENST00000509248 | SLC7A11 | −1.06 | 2.2E−04 | 389 |
| 8 | 103941579 | 103942473 | promoter | ENST00000517996 | KB-1507C5.2 | −1.07 | 8.4E−09 | 894 |
| 15 | 36469921 | 36470501 | intron | ENST00000561394 | RP11-184D12.1 | −1.53 | 9.4E−04 | 580 |
| 8 | 15397612 | 15398367 | promoter | ENST00000503731 | TUSC3 | −1.80 | 5.8E−05 | 755 |
| 7 | 98013278 | 98014497 | promoter | ENST00000398259 | RPS3AP26 | −1.20 | 2.7E−04 | 1219 |
| 18 | 3051740 | 3052729 | intergenic | ENST00000356443 | MYOM1 | −1.45 | 3.8E−05 | 989 |
| 15 | 98491142 | 98491429 | intron | ENST00000538249 | ARRDC4 | −1.05 | 4.7E−04 | 287 |
| X | 24167349 | 24168808 | promoter | ENST00000427551 | ZFX-AS1 | −1.12 | 9.2E−07 | 1459 |
| 13 | 30682897 | 30683442 | promoter | ENST00000432770 | LINC00365 | −1.02 | 6.8E−04 | 545 |
| 10 | 65479858 | 65480099 | intron | ENST00000444770 | RP11-170M17.1 | −1.28 | 2.0E−06 | 241 |
| 22 | 43336262 | 43336736 | intron | ENST00000453079 | PACSIN2 | −1.07 | 4.8E−04 | 474 |
| 18 | 24235854 | 24237453 | promoter | ENST00000584630 | KCTD1 | −1.21 | 1.1E−04 | 1599 |
| 18 | 29665002 | 29665389 | intron | ENST00000583184 | RP11-53I6.2 | −1.47 | 4.1E−04 | 387 |
| X | 123540218 | 123540808 | intron | ENST00000469481 | STAG2 | −1.15 | 2.0E−06 | 590 |
| 21 | 29628568 | 29629059 | intergenic | ENST00000453420 | AL035610.2 | −1.35 | 1.8E−05 | 491 |
| 14 | 24777038 | 24777597 | promoter | ENST00000554411 | CIDEB | −1.09 | 5.1E−06 | 559 |
| 7 | 90350197 | 90350681 | intron | ENST00000436577 | CDK14 | −1.28 | 5.1E−05 | 484 |
| 3 | 118930104 | 118930466 | intergenic | ENST00000483209 | B4GALT4 | −1.33 | 9.1E−04 | 362 |
| 17 | 33759489 | 33760107 | promoter | ENST00000304905 | SLFN12 | −1.36 | 3.0E−05 | 618 |
| 6 | 126265396 | 126265975 | intergenic | ENST00000229633 | HINT3 | −1.22 | 5.2E−05 | 579 |
| 18 | 8341512 | 8342175 | intron | ENST00000577827 | PTPRM | −1.38 | 7.6E−05 | 663 |
| 13 | 60586478 | 60586983 | promoter | ENST00000435636 | DIAPH3-AS1 | −1.16 | 2.0E−04 | 505 |
| 2 | 43232429 | 43233212 | promoter | ENST00000457457 | AC016735.1 | −1.36 | 2.3E−07 | 783 |
| 4 | 72052163 | 72052582 | promoter | ENST00000264485 | SLC4A4 | −1.53 | 1.8E−07 | 419 |
| 18 | 11005554 | 11005954 | intron | ENST00000582913 | PIEZO2 | −1.21 | 3.1E−05 | 400 |
| 6 | 52254401 | 52254862 | intron | ENST00000360726 | PAQR8 | −1.13 | 1.8E−05 | 461 |
| 16 | 1031471 | 1032054 | promoter | ENST00000565467 | RP11-161M6.2 | −1.39 | 3.3E−04 | 583 |
| 14 | 68987627 | 68988132 | intron | ENST00000478014 | RAD51B | −1.03 | 2.2E−06 | 505 |
| 4 | 38387157 | 38387752 | intron | ENST00000503465 | RP11-83C7.1 | −1.45 | 1.6E−12 | 595 |
| 12 | 18951259 | 18952375 | intergenic | ENST00000317658 | CAPZA3 | −1.17 | 8.8E−04 | 1116 |
| 8 | 74219833 | 74220352 | intron | ENST00000520894 | RP11-434I12.2 | −1.28 | 8.7E−04 | 519 |
| 11 | 134526444 | 134526989 | intergenic | ENST00000529417 | RP11-469N6.3 | 2.13 | 6.3E−08 | 545 |
| 10 | 108273148 | 108273531 | intergenic | ENST00000399415 | RP11-446H13.2 | −1.96 | 1.5E−04 | 383 |
| 2 | 165770474 | 165770888 | promoter | ENST00000483641 | SLC38A11 | −1.19 | 5.7E−05 | 414 |
| 9 | 28915264 | 28915864 | intergenic | ENST00000401120 | MIR873 | −1.80 | 1.7E−04 | 600 |
| 1 | 244231070 | 244231550 | promoter | ENST00000598000 | AL590483.1 | −1.21 | 4.3E−04 | 480 |
| 4 | 24384043 | 24384371 | intergenic | ENST00000410330 | AC092846.1 | −1.10 | 5.1E−05 | 328 |
| 5 | 103398196 | 103398978 | intergenic | ENST00000514769 | RP11-138J23.1 | −1.19 | 9.4E−04 | 782 |
| 8 | 1878704 | 1879351 | intron | ENST00000522435 | ARHGEF10 | −1.31 | 3.5E−04 | 647 |
| 8 | 37159582 | 37160492 | intergenic | ENST00000518765 | RP11-527N22.1 | −1.01 | 2.5E−04 | 910 |
| 19 | 10859669 | 10860777 | intron | ENST00000586939 | DNM2 | −1.13 | 1.9E−04 | 1108 |
| 8 | 38124767 | 38125231 | promoter | ENST00000530193 | PPAPDC1B | −1.13 | 8.4E−05 | 464 |
| 14 | 100625737 | 100626234 | promoter | ENST00000553834 | DEGS2 | −1.04 | 8.6E−04 | 497 |
| 17 | 70514867 | 70515633 | intron | ENST00000580861 | LINC00511 | −1.10 | 1.8E−04 | 766 |
| 11 | 22213851 | 22215484 | promoter | ENST00000324559 | ANO5 | −1.10 | 5.0E−06 | 1633 |
| 11 | 91530137 | 91530591 | promoter | ENST00000581290 | RP11-201M22.1 | −1.11 | 8.9E−04 | 454 |
| 4 | 174112844 | 174113342 | intron | ENST00000512285 | GALNT7 | −1.32 | 1.1E−04 | 498 |
| 8 | 98861557 | 98862712 | intron | ENST00000521545 | LAPTM4B | −1.07 | 3.5E−04 | 1155 |
| 12 | 132401688 | 132401954 | promoter | ENST00000540647 | ULK1 | 1.88 | 3.5E−05 | 266 |
| 10 | 98623698 | 98624364 | intron | ENST00000371097 | LCOR | −1.04 | 8.8E−04 | 666 |
| 5 | 67497853 | 67498258 | intergenic | ENST00000520762 | RP11-404L6.2 | −1.34 | 1.8E−04 | 405 |
| 8 | 71115117 | 71115743 | intron | ENST00000518287 | NCOA2 | −1.46 | 1.6E−05 | 626 |
| 18 | 20695658 | 20696122 | intergenic | ENST00000400473 | CABLES1 | −1.22 | 4.5E−05 | 464 |

TABLE 1-continued

| Chr | Start | End | Annotation | Transcript_id | Gene symbol | Fold Change | P-value (adj) | Peak width (bp) |
|---|---|---|---|---|---|---|---|---|
| 18 | 19577616 | 19577921 | promoter | ENST00000577673 | AC091043.1 | −1.35 | 1.3E−05 | 305 |
| 17 | 72746567 | 72746861 | promoter | ENST00000585285 | MIR3615 | −1.28 | 8.9E−05 | 294 |
| 18 | 19866602 | 19866925 | intergenic | ENST00000459476 | snoU13 | −1.38 | 3.8E−06 | 323 |
| 1 | 2688905 | 2690000 | intron | ENST00000401095 | TTC34 | 1.02 | 3.3E−04 | 1095 |
| 12 | 15842656 | 15843267 | intron | ENST00000544064 | EPS8 | −1.26 | 9.2E−07 | 611 |
| 5 | 54467950 | 54468191 | promoter | ENST00000516047 | MIR449C | −1.04 | 4.2E−06 | 241 |
| 12 | 19219371 | 19219904 | intergenic | ENST00000449390 | RPL7P6 | −1.53 | 1.4E−04 | 533 |
| 2 | 109002050 | 109002496 | intron | ENST00000409309 | SULT1C4 | −1.20 | 5.7E−04 | 446 |
| 4 | 40475810 | 40476436 | promoter | ENST00000507180 | RBM47 | −1.30 | 1.1E−05 | 626 |
| 4 | 115484596 | 115485293 | intergenic | ENST00000310836 | UGT8 | −1.13 | 1.7E−04 | 697 |
| 5 | 56731545 | 56732157 | intron | ENST00000506106 | CTD-2023N9.1 | −1.02 | 1.9E−04 | 612 |
| 5 | 98215879 | 98216617 | intron | ENST00000284049 | CHD1 | −1.03 | 8.2E−04 | 738 |
| 6 | 155649620 | 155650370 | intergenic | ENST00000475849 | TFB1M | −1.27 | 4.6E−04 | 750 |
| 8 | 23039576 | 23039972 | intergenic | ENST00000518308 | RP11-1149O23.2 | −1.07 | 8.2E−04 | 396 |
| 14 | 65409340 | 65409856 | promoter | ENST00000557323 | GPX2 | −1.13 | 1.8E−05 | 516 |
| 18 | 12659958 | 12660445 | promoter | ENST00000589405 | PSMG2 | −1.99 | 1.3E−06 | 487 |
| 16 | 57286027 | 57286608 | promoter | ENST00000564376 | RP11-407G23.3 | −1.45 | 1.3E−04 | 581 |
| 12 | 89900906 | 89901589 | intron | ENST00000546830 | POC1B | −1.67 | 2.4E−04 | 683 |
| 3 | 172635673 | 172636396 | intron | ENST00000351008 | SPATA16 | −1.28 | 3.0E−04 | 723 |
| 6 | 56263991 | 56264896 | intergenic | ENST00000370819 | COL21A1 | −1.30 | 2.7E−05 | 905 |
| 8 | 86459177 | 86459730 | intergenic | ENST00000520459 | RP11-317J10.4 | −1.05 | 8.6E−04 | 553 |
| 18 | 21699037 | 21699241 | promoter | ENST00000583782 | RP11-799B12.2 | −1.68 | 9.4E−07 | 204 |
| 8 | 4188712 | 4189987 | intron | ENST00000539096 | CSMD1 | −1.19 | 7.6E−05 | 1275 |
| 15 | 41324040 | 41324393 | intron | ENST00000558357 | INO80 | 3.06 | 1.2E−04 | 353 |
| 7 | 57265415 | 57265595 | promoter | ENST00000423752 | RP11-1217F2.13 | 2.76 | 6.9E−04 | 180 |
| 12 | 7055207 | 7055997 | promoter | ENST00000538318 | PTPN6 | −1.13 | 4.7E−05 | 790 |
| 1 | 73361638 | 73361801 | intron | ENST00000445976 | RP4-660H19.1 | 2.75 | 4.5E−04 | 163 |
| 2 | 15499821 | 15500945 | intron | ENST00000442506 | NBAS | 2.05 | 8.1E−04 | 1124 |
| 6 | 97944099 | 97944304 | intergenic | ENST00000574739 | RP3-418C23.2 | 2.08 | 1.3E−04 | 205 |
| 19 | 31869090 | 31869843 | intron | ENST00000585336 | AC007796.1 | 1.50 | 9.7E−04 | 753 |
| 17 | 80544014 | 80544489 | promoter | ENST00000575578 | FOXK2 | 1.24 | 2.5E−04 | 475 |
| 7 | 148469337 | 148470194 | intron | ENST00000325222 | CUL1 | 1.23 | 9.7E−04 | 857 |
| 10 | 129595626 | 129595975 | intergenic | ENST00000388920 | FOXI2 | 1.21 | 7.1E−04 | 349 |
| 2 | 217237783 | 217238658 | promoter | ENST00000273067 | 4-Mar | 1.66 | 2.3E−04 | 875 |
| 19 | 38489929 | 38490545 | intron | ENST00000476317 | SIPA1L3 | 2.18 | 4.3E−06 | 616 |
| 10 | 133797280 | 133797729 | promoter | ENST00000368636 | BNIP3 | 1.38 | 2.4E−04 | 449 |
| 10 | 133661124 | 133661318 | intergenic | ENST00000341866 | AL450307.1 | 1.96 | 9.7E−04 | 194 |
| 2 | 36129295 | 36129643 | intergenic | ENST00000431951 | MRPL50P1 | 1.77 | 6.1E−04 | 348 |
| 4 | 122791099 | 122792004 | promoter | ENST00000567769 | RP11-63B13.1 | −1.05 | 3.2E−04 | 905 |
| 10 | 96989136 | 96989837 | promoter | ENST00000451737 | RP11-310E22.4 | 1.48 | 3.7E−04 | 701 |
| 12 | 6387233 | 6388200 | intergenic | ENST00000539998 | RP1-96H9.5 | −1.01 | 1.6E−04 | 967 |
| 1 | 237963084 | 237963484 | promoter | ENST00000466626 | RYR2 | −1.15 | 6.8E−04 | 400 |
| 11 | 117109912 | 117110426 | exon | ENST00000529869_361297 | | 1.45 | 8.5E−04 | 514 |
| 9 | 137494257 | 137495098 | intergenic | ENST00000371817 | COL5A1 | 1.68 | 1.7E−04 | 841 |
| 19 | 35809800 | 35810562 | promoter | ENST00000601414 | CD22 | 1.10 | 1.0E−04 | 762 |
| 19 | 38530496 | 38531253 | intron | ENST00000476317 | SIPA1L3 | 2.28 | 9.2E−07 | 757 |
| 12 | 108876411 | 108877044 | intron | ENST00000502160 | RP11-13G14.4 | 1.73 | 3.5E−05 | 633 |
| 1 | 210612139 | 210613054 | promoter | ENST00000367009 | HHAT | 1.58 | 2.2E−04 | 915 |
| 7 | 157599753 | 157600564 | intron | ENST00000404321 | PTPRN2 | 1.35 | 2.6E−04 | 811 |
| 17 | 68185179 | 68185450 | intergenic | ENST00000243457 | KCNJ2 | 1.93 | 3.5E−04 | 271 |
| 19 | 30019124 | 30019835 | promoter | ENST00000579268 | CTC-525D6.2 | 1.50 | 6.3E−04 | 711 |
| 7 | 154861699 | 154862044 | promoter | ENST00000287907 | HTR5A | 1.23 | 1.5E−04 | 345 |
| 7 | 2915618 | 2916223 | intergenic | ENST00000396946 | CARD11 | 1.24 | 8.6E−04 | 605 |
| 3 | 168602522 | 168603249 | intergenic | ENST00000484765 | RP11-368I23.2 | 1.30 | 6.4E−04 | 727 |
| 2 | 15309734 | 15310359 | intron | ENST00000485694 | NBAS | 1.55 | 1.8E−04 | 625 |
| 19 | 33367595 | 33368355 | promoter | ENST00000586628 | CTD-2085J24.4 | 1.70 | 7.0E−05 | 760 |
| 11 | 117151727 | 117152451 | promoter | ENST00000524917 | RNF214 | 1.29 | 6.4E−04 | 724 |
| 12 | 116400382 | 116401203 | promoter | ENST00000549725 | RP11-493P1.2 | 1.69 | 2.6E−05 | 821 |
| 4 | 85420209 | 85421036 | promoter | ENST00000295886 | NKX6-1 | −1.14 | 1.9E−04 | 827 |
| 19 | 37793700 | 37794465 | intergenic | ENST00000591471 | HKR1 | 1.62 | 3.6E−04 | 765 |
| 3 | 183894085 | 183894896 | promoter | ENST00000431779 | AP2M1 | 1.02 | 2.5E−04 | 811 |
| 16 | 86985326 | 86986094 | intergenic | ENST00000566109 | RP11-107C10.1 | 1.33 | 4.8E−04 | 768 |
| 3 | 14203211 | 14203401 | intron | ENST00000477324 | XPC | 2.20 | 3.0E−04 | 190 |
| 16 | 28394898 | 28395627 | intron | ENST00000398943 | EIF3CL | 1.66 | 3.5E−04 | 729 |
| 19 | 42617722 | 42618169 | intron | ENST00000531773 | POU2F2 | 1.24 | 8.3E−04 | 447 |
| 1 | 165868016 | 165868540 | promoter | ENST00000463772 | UCK2 | 1.08 | 8.5E−04 | 524 |
| 5 | 79715065 | 79715253 | intron | ENST00000510995 | ZFYVE16 | 2.32 | 2.0E−04 | 188 |
| X | 44731642 | 44733410 | promoter | ENST00000475233 | KDM6A | −1.02 | 7.2E−05 | 1768 |
| 19 | 36095937 | 36096410 | intergenic | ENST00000589603 | AC002115.9 | 1.37 | 9.3E−05 | 473 |
| 16 | 28742292 | 28743038 | promoter | ENST00000569005 | EIF3C | 1.36 | 6.4E−04 | 746 |
| 18 | 21032725 | 21033693 | promoter | ENST00000577501 | RIOK3 | −1.05 | 5.2E−04 | 968 |
| 11 | 12185010 | 12186343 | promoter | ENST00000379612 | MICAL2 | 1.03 | 9.2E−04 | 1333 |
| 14 | 76815171 | 76815651 | promoter | ENST00000390772 | AC016543.1 | 1.20 | 6.3E−04 | 480 |
| 17 | 21305235 | 21305901 | intron | ENST00000583088 | KCNJ12 | 1.03 | 7.6E−04 | 666 |
| 9 | 137394472 | 137395015 | intergenic | ENST00000444936 | RP11-473E2.2 | 1.21 | 7.7E−04 | 543 |
| 19 | 38704515 | 38705167 | promoter | ENST00000488378 | DPF1 | 1.71 | 5.1E−06 | 652 |
| 8 | 143273979 | 143275177 | intergenic | ENST00000517704 | LINC00051 | 1.44 | 3.1E−05 | 1198 |

TABLE 1-continued

| Chr | Start | End | Annotation | Transcript_id | Gene symbol | Fold Change | P-value (adj) | Peak width (bp) |
|---|---|---|---|---|---|---|---|---|
| 18 | 24060728 | 24061749 | intron | ENST00000578973 | KCTD1 | −1.30 | 2.7E−04 | 1021 |
| 11 | 20118774 | 20119500 | intron | ENST00000311043 | NAV2 | 1.49 | 6.7E−04 | 726 |
| 14 | 56298766 | 56299226 | intergenic | ENST00000560336 | LINC00520 | −1.01 | 6.7E−05 | 460 |
| 20 | 22392204 | 22392708 | intron | ENST00000377121 | RP5-1004I9.1 | −1.09 | 5.9E−04 | 504 |
| 19 | 39564251 | 39564693 | intergenic | ENST00000601575 | PAPL | 1.36 | 8.2E−05 | 442 |
| 3 | 126326051 | 126326334 | promoter | ENST00000519162 | TXNRD3 | 1.54 | 5.5E−04 | 283 |
| 5 | 89316952 | 89317321 | intergenic | ENST00000584845 | MIR3660 | −1.03 | 4.1E−04 | 369 |
| 11 | 117069701 | 117070445 | promoter | ENST00000278968 | TAGLN | 1.19 | 4.0E−04 | 744 |
| 1 | 19586986 | 19587534 | intergenic | ENST00000330263 | MRTO4 | 1.32 | 5.2E−04 | 548 |
| 15 | 26020460 | 26021175 | intron | ENST00000555815 | ATP10A | 1.33 | 1.3E−06 | 715 |
| 2 | 102353912 | 102354557 | intron | ENST00000417294 | MAP4K4 | −1.29 | 7.3E−05 | 645 |
| 4 | 141264454 | 141264871 | promoter | ENST00000506322 | SCOC | −1.08 | 3.8E−05 | 417 |
| 2 | 242054831 | 242055272 | intron | ENST00000493544 | PASK | 1.77 | 1.7E−06 | 441 |
| 17 | 39686341 | 39686778 | promoter | ENST00000361566 | KRT19 | −1.12 | 1.3E−04 | 437 |
| 13 | 42270599 | 42271143 | promoter | ENST00000478987 | VWA8 | −1.26 | 3.1E−04 | 544 |
| 19 | 33236950 | 33238144 | intron | ENST00000421545 | TDRD12 | 1.04 | 4.6E−04 | 1194 |
| 12 | 33049306 | 33050344 | promoter | ENST00000546741 | PKP2 | −1.04 | 1.4E−04 | 1038 |
| 10 | 81239097 | 81239352 | intergenic | ENST00000557620 | TPRX1P1 | 1.62 | 4.5E−04 | 255 |
| 20 | 36919560 | 36920024 | exon | ENST00000451435_619426 |  | 1.18 | 1.8E−04 | 464 |
| 10 | 126028465 | 126028958 | intergenic | ENST00000539214 | OAT | 1.54 | 9.5E−04 | 493 |
| 11 | 120088623 | 120089064 | intron | ENST00000531220 | OAF | 1.43 | 7.0E−04 | 441 |
| 15 | 51369174 | 51369713 | intron | ENST00000559909 | RP11-108K3.1 | 1.16 | 4.6E−04 | 539 |
| 16 | 19843028 | 19843331 | intron | ENST00000568061 | IQCK | 1.29 | 9.5E−04 | 303 |
| X | 1510891 | 1512012 | promoter | ENST00000484026 | SLC25A6 | −1.04 | 8.6E−04 | 1121 |
| 3 | 71591682 | 71592117 | promoter | ENST00000408337 | MIR1284 | 1.17 | 1.5E−04 | 435 |
| 19 | 33963942 | 33964303 | intron | ENST00000590408 | PEPD | 1.31 | 3.3E−04 | 361 |
| 17 | 64536177 | 64536808 | intron | ENST00000284384 | PRKCA | 1.39 | 9.4E−04 | 631 |
| 11 | 1078428 | 1079839 | intron | ENST00000359061 | MUC2 | 1.34 | 8.4E−04 | 1411 |
| 12 | 98793216 | 98793758 | intergenic | ENST00000364426 | RNU4-41P | 1.16 | 2.4E−05 | 542 |
| 1 | 15322511 | 15323031 | intron | ENST00000400797 | KAZN | 1.15 | 4.6E−04 | 520 |
| 2 | 208352490 | 208352976 | intron | ENST00000418850 | AC007879.5 | 1.98 | 2.9E−04 | 486 |
| 3 | 128914473 | 128915151 | intergenic | ENST00000422453 | CNBP | 1.16 | 4.6E−04 | 678 |
| 6 | 110064994 | 110065287 | intron | ENST00000230124 | FIG4 | 1.24 | 5.5E−04 | 293 |
| 7 | 86688557 | 86689480 | promoter | ENST00000423294 | KIAA1324L | −1.09 | 2.5E−04 | 923 |
| 3 | 127453590 | 127454743 | promoter | ENST00000398101 | MGLL | 1.22 | 1.0E−04 | 1153 |
| 9 | 127105090 | 127105743 | intron | ENST00000539416 | NEK6 | 1.31 | 1.7E−04 | 653 |
| 4 | 99064059 | 99065056 | promoter | ENST00000295268 | STPG2 | −1.10 | 9.8E−07 | 997 |
| 11 | 70496478 | 70496740 | intron | ENST00000445654 | SHANK2 | 1.30 | 6.5E−06 | 262 |
| 11 | 1691687 | 1692395 | intergenic | ENST00000382167 | FAM99A | 1.49 | 4.4E−05 | 708 |
| 4 | 173647115 | 173647791 | intron | ENST00000508122 | GALNTL6 | −1.60 | 1.3E−05 | 676 |
| 14 | 102172379 | 102172956 | intron | ENST00000557778 | RP11-1029J19.5 | 1.02 | 4.1E−04 | 577 |
| 18 | 21082967 | 21083951 | promoter | ENST00000592119 | C18orf8 | −1.12 | 9.3E−05 | 984 |
| 7 | 150810759 | 150811221 | promoter | ENST00000335367 | AGAP3 | 1.13 | 4.0E−04 | 462 |
| 2 | 74010590 | 74010935 | promoter | ENST00000409561 | C2orf78 | 1.10 | 3.0E−04 | 345 |
| 10 | 133759398 | 133760269 | intron | ENST00000472664 | PPP2R2D | 1.38 | 2.4E−04 | 871 |
| 8 | 101635463 | 101636150 | intron | ENST00000520661 | SNX31 | 1.30 | 9.0E−05 | 687 |
| 13 | 114579128 | 114579433 | intron | ENST00000449463 | RP11-199F6.4 | 1.33 | 2.3E−04 | 305 |
| 12 | 47488676 | 47488915 | intron | ENST00000546455 | PCED1B | 1.53 | 9.5E−04 | 239 |
| 4 | 48946273 | 48946960 | intergenic | ENST00000507399 | RP11-317G22.2 | −1.22 | 2.1E−05 | 687 |
| 17 | 40074968 | 40075633 | promoter | ENST00000590735 | ACLY | −1.00 | 4.9E−04 | 665 |
| X | 16804037 | 16805127 | promoter | ENST00000398155 | TXLNG | −1.12 | 2.1E−05 | 1090 |
| 15 | 102215274 | 102215634 | intron | ENST00000539112 | TARSL2 | 1.43 | 6.6E−04 | 360 |
| 16 | 88840365 | 88840766 | intron | ENST00000301015 | PIEZO1 | 1.47 | 1.5E−04 | 401 |
| 2 | 239835989 | 239836732 | intergenic | ENST00000455228 | AC114788.2 | 1.19 | 5.2E−04 | 743 |
| 2 | 129063639 | 129064276 | intron | ENST00000494089 | HS6ST1 | 1.06 | 6.7E−04 | 637 |
| 1 | 230994632 | 230995105 | intron | ENST00000522201 | C1orf198 | 1.59 | 4.5E−04 | 473 |
| 1 | 12100647 | 12101031 | intergenic | ENST00000496974 | RN7SL649P | 1.01 | 7.1E−04 | 384 |
| 1 | 178877654 | 178877828 | intron | ENST00000478871 | RALGPS2 | 1.66 | 8.4E−04 | 174 |
| 17 | 15917197 | 15917706 | intron | ENST00000497842 | TTC19 | 1.20 | 7.6E−04 | 509 |
| 8 | 142157841 | 142158130 | intron | ENST00000523015 | DENND3 | 1.62 | 1.9E−04 | 289 |
| 10 | 121010086 | 121010469 | intron | ENST00000392870 | GRK5 | 1.31 | 2.5E−04 | 383 |
| 7 | 63212550 | 63212945 | intergenic | ENST00000605464 | CICP24 | 1.43 | 3.5E−05 | 395 |
| 12 | 131851320 | 131852149 | promoter | ENST00000539209 | RP13-507P19.1 | 1.52 | 5.6E−05 | 829 |
| 7 | 63217941 | 63218533 | intergenic | ENST00000605464 | CICP24 | 1.48 | 5.1E−05 | 592 |
| 5 | 40679080 | 40680306 | promoter | ENST00000514343 | PTGER4 | −1.00 | 5.4E−07 | 1226 |
| 7 | 155199524 | 155200087 | intergenic | ENST00000569431 | RP5-912I13.1 | 1.59 | 6.7E−06 | 563 |
| 5 | 628422 | 629006 | intron | ENST00000444221 | CEP72 | 1.27 | 1.7E−04 | 584 |
| 17 | 81140434 | 81141322 | intergenic | ENST00000572343 | AC139099.4 | 1.21 | 6.6E−04 | 888 |
| 7 | 63216118 | 63216460 | intergenic | ENST00000605464 | CICP24 | 1.48 | 1.8E−04 | 342 |
| 17 | 105730 | 106265 | intron | ENST00000570638 | RPH3AL | 1.38 | 1.2E−04 | 535 |
| 16 | 86878909 | 86879904 | intergenic | ENST00000566109 | RP11-107C10.1 | 1.25 | 3.6E−05 | 995 |
| 21 | 33157360 | 33157791 | intergenic | ENST00000610276 | AP000255.6 | 1.15 | 1.2E−04 | 431 |
| 11 | 22174396 | 22174976 | intergenic | ENST00000530837 | CTD-2019O4.1 | −1.71 | 4.2E−08 | 580 |
| 16 | 33293693 | 33295127 | intergenic | ENST00000573021 | RP11-23E10.5 | 1.15 | 8.0E−04 | 1434 |
| 5 | 2490324 | 2490714 | intergenic | ENST00000560688 | RP11-129I19.2 | 1.13 | 1.5E−04 | 390 |
| 19 | 1164280 | 1165046 | intron | ENST00000587655 | SBNO2 | 1.01 | 5.2E−04 | 766 |
| 13 | 113680424 | 113680653 | promoter | ENST00000473345 | MCF2L | 1.61 | 1.6E−04 | 229 |

TABLE 1-continued

| Chr | Start | End | Annotation | Transcript_id | Gene symbol | Fold Change | P-value (adj) | Peak width (bp) |
|---|---|---|---|---|---|---|---|---|
| 14 | 60043166 | 60043680 | promoter | ENST00000281581 | CCDC175 | −1.25 | 1.8E−04 | 514 |
| 18 | 34408158 | 34409506 | promoter | ENST00000587139 | KIAA1328 | −1.07 | 1.1E−05 | 1348 |
| 17 | 55740045 | 55740953 | intron | ENST00000579505 | MSI2 | −1.01 | 1.1E−05 | 908 |
| 17 | 44438927 | 44439708 | promoter | ENST00000450673 | ARL17B | −1.22 | 6.7E−04 | 781 |
| 7 | 206405 | 206816 | intron | ENST00000477004 | FAM20C | 1.19 | 6.5E−04 | 411 |
| 7 | 63222975 | 63223858 | intergenic | ENST00000605464 | CICP24 | 1.12 | 5.0E−04 | 883 |
| 13 | 80055053 | 80055742 | promoter | ENST00000457171 | NDFIP2-AS1 | −1.00 | 4.2E−04 | 689 |
| 4 | 40578882 | 40579574 | intron | ENST00000513044 | RBM47 | −1.07 | 3.0E−08 | 692 |
| 9 | 140188004 | 140189043 | promoter | ENST00000566954 | RP13-122B23.8 | −1.23 | 8.9E−04 | 1039 |
| 17 | 70613945 | 70614728 | intron | ENST00000581549 | LINC00511 | −1.01 | 5.7E−06 | 783 |
| 5 | 74332978 | 74333338 | intergenic | ENST00000322348 | GCNT4 | −1.09 | 4.2E−04 | 360 |
| 4 | 1722559 | 1723411 | promoter | ENST00000536901 | TMEM129 | −1.03 | 1.4E−04 | 852 |
| 18 | 21166005 | 21167139 | promoter | ENST00000540608 | NPC1 | −1.36 | 1.1E−09 | 1134 |
| 17 | 39058236 | 39058611 | intergenic | ENST00000167588 | KRT20 | −1.19 | 5.7E−04 | 375 |
| 2 | 167231978 | 167233085 | promoter | ENST00000375387 | SCN9A | −1.12 | 1.6E−05 | 1107 |
| Y | 297421 | 298266 | intergenic | ENST00000516032 | RNU6-1334P | −1.02 | 5.9E−04 | 845 |
| 17 | 70462355 | 70462619 | intron | ENST00000580861 | LINC00511 | −1.03 | 4.9E−06 | 264 |
| 22 | 42709789 | 42710226 | intron | ENST00000515426 | TCF20 | −1.13 | 2.4E−04 | 437 |
| 13 | 30646504 | 30647236 | intergenic | ENST00000413591 | LINC00365 | −1.28 | 4.7E−05 | 732 |
| 18 | 77393621 | 77394083 | intergenic | ENST00000317008 | RP11-567M16.3 | 1.02 | 8.3E−04 | 462 |
| 17 | 73613416 | 73613713 | promoter | ENST00000578300 | MYO15B | −1.09 | 4.0E−05 | 297 |
| 18 | 20558174 | 20558672 | intron | ENST00000585177 | RBBP8 | −1.33 | 2.7E−07 | 498 |
| 21 | 18899540 | 18900000 | promoter | ENST00000363884 | Y_RNA | −1.31 | 8.0E−05 | 460 |
| 4 | 19557727 | 19558281 | intron | ENST00000511431 | RP11-608O21.1 | −1.74 | 1.6E−06 | 554 |
| 4 | 99582947 | 99583241 | exon | ENST00000569927_160528 | | −1.24 | 1.7E−04 | 294 |
| 15 | 102432818 | 102433991 | intergenic | ENST00000560907 | WBP1LP5 | 1.21 | 2.1E−04 | 1173 |
| 3 | 195487289 | 195487523 | intron | ENST00000480843 | MUC4 | 1.63 | 6.1E−05 | 234 |
| 19 | 2128409 | 2128837 | promoter | ENST00000590683 | AP3D1 | 2.03 | 4.6E−07 | 428 |
| 4 | 156679791 | 156681400 | promoter | ENST00000513437 | GUCY1B3 | −1.10 | 2.2E−06 | 1609 |
| 4 | 38735730 | 38736026 | intergenic | ENST00000410298 | RNA5SP158 | 1.17 | 5.5E−04 | 296 |
| X | 15755897 | 15756576 | promoter | ENST00000380319 | CA5B | −1.02 | 1.5E−04 | 679 |
| 19 | 51898699 | 51898961 | promoter | ENST00000600765 | CTD-2616J11.14 | 1.26 | 8.8E−04 | 262 |
| 4 | 103994568 | 103995223 | intron | ENST00000508136 | SLC9B2 | −1.52 | 4.2E−05 | 655 |
| 2 | 241564963 | 241565884 | promoter | ENST00000407714 | GPR35 | 1.21 | 1.8E−05 | 921 |
| 4 | 7404260 | 7404679 | intron | ENST00000329016 | SORCS2 | −1.76 | 1.7E−08 | 419 |
| 9 | 115851492 | 115852115 | intergenic | ENST00000439875 | FAM225B | 1.39 | 2.6E−04 | 623 |
| 17 | 79486482 | 79486780 | promoter | ENST00000442532 | RP13-766D20.2 | −1.29 | 2.9E−04 | 298 |
| 18 | 24159844 | 24160367 | intron | ENST00000580191 | KCTD1 | −1.80 | 3.4E−06 | 523 |
| 13 | 21277892 | 21278693 | promoter | ENST00000468605 | IL17D | −1.14 | 2.2E−05 | 801 |
| 18 | 2654993 | 2656229 | promoter | ENST00000579647 | CBX3P2 | −1.01 | 9.8E−04 | 1236 |
| 9 | 108081065 | 108081533 | intron | ENST00000607692 | SLC44A1 | −1.33 | 1.4E−04 | 468 |
| 10 | 35838253 | 35839249 | intron | ENST00000497692 | CCNY | 1.19 | 4.4E−04 | 996 |
| 18 | 3218007 | 3218215 | promoter | ENST00000261606 | MYOM1 | −1.32 | 6.7E−04 | 208 |
| 16 | 32351227 | 32353593 | intergenic | ENST00000562853 | RP11-17M15.4 | 1.20 | 6.5E−05 | 2366 |
| 4 | 41992323 | 41992873 | promoter | ENST00000510460 | SLC30A9 | −1.05 | 1.2E−05 | 550 |
| 4 | 122369404 | 122369799 | intergenic | ENST00000512282 | TUBB4BP5 | −1.10 | 4.1E−04 | 395 |
| 18 | 6315695 | 6316404 | intron | ENST00000580162 | L3MBTL4 | −2.14 | 3.8E−06 | 709 |
| 17 | 29816786 | 29817073 | promoter | ENST00000578694 | RAB11FIP4 | −1.46 | 1.2E−07 | 287 |
| 17 | 38501710 | 38502341 | promoter | ENST00000475125 | RARA | −1.14 | 5.8E−05 | 631 |
| 13 | 35923722 | 35924281 | intron | ENST00000379939 | NBEA | −1.45 | 9.2E−04 | 559 |
| 13 | 103553441 | 103553830 | intergenic | ENST00000605100 | METTL21EP | −1.72 | 8.0E−05 | 389 |
| 4 | 62406648 | 62407173 | intron | ENST00000514996 | LPHN3 | −1.51 | 4.9E−04 | 525 |
| 17 | 31281498 | 31281947 | intergenic | ENST00000578289 | TMEM98 | −1.10 | 8.1E−05 | 449 |
| 8 | 134440828 | 134441594 | intergenic | ENST00000393673 | ST13P6 | −1.33 | 3.1E−04 | 766 |
| 5 | 40784185 | 40784659 | intron | ENST00000397006 | PRKAA1 | −1.24 | 2.1E−04 | 474 |
| 4 | 185269668 | 185270393 | promoter | ENST00000511465 | RP11-290F5.2 | −1.12 | 1.4E−04 | 725 |
| 4 | 164471320 | 164471761 | intron | ENST00000510786 | 1-Mar | −1.12 | 1.3E−05 | 441 |
| 17 | 45393737 | 45394013 | intron | ENST00000575039 | RP11-290H9.4 | −1.59 | 1.3E−05 | 276 |
| 12 | 6873219 | 6873910 | promoter | ENST00000540667 | PTMS | −1.11 | 4.8E−04 | 691 |
| 1 | 201374557 | 201374865 | exon | ENST00000361379_57596 | | −1.02 | 2.7E−05 | 308 |
| 22 | 41983726 | 41984326 | promoter | ENST00000466645 | PMM1 | −1.17 | 8.3E−04 | 600 |
| 18 | 22067707 | 22067934 | promoter | ENST00000583122 | RP11-178F10.2 | −1.13 | 6.5E−04 | 227 |
| 17 | 74392058 | 74392341 | exon | ENST00000586409_558822 | | −1.21 | 2.0E−04 | 283 |
| 14 | 59296342 | 59296558 | promoter | ENST00000555578 | RP11-112J1.2 | −1.17 | 1.0E−04 | 516 |
| 4 | 103701581 | 103701969 | intergenic | ENST00000453744 | UBE2D3 | −1.03 | 5.8E−04 | 388 |
| 14 | 88715001 | 88715398 | intron | ENST00000556282 | KCNK10 | −1.14 | 3.7E−04 | 397 |
| 4 | 57107532 | 57108067 | intron | ENST00000264229 | KIAA1211 | −1.19 | 9.0E−04 | 535 |
| 18 | 52613423 | 52613785 | intron | ENST00000587148 | CCDC68 | −1.13 | 4.0E−05 | 362 |
| 4 | 129495033 | 129495556 | intergenic | ENST00000514265 | RP11-184M15.1 | −1.63 | 3.2E−06 | 523 |
| 10 | 112835917 | 112837154 | promoter | ENST00000280155 | ADRA2A | −1.34 | 9.1E−05 | 1237 |
| X | 7894985 | 7896017 | promoter | ENST00000442940 | PNPLA4 | −1.21 | 4.6E−08 | 1032 |
| 2 | 183956117 | 183956559 | intron | ENST00000444562 | AC064871.3 | −1.51 | 6.7E−04 | 442 |
| 18 | 71892391 | 71892807 | promoter | ENST00000480810 | RN7SL551P | −1.30 | 2.1E−04 | 416 |
| 6 | 2986172 | 2986575 | promoter | ENST00000450238 | LINC01011 | −1.22 | 1.0E−04 | 403 |
| 14 | 38438045 | 38438416 | intron | ENST00000533625 | TTC6 | −1.49 | 6.0E−04 | 371 |
| 4 | 30964479 | 30964886 | intron | ENST00000509759 | PCDH7 | −1.41 | 5.2E−05 | 407 |
| 18 | 29740444 | 29740915 | intron | ENST00000583696 | GAREM | −1.99 | 5.7E−05 | 471 |

TABLE 1-continued

| Chr | Start | End | Annotation | Transcript_id | Gene symbol | Fold Change | P-value (adj) | Peak width (bp) |
|---|---|---|---|---|---|---|---|---|
| 17 | 57069125 | 57069558 | intron | ENST00000393066 | TRIM37 | −1.41 | 1.9E−07 | 433 |
| 12 | 105711706 | 105711997 | intron | ENST00000549251 | RP11-474B16.1 | −1.49 | 3.2E−04 | 291 |
| 18 | 20284179 | 20284604 | intron | ENST00000578831 | RP11-739L10.1 | −1.18 | 4.2E−05 | 425 |
| 17 | 64382980 | 64383423 | intron | ENST00000284384 | PRKCA | −1.24 | 1.5E−05 | 443 |
| 3 | 24640233 | 24640703 | intergenic | ENST00000415266 | EIF3KP2 | −1.32 | 4.0E−04 | 470 |
| 18 | 14430668 | 14431655 | intergenic | ENST00000584783 | LONRF2P1 | −1.04 | 9.7E−04 | 987 |
| 9 | 79249252 | 79250114 | intron | ENST00000223609 | PRUNE2 | −1.81 | 4.8E−08 | 862 |
| 3 | 24565803 | 24566193 | intergenic | ENST00000580344 | MIR4792 | −1.24 | 6.9E−04 | 390 |
| 4 | 108729691 | 108730105 | intergenic | ENST00000506462 | SGMS2 | −1.23 | 3.2E−04 | 414 |
| 12 | 3982194 | 3982816 | promoter | ENST00000450737 | PARP11 | −1.00 | 3.1E−04 | 622 |
| 14 | 50453931 | 50454479 | intron | ENST00000530176 | C14orf182 | −1.02 | 2.7E−04 | 548 |
| 2 | 42422735 | 42423150 | intron | ENST00000401738 | EML4 | −1.32 | 2.6E−04 | 415 |
| 8 | 8547367 | 8547711 | intergenic | ENST00000519106 | CLDN23 | −1.14 | 1.6E−04 | 344 |
| 1 | 28648608 | 28649153 | intergenic | ENST00000479574 | MED18 | −2.06 | 1.0E−07 | 545 |
| 12 | 646923 | 647267 | intron | ENST00000535680 | B4GALNT3 | −1.24 | 4.0E−04 | 344 |
| 8 | 22222876 | 22223300 | promoter | ENST00000359741 | SLC39A14 | −1.28 | 6.6E−04 | 424 |
| 5 | 162110217 | 162110778 | intergenic | ENST00000517722 | RP11-167P20.1 | −1.85 | 3.0E−04 | 561 |
| 22 | 50228082 | 50228576 | intron | ENST00000565177 | RP3-522J7.6 | −1.18 | 1.8E−04 | 494 |
| 12 | 1779737 | 1779986 | intergenic | ENST00000577921 | MIR3649 | −1.41 | 3.7E−04 | 249 |
| 13 | 24758417 | 24758918 | intron | ENST00000382141 | RP11-307N16.6 | −1.20 | 1.4E−04 | 501 |
| 4 | 187027154 | 187027446 | promoter | ENST00000508379 | FAM149A | −1.07 | 8.8E−05 | 292 |
| 4 | 149908119 | 149908467 | intergenic | ENST00000458836 | RNU7-197P | −1.05 | 8.7E−04 | 348 |
| 9 | 90184915 | 90185347 | intron | ENST00000489291 | DAPK1 | −1.44 | 3.3E−04 | 432 |
| 4 | 154140059 | 154140489 | intron | ENST00000338700 | TRIM2 | −1.62 | 9.8E−07 | 430 |
| 12 | 12556572 | 12557059 | intron | ENST00000298571 | LOH12CR1 | −1.35 | 3.7E−04 | 487 |
| 4 | 37684752 | 37685026 | intron | ENST00000454158 | RELL1 | −1.32 | 2.2E−04 | 274 |
| 17 | 62700725 | 62701052 | intergenic | ENST00000604003 | MINOS1P2 | −1.42 | 8.0E−05 | 327 |
| 17 | 79823676 | 79823948 | promoter | ENST00000576021 | RP11-498C9.3 | −1.24 | 6.2E−04 | 272 |
| 17 | 30533043 | 30533564 | promoter | ENST00000581148 | RHOT1 | −1.01 | 5.9E−04 | 521 |
| 18 | 25185269 | 25185490 | intergenic | ENST00000584546 | RP11-739N10.1 | −1.24 | 4.9E−04 | 221 |
| 18 | 2939329 | 2939618 | intergenic | ENST00000261596 | LPIN2 | −1.42 | 9.6E−05 | 289 |
| 18 | 19774213 | 19774529 | intron | ENST00000581694 | GATA6 | −1.46 | 9.2E−07 | 316 |
| 18 | 54937345 | 54938049 | intergenic | ENST00000365370 | RNU6-737P | −1.63 | 1.9E−04 | 704 |
| 3 | 191194228 | 191194546 | intergenic | ENST00000518817 | PYDC2 | −1.75 | 2.5E−05 | 318 |
| 5 | 90184384 | 90184958 | intron | ENST00000425867 | GPR98 | −1.05 | 2.7E−04 | 574 |
| 6 | 143160084 | 143160736 | promoter | ENST00000367604 | HIVEP2 | −1.11 | 4.9E−04 | 652 |
| 18 | 30050445 | 30051372 | promoter | ENST00000399218 | GAREM | −1.53 | 2.7E−04 | 927 |
| 3 | 43255202 | 43255564 | intergenic | ENST00000410399 | AC104434.1 | −1.35 | 1.8E−04 | 362 |
| 5 | 98360931 | 98361324 | intergenic | ENST00000513175 | CTD-2007H13.3 | −1.26 | 4.8E−06 | 393 |
| 19 | 45198585 | 45199263 | intron | ENST00000590796 | CTB-171A8.1 | −1.39 | 9.9E−05 | 678 |
| 17 | 76334969 | 76335254 | intron | ENST00000586321 | AC061992.2 | −1.35 | 2.2E−06 | 285 |
| 3 | 24358451 | 24358695 | intron | ENST00000418247 | THRB | −1.11 | 3.7E−04 | 244 |
| 4 | 31148080 | 31148352 | exon | ENST00000511884_155940 | | −1.70 | 1.2E−10 | 272 |
| 5 | 34212911 | 34213718 | intron | ENST00000512782 | RP11-1023L17.1 | −1.68 | 2.1E−05 | 807 |
| 10 | 482220 | 483506 | promoter | ENST00000425723 | RP11-490E15.2 | 2.06 | 9.3E−04 | 1286 |
| 12 | 132060998 | 132062024 | intergenic | ENST00000541343 | RP11-292I17.1 | 2.01 | 2.0E−05 | 1026 |
| 20 | 61695692 | 61696531 | intergenic | ENST00000607802 | RP11-305P22.9 | 1.85 | 1.3E−04 | 840 |
| 4 | 7541341 | 7542231 | intron | ENST00000329016 | SORCS2 | 1.81 | 1.3E−04 | 890 |
| 16 | 88366497 | 88367260 | intergenic | ENST00000563190 | LA16c-444G7.1 | 1.32 | 2.6E−04 | 763 |
| 1 | 30664002 | 30664591 | intergenic | ENST00000442774 | RP3-357I16.1 | 1.41 | 2.7E−04 | 589 |
| 16 | 84558648 | 84558989 | intron | ENST00000565079 | TLDC1 | 1.67 | 6.6E−04 | 341 |
| 18 | 21453249 | 21453428 | promoter | ENST00000587184 | LAMA3 | −1.37 | 2.1E−05 | 179 |
| 3 | 195542062 | 195542854 | intergenic | ENST00000463781 | MUC4 | 1.03 | 9.1E−04 | 792 |
| 15 | 29269492 | 29270164 | promoter | ENST00000560531 | RP13-126C7.1 | 1.12 | 4.0E−05 | 672 |
| 8 | 143026250 | 143026924 | promoter | ENST00000408196 | AC104417.1 | 1.21 | 6.0E−04 | 674 |
| 2 | 233755631 | 233756268 | promoter | ENST00000461944 | NGEF | 1.49 | 2.4E−04 | 637 |
| X | 130712602 | 130713291 | intergenic | ENST00000444577 | OR13K1P | 1.94 | 4.5E−05 | 689 |
| 2 | 242838585 | 242839046 | intron | ENST00000429947 | AC131097.3 | 1.12 | 1.5E−04 | 461 |
| 19 | 38943593 | 38944148 | intron | ENST00000359596 | RYR1 | 1.41 | 7.3E−05 | 555 |
| 19 | 50215579 | 50216042 | promoter | ENST00000598072 | CPT1C | 1.61 | 4.9E−04 | 463 |
| 10 | 132897016 | 132897650 | intron | ENST00000368642 | TCERG1L | 1.35 | 1.9E−04 | 634 |
| 18 | 3117490 | 3118235 | intron | ENST00000261606 | MYOM1 | −1.48 | 4.7E−04 | 745 |
| 16 | 10394727 | 10395216 | intergenic | ENST00000564797 | ATF7IP2 | 1.47 | 3.0E−04 | 489 |
| 19 | 34112310 | 34112461 | promoter | ENST00000591312 | CHST8 | 1.65 | 8.3E−05 | 151 |
| 11 | 45149239 | 45150097 | intron | ENST00000530656 | PRDM11 | 1.11 | 4.1E−04 | 858 |
| 2 | 60524652 | 60525178 | intergenic | ENST00000457668 | AC007381.3 | 1.23 | 8.5E−04 | 526 |
| 18 | 19770500 | 19771301 | intron | ENST00000581694 | GATA6 | −1.05 | 9.9E−05 | 801 |
| 2 | 3497474 | 3498028 | intergenic | ENST00000607415 | RP11-1293J14.1 | 1.49 | 8.0E−05 | 554 |
| 20 | 55201436 | 55201906 | intergenic | ENST00000201031 | TFAP2C | 1.68 | 1.9E−04 | 470 |
| 19 | 39569172 | 39569875 | intergenic | ENST00000601575 | PAPL | 1.42 | 2.7E−04 | 703 |
| 19 | 51893704 | 51894598 | promoter | ENST00000570516 | C19orf84 | 1.52 | 2.2E−04 | 894 |
| 10 | 133908226 | 133908850 | intergenic | ENST00000298629 | JAKMIP3 | 1.61 | 5.7E−06 | 577 |
| 17 | 44656868 | 44657529 | promoter | ENST00000336125 | ARL17A | −1.17 | 6.7E−04 | 661 |
| 7 | 101321102 | 101321282 | intergenic | ENST00000223167 | MYL10 | 1.54 | 5.7E−04 | 180 |
| 3 | 139289513 | 139290376 | intron | ENST00000381790 | RP11-319G6.1 | 1.22 | 6.6E−05 | 863 |
| 7 | 6116687 | 6117343 | intergenic | ENST00000436915 | AC004895.4 | 1.06 | 9.1E−05 | 656 |
| 1 | 117635514 | 117636236 | promoter | ENST00000492682 | TTF2 | 1.20 | 7.6E−04 | 722 |

TABLE 1-continued

| Chr | Start | End | Annotation | Transcript_id | Gene symbol | Fold Change | P-value (adj) | Peak width (bp) |
|---|---|---|---|---|---|---|---|---|
| 12 | 132816724 | 132819336 | intron | ENST00000328957 | GALNT9 | 1.52 | 2.6E−04 | 2612 |
| 1 | 16005038 | 16005519 | intergenic | ENST00000606262 | RP4-680D5.9 | 1.45 | 1.1E−04 | 481 |
| 18 | 29522315 | 29523852 | promoter | ENST00000580420 | RP11-326K13.4 | −1.51 | 8.6E−04 | 1537 |
| 1 | 17574935 | 17575827 | promoter | ENST00000375460 | PADI3 | 1.34 | 5.8E−04 | 892 |
| 9 | 104053040 | 104053880 | intron | ENST00000463206 | LPPR1 | 1.34 | 9.7E−04 | 840 |
| 15 | 80164774 | 80165510 | intron | ENST00000494999 | ST20-MTHFS | 1.13 | 8.1E−05 | 736 |
| 20 | 44978838 | 44979690 | exon | ENST00000493599_627499 | | 1.19 | 5.6E−05 | 852 |
| 16 | 56641008 | 56641623 | promoter | ENST00000245185 | MT2A | 1.21 | 3.2E−04 | 615 |
| 1 | 61105637 | 61106487 | promoter | ENST00000439156 | RP11-776H12.1 | 1.76 | 3.9E−06 | 850 |
| 9 | 139240060 | 139240754 | intron | ENST00000354753 | GPSM1 | 1.04 | 3.3E−04 | 694 |
| 16 | 53453058 | 53453761 | intergenic | ENST00000567964 | RBL2 | 1.22 | 5.7E−04 | 703 |
| 1 | 19724621 | 19725289 | intron | ENST00000482808 | CAPZB | 1.45 | 1.7E−04 | 668 |
| 17 | 60266034 | 60266758 | intergenic | ENST00000577881 | RP11-51L5.3 | −1.21 | 7.8E−05 | 724 |
| 19 | 52645300 | 52645902 | promoter | ENST00000597886 | CTC-471J1.9 | 1.26 | 1.9E−04 | 602 |
| 11 | 33202571 | 33203188 | intron | ENST00000500025 | CSTF3-AS1 | 1.21 | 7.8E−04 | 617 |
| 14 | 81769514 | 81770277 | intron | ENST00000556280 | STON2 | −1.00 | 3.0E−06 | 763 |
| 11 | 9567258 | 9568184 | intergenic | ENST00000396602 | ZNF143 | 1.34 | 2.6E−04 | 926 |
| 5 | 34466571 | 34467442 | intergenic | ENST00000503549 | RP11-1325J9.1 | −1.32 | 1.0E−09 | 871 |
| 2 | 237573927 | 237574674 | intergenic | ENST00000455068 | AC011286.1 | 1.18 | 8.6E−04 | 747 |
| 7 | 114670431 | 114671261 | intergenic | ENST00000257724 | MDFIC | 1.48 | 6.6E−04 | 830 |
| 4 | 2420021 | 2420910 | promoter | ENST00000382849 | RP11-503N18.1 | −1.03 | 6.5E−04 | 889 |
| 3 | 80745459 | 80745848 | intergenic | ENST00000482003 | RP11-47P18.1 | −1.28 | 2.8E−06 | 389 |
| 4 | 125353676 | 125354469 | intergenic | ENST00000506481 | RP11-93I21.2 | −1.10 | 2.8E−06 | 793 |
| 2 | 165477406 | 165478493 | promoter | ENST00000446413 | GRB14 | −1.03 | 5.2E−04 | 1087 |
| 19 | 31899364 | 31900164 | intron | ENST00000585336 | AC007796.1 | 1.30 | 6.5E−04 | 800 |
| 20 | 45887465 | 45888265 | intron | ENST00000468376 | ZMYND8 | 1.10 | 4.6E−04 | 800 |
| 4 | 54342467 | 54343100 | intron | ENST00000507166 | FIP1L1 | 1.32 | 2.9E−04 | 633 |
| 1 | 25296870 | 25297681 | promoter | ENST00000568143 | RP11-84D1.2 | 1.02 | 6.3E−04 | 811 |
| X | 2815696 | 2816658 | intergenic | ENST00000381154 | ARSD | −1.22 | 2.8E−06 | 962 |
| 12 | 7950400 | 7950813 | intergenic | ENST00000229307 | NANOG | −1.42 | 1.7E−04 | 413 |
| 1 | 92791916 | 92792644 | intron | ENST00000610020 | RPAP2 | 1.20 | 5.9E−04 | 728 |
| 5 | 92414000 | 92415132 | intergenic | ENST00000515153 | CTD-2091N23.1 | −1.04 | 2.9E−06 | 1132 |
| 11 | 70270264 | 70270605 | promoter | ENST00000393747 | CTTN | 1.11 | 9.0E−04 | 341 |
| 18 | 24067372 | 24067793 | intron | ENST00000578973 | KCTD1 | −1.42 | 3.2E−04 | 421 |
| X | 15692727 | 15694099 | promoter | ENST00000380333 | CA5BP1 | −1.05 | 1.8E−05 | 1372 |
| 3 | 195890536 | 195890927 | intergenic | ENST00000457079 | LINC00885 | 1.15 | 4.3E−04 | 391 |
| 10 | 133849722 | 133850635 | intergenic | ENST00000368636 | BNIP3 | 1.05 | 6.1E−05 | 913 |
| 1 | 29839867 | 29840197 | intergenic | ENST00000515851 | RP11-810H18.1 | 1.02 | 8.7E−04 | 330 |
| 12 | 132280700 | 132281100 | promoter | ENST00000537582 | SFSWAP | 1.26 | 2.7E−04 | 400 |
| 4 | 120549649 | 120550511 | promoter | ENST00000354960 | PDE5A | −1.27 | 5.1E−07 | 862 |
| 5 | 60954962 | 60955315 | exon | ENST00000505623_198864 | | −1.11 | 8.6E−04 | 353 |
| 8 | 107630045 | 107630587 | promoter | ENST00000497705 | OXR1 | −1.06 | 4.7E−05 | 542 |
| 10 | 132892787 | 132893492 | promoter | ENST00000436942 | TCERG1L-AS1 | 1.17 | 2.2E−04 | 705 |
| 7 | 16961496 | 16961960 | intergenic | ENST00000419352 | AC098592.7 | −1.21 | 2.5E−04 | 464 |
| 8 | 142597388 | 142597870 | intergenic | ENST00000427937 | AC138647.1 | 1.15 | 4.2E−05 | 482 |
| 4 | 125127833 | 125128704 | intron | ENST00000507299 | CTD-2325B11.1 | −1.33 | 5.1E−05 | 871 |
| 2 | 233124653 | 233125150 | exon | ENST00000433430_85344 | | 1.04 | 4.0E−04 | 497 |
| 1 | 6305892 | 6306263 | promoter | ENST00000377898 | HES3 | 1.14 | 6.6E−04 | 371 |
| X | 47052740 | 47053352 | promoter | ENST00000335972 | UBA1 | −1.22 | 6.5E−06 | 612 |
| 20 | 59832756 | 59833009 | intron | ENST00000360469 | CDH4 | 1.72 | 5.8E−04 | 253 |
| 5 | 87564239 | 87565285 | promoter | ENST00000512724 | TMEM161B-AS1 | −1.06 | 5.2E−05 | 1046 |
| 4 | 124467237 | 124467606 | intergenic | ENST00000508291 | RP11-381N20.1 | −1.29 | 4.6E−05 | 369 |
| 2 | 241811517 | 241811995 | promoter | ENST00000476698 | AGXT | 1.47 | 1.3E−06 | 478 |
| 16 | 73116469 | 73116806 | intergenic | ENST00000569990 | HCCAT5 | 1.31 | 2.4E−04 | 337 |
| 16 | 32639949 | 32640460 | intergenic | ENST00000564327 | RP11-96K14.1 | 1.29 | 2.5E−04 | 511 |
| 7 | 151169967 | 151170459 | promoter | ENST00000482053 | RHEB | 1.27 | 6.5E−04 | 492 |
| 15 | 59548285 | 59548587 | intron | ENST00000558571 | MYO1E | −1.06 | 2.4E−04 | 302 |
| 16 | 63651192 | 63652144 | promoter | ENST00000563855 | RP11-368L12.1 | −1.25 | 5.9E−04 | 952 |
| 19 | 30154965 | 30155734 | promoter | ENST00000436066 | PLEKHF1 | 1.11 | 3.8E−06 | 769 |
| 7 | 5635384 | 5635656 | promoter | ENST00000405801 | FSCN1 | 1.01 | 7.3E−05 | 272 |
| 11 | 2008321 | 2008791 | intron | ENST00000419080 | MRPL23-AS1 | 1.26 | 3.8E−05 | 470 |
| 4 | 142271254 | 142271697 | intergenic | ENST00000511213 | RP11-362F19.1 | −1.05 | 4.3E−04 | 443 |
| X | 7050318 | 7051134 | intron | ENST00000498474 | HDHD1 | −1.08 | 1.8E−05 | 816 |
| 4 | 176986570 | 176987383 | promoter | ENST00000280190 | WDR17 | −1.55 | 7.8E−04 | 813 |
| 3 | 15900398 | 15901920 | promoter | ENST00000439830 | ANKRD28 | −1.06 | 4.2E−04 | 1522 |
| 18 | 21408398 | 21408763 | promoter | ENST00000591749 | LAMA3 | −1.25 | 1.7E−06 | 365 |
| 4 | 36352766 | 36353045 | intron | ENST00000504344 | RP11-431M7.2 | −1.08 | 1.8E−04 | 279 |
| 4 | 26828299 | 26828789 | intergenic | ENST00000494628 | STIM2 | −1.12 | 5.5E−04 | 490 |
| 19 | 34760796 | 34761482 | intron | ENST00000585833 | KIAA0355 | 1.04 | 1.6E−05 | 686 |
| 3 | 188506277 | 188507139 | intron | ENST00000459897 | LPP | 1.01 | 3.1E−04 | 862 |
| 17 | 36507408 | 36508157 | promoter | ENST00000577233 | SOCS7 | −1.02 | 2.2E−05 | 749 |
| 4 | 149297345 | 149297623 | promoter | ENST00000511528 | NR3C2 | −1.19 | 5.8E−04 | 278 |
| 19 | 38538873 | 38540260 | intron | ENST00000476317 | SIPA1L3 | 1.19 | 3.3E−04 | 1387 |
| 12 | 17795043 | 17795272 | intergenic | ENST00000539105 | RP11-606D9.1 | −1.30 | 8.9E−06 | 229 |
| 11 | 64512396 | 64512888 | promoter | ENST00000377485 | RASGRP2 | 1.12 | 6.7E−04 | 492 |
| 18 | 77679919 | 77680340 | intron | ENST00000478144 | PQLC1 | 1.18 | 5.5E−04 | 421 |
| 5 | 156692779 | 156693779 | promoter | ENST00000517634 | CTC-248O19.1 | −1.15 | 8.9E−07 | 1000 |

TABLE 1-continued

| Chr | Start | End | Annotation | Transcript_id | Gene symbol | Fold Change | P-value (adj) | Peak width (bp) |
|---|---|---|---|---|---|---|---|---|
| 19 | 38524195 | 38525390 | intron | ENST00000476317 | SIPA1L3 | 1.46 | 2.0E−04 | 1195 |
| 18 | 21452574 | 21453145 | promoter | ENST00000587184 | LAMA3 | −1.60 | 8.0E−11 | 571 |
| 19 | 36760064 | 36760513 | intergenic | ENST00000355114 | ZNF565 | 1.43 | 9.9E−04 | 449 |
| 4 | 90226929 | 90227192 | promoter | ENST00000609438 | GPRIN3 | −1.34 | 7.6E−05 | 263 |
| 16 | 4464103 | 4464762 | promoter | ENST00000576457 | CORO7 | −1.03 | 5.3E−04 | 659 |
| X | 24482963 | 24483767 | promoter | ENST00000441463 | PDK3 | −1.15 | 2.0E−06 | 804 |
| 18 | 12657581 | 12658532 | promoter | ENST00000400512 | AP005482.1 | −1.10 | 6.7E−04 | 951 |
| 7 | 534134 | 534368 | promoter | ENST00000434541 | AC147651.1 | 1.29 | 7.7E−07 | 234 |
| 7 | 30829073 | 30829346 | intron | ENST00000451002 | INMT-FAM188B | 1.25 | 4.4E−04 | 273 |
| 5 | 70743142 | 70743357 | promoter | ENST00000502659 | RP11-136K7.2 | −1.14 | 7.6E−04 | 215 |
| 3 | 195510841 | 195511431 | exon | ENST00000478156_152007 | | 1.25 | 9.4E−04 | 590 |
| 4 | 54457506 | 54458027 | promoter | ENST00000512247 | LNX1 | −1.07 | 9.4E−06 | 521 |
| 16 | 4394345 | 4394677 | promoter | ENST00000575848 | PAM16 | 1.18 | 4.0E−04 | 332 |
| 10 | 11927228 | 11927674 | intron | ENST00000445498 | PROSER2-AS1 | 1.49 | 3.1E−04 | 446 |
| 22 | 43892550 | 43892910 | intron | ENST00000538182 | MPPED1 | 1.12 | 3.3E−04 | 360 |
| 9 | 114827947 | 114828604 | intron | ENST00000374264 | SUSD1 | −1.39 | 1.0E−04 | 657 |
| 20 | 59950361 | 59951203 | intron | ENST00000360469 | CDH4 | 1.05 | 5.7E−04 | 842 |
| 17 | 72987700 | 72988299 | intron | ENST00000337231 | CDR2L | −1.01 | 2.0E−04 | 599 |
| 17 | 62161429 | 62162290 | intron | ENST00000584041 | ERN1 | −1.17 | 5.3E−05 | 861 |
| 18 | 20263110 | 20263735 | intergenic | ENST00000578831 | RP11-739L10.1 | −1.58 | 3.4E−08 | 625 |
| 20 | 31208975 | 31209164 | intergenic | ENST00000360785 | C20orf203 | 1.39 | 1.7E−04 | 189 |
| 7 | 158995289 | 158995591 | intergenic | ENST00000437005 | PIP5K1P2 | 1.27 | 5.3E−04 | 302 |
| 8 | 17658296 | 17659254 | promoter | ENST00000522768 | RP11-156K13.1 | −1.23 | 3.1E−04 | 958 |
| 19 | 1144620 | 1144966 | intron | ENST00000587655 | SBNO2 | 1.32 | 8.2E−04 | 346 |
| 2 | 97117403 | 97117850 | intergenic | ENST00000310865 | NEURL3 | 1.02 | 1.3E−04 | 447 |
| 1 | 245100328 | 245100603 | intergenic | ENST00000364888 | RN7SKP55 | 1.66 | 1.0E−04 | 275 |
| 19 | 38735536 | 38736387 | promoter | ENST00000590510 | SPINT2 | 1.49 | 2.8E−04 | 851 |
| 19 | 34809126 | 34810741 | intron | ENST00000588338 | KIAA0355 | 1.38 | 7.8E−06 | 1615 |
| 17 | 854896 | 856177 | intron | ENST00000575171 | NXN | 1.26 | 2.9E−04 | 1281 |
| 19 | 31830912 | 31831630 | intron | ENST00000558569 | TSHZ3 | 1.69 | 4.6E−04 | 718 |
| 19 | 38905395 | 38905919 | promoter | ENST00000588708 | RASGRP4 | 1.69 | 5.2E−05 | 524 |
| 13 | 30122775 | 30123280 | intron | ENST00000450494 | SLC7A1 | −1.31 | 2.2E−04 | 505 |
| 3 | 152974102 | 152975125 | intergenic | ENST00000582522 | RN7SL300P | 1.04 | 4.6E−04 | 1023 |
| 17 | 56494818 | 56495318 | promoter | ENST00000580014 | RNF43 | −1.02 | 1.8E−04 | 500 |
| 12 | 15427333 | 15427966 | intron | ENST00000393736 | RERG | −1.30 | 1.0E−05 | 633 |
| 18 | 19862218 | 19863030 | intergenic | ENST00000459476 | snoU13 | −1.39 | 6.3E−06 | 812 |
| 14 | 31697679 | 31698056 | intergenic | ENST00000365532 | Y_RNA | −1.23 | 7.5E−05 | 377 |
| 20 | 55363228 | 55363724 | intergenic | ENST00000384429 | RNU6-929P | 1.55 | 1.6E−06 | 496 |
| 19 | 36799597 | 36800084 | promoter | ENST00000600983 | CTD-3162L10.1 | 1.36 | 8.1E−04 | 487 |
| 19 | 31828906 | 31829306 | intron | ENST00000558569 | TSHZ3 | 1.46 | 3.1E−04 | 400 |
| 4 | 79548832 | 79549112 | intergenic | ENST00000364128 | Y_RNA | −1.04 | 8.0E−04 | 280 |
| 1 | 148929648 | 148931757 | promoter | ENST00000457390 | RP11-14N7.2 | 1.14 | 5.7E−04 | 2109 |
| 16 | 57298954 | 57299312 | promoter | ENST00000564018 | PLLP | −1.09 | 1.7E−07 | 358 |
| 18 | 20679542 | 20679947 | intergenic | ENST00000400473 | CABLES1 | −1.17 | 2.1E−05 | 405 |
| 12 | 12223581 | 12224233 | promoter | ENST00000308721 | BCL2L14 | −1.13 | 2.6E−04 | 652 |
| 5 | 170224689 | 170225199 | intron | ENST00000519598 | GABRP | 1.03 | 2.0E−04 | 510 |
| 8 | 118958604 | 118959299 | intron | ENST00000436216 | EXT1 | −1.00 | 6.4E−04 | 695 |
| 5 | 170184196 | 170184589 | promoter | ENST00000521965 | MIR4454 | −1.23 | 1.2E−05 | 393 |
| 15 | 39565852 | 39566905 | promoter | ENST00000561058 | RP11-624L4.1 | −1.14 | 1.8E−08 | 1053 |
| 5 | 81931049 | 81932003 | intergenic | ENST00000510845 | CTD-2015A6.2 | −1.01 | 2.7E−04 | 954 |
| 1 | 8800026 | 8800575 | intron | ENST00000480342 | RERE | 1.26 | 8.8E−04 | 549 |
| 14 | 87265459 | 87266198 | intergenic | ENST00000557527 | RP11-322L20.1 | −1.35 | 8.6E−04 | 739 |
| 4 | 169019178 | 169019931 | intron | ENST00000506926 | RP11-310I9.1 | −1.29 | 1.3E−06 | 753 |
| 1 | 165742556 | 165743015 | exon | ENST00000423121_23045 | | 1.33 | 7.8E−04 | 459 |
| 1 | 180126329 | 180127241 | intron | ENST00000367600 | QSOX1 | −1.08 | 4.7E−04 | 912 |
| 3 | 195627548 | 195627967 | intron | ENST00000468819 | TNK2 | 1.01 | 8.7E−04 | 419 |
| 1 | 68345690 | 68346295 | intron | ENST00000413628 | GNG12-AS1 | −1.11 | 1.1E−04 | 605 |
| 5 | 95429064 | 95430289 | intron | ENST00000511775 | CTD-2337A12.1 | −1.22 | 6.0E−05 | 1225 |
| 12 | 113342092 | 113342931 | promoter | ENST00000202917 | OAS1 | 1.04 | 9.7E−04 | 839 |
| 14 | 50908246 | 50909117 | intron | ENST00000013125 | MAP4K5 | −1.07 | 4.0E−05 | 871 |
| 16 | 56687942 | 56688603 | intergenic | ENST00000334346 | MT1B | 1.20 | 9.2E−04 | 661 |
| 4 | 98353586 | 98354125 | intron | ENST00000518105 | RP11-681L8.1 | −1.30 | 8.0E−05 | 539 |
| X | 17613238 | 17614124 | intron | ENST00000380060 | NHS | −1.26 | 3.9E−04 | 886 |
| 7 | 86475603 | 86476697 | intron | ENST00000439827 | GRM3 | −1.30 | 5.4E−04 | 1094 |
| 13 | 73745224 | 73745935 | intergenic | ENST00000364383 | RNU4-10P | −1.20 | 9.9E−05 | 711 |
| 13 | 39260761 | 39261550 | promoter | ENST00000280481 | FREM2 | −1.21 | 2.3E−10 | 789 |
| 1 | 11999122 | 11999719 | intron | ENST00000196061 | PLOD1 | 1.23 | 9.4E−04 | 597 |
| 18 | 14178703 | 14179225 | promoter | ENST00000581181 | ANKRD20A5P | −1.32 | 1.2E−05 | 522 |
| 6 | 15949256 | 15950233 | intergenic | ENST00000448802 | ARPC3P5 | −1.21 | 3.3E−04 | 977 |
| 5 | 73704005 | 73704568 | intron | ENST00000507781 | CTC-419K13.1 | −1.18 | 2.1E−05 | 563 |
| 4 | 184276391 | 184276972 | intergenic | ENST00000514910 | RP11-451F20.1 | −1.10 | 3.7E−04 | 581 |
| 18 | 29952163 | 29952949 | promoter | ENST00000269200 | GAREM | −1.80 | 1.2E−05 | 786 |
| 4 | 120651110 | 120651691 | intergenic | ENST00000503266 | RP11-236P13.1 | −1.15 | 8.8E−06 | 581 |
| 4 | 147866860 | 147867427 | promoter | ENST00000502319 | TTC29 | −1.10 | 5.1E−05 | 567 |
| 13 | 24606606 | 24607289 | intron | ENST00000382141 | RP11-307N16.6 | −1.27 | 4.9E−06 | 683 |
| 9 | 116333099 | 116333705 | intron | ENST00000428429 | RP11-168K11.2 | −1.05 | 1.5E−04 | 606 |
| 16 | 52288281 | 52288983 | promoter | ENST00000408588 | AC007333.1 | −1.15 | 9.5E−04 | 702 |

TABLE 1-continued

| Chr | Start | End | Annotation | Transcript_id | Gene symbol | Fold Change | P-value (adj) | Peak width (bp) |
|---|---|---|---|---|---|---|---|---|
| 4 | 168139291 | 168139787 | intron | ENST00000512042 | SPOCK3 | −1.35 | 6.0E−04 | 496 |
| 2 | 237791572 | 237792049 | intergenic | ENST00000413385 | AC011286.1 | 1.28 | 2.9E−04 | 477 |
| 1 | 4016604 | 4017089 | intergenic | ENST00000412674 | RP13-614K11.1 | 1.09 | 4.1E−04 | 485 |
| 5 | 50728721 | 50729673 | intergenic | ENST00000505723 | CTD-2335O3.2 | −1.01 | 1.4E−04 | 952 |
| 10 | 14862005 | 14862511 | intron | ENST00000465530 | CDNF | 1.30 | 9.5E−04 | 506 |
| 4 | 111751532 | 111751971 | intergenic | ENST00000515999 | AC024198.1 | −1.22 | 6.6E−04 | 439 |
| X | 64416588 | 64417229 | intergenic | ENST00000451184 | RP11-231N9.1 | −1.05 | 3.8E−04 | 641 |
| 1 | 227947119 | 227947769 | intron | ENST00000478768 | SNAP47 | 1.30 | 6.6E−05 | 650 |
| 13 | 76583584 | 76584230 | intergenic | ENST00000448806 | LINC01034 | −1.58 | 7.1E−05 | 646 |
| 18 | 21207297 | 21207674 | intron | ENST00000587763 | ANKRD29 | −1.54 | 1.3E−08 | 377 |
| 22 | 32475114 | 32475693 | intron | ENST00000543737 | SLC5A1 | −1.52 | 4.1E−07 | 579 |
| 3 | 126678871 | 126679767 | intron | ENST00000510044 | CHCHD6 | 1.17 | 1.3E−06 | 896 |
| 4 | 106830892 | 106831539 | promoter | ENST00000506056 | NPNT | −1.21 | 7.1E−06 | 647 |
| 15 | 63343399 | 63343882 | promoter | ENST00000561241 | RP11-244F12.3 | −1.35 | 4.6E−05 | 483 |
| 3 | 141133388 | 141134001 | intron | ENST00000513570 | ZBTB38 | 1.28 | 9.2E−04 | 613 |
| 21 | 36391861 | 36392371 | intron | ENST00000416754 | RUNX1 | −1.14 | 4.7E−04 | 510 |
| 13 | 103782751 | 103783563 | intergenic | ENST00000245312 | SLC10A2 | −1.43 | 2.0E−05 | 812 |
| 5 | 110072468 | 110072845 | promoter | ENST00000512886 | TMEM232 | −1.09 | 1.4E−04 | 377 |
| 9 | 89951812 | 89952262 | intergenic | ENST00000391119 | SNORA26 | −1.23 | 7.0E−08 | 450 |
| 18 | 8794410 | 8794963 | intron | ENST00000518815 | SOGA2 | −1.63 | 6.2E−05 | 553 |
| 10 | 79115617 | 79115970 | promoter | ENST00000418515 | RP11-619F23.2 | 1.10 | 6.8E−04 | 353 |
| 17 | 48770069 | 48771000 | promoter | ENST00000574246 | RP11-294J22.6 | −1.21 | 9.2E−05 | 931 |
| 5 | 14581642 | 14582228 | promoter | ENST00000274217 | FAM105A | −1.12 | 2.4E−05 | 586 |
| 18 | 71007537 | 71008213 | intron | ENST00000583942 | CTD-2354A18.1 | −1.40 | 7.0E−04 | 676 |
| 22 | 34142384 | 34142996 | intron | ENST00000416275 | LARGE-AS1 | −1.32 | 4.7E−04 | 612 |
| 19 | 51596977 | 51597664 | intergenic | ENST00000421832 | CTU1 | 1.06 | 8.0E−04 | 687 |
| 18 | 7878650 | 7879298 | intron | ENST00000400053 | PTPRM | −1.20 | 1.8E−04 | 648 |
| 4 | 67440362 | 67441524 | intergenic | ENST00000470993 | RPS23P3 | −1.27 | 3.6E−08 | 1162 |
| 11 | 68847695 | 68848373 | intron | ENST00000442692 | TPCN2 | 1.11 | 3.5E−05 | 678 |
| 15 | 86106408 | 86107073 | intron | ENST00000558811 | AKAP13 | −1.08 | 1.4E−04 | 665 |
| 14 | 38063747 | 38065628 | promoter | ENST00000556845 | TTC6 | −1.08 | 4.5E−07 | 1881 |
| 13 | 74864507 | 74864895 | promoter | ENST00000383890 | RNY1P5 | −1.55 | 6.9E−04 | 388 |
| 22 | 40783623 | 40784186 | promoter | ENST00000607915 | RP5-1042K10.10 | −1.27 | 4.5E−04 | 563 |
| 18 | 23669906 | 23671402 | promoter | ENST00000578595 | SS18 | −1.27 | 4.1E−05 | 1496 |
| 2 | 228626684 | 228627219 | promoter | ENST00000516537 | RNA5SP121 | −1.67 | 2.7E−04 | 535 |
| 14 | 75749392 | 75750562 | intergenic | ENST00000303562 | FOS | −1.27 | 3.2E−06 | 1170 |
| 5 | 34717596 | 34718270 | promoter | ENST00000502736 | RAI14 | 1.03 | 1.4E−04 | 674 |
| 1 | 204616727 | 204616979 | intron | ENST00000496057 | LRRN2 | 1.14 | 1.1E−04 | 252 |
| 9 | 132105932 | 132106561 | intergenic | ENST00000421833 | RP11-65J3.1 | 1.05 | 3.0E−04 | 629 |
| 19 | 7489776 | 7490370 | intron | ENST00000593531 | CTD-2207O23.3 | −1.17 | 1.7E−04 | 594 |
| X | 21816665 | 21817660 | intergenic | ENST00000465888 | MBTPS2 | −1.03 | 6.1E−04 | 995 |
| 9 | 131821742 | 131822331 | promoter | ENST00000474639 | FAM73B | 1.16 | 9.9E−04 | 589 |
| 18 | 60087362 | 60088390 | promoter | ENST00000591796 | RP11-640A1.4 | −1.02 | 1.3E−05 | 1028 |
| 2 | 187426114 | 187426881 | intergenic | ENST00000261023 | ITGAV | 1.22 | 1.6E−05 | 767 |
| 18 | 21269015 | 21270342 | promoter | ENST00000399516 | LAMA3 | −1.15 | 8.2E−10 | 1327 |
| 8 | 26165314 | 26165833 | intron | ENST00000523964 | PPP2R2A | −1.10 | 3.8E−04 | 519 |
| 6 | 43663358 | 43663937 | intergenic | ENST00000372133 | MRPS18A | −1.39 | 5.1E−06 | 579 |
| 10 | 8610021 | 8610921 | intergenic | ENST00000425516 | CHCHD3P1 | −1.01 | 7.6E−04 | 900 |
| 10 | 52753171 | 52754401 | intron | ENST00000373985 | PRKG1 | −1.13 | 1.3E−05 | 1230 |
| 17 | 69325178 | 69326441 | intergenic | ENST00000410631 | RNU6-305P | −1.35 | 2.1E−05 | 1263 |
| 12 | 22741552 | 22742171 | intergenic | ENST00000535801 | RP11-268P4.2 | −1.66 | 1.6E−05 | 619 |
| 4 | 77613059 | 77614188 | intron | ENST00000486758 | SHROOM3 | −1.47 | 8.2E−06 | 1129 |
| 22 | 42579385 | 42580044 | intron | ENST00000404876 | TCF20 | −1.28 | 4.7E−04 | 659 |
| 11 | 102800546 | 102801385 | intergenic | ENST00000260302 | MMP13 | −1.15 | 5.5E−05 | 839 |
| 1 | 168769107 | 168770153 | intergenic | ENST00000420691 | LINC00626 | −1.51 | 3.6E−04 | 1046 |
| 17 | 48968048 | 48968736 | intergenic | ENST00000514358 | TOB1-AS1 | −1.42 | 8.2E−09 | 688 |
| 6 | 131579205 | 131579893 | intron | ENST00000474850 | AKAP7 | −2.08 | 9.6E−06 | 688 |
| 5 | 111869063 | 111869538 | intergenic | ENST00000514243 | RP11-159K7.1 | −1.05 | 2.7E−05 | 475 |
| 10 | 9866325 | 9867152 | intergenic | ENST00000419836 | RP5-1051H14.2 | −1.51 | 4.2E−04 | 827 |
| 21 | 40174479 | 40175013 | intergenic | ENST00000360214 | ETS2 | −1.48 | 1.0E−04 | 534 |
| 3 | 169022989 | 169023782 | intron | ENST00000485957 | MECOM | −1.09 | 1.3E−04 | 793 |
| 10 | 74209572 | 74210383 | intron | ENST00000489666 | MICU1 | −1.48 | 9.2E−04 | 811 |
| 2 | 101441977 | 101442437 | intron | ENST00000430586 | AC092168.2 | −1.65 | 2.1E−05 | 460 |
| 15 | 71438884 | 71439471 | intron | ENST00000261862 | THSD4 | −1.30 | 6.6E−04 | 587 |
| 18 | 52434366 | 52434770 | intron | ENST00000586570 | RAB27B | −1.67 | 1.4E−06 | 404 |
| X | 17027964 | 17029048 | intron | ENST00000380064 | REPS2 | −1.40 | 4.7E−05 | 1084 |
| 4 | 74889262 | 74890088 | intergenic | ENST00000464637 | RN7SL218P | −1.21 | 4.3E−04 | 826 |
| 8 | 127836689 | 127837275 | intergenic | ENST00000519319 | PCAT1 | −1.41 | 3.6E−14 | 586 |
| 5 | 60757258 | 60757764 | intron | ENST00000252744 | ZSWIM6 | −1.20 | 6.5E−05 | 506 |
| 3 | 151576923 | 151578197 | intron | ENST00000475855 | RP11-454C18.2 | −1.62 | 1.9E−04 | 1274 |
| X | 17050088 | 17050991 | intron | ENST00000380064 | REPS2 | −1.22 | 4.1E−05 | 903 |
| 15 | 54081718 | 54082628 | promoter | ENST00000383914 | RNU6-449P | −1.63 | 3.1E−04 | 910 |
| 4 | 115433283 | 115434630 | intergenic | ENST00000310836 | UGT8 | −1.23 | 6.4E−06 | 1347 |
| 6 | 131579943 | 131580553 | intron | ENST00000474850 | AKAP7 | −1.61 | 5.7E−07 | 610 |
| 7 | 65226259 | 65226827 | promoter | ENST00000384058 | SNORA15 | −1.65 | 3.5E−05 | 568 |
| 12 | 22715040 | 22716069 | intergenic | ENST00000542742 | RP11-359J14.3 | −1.65 | 1.9E−06 | 1029 |
| 8 | 8543551 | 8544101 | intergenic | ENST00000519106 | CLDN23 | −1.53 | 3.8E−05 | 550 |

TABLE 1-continued

| Chr | Start | End | Annotation | Transcript_id | Gene symbol | Fold Change | P-value (adj) | Peak width (bp) |
|---|---|---|---|---|---|---|---|---|
| 17 | 56477290 | 56477780 | intron | ENST00000583841 | BZRAP1-AS1 | −1.09 | 9.2E−05 | 490 |
| 4 | 30903182 | 30904207 | intron | ENST00000511884 | PCDH7 | −1.09 | 1.8E−05 | 1025 |
| 12 | 13539722 | 13539939 | promoter | ENST00000532841 | C12orf36 | −1.34 | 4.5E−04 | 217 |
| 12 | 13539993 | 13540519 | promoter | ENST00000531049 | C12orf36 | −1.34 | 8.7E−05 | 526 |
| 4 | 109875916 | 109876470 | intron | ENST00000399126 | COL25A1 | −1.34 | 2.7E−04 | 554 |
| 15 | 97862475 | 97863361 | promoter | ENST00000559394 | RP11-315L6.1 | −1.52 | 4.7E−04 | 886 |
| 5 | 32302570 | 32303291 | intron | ENST00000513622 | MTMR12 | −1.36 | 4.6E−04 | 721 |
| 15 | 30110396 | 30110856 | intron | ENST00000473741 | TJP1 | −1.14 | 2.9E−04 | 460 |
| 4 | 175181121 | 175181620 | intron | ENST00000513696 | FBXO8 | −1.43 | 4.1E−05 | 499 |
| 21 | 16513635 | 16514425 | intergenic | ENST00000449746 | AF127577.12 | −1.38 | 2.9E−05 | 790 |
| 2 | 68800612 | 68801208 | promoter | ENST00000433396 | AC007392.3 | −1.41 | 5.1E−04 | 596 |
| 3 | 169097224 | 169097849 | intron | ENST00000485957 | MECOM | −1.23 | 1.3E−05 | 625 |
| 4 | 149352458 | 149353065 | intron | ENST00000511528 | NR3C2 | −1.02 | 9.1E−04 | 607 |
| 7 | 116452899 | 116453499 | promoter | ENST00000464223 | CAPZA2 | −1.44 | 9.7E−06 | 600 |
| 12 | 122595449 | 122596247 | intron | ENST00000319080 | MLXIP | −1.04 | 9.3E−04 | 798 |
| X | 110580244 | 110580776 | intron | ENST00000496551 | DCX | −1.33 | 6.6E−04 | 532 |
| 6 | 56558773 | 56559190 | promoter | ENST00000521104 | DST | −1.14 | 8.2E−04 | 417 |
| 8 | 71578881 | 71579614 | promoter | ENST00000276590 | LACTB2 | −1.09 | 2.1E−04 | 733 |
| 14 | 31503002 | 31503435 | intron | ENST00000555417 | AP4S1 | −1.35 | 3.1E−07 | 433 |
| 5 | 55053665 | 55054839 | intron | ENST00000504880 | SLC38A9 | −1.45 | 2.7E−05 | 1174 |
| 14 | 68631120 | 68631904 | intron | ENST00000557045 | RAD51B | −1.19 | 9.1E−04 | 784 |
| 4 | 53728083 | 53728700 | promoter | ENST00000515677 | RASL11B | −1.00 | 3.4E−05 | 617 |
| X | 17878644 | 17879810 | promoter | ENST00000545871 | RAI2 | −1.24 | 4.3E−04 | 1166 |
| 17 | 31121546 | 31122070 | intron | ENST00000583621 | MYO1D | −1.43 | 6.7E−04 | 524 |
| 13 | 73899238 | 73900358 | intergenic | ENST00000420129 | MARK2P12 | −1.07 | 2.2E−04 | 1120 |
| 7 | 117356474 | 117357412 | intron | ENST00000445366 | CTTNBP2 | −1.10 | 3.5E−04 | 938 |
| 17 | 71856589 | 71857110 | intergenic | ENST00000580370 | CTD-2532D12.5 | −1.05 | 9.1E−04 | 521 |
| 4 | 87863404 | 87863696 | intron | ENST00000511442 | AFF1 | −1.14 | 1.0E−04 | 292 |
| 14 | 90114844 | 90115344 | promoter | ENST00000516846 | Y_RNA | −1.33 | 6.3E−04 | 500 |
| 13 | 113339543 | 113340006 | promoter | ENST00000356049 | C13orf35 | −1.43 | 4.0E−04 | 463 |
| 18 | 20714210 | 20714563 | promoter | ENST00000579963 | CABLES1 | −1.18 | 7.2E−05 | 353 |
| 13 | 106458613 | 106459355 | intergenic | ENST00000415294 | LINC00343 | −1.09 | 4.0E−04 | 742 |
| 18 | 10798713 | 10799240 | intron | ENST00000579112 | PIEZO2 | −1.31 | 2.7E−05 | 527 |
| 4 | 154110178 | 154111052 | intron | ENST00000437508 | TRIM2 | −1.00 | 4.2E−04 | 874 |
| 15 | 74305515 | 74306058 | intron | ENST00000564725 | PML | −1.73 | 6.2E−04 | 543 |
| 5 | 60550923 | 60551655 | intron | ENST00000503882 | CTC-436P18.3 | −1.45 | 5.6E−06 | 732 |
| 10 | 60228227 | 60229121 | intergenic | ENST00000373886 | BICC1 | −1.33 | 9.2E−05 | 894 |
| 2 | 151828282 | 151829233 | intergenic | ENST00000425983 | AC023469.2 | −1.10 | 9.5E−05 | 951 |
| 4 | 156625042 | 156625531 | intron | ENST00000513574 | GUCY1A3 | −1.16 | 1.8E−05 | 489 |
| 16 | 82061215 | 82061820 | intergenic | ENST00000563491 | HSD17B2 | −1.53 | 4.5E−06 | 605 |
| 3 | 27683392 | 27684170 | intergenic | ENST00000607601 | RP11-222K16.1 | −1.08 | 4.7E−04 | 778 |
| 8 | 38624299 | 38625022 | intron | ENST00000348567 | TACC1 | −1.03 | 8.6E−05 | 723 |
| 17 | 46018633 | 46019210 | promoter | ENST00000433001 | AC003665.1 | −1.15 | 2.2E−04 | 577 |
| 5 | 139544548 | 139545540 | exon | ENST00000607850_189600 | | −1.20 | 3.2E−04 | 992 |
| 4 | 30954382 | 30954826 | intron | ENST00000509759 | PCDH7 | −1.17 | 5.2E−04 | 444 |
| X | 35457520 | 35458562 | intergenic | ENST00000516602 | RNU6-1087P | −1.06 | 2.0E−04 | 1042 |
| 8 | 17652219 | 17652783 | intron | ENST00000381862 | MTUS1 | −1.53 | 5.6E−05 | 564 |
| 1 | 172137033 | 172137953 | intron | ENST00000523513 | DNM3 | −1.28 | 9.8E−04 | 920 |
| 4 | 155664739 | 155665500 | promoter | ENST00000510733 | LRAT | −1.59 | 1.9E−14 | 761 |
| 22 | 39317071 | 39317566 | promoter | ENST00000450216 | CTA-150C2.13 | −1.00 | 3.0E−04 | 495 |
| 11 | 22696063 | 22696714 | promoter | ENST00000433790 | GAS2 | −1.36 | 2.2E−06 | 651 |
| 5 | 66381100 | 66381787 | intron | ENST00000447738 | MAST4 | −1.09 | 1.3E−04 | 687 |
| 4 | 45648854 | 45650096 | intergenic | ENST00000363850 | RNU6-931P | −1.02 | 2.8E−04 | 1242 |
| 4 | 187564825 | 187565498 | intron | ENST00000441802 | FAT1 | −1.40 | 5.3E−07 | 673 |
| 15 | 53746791 | 53747925 | intergenic | ENST00000567224 | WDR72 | −1.40 | 5.0E−05 | 1134 |
| 4 | 105862880 | 105863326 | intron | ENST00000515649 | RP11-556I14.1 | −1.11 | 7.2E−04 | 446 |
| 4 | 77521435 | 77522140 | intron | ENST00000485780 | SHROOM3 | −1.13 | 7.2E−04 | 705 |
| 1 | 160512233 | 160512642 | exon | ENST00000534968_54273 | | −1.54 | 1.4E−04 | 409 |
| 4 | 25789258 | 25790342 | intron | ENST00000502949 | SEL1L3 | −1.49 | 6.0E−05 | 1084 |
| 21 | 15588231 | 15588966 | promoter | ENST00000400577 | RBM11 | −1.36 | 4.0E−05 | 735 |
| 15 | 23095116 | 23095978 | promoter | ENST00000559762 | RP11-566K19.5 | −1.14 | 6.8E−05 | 862 |
| 10 | 3598428 | 3598998 | intergenic | ENST00000426811 | RP11-482E14.2 | 1.87 | 5.3E−04 | 570 |
| 12 | 43309649 | 43310455 | intergenic | ENST00000603420 | RP11-510P12.1 | −1.26 | 3.0E−04 | 806 |
| 2 | 36008748 | 36009185 | intergenic | ENST00000431951 | MRPL50P1 | −1.81 | 2.2E−04 | 437 |
| 4 | 175547466 | 175548242 | intergenic | ENST00000274093 | GLRA3 | −1.43 | 1.7E−04 | 776 |
| 12 | 123129219 | 123129801 | intron | ENST00000356987 | HCAR1 | 1.17 | 3.5E−04 | 582 |
| 8 | 42082268 | 42083254 | promoter | ENST00000459183 | snoU13 | −1.26 | 5.4E−04 | 986 |
| 5 | 139598938 | 139599611 | intron | ENST00000509789 | CYSTM1 | −1.22 | 5.5E−04 | 673 |
| 7 | 121037949 | 121038214 | promoter | ENST00000411715 | CYCSP19 | −1.35 | 9.2E−07 | 265 |
| 4 | 94763615 | 94764289 | intergenic | ENST00000306011 | ATOH1 | −1.26 | 2.5E−04 | 674 |
| 12 | 12603953 | 12604650 | promoter | ENST00000605743 | RP11-253I19.4 | −1.48 | 8.2E−04 | 697 |
| 18 | 21075012 | 21075330 | promoter | ENST00000269220 | C18orf8 | −1.19 | 3.7E−04 | 318 |
| X | 23925684 | 23926349 | promoter | ENST00000490078 | APOO | −1.02 | 8.0E−05 | 665 |
| 21 | 36250878 | 36251125 | intron | ENST00000486278 | RUNX1 | −1.32 | 7.2E−04 | 247 |
| 18 | 8329209 | 8329564 | intron | ENST00000577827 | PTPRM | −1.19 | 1.4E−04 | 355 |
| 2 | 73944031 | 73944360 | intergenic | ENST00000489476 | TPRKB | −1.29 | 2.2E−06 | 329 |
| 4 | 37491862 | 37492339 | intron | ENST00000508175 | C4orf19 | −1.21 | 5.4E−05 | 477 |

TABLE 1-continued

| Chr | Start | End | Annotation | Transcript_id | Gene symbol | Fold Change | P-value (adj) | Peak width (bp) |
|---|---|---|---|---|---|---|---|---|
| Y | 2558421 | 2558773 | intergenic | ENST00000516032 | RNU6-1334P | −1.32 | 9.6E−05 | 352 |
| 15 | 63969949 | 63970349 | promoter | ENST00000559715 | HERC1 | −1.11 | 4.9E−04 | 400 |
| 18 | 19664513 | 19664896 | intergenic | ENST00000579830 | RP11-595B24.2 | −1.15 | 4.9E−07 | 383 |
| 4 | 74548559 | 74549428 | intergenic | ENST00000436089 | AC112518.3 | −1.19 | 4.1E−04 | 869 |
| 18 | 9422752 | 9423417 | intergenic | ENST00000262120 | TWSG1 | −1.51 | 3.5E−04 | 665 |
| 18 | 21464667 | 21465113 | promoter | ENST00000586751 | LAMA3 | −1.31 | 6.7E−05 | 446 |
| 4 | 48261077 | 48261668 | intron | ENST00000381501 | TEC | −1.28 | 8.2E−05 | 591 |
| 12 | 15305835 | 15306272 | promoter | ENST00000541243 | RERG-AS1 | −1.21 | 5.5E−05 | 437 |
| 4 | 105979088 | 105979826 | intron | ENST00000506386 | RP11-556I14.1 | −1.08 | 4.5E−04 | 738 |
| X | 2608934 | 2609490 | promoter | ENST00000381180 | CD99 | −1.44 | 9.0E−07 | 556 |
| 13 | 73544410 | 73545113 | promoter | ENST00000469712 | PIBF1 | −1.58 | 1.1E−06 | 703 |
| 4 | 55896756 | 55897737 | promoter | ENST00000517006 | RNU6-410P | −1.39 | 1.6E−04 | 981 |
| 4 | 13703459 | 13704075 | intron | ENST00000510907 | RP11-341G5.1 | −1.31 | 3.2E−05 | 616 |
| 14 | 64137369 | 64137812 | intergenic | ENST00000247225 | SGPP1 | −1.71 | 4.0E−04 | 443 |
| 12 | 26421726 | 26422408 | intron | ENST00000540392 | RP11-283G6.4 | −1.37 | 8.2E−05 | 682 |
| 18 | 4004111 | 4004976 | promoter | ENST00000582051 | DLGAP1 | −1.51 | 3.5E−04 | 865 |
| X | 16328282 | 16328968 | intergenic | ENST00000516839 | AC078993.1 | −1.31 | 2.9E−04 | 686 |
| X | 13012317 | 13012875 | intron | ENST00000451311 | TMSB4X | −1.75 | 2.4E−05 | 558 |
| 5 | 50521576 | 50522552 | intergenic | ENST00000468490 | CTD-2312P21.1 | −1.06 | 1.1E−04 | 976 |
| 4 | 87933836 | 87934323 | intron | ENST00000544085 | AFF1 | −1.28 | 1.1E−04 | 487 |
| 15 | 57619201 | 57619605 | promoter | ENST00000567319 | RP11-358M11.4 | −1.29 | 1.4E−04 | 404 |
| 8 | 118959719 | 118960347 | intron | ENST00000436216 | EXT1 | −1.20 | 9.7E−05 | 628 |
| 4 | 170106361 | 170107215 | intron | ENST00000508685 | SH3RF1 | −1.55 | 6.5E−06 | 854 |
| 14 | 23029755 | 23030313 | intergenic | ENST00000557595 | AE000662.92 | −1.03 | 2.5E−05 | 558 |
| 13 | 102392011 | 102392599 | intron | ENST00000376143 | FGF14 | −1.38 | 5.2E−04 | 588 |
| 4 | 186639663 | 186640609 | intron | ENST00000456060 | SORBS2 | −1.17 | 2.3E−04 | 946 |
| 17 | 35281035 | 35281678 | intron | ENST00000529264 | RP11-445F12.1 | −1.22 | 1.8E−05 | 643 |
| 18 | 19790101 | 19790813 | intergenic | ENST00000578741 | RP11-627G18.4 | −1.43 | 2.0E−07 | 712 |
| 4 | 85432843 | 85433341 | intergenic | ENST00000295886 | NKX6-1 | −1.15 | 5.1E−04 | 498 |
| 1 | 40357889 | 40358640 | intergenic | ENST00000397332 | MYCL | −1.30 | 7.4E−05 | 751 |
| 13 | 52532098 | 52532856 | intron | ENST00000542656 | ATP7B | −1.03 | 7.5E−05 | 758 |
| 12 | 92940036 | 92940836 | promoter | ENST00000459090 | snoU13 | −1.50 | 7.6E−05 | 800 |
| 4 | 158954507 | 158955331 | intergenic | ENST00000513850 | RP11-312A15.3 | −1.07 | 2.3E−06 | 824 |
| X | 132843583 | 132844339 | intron | ENST00000406757 | GPC3 | −1.88 | 1.5E−05 | 756 |
| 5 | 31048491 | 31049119 | intergenic | ENST00000495944 | RPL19P11 | −1.19 | 4.2E−04 | 628 |
| 18 | 24337137 | 24337871 | intron | ENST00000579964 | AQP4-AS1 | −1.32 | 5.9E−04 | 734 |
| 4 | 151435655 | 151436697 | intron | ENST00000513021 | LRBA | −1.10 | 6.8E−04 | 1042 |
| 4 | 72003550 | 72004695 | intergenic | ENST00000264485 | SLC4A4 | −1.27 | 2.5E−04 | 1145 |
| 16 | 52290147 | 52290849 | promoter | ENST00000408588 | AC007333.1 | −1.27 | 1.0E−04 | 702 |
| 18 | 19624260 | 19625733 | intron | ENST00000584898 | RP11-595B24.1 | −1.37 | 3.1E−07 | 1473 |
| 18 | 21209345 | 21209877 | promoter | ENST00000587763 | ANKRD29 | −1.41 | 3.0E−10 | 532 |
| 13 | 102399458 | 102399928 | intron | ENST00000376143 | FGF14 | −1.68 | 3.8E−06 | 470 |
| 4 | 106772105 | 106772881 | intron | ENST00000510764 | INTS12 | −1.11 | 2.2E−04 | 777 |
| 18 | 21290854 | 21291433 | promoter | ENST00000588044 | RPL23AP77 | −1.41 | 5.1E−05 | 579 |
| 13 | 108486621 | 108487030 | promoter | ENST00000449551 | FAM155A-IT1 | −1.35 | 5.9E−04 | 409 |
| 8 | 135029476 | 135029978 | intergenic | ENST00000605278 | RP11-157E21.2 | −1.27 | 5.8E−04 | 502 |
| 13 | 73614637 | 73615691 | intergenic | ENST00000437000 | PSMD10P3 | −1.09 | 3.1E−04 | 1054 |
| 18 | 60766821 | 60767604 | intergenic | ENST00000398117 | BCL2 | −1.01 | 1.8E−04 | 783 |
| 9 | 27385265 | 27386040 | intron | ENST00000603061 | MOB3B | −1.31 | 3.5E−04 | 775 |
| 17 | 72970801 | 72971274 | promoter | ENST00000532900 | HID1 | −1.29 | 2.8E−04 | 473 |
| X | 24163828 | 24164250 | intergenic | ENST00000427551 | ZFX-AS1 | −1.95 | 1.9E−06 | 422 |
| 18 | 70985941 | 70986635 | intergenic | ENST00000563172 | CTD-2354A18.1 | −1.61 | 3.1E−04 | 694 |
| 12 | 9880385 | 9880890 | intron | ENST00000327839 | CLECL1 | −1.33 | 8.1E−04 | 505 |
| 13 | 60181712 | 60182550 | intergenic | ENST00000400324 | DIAPH3 | −1.26 | 6.9E−05 | 838 |
| 15 | 90877324 | 90877942 | intergenic | ENST00000412799 | GABARAPL3 | −1.17 | 2.2E−04 | 618 |
| 18 | 59402679 | 59403762 | intron | ENST00000590968 | RP11-879F14.1 | −1.28 | 8.2E−04 | 1083 |
| 14 | 39308853 | 39309445 | promoter | ENST00000557440 | LINC00639 | −1.08 | 1.4E−04 | 592 |
| 4 | 22943322 | 22944138 | intergenic | ENST00000511453 | RP11-412P11.1 | −1.16 | 7.5E−04 | 816 |
| 4 | 139833077 | 139833445 | intron | ENST00000507038 | RP11-371F15.3 | −1.03 | 2.4E−04 | 368 |
| 18 | 19686422 | 19686904 | intergenic | ENST00000579830 | RP11-595B24.2 | −1.11 | 6.5E−06 | 482 |
| 10 | 43137085 | 43137382 | intergenic | ENST00000486614 | ZNF33B | −1.35 | 2.5E−04 | 297 |
| 20 | 15119226 | 15119713 | intron | ENST00000310348 | MACROD2 | −1.51 | 5.0E−07 | 487 |
| 21 | 36168889 | 36169428 | intron | ENST00000399240 | RUNX1 | −1.09 | 9.0E−04 | 539 |
| 18 | 4017582 | 4018096 | intron | ENST00000577430 | DLGAP1 | −1.26 | 7.7E−04 | 514 |
| 5 | 132208952 | 132209463 | promoter | ENST00000485457 | LEAP2 | −1.25 | 7.5E−04 | 511 |
| 7 | 115979679 | 115980039 | intron | ENST00000446355 | AC002066.1 | −1.22 | 4.9E−04 | 360 |
| 18 | 55102256 | 55103165 | promoter | ENST00000581316 | AC090340.1 | −1.02 | 3.1E−04 | 909 |
| 4 | 170035695 | 170036113 | intron | ENST00000284637 | SH3RF1 | −1.61 | 1.7E−04 | 418 |
| X | 15872339 | 15873736 | promoter | ENST00000421527 | AP1S2 | −1.09 | 2.1E−08 | 1397 |
| 4 | 177114274 | 177114599 | promoter | ENST00000515234 | SPATA4 | −1.69 | 2.3E−04 | 325 |
| 18 | 40105871 | 40106286 | intron | ENST00000589068 | LINC00907 | −1.40 | 7.3E−04 | 415 |
| 13 | 99300363 | 99300980 | intron | ENST00000430810 | CALM2P4 | −1.25 | 1.6E−04 | 619 |
| 7 | 12969053 | 12969525 | intergenic | ENST00000441256 | RBMX2P4 | −1.31 | 3.5E−04 | 472 |
| X | 117907769 | 117908146 | intron | ENST00000371637 | IL13RA1 | −1.28 | 2.2E−04 | 377 |
| 1 | 12050437 | 12051116 | intron | ENST00000412236 | MFN2 | 1.27 | 8.3E−04 | 679 |
| 4 | 171147427 | 171147816 | intergenic | ENST00000504509 | RP11-789C1.1 | −1.58 | 8.7E−04 | 389 |
| 12 | 13158692 | 13159059 | intron | ENST00000543321 | RP11-377D9.3 | −1.66 | 2.7E−04 | 367 |

TABLE 1-continued

| Chr | Start | End | Annotation | Transcript_id | Gene symbol | Fold Change | P-value (adj) | Peak width (bp) |
|---|---|---|---|---|---|---|---|---|
| 8 | 29595979 | 29596739 | intron | ENST00000506121 | LINC00589 | −1.10 | 3.4E−05 | 760 |
| 8 | 22312699 | 22313062 | intron | ENST00000522000 | PPP3CC | −1.41 | 2.6E−04 | 363 |
| 4 | 103811017 | 103811934 | intron | ENST00000514972 | SLC9B1 | −1.11 | 5.3E−04 | 917 |
| 8 | 8549498 | 8549897 | intergenic | ENST00000519106 | CLDN23 | −1.38 | 3.2E−04 | 399 |
| 4 | 106818891 | 106819676 | promoter | ENST00000513430 | NPNT | −1.04 | 7.7E−04 | 785 |
| 10 | 6343519 | 6344014 | intron | ENST00000399868 | RP11-563J2.2 | −1.02 | 2.6E−04 | 495 |
| 9 | 78528856 | 78529314 | promoter | ENST00000459505 | AL359253.1 | −1.59 | 9.4E−06 | 458 |
| 5 | 17114415 | 17114792 | intron | ENST00000606445 | BASP1 | −1.06 | 3.2E−04 | 377 |
| X | 15624226 | 15624853 | intron | ENST00000421585 | GS1-594A7.3 | −1.44 | 5.7E−04 | 627 |
| 18 | 21189439 | 21189988 | intron | ENST00000591617 | ANKRD29 | −1.54 | 1.6E−05 | 549 |
| 10 | 115312349 | 115312929 | promoter | ENST00000541666 | HABP2 | −1.19 | 9.3E−04 | 580 |
| 6 | 119915982 | 119916519 | intergenic | ENST00000368468 | MAN1A1 | −1.26 | 8.3E−04 | 537 |
| 19 | 39646961 | 39647663 | promoter | ENST00000599657 | PAK4 | 1.28 | 2.7E−04 | 702 |
| 4 | 157873335 | 157873855 | intron | ENST00000422544 | PDGFC | −1.58 | 3.2E−04 | 520 |
| 4 | 77510524 | 77510923 | intron | ENST00000485780 | SHROOM3 | −1.06 | 2.6E−04 | 399 |
| 3 | 7246159 | 7246840 | intron | ENST00000435689 | GRM7 | −1.25 | 7.7E−04 | 681 |
| 18 | 9673064 | 9673873 | intergenic | ENST00000581937 | KRT18P8 | −1.16 | 5.7E−04 | 809 |
| 18 | 71068317 | 71068856 | intron | ENST00000563172 | CTD-2354A18.1 | −1.22 | 8.9E−04 | 539 |
| 4 | 18814749 | 18815500 | intergenic | ENST00000503815 | RP11-608B3.1 | −1.54 | 6.5E−04 | 751 |
| 18 | 9736984 | 9737287 | promoter | ENST00000578806 | RP11-692N5.2 | −1.58 | 7.5E−04 | 303 |
| 12 | 21597079 | 21597766 | intron | ENST00000538582 | PYROXD1 | −1.38 | 7.6E−05 | 687 |
| 18 | 28981489 | 28981834 | intron | ENST00000581452 | RP11-534N16.1 | −1.56 | 5.4E−04 | 345 |
| 5 | 37165920 | 37166523 | intron | ENST00000511824 | C5orf42 | −1.15 | 1.4E−04 | 603 |
| 12 | 60566172 | 60566790 | intergenic | ENST00000551882 | RP11-335M9.1 | −1.26 | 6.7E−04 | 618 |
| 18 | 26372413 | 26372889 | intergenic | ENST00000582726 | RP11-510D21.1 | −1.30 | 1.3E−04 | 476 |
| X | 3631095 | 3632157 | intron | ENST00000262848 | PRKX | −1.25 | 2.1E−06 | 1062 |
| 18 | 3250757 | 3251051 | promoter | ENST00000578562 | MYL12A | −1.05 | 8.9E−04 | 294 |
| 18 | 65288323 | 65288979 | intron | ENST00000583687 | RP11-638L3.1 | −1.51 | 4.2E−04 | 656 |
| 5 | 144843814 | 144844163 | intergenic | ENST00000510259 | PRELID2 | −1.41 | 1.0E−04 | 349 |
| 18 | 21544367 | 21545241 | intron | ENST00000582300 | RP11-403A21.1 | −1.06 | 4.2E−04 | 874 |
| 12 | 71557965 | 71558303 | intron | ENST00000549421 | TSPAN8 | −1.61 | 1.8E−04 | 338 |
| 12 | 13025022 | 13026103 | intergenic | ENST00000459725 | RPL13AP20 | −1.09 | 2.5E−04 | 1081 |
| 12 | 71555389 | 71555659 | intron | ENST00000549421 | TSPAN8 | −1.60 | 5.5E−04 | 270 |
| 5 | 54660393 | 54660916 | intron | ENST00000545714 | SKIV2L2 | −1.16 | 7.1E−04 | 523 |
| 6 | 106894847 | 106895225 | intergenic | ENST00000365516 | RNA5SP211 | −1.80 | 2.0E−04 | 378 |
| X | 77192772 | 77193146 | intron | ENST00000602791 | RP5-1000K24.2 | −1.23 | 2.4E−04 | 374 |
| 18 | 12000289 | 12000722 | promoter | ENST00000588863 | IMPA2 | −2.16 | 3.4E−05 | 433 |
| 18 | 3456781 | 3457062 | promoter | ENST00000472042 | TGIF1 | −1.75 | 3.1E−05 | 281 |
| 5 | 43893907 | 43894383 | intergenic | ENST00000508829 | RP11-8L21.1 | −1.61 | 1.2E−04 | 476 |
| 13 | 35515748 | 35516975 | promoter | ENST00000379939 | NBEA | −1.58 | 3.8E−11 | 1227 |
| 18 | 26374435 | 26374857 | intergenic | ENST00000582726 | RP11-510D21.1 | −1.31 | 2.1E−04 | 422 |
| 15 | 89668375 | 89668644 | intron | ENST00000562073 | ABHD2 | −1.65 | 2.6E−04 | 269 |
| 4 | 37978642 | 37979668 | promoter | ENST00000446803 | TBC1D1 | −1.06 | 6.4E−05 | 1026 |
| 13 | 77498752 | 77499091 | intergenic | ENST00000426582 | BTF3P11 | −1.37 | 8.4E−04 | 339 |
| X | 105961933 | 105962318 | intron | ENST00000324342 | RNF128 | −1.51 | 9.7E−04 | 385 |
| 14 | 56355837 | 56356276 | intergenic | ENST00000569625 | RP11-1012E15.1 | −1.08 | 3.5E−04 | 439 |
| 3 | 66543117 | 66543471 | intron | ENST00000475366 | LRIG1 | −1.23 | 1.5E−04 | 354 |
| 4 | 4501198 | 4501552 | intron | ENST00000512780 | STX18 | −1.44 | 8.4E−04 | 354 |
| 15 | 90401815 | 90402255 | intron | ENST00000559629 | C15orf38-AP3S2 | −1.93 | 2.5E−05 | 440 |
| 7 | 13005419 | 13005842 | intergenic | ENST00000441256 | RBMX2P4 | −1.15 | 2.6E−04 | 423 |
| 14 | 37798337 | 37798669 | intron | ENST00000556940 | MIPOL1 | −1.52 | 6.7E−06 | 332 |
| 17 | 48774453 | 48774711 | promoter | ENST00000364470 | Y_RNA | −1.16 | 6.7E−04 | 258 |
| 13 | 32519681 | 32520190 | intron | ENST00000428783 | EEF1DP3 | −1.12 | 7.1E−06 | 509 |
| 17 | 10640501 | 10640980 | intron | ENST00000583012 | CTC-297N7.5 | −1.12 | 5.2E−05 | 479 |
| 8 | 142140988 | 142141629 | promoter | ENST00000517908 | RP11-809O17.1 | 1.23 | 3.7E−04 | 641 |
| 9 | 45008582 | 45009082 | intron | ENST00000421848 | RP11-374M1.4 | −1.17 | 6.0E−04 | 500 |
| 18 | 19748853 | 19749787 | promoter | ENST00000583490 | GATA6-AS1 | −1.54 | 1.0E−06 | 934 |
| 8 | 17646298 | 17647375 | intron | ENST00000381862 | MTUS1 | −1.20 | 5.7E−04 | 1077 |
| 17 | 618801 | 619322 | promoter | ENST00000437048 | VPS53 | −1.27 | 6.7E−04 | 521 |
| 13 | 93125967 | 93126657 | intron | ENST00000377067 | GPC5 | −1.64 | 6.0E−04 | 690 |
| 10 | 65479061 | 65479739 | intron | ENST00000444770 | RP11-170M17.1 | −1.72 | 1.2E−06 | 678 |
| 3 | 19189370 | 19190217 | promoter | ENST00000452398 | KCNH8 | −1.61 | 1.6E−05 | 847 |
| 1 | 59245356 | 59246066 | intergenic | ENST00000371222 | JUN | −1.23 | 4.7E−05 | 710 |
| 9 | 105629671 | 105630230 | intergenic | ENST00000430854 | RP11-338N12.1 | −1.17 | 6.0E−04 | 559 |
| 2 | 134946547 | 134947309 | intron | ENST00000409645 | MGAT5 | −1.11 | 8.1E−04 | 762 |
| 12 | 113905094 | 113906232 | intron | ENST00000261731 | LHX5 | 1.03 | 7.6E−04 | 1138 |
| 13 | 78271260 | 78272125 | promoter | ENST00000466548 | SLAIN1 | −1.58 | 4.6E−08 | 865 |
| 14 | 68658282 | 68659082 | intron | ENST00000557045 | RAD51B | −1.08 | 4.4E−05 | 800 |
| X | 22003441 | 22003730 | intron | ENST00000415881 | SMS | −1.08 | 1.9E−04 | 289 |
| 7 | 38903200 | 38903772 | intron | ENST00000457055 | VPS41 | −1.16 | 4.2E−06 | 572 |
| 17 | 53510366 | 53511001 | intergenic | ENST00000262065 | MMD | −1.11 | 1.7E−04 | 635 |
| 3 | 194353440 | 194354066 | intergenic | ENST00000447139 | AC046143.3 | 1.07 | 8.2E−04 | 224 |
| 12 | 15373831 | 15374573 | promoter | ENST00000537717 | RERG | −1.02 | 2.1E−05 | 742 |
| 15 | 52199610 | 52200183 | promoter | ENST00000606352 | U6 | −1.12 | 2.3E−08 | 573 |
| Y | 2476943 | 2477666 | intergenic | ENST00000516032 | RNU6-1334P | −1.19 | 1.4E−04 | 723 |
| 17 | 46024345 | 46024764 | promoter | ENST00000580372 | RP11-6N17.6 | −1.16 | 9.1E−04 | 419 |
| X | 1710260 | 1710695 | promoter | ENST00000381261 | AKAP17A | −1.01 | 6.7E−04 | 435 |

TABLE 1-continued

| Chr | Start | End | Annotation | Transcript_id | Gene symbol | Fold Change | P-value (adj) | Peak width (bp) |
|---|---|---|---|---|---|---|---|---|
| Y | 2558832 | 2559585 | intergenic | ENST00000516032 | RNU6-1334P | −1.33 | 8.4E−07 | 753 |
| 18 | 23806089 | 23807166 | promoter | ENST00000418698 | TAF4B | −1.39 | 2.7E−05 | 1077 |
| 4 | 69598563 | 69599228 | intergenic | ENST00000509261 | RP11-1267H10.4 | −1.31 | 9.2E−08 | 665 |
| 12 | 6419391 | 6420221 | promoter | ENST00000396988 | PLEKHG6 | −1.05 | 4.5E−04 | 830 |
| 18 | 2984812 | 2985290 | promoter | ENST00000584915 | LPIN2 | −1.58 | 6.0E−05 | 478 |
| X | 20392961 | 20393546 | intergenic | ENST00000517169 | RN7SKP183 | −1.03 | 8.9E−04 | 585 |
| 15 | 66124847 | 66125582 | intron | ENST00000568850 | RAB11A | −1.07 | 6.5E−06 | 735 |
| 4 | 119273882 | 119274465 | promoter | ENST00000296498 | PRSS12 | −1.00 | 5.3E−05 | 583 |
| 3 | 19188141 | 19189179 | promoter | ENST00000328405 | KCNH8 | −1.13 | 2.3E−04 | 1038 |
| 11 | 94335540 | 94336653 | intron | ENST00000537874 | RP11-867G2.8 | −1.14 | 1.1E−05 | 1113 |
| 18 | 29665492 | 29665879 | intron | ENST00000583184 | RP11-53I6.2 | −1.70 | 2.9E−04 | 387 |
| 5 | 176513355 | 176514471 | promoter | ENST00000513166 | FGFR4 | −1.02 | 2.6E−04 | 1116 |
| 18 | 12376764 | 12377928 | promoter | ENST00000590811 | AFG3L2 | −1.05 | 4.2E−04 | 1164 |
| X | 33780627 | 33780788 | intron | ENST00000445233 | RP11-305F18.1 | −1.32 | 9.7E−04 | 161 |
| X | 83441953 | 83443818 | promoter | ENST00000460730 | RPS6KA6 | −1.04 | 1.3E−04 | 1865 |
| 4 | 15679072 | 15679693 | intron | ENST00000514541 | FBXL5 | −1.30 | 6.6E−10 | 621 |
| 3 | 194432537 | 194433012 | intron | ENST00000423318 | AC090505.6 | 1.01 | 6.1E−04 | 475 |
| 17 | 36070163 | 36070788 | intron | ENST00000560016 | HNF1B | −1.79 | 6.3E−11 | 625 |
| 18 | 28551397 | 28551656 | intron | ENST00000583580 | RP11-25I11.1 | −1.93 | 8.6E−05 | 259 |
| 18 | 21795580 | 21796435 | promoter | ENST00000384039 | RNU6-435P | −1.00 | 9.5E−04 | 855 |
| 4 | 89897580 | 89898181 | intron | ENST00000509094 | FAM13A | −1.15 | 9.6E−04 | 601 |
| 8 | 40013191 | 40014286 | intergenic | ENST00000315792 | C8orf4 | −1.03 | 3.5E−04 | 1095 |
| 4 | 52883991 | 52884363 | promoter | ENST00000343457 | LRRC66 | −1.30 | 2.6E−04 | 372 |
| 3 | 66692481 | 66692862 | intergenic | ENST00000459863 | RPL21P41 | −1.43 | 8.0E−04 | 381 |
| 18 | 19748357 | 19748632 | promoter | ENST00000579431 | GATA6-AS1 | −1.26 | 1.8E−04 | 275 |
| 5 | 58145773 | 58146112 | intron | ENST00000510198 | CTD-2176I21.2 | −1.35 | 1.2E−05 | 339 |
| 5 | 40485204 | 40485821 | intergenic | ENST00000583717 | AC108105.1 | −1.22 | 2.4E−04 | 617 |
| 7 | 64532350 | 64532740 | promoter | ENST00000384334 | SNORA15 | −1.70 | 6.4E−06 | 390 |
| 18 | 21450963 | 21451245 | promoter | ENST00000269217 | LAMA3 | −1.41 | 1.8E−07 | 282 |
| 15 | 57899754 | 57900281 | intron | ENST00000569089 | MYZAP | −1.17 | 1.9E−06 | 527 |
| 12 | 27425172 | 27426386 | intron | ENST00000543246 | STK38L | −1.11 | 2.0E−05 | 1214 |
| 2 | 306486 | 306655 | promoter | ENST00000592090 | AC079779.5 | 1.89 | 9.5E−05 | 169 |
| 16 | 83983871 | 83984533 | promoter | ENST00000361711 | OSGIN1 | 1.35 | 7.1E−05 | 662 |
| 7 | 591580 | 592225 | promoter | ENST00000517177 | AC147651.2 | 1.23 | 1.8E−04 | 645 |
| Median | | | | | | | | 595.5 |
| Min. | | | | | | | | 151 |
| Max. | | | | | | | | 2612 |

Figure 14A:
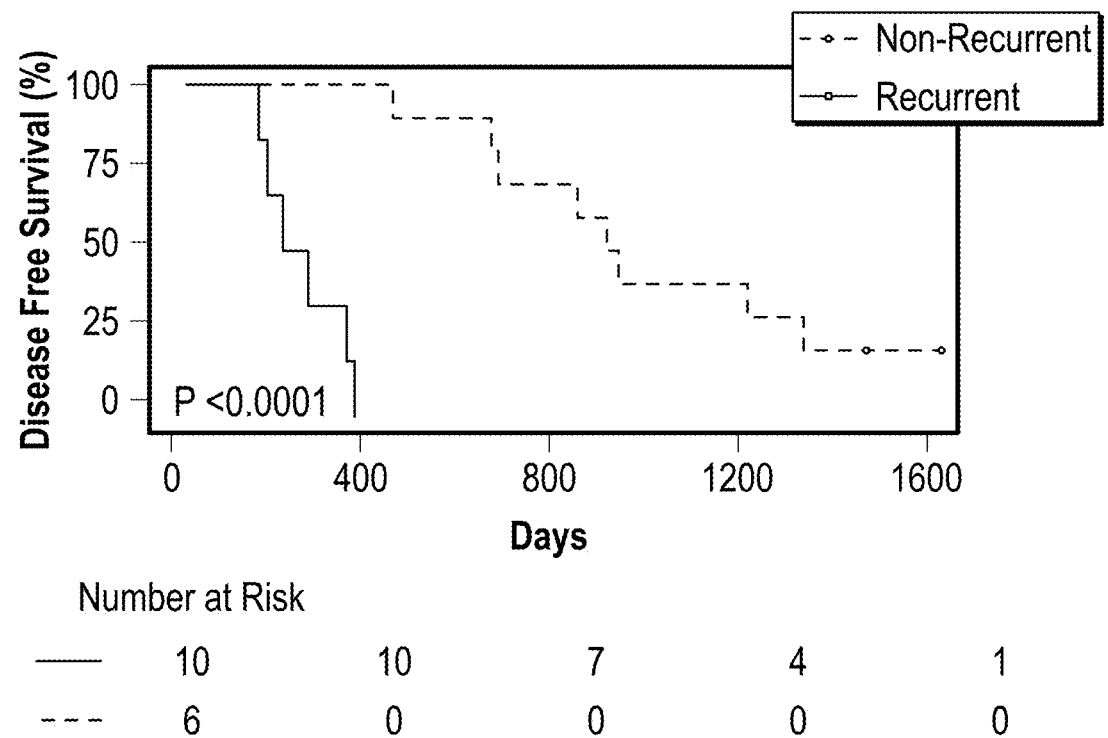
FIG. 14A shows a Kaplan-Meier graph showing the segregation of the recurrent (n=6) and non-recurrent (n=10) group of patients with a median 4.15 (min=3.18, and max=4.75) years of follow up (log rank P<0.0001, HR 0.1579, 95% CI of HR 0.02877 to 0.8665.
Figure 14B:
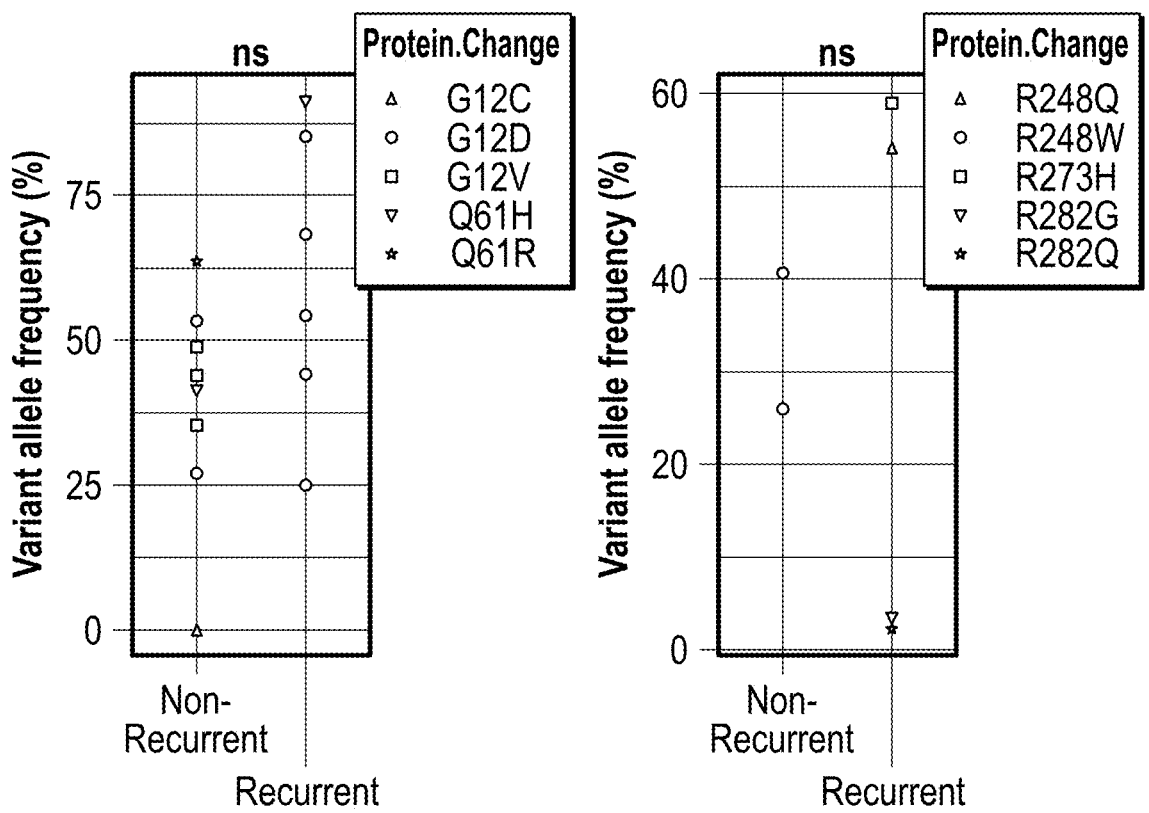
FIG. 14B depicts non-significant differences of KRAS (left) and TP53 (right) variant allele frequencies (different dots represent different canonical variant alleles).
Figure 14C:
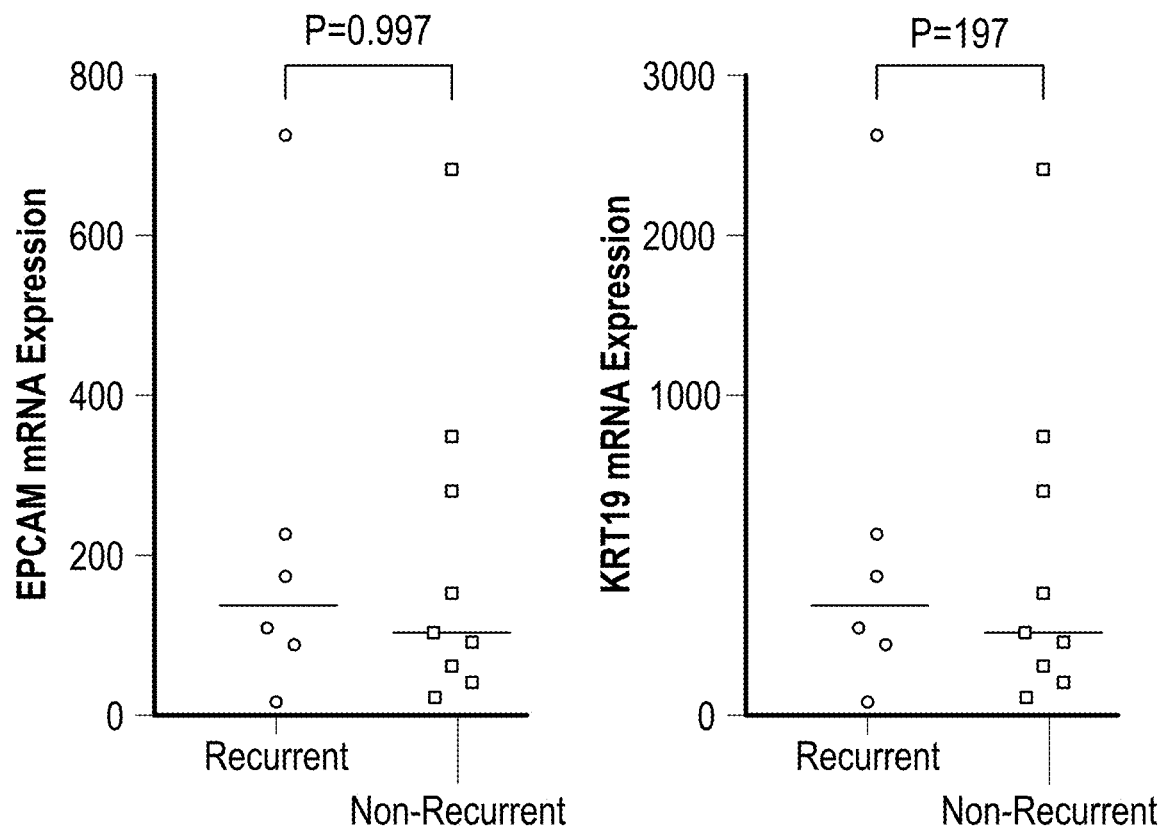
FIG. 14C shows non-significant differences of EpCAM and KRT19 mRNA expression between the recurrent (n=6) and non-recurrent (n=10) groups (unpaired two tailed t-test with P<0.05 is significant).

Cox regression was applied to evaluate the confounding effect of age, sex and cellularity on DFS. FIG. 14A shows the Kaplan-Meier curve (log rank P<0.0001, HR 0.1579, 95% CI of HR 0.02877 to 0.8665, median DFS recurrent 236.5 and non-recurrent 927.5 days) with a median 4.15 (min=3.18, max=4.75) years of follow up on the discovery set patients (n=16) and adjusting for age, sex and cellularity (KRAS variant allele frequency). Neither the variant allele frequencies for KRAS and TP53 nor levels of EpCAM and KRT19 gene expression were significantly different between the 6 recurrent and 10 non-recurrent patients (see FIGS. 14B and 14C), confirming no confounding effect of epithelial cellularity on the discovery of the differentially accessible 1092 chromatin peak signature.

Figure 2:
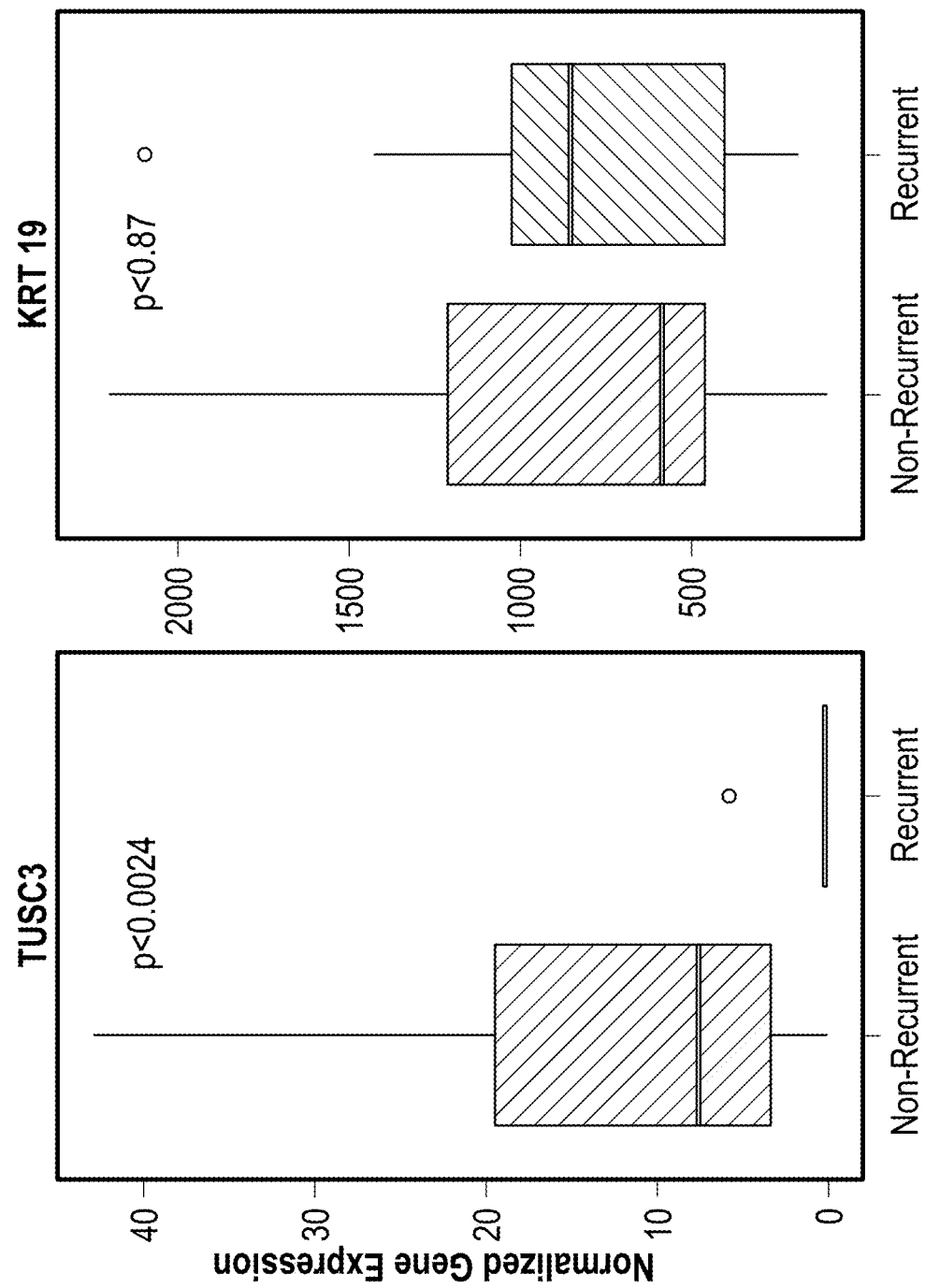
FIG. 2 is a set of graphs showing mRNA expression for TUSC3 (left panel) and KRT19 (right panel) as an internal control. The putative promoter region of TUSC3 gene was less accessible in the recurrent tumors (not shown) and, consistent with this observation, mRNA expression of TUSC3 was significantly downregulated.
Figure 15A:
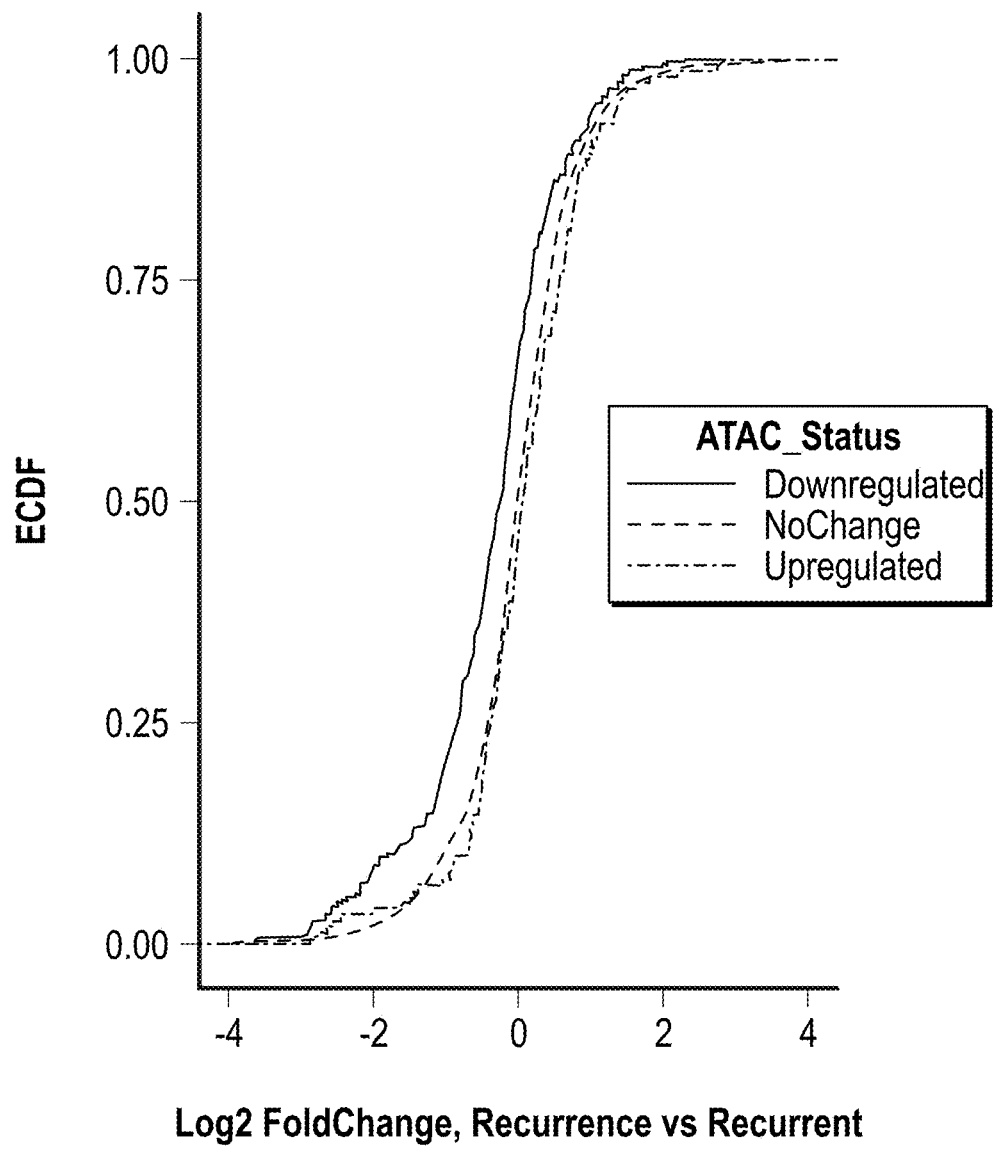
FIG. 15A shows empirical cumulative distribution frequency (ECDF) of expressed genes annotated to ATAC-seq peaks comparing the expression of downregulated and the upregulated genes with the unaltered set of genes (statistical test is Kolmogorov-Smirnov test).

Interestingly, expression of genes associated with differentially closed peaks was significantly downregulated in EpCAM+ cells of the recurrent versus non-recurrent tumors (P<2.5×10$^{-9}$, KS test), but expression of genes near differentially open peaks was not significantly upregulated compared to the background of genes near unchanged peaks (see FIG. 15A). The putative promoter region of TUSC3 gene was less accessible in the recurrent tumors, consistent with its mRNA expression (shown in FIG. 2). The promoter region of KRT19 (as internal control), a marker gene for pancreatic ductal cells, showed no difference in accessibility and no change in mRNA expression. The promoter region of KRT19 (as internal control), a marker gene for pancreatic ductal differentiation, showed no difference in accessibility and no differences in mRNA expression between groups. These loci were interrogated in the ENCODE database for a pancreatic cancer cell line (Panc-1) and two normal pancreatic cell lines (HPDE, pancreas BC). The TUSC3 promoter region displayed hypermethylation in Panc-1 and hypomethylation in pancreas BC, whereas hypomethylation at the KRT19 region was visible in both the cells showed. Also, there was no DNase 1 hypersensitive site (DHS) detected at the TUSC3 promoter in Panc-1, while it was clearly detected in HPDE.

Figure 3:
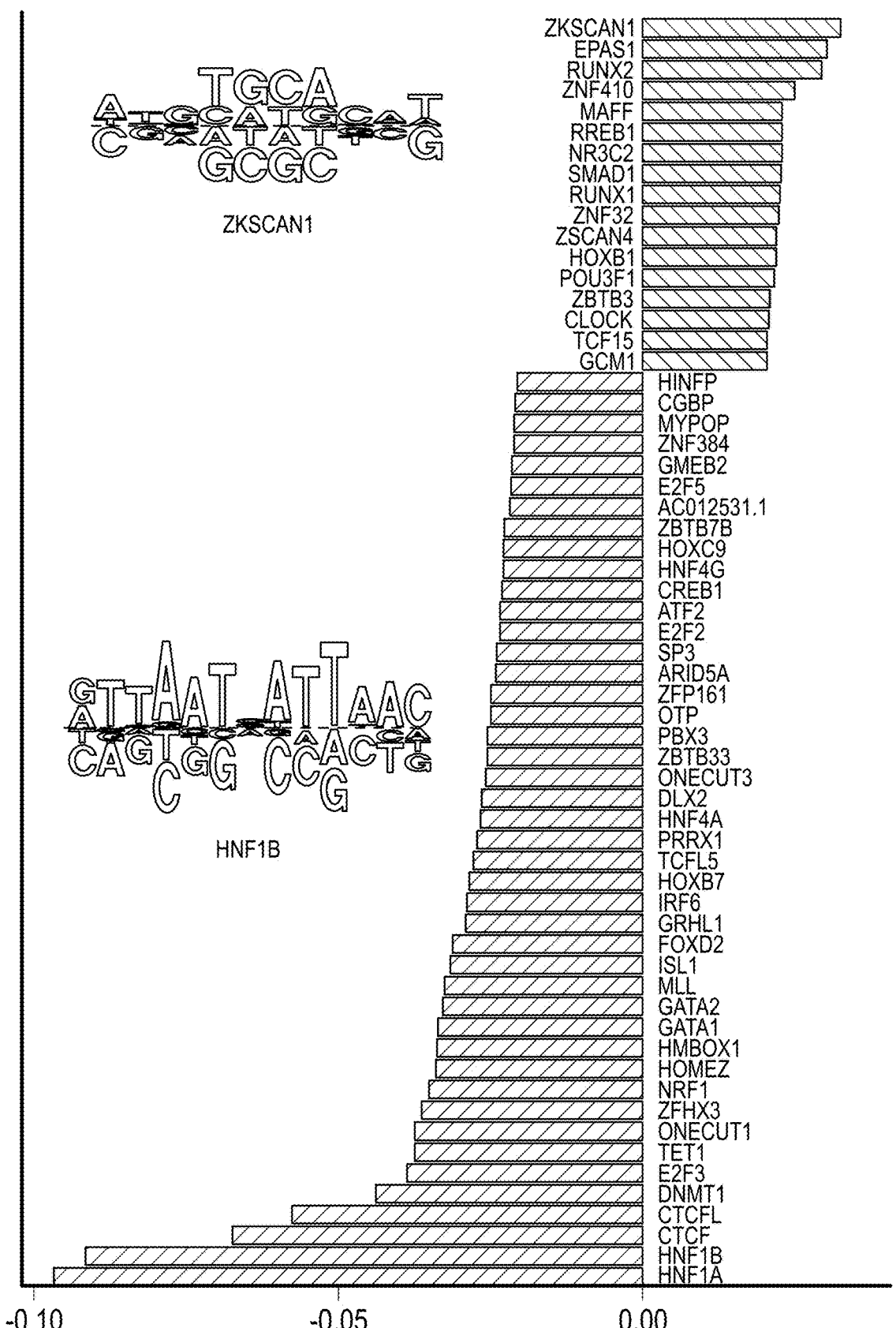
FIG. 3 depicts the sixty one (61) TFs identified whose motifs were differentially open in recurrent (17 motifs) and non-recurrent (44 motifs) patients. Two TFs—ZKSCAN1 and HNFIB—were selected for further analysis.

Through the transcription factor (TF) binding motif analysis and predictive modeling on these open chromatin peaks, sixty one (61) TFs were identified whose motifs were differentially open in recurrent (17 motifs) and non-recurrent (44 motifs) patients as in FIG. 3.

Table 2A includes the 17 transcription factors whose motifs were differentially open in recurrent patients, while Table 2B includes the 44 transcription factors whose motifs were differentially open in non-recurrent patients.

TABLE 2A

TFs whose motifs were open in recurrent patients

| | | | | |
|---|---|---|---|---|
| ZKSCAN1 | MAFF | RUNX1 | POU3F1 | GCM1 |
| EPAS1 | RREB1 | ZNF32 | ZBTB3 | |
| RUNX2 | NR3C2 | ZSCAN4 | CLOCK | |
| ZNF410 | SMAD1 | HOXB1 | TCF15 | |

TABLE 2B

| TFs whose motifs were open in non-recurrent patients | | | | |
|---|---|---|---|---|
| HINFP | HNF4G | ZBTB33 | FOXD2 | ONECUT1 |
| CGBP | CREB1 | ONECUT3 | ISL1 | TET1 |
| MYPOP | ATF2 | DLX2 | MLL | E2F3 |
| ZNF384 | E2F2 | HNF4A | GATA2 | DNMT1 |
| GMEB2 | SP3 | PRRX1 | GATA1 | CTCFL |
| E2F5 | ARID5A | TCFL5 | HMBOX1 | CTCF |
| AC012531.1 | ZFP161 | HOXB7 | HOMEZ | HNF1B |
| ZBTB7B | OTP | IRF6 | NRF1 | HNF1A |
| HOXC9 | PBX3 | GRHL1 | ZFHX3 | |

Nuclear localization of two TFs from this analysis, ZKSCAN1 and HNF1b, associated with recurrent and non-recurrent groups respectively, were confirmed by immunohistochemistry (IHC) and immunofluorescence (IF) staining on the tissue microarrays (TMAs) on a subset of this cohort (N=40).

Figure 4A:
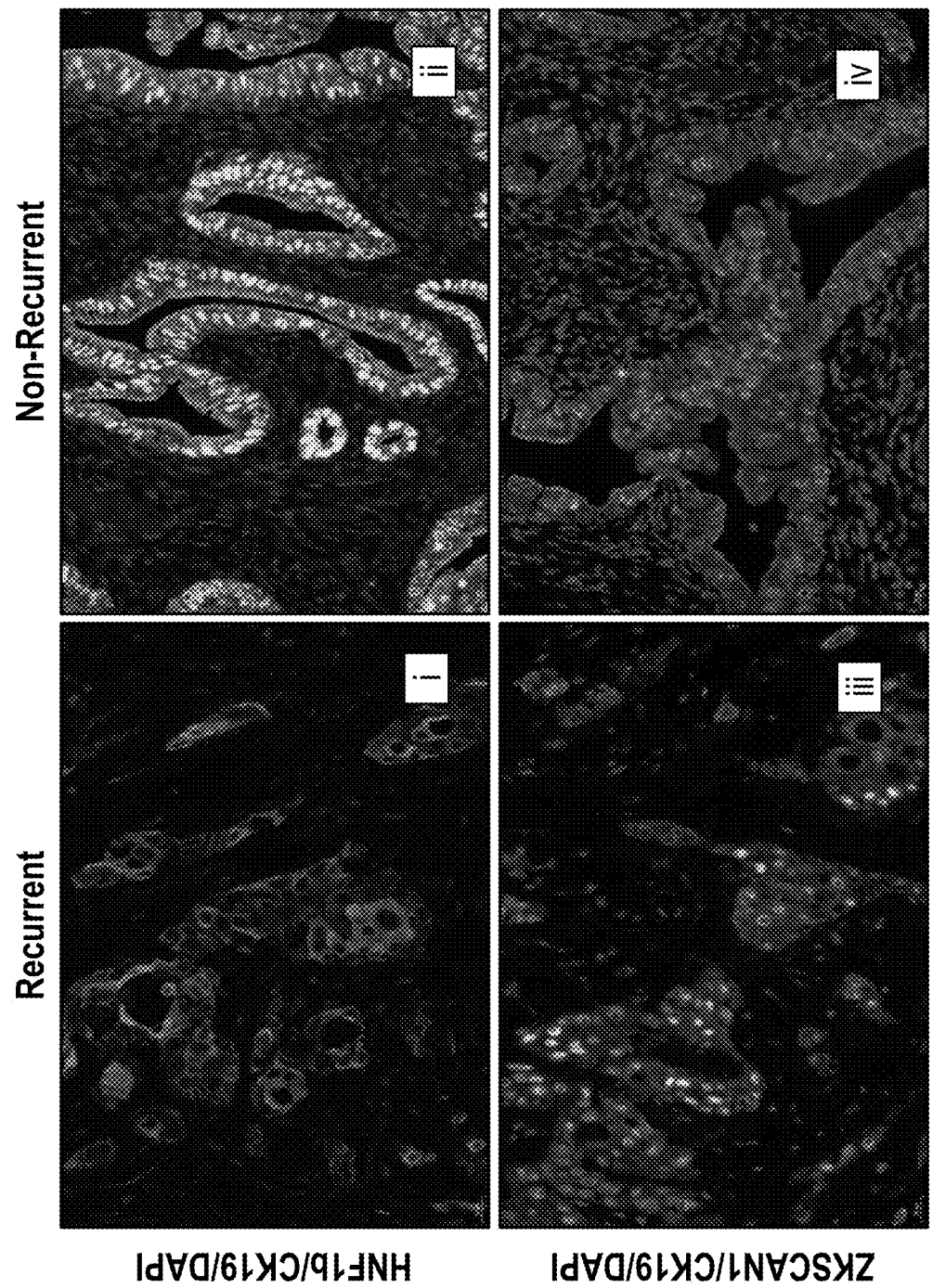
FIG. 4A shows nuclear localization of HNF1b (panels i and ii) and ZKSCAN1 (panels iii and iv) by immunofluorescence in non-recurrent (panels ii and iv) compared to recurrent (panels i and iii) patients.

FIG. 4A shows the nuclear staining patterns of HNF1b and ZKSCAN1 in representative recurrent (i and iii, respectively) and non-recurrent (ii and iv, respectively) patients. HNF1b nuclear staining was either completely absent or weak in recurrent patients and strong in non-recurrent patients ($p<0.0067$, Fisher's exact test). Although differential localization of ZKSCAN1 was not as dramatic, we found nuclear staining of ZKSCAN1 in recurrent patients, contrasting with weak staining in non-recurrent patients (not significantly associated with recurrence, Fisher's exact test).

Figure 4B:
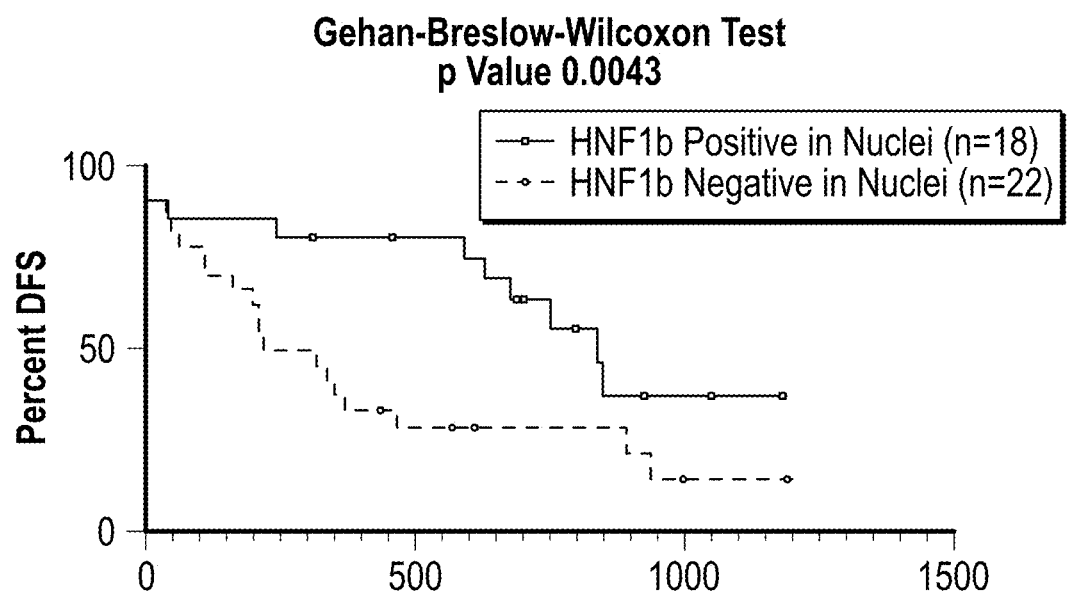
FIG. 4B is a Kaplan-Meier curve of the patients with and without nuclear localization of HNF1b.

Kaplan-Meier analysis showed significant segregation of the patients showing strong nuclear localization versus patients showing weak/no nuclear localization of HNF1b as shown in FIG. 4B (Gehan-Breslow-Wilcoxon test $p=0.0043$, $n=40$), but that of ZKSCAN1 did not show a significant segregation (data not shown).

Figure 15B:
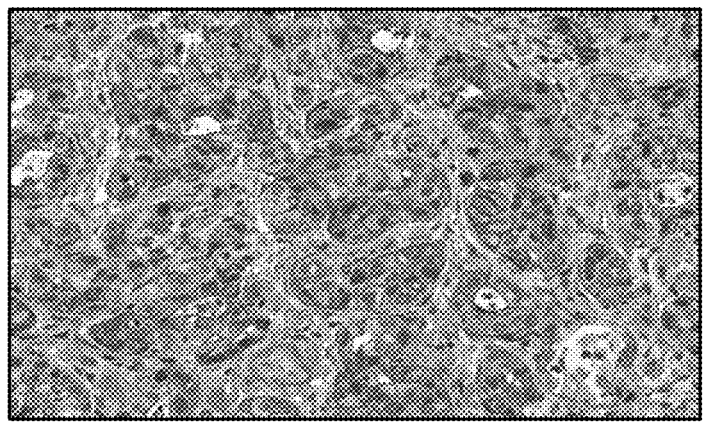
FIG. 15B shows cytoplasmic and FIG. 15C shows nuclear staining of HNF1b by immunohistochemistry on the TMA sections. Scale bars are 20 µM as displayed at the left bottom corners of all the micrographs.
Figure 15C:
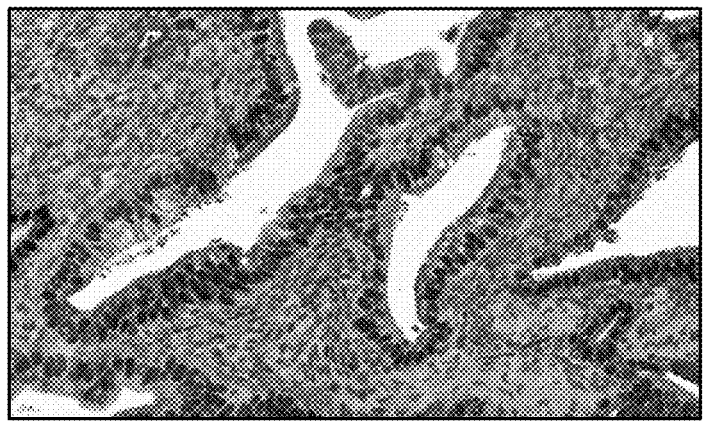

Nuclear staining was considered to be a positive indicator of nuclear localization of the TFs (see FIGS. 15B and 15C).

Table 3 shows the association of nuclear localization of HNF1b and ZKSCAN1 with recurrence.

| | HNF1b Nuclear Staining | | ZKSCAN1 Nuclear Staining | |
|---|---|---|---|---|
| | Recurred (n) | Not-recurred (n) | Recurred (n) | Not-recurred (n) |
| Absent or weak | 12 | 8 | 6 | 6 |
| Strong | 2 | 13 | 9 | 15 |
| | Fisher's exact test: $p < 0.007$ | | Fisher's exact test: p = n.s. | |

HNF1b and ZKSCAN1 staining was further validated on another independent archival PDAC cohort (N=97), where the short-term survivors (N=45) with median overall survival (OS) 6 months and the long-term survivors (N=52) with median OS 6 years were already preselected.

Only rare cells with HNF1b nuclear staining were observed in the tumors of short-term survivors, but many such cell were observed in long-term survivors. By quantitative estimation of the proportion of nuclear-positive cells, the long-term survivors showed a 52-fold increase in HNF1b nuclear localization compared to short-term survivors. Conversely, ZKSCAN1 was 5.3-fold lower in long-term survivors compared to short-term survivors. For both TFs, a simple determination of total area staining positive was much less discriminative. Consistent with the fact that differential TF localization can occur without changes in their gene expression, we saw no difference in normalized gene expression of either HNF1b or ZKSCAN1, suggesting that the nuclear localization of these TFs, but not their overall expression, is predictive of recurrence. These studies demonstrate that the expression and localization of HNF1b protein, a transcription factor identified through unbiased assessment of chromatin accessibility, is different between samples with short and long DFS.

Thus, the chromatin accessibility signature and the differential nuclear localization of TFs predict the post-resection early recurrence of PDAC with remarkable accuracy. No other existing method is capable of such accuracy. Indeed, no existing technology can predict the potential risk of post-resection early recurrence in PDAC. The present disclosure provides the first array of its kind, which will predict early recurrence of human PDAC.

Figure 5:
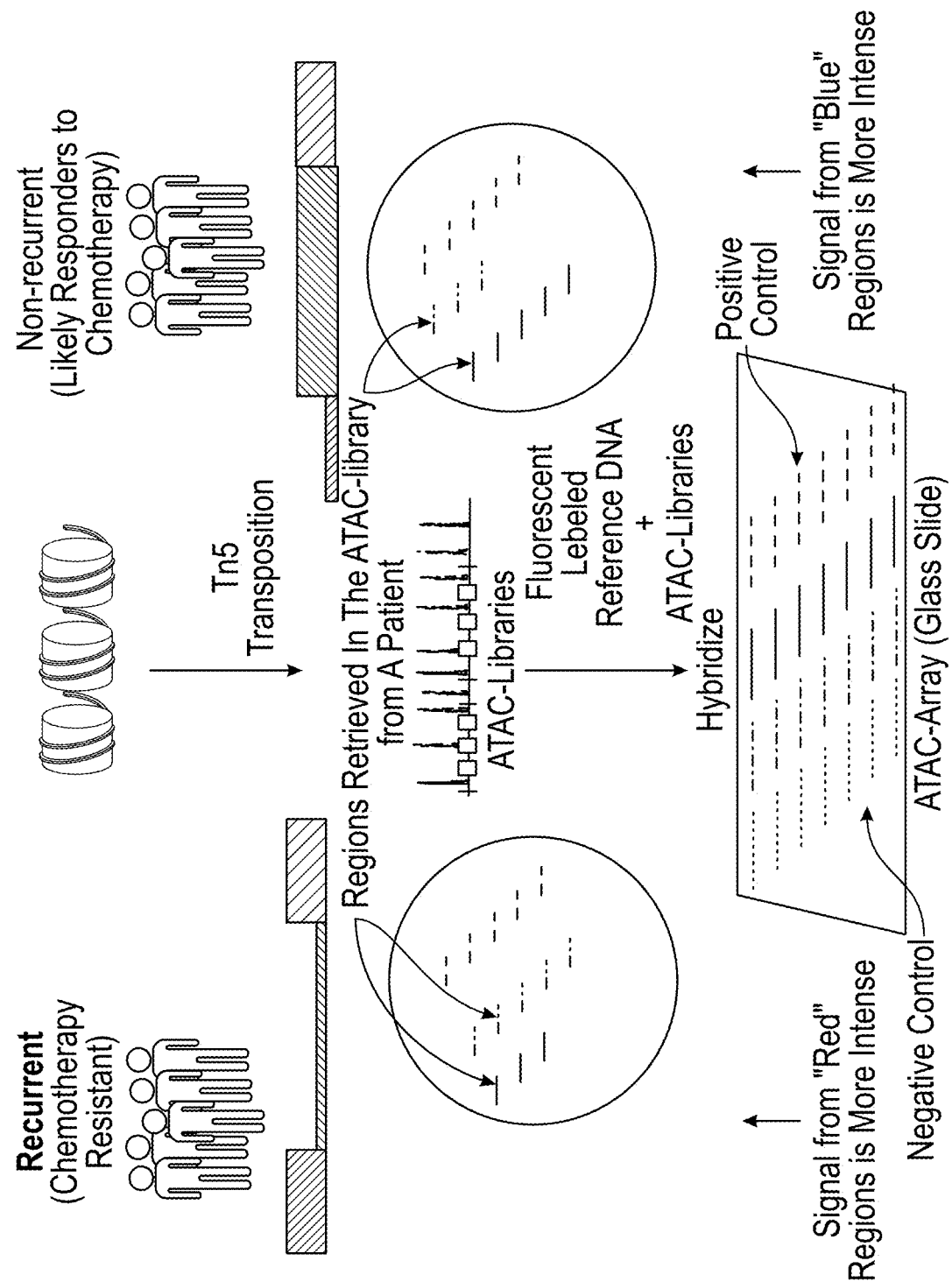
FIG. 5 depicts a schematic representation of an exemplary ATAC-array approach described herein.
Figure 6A:
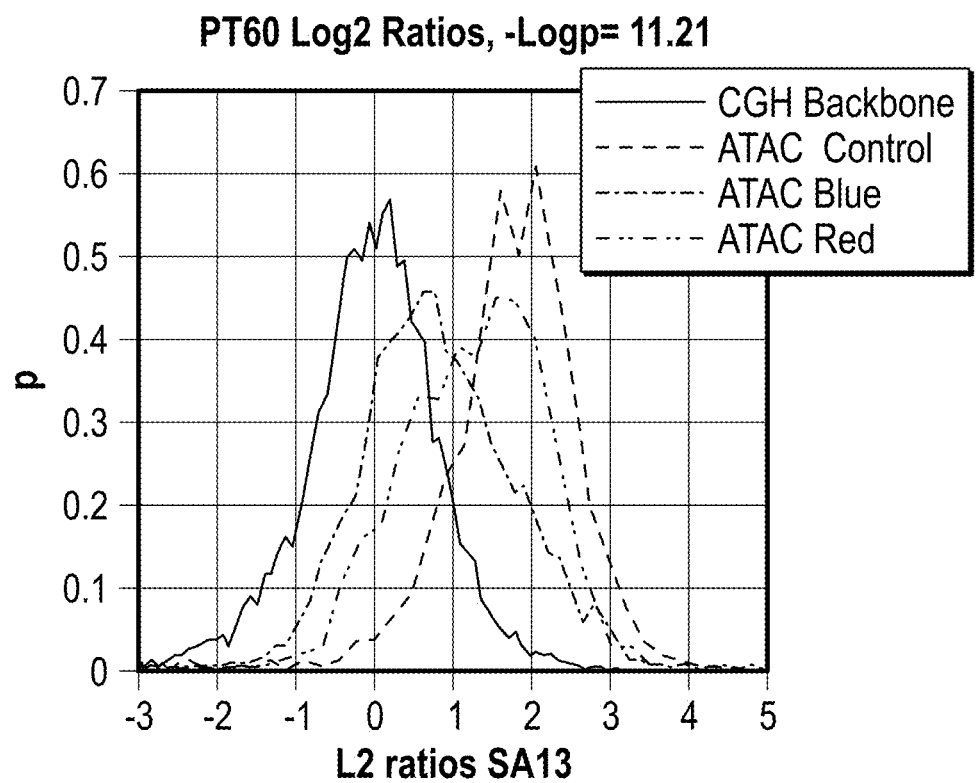
FIG. 6A and FIG. 6B depict exemplary histogram results of the ATAC-array showing the differential enrichment of peaks from a recurrent (6A) and non-recurrent (6B) patient.
Figure 6B:
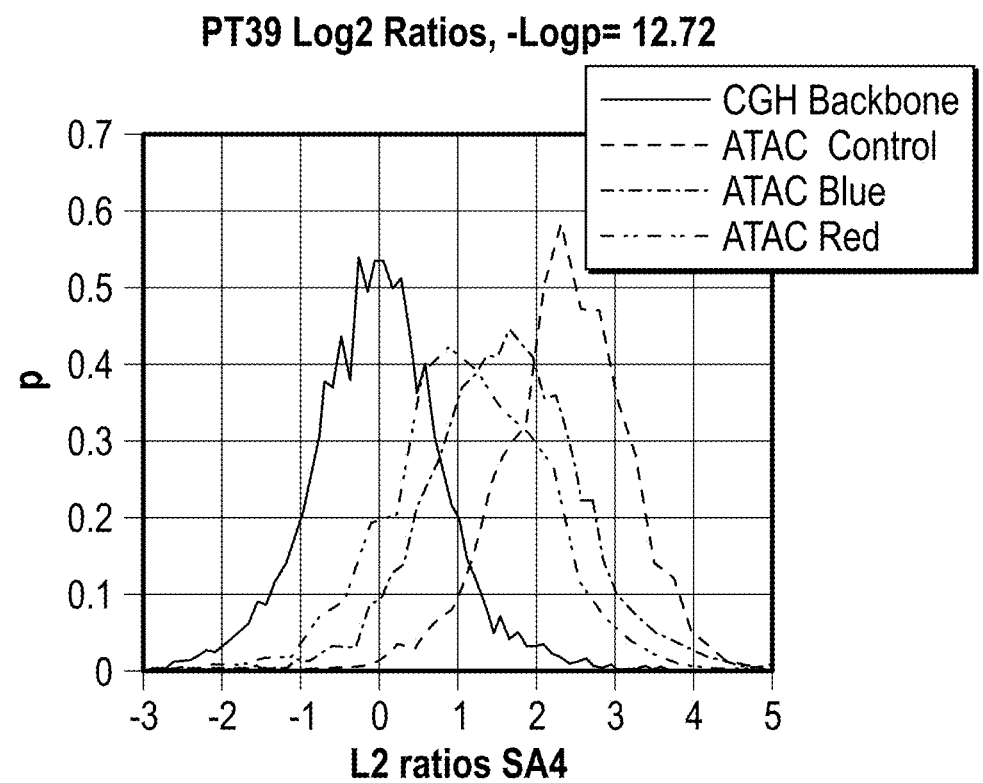

Example 2: Array Methodology (A) Array Preparation:

ATAC-array platform technology was developed in order to cross-validate the chromatin accessibility signature (as obtained by ATAC-seq above) classifying PDAC patients into recurrent and non-recurrent groups. FIG. 5 provides a schematic representation of an exemplary ATAC-array approach described herein.

An array was prepared on a desired format. The array was prepared by taking the coordinates of previously identified open chromatin peaks, the start and end loci. Complementary sequences were placed on a solid platform on an array format following the protocol of the manufacturer.

An exemplary PDAC array may target at least 100, at least 200, at least 300, at least 400, at least 500, at least 600, at least 700, at least 800, at least 900, at least 1000, or alternatively, all 1092 chromatin regions identified in Table 1.

In particular, to validate the signature obtained by ATAC-seq, a custom microarray (using an aCGH-array from Agilent Technologies) was prepared with 932 out of 1092 regions from the chromatin accessibility signature (244 regions that were opened in recurrent but silenced in non-recurrent group+688 regions that were opened in non-recurrent group but silenced in recurrent group) along with 312 control regions (opened in both recurrent and non-recurrent groups).

(B) Library Preparation:

ATAC libraries were prepared as described in detail below. Briefly, intact nuclei were extracted from a biological sample. A Tn5 transposase complex was added to the intact nuclei. Following an incubation, transposed DNA fragments were extracted from the reaction solution and amplified to provide ATAC libraries.

The preparation of tumor specimens followed the procedure outlined below: first EpCAM+ PDAC malignant cells were isolated from the tumor microenvironment and then ATAC-libraries were made (the details of the methodology in given below).

(1) Making Single-Cell Suspension from PDAC FNA/Laparoscopic Surgical/Surgically Resected Specimens.

The FNA/laparoscopic surgical/surgically resected specimens were taken into a 50-ml Gentle-MACS "C" tube containing the digestion buffer: 5 ml of media (MEM+protease inhibitor)+100 µl of liberase (Roche)+50 µl Kolliphor® P 188 (15 mM stock)+5 µl DNAse-1 (10 mg/ml stock)+37.5 µl CaCl$_2$) (IM stock) and the tube was placed in Gentle-MACS tissue dissociator machine for 60 min at 37° C. After incubation, 5 ml of MACS buffer was added, and the suspension filtered through 40 µM filter (BD cell strainer) into another 50 ml microfuge tube. The tube was centrifuged @500×g for 5 min at 4° C. and the supernatant discarded. 500 µL of ACK lysing buffer was added to the pellet, incubated for 5 min at RT then diluted immediately with 4.5 ml of MACS buffer (BSA diluted 1:20 with Auto-MACS rinsing solution). The tube was centrifuged @500×g for 5 min at 4° C. and the supernatant discarded. The cell pellet was re-suspended in 50 µL of MACS buffer and 100 µL of FcR Blocking Reagent and 00 µL of CD326 (EpCAM) Micro-Beads were added. The mixture was mixed well and refrigerated for 30 minutes (4-8° C.) but not on ice. After the incubation, the cells were washed once by adding 5 ml of MACS buffer and centrifuged at 500×g for 5 minutes at 4° C. The supernatant was aspirated completely. The pellet was re-suspended in 500 µL of MACS buffer and proceed to magnetic separation.

(2) Magnetic separation of EpCAM+ cells with LS Columns

A 15 ml tube was used for collection of the effluents (start preparing the column by rinsing with 3 ml MACS buffer while centrifuging the cell suspension). The cell suspension 500 µL was applied onto the column. "Unlabeled" cells (anything other than epithelial cells) that pass through were collected and the column was washed with 3×3 ml of buffer as effluent. Washing steps were performed by adding buffer three times. The column was removed from the separator and placed on a 15 ml collection tube. 5 ml of buffer was pipetted onto the column. The magnetically labeled cells were flushed out by firmly pushing the plunger into the column. (To increase the purity of the magnetically labeled fraction, the cells may be passed over a new, freshly prepared column.) The cells (~5 ml total suspension) were pelleted down @500×g for 5 min at 4° C. The unlabeled cells (~12.5 ml total suspension from previous step) were also pelleted down @500×g for 5 min at 4° C. Supernatant was discarded and labeled cells were re-suspended in 200 µL of 1× cold PBS. The cells were counted, and only epithelial cells fraction were used for ATAC-library preparation utilizing 10,000-50,000 cells, and the remaining cells were stored for DNA/RNA extraction (later with Qiagen All-prep DNA-RNA kit). The "Effluent" fraction was pelleted down and stored at −80° C. along with the epithelial cell fraction for future DNA/RNA extraction in order to utilize it as control for checking epithelial enrichment.

(3) Continue with Transposition Reaction on the Isolated Cells 10,000-50,000 cells were taken in each of the two 1.5 ml microfuge tubes (in duplicates) and centrifuged for 5 min at 500×g at 4° C. Supernatant was discarded and the cell pellet was re-suspended by pipetting up and down in 50 µl of cold lysis buffer. The re-suspended pellet was centrifuged immediately for 10 min at 500×g at 4° C. This step affords lysis of cells with nonionic detergent and generated a crude nuclei preparation. The supernatant was discarded, and the crude nuclei preparation was used in the transposition reaction.

(4) Transposition Reaction and Purification (Modified from Buenrostro, Nat Methods (2013)).

The cell pellet was placed on ice.
Transposition reaction mixture:
a. In 100-µL for a duplicate library reaction:
  i. 50-µL TN5 buffer TD (2× reaction buffer from Nextera kit)
  ii. 45-µL nuclease-free water
  iii. 5-µL TN5 enzyme TDE1 (Nextera Tn5 Transposase from Nextera kit)

b. The transposition reaction mixture was incubated at 37° C. for 30 min with gentle mixing to increase fragment yield.

Qiagen MinElute purification before PCR
a. Eluted in 20-µL elution buffer
Purified DNA was stored at −20° C. if necessary.

(5) PCR amplification of transposed DNA fragments

10-µL elute was taken into the 50-µL PCR-reaction and then the usual protocol was followed with the primer pairs as described in Buenrostro, Nat Methods (2013) (supplement). The amplicons were purified with Qiagen mini-elute PCR cleanup kit.

The following was combined in a 0.2 ml PCR tube:
10 µl transposed DNA (or the cleaned product of the first PCR)
10 µl nuclease-free $H_2O$
2.5 µl 25 µM PCR Primer 1
2.5 µl 25 µM Barcoded PCR Primer 2 (1 through 24—all primers, forward (primer 1) and reverse (primer 2) from Buenrostro, Nat Methods (2013) (supplement)
25 µl NEBNext High-Fidelity 2× PCR Master Mix Primers and PCR conditions were optimized for amplifying large-molecular-weight fragments from low-input material. Integrated DNA Technologies (IDT) synthesized all primers —with no additional modifications. Samples were barcoded appropriately for subsequent pooling and sequencing.

Thermal cycle conditions were as follows:

| 1 cycle:    | 5 min  | 72° C. |
|-------------|--------|--------|
|             | 30 sec | 98° C. |
| 12 cycles:  | 10 sec | 98° C. |
|             | 30 sec | 63° C. |
|             | 1 min  | 72° C. |

The first 5-min extension at 72° C. allowed for extension of both ends of the primer after transposition, thereby generating amplifiable fragments.

Amplified library was purified using Qiagen MinElute PCR Purification Kit. The purified library was eluted in 20 µl elution buffer (Buffer EB from the MinElute kit consisting of 10 mM Tris.Cl, pH 8). The column was dried prior to adding elution buffer to avoid ethanol contamination in the final library. Typically, the nanodrop concentration after 12 cycle PCR is ~10 fold more than the before PCR (The concentration of DNA eluted from the column ought to be approximately 30 nM; however, 5fold variation is possible and not detrimental). The quality of purified libraries was assessed using a Bioanalyzer High-Sensitivity DNA Analysis kit (Agilent).

(C) Hybridization of the Libraries with the Array:

The final hybridization of the array (complementary probes) with the fluorescent labeled libraries was done by following the manufacturer's guidelines.

Reference genomic DNA with known copy number (Agilent Technologies, catalog #5190-4370, lot #0006392634) was labeled with Cy3 and the ATAC libraries were labeled Cy5 using Genomic DNA ULS labeling kit (Agilent Technologies, catalog #5190-0420). After estimating the labeling efficiencies independently by nanodrop, the labeled reference gDNA and labeled ATAC libraries were mixed together and applied to the custom microarray and incubated overnight following the manufacturer's aCGH hybridization protocol.

The following day, the microarray was washed with wash buffers (Agilent Technologies) and scanned on a SureScanDx microarray reader (Agilent Technologies). Reference gDNA (Cy3) was used as the control to normalize the hybridization efficiencies on each probe. The microarray data were analyzed by using standard bioinformatic pipeline of aCGH analysis.

With this technology, specific regions of interest in the genome can be targeted and interrogated to determine whether these regions are opened of closed, associating them with a phenotype. In the exemplary embodiment disclosed herein, 1092 regions of the PDAC genome, which are differentially opened or closed between the patients who recur early versus the patients who do not are targeted.

Thus, in a particular embodiment, only the targeted 1092 open chromatin regions were interrogated by the array instead of the entire library. Depending on the patterns of the open chromatin peaks within the array, the potential risk of post-resection early recurrence was predicted.

Figure 7A:
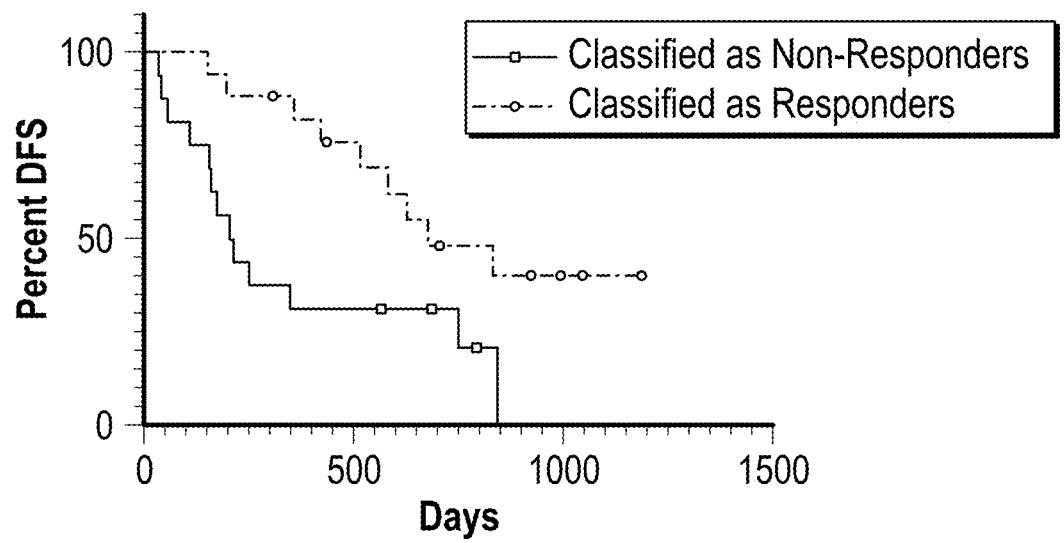
FIG. 7A is a line graph showing percent disease-free survival (DFS) following resection based on classification of the patients into recurrent (non-responders) and non-recurrent (responders) using the ATAC-array approach.

Results:

Patient-by-patient classification of the recurrent and non-recurrent groups was independently determined by ATAC-array on the basis of significant (Student's t-test p<0.001) enrichment of relative intensity of probes representing either recurrent or non-recurrent signature peaks (see FIG. 5). Classification of patients into recurrent and non-recurrent groups as predicted by ATAC-array on the discovery set samples (n=16) had a perfect correlation (Pearson's r=1) with what was done before by ATAC-seq supervised learning. Patients were classified into two groups by ATAC-array: recurrent (median DFS 211 days) and non-recurrent groups (median DFS 678 days) with statistical significance (Log-rank test p=0.0137 and Gehan-Breslow-Wilcoxon test p=0.0076) (FIG. 7A).

Figure 7B:
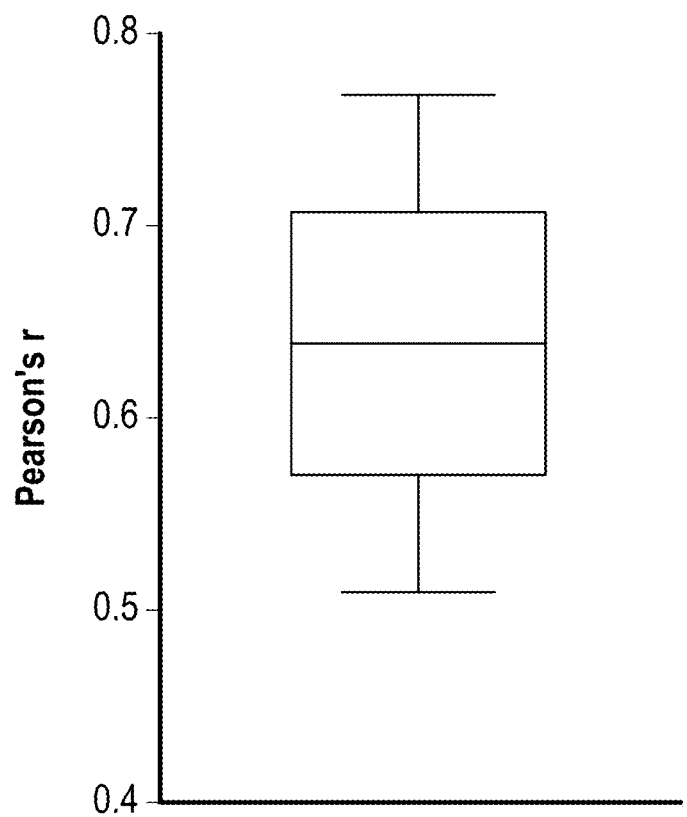
FIG. 7B shows the correlation between ATAC-seq and ATAC-array for 932 regulatory regions overlapping between the two platforms (n=30).
Figure 7C:
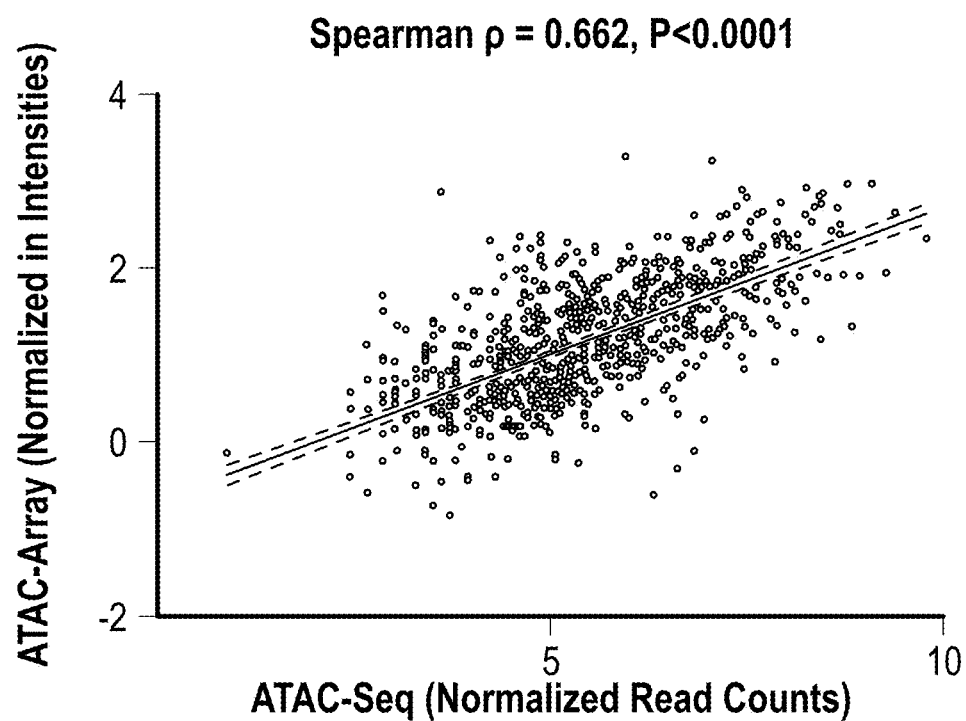
FIG. 7C shows the ATAC-seq and ATAC-array correlation in a representative patient (PT17).

In the larger dataset (n=30), significant correlation was observed between ATAC-seq and ATAC-array in each patient (n=36, Spearman p min=0.5, median=0.65, and max=0.77) as shown in FIG. 7B and for a representative patient PT17 (Spearman p=0.6615, 95% CI 0.6226 to 0.6971, P<0.0001, number of pairs 931) as shown in FIG. 7C.

Figure 7D:
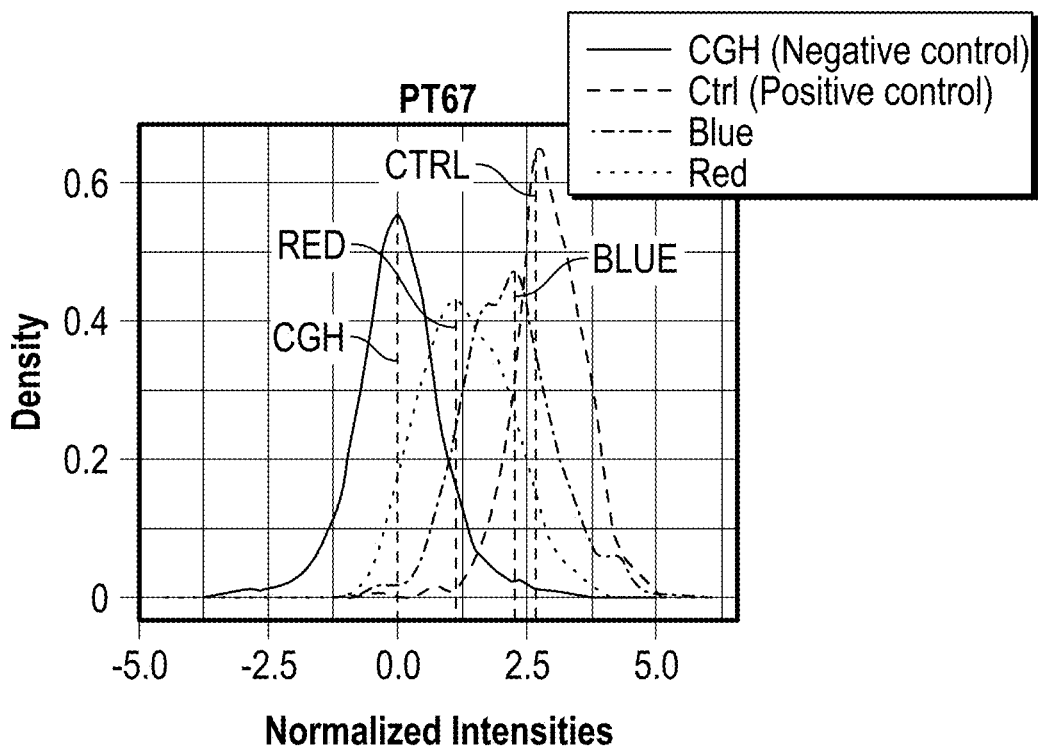
FIG. 7D shows a representative histogram showing good (blue distribution median intensity >red) prognosis ATAC-array signature in patient PT67.
Figure 7E:
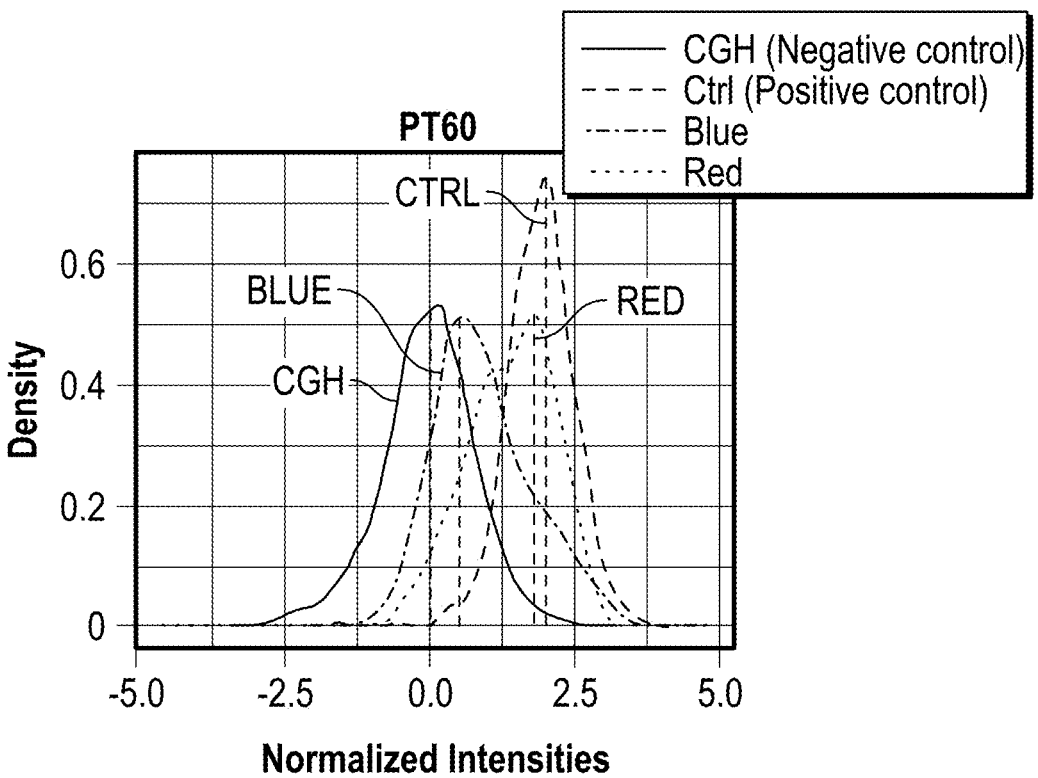
FIG. 7E shows a representative histogram showing poor (red distribution median intensity >blue) prognosis in patient PT60.
Figure 7F:
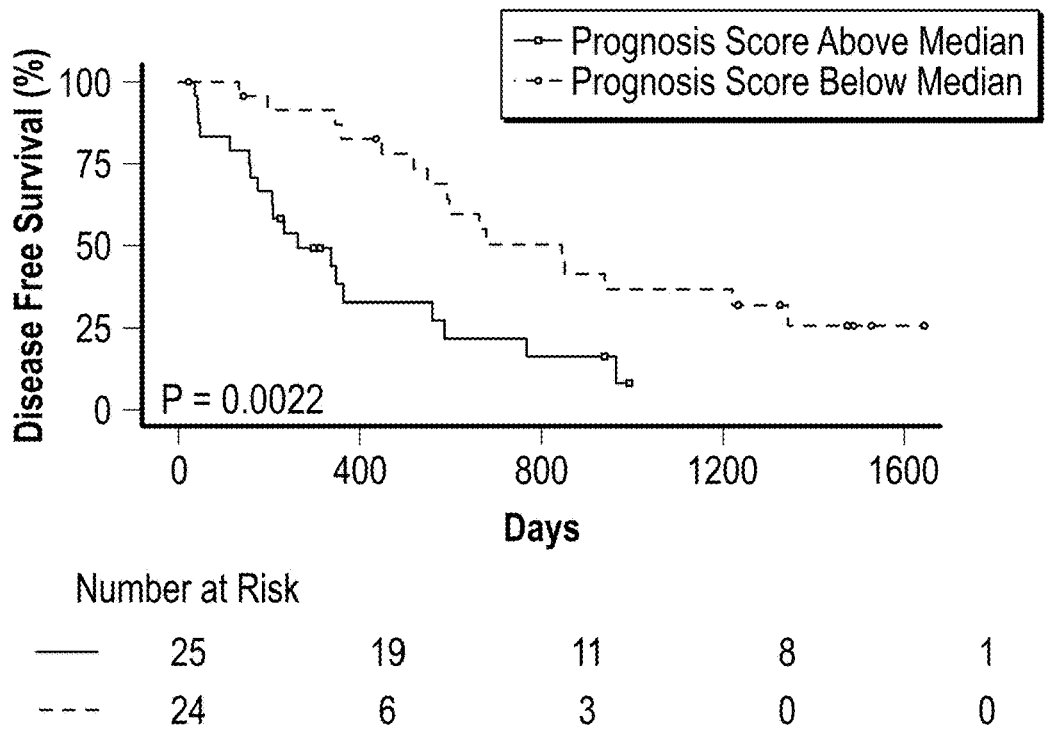
FIG. 7F is a Kaplan-Meier curve showing significant segregation of PDAC patients (n=49) on the basis of ATAC-array prognosis score, which is the normalized intensity of the blue peaks (BLUE/(CTRL—CGH)) (log-rank (Mantel-Cox) test P=0.0022, HR 2.896, 95% CI 1.426 to 5.878).
Figure 16A:
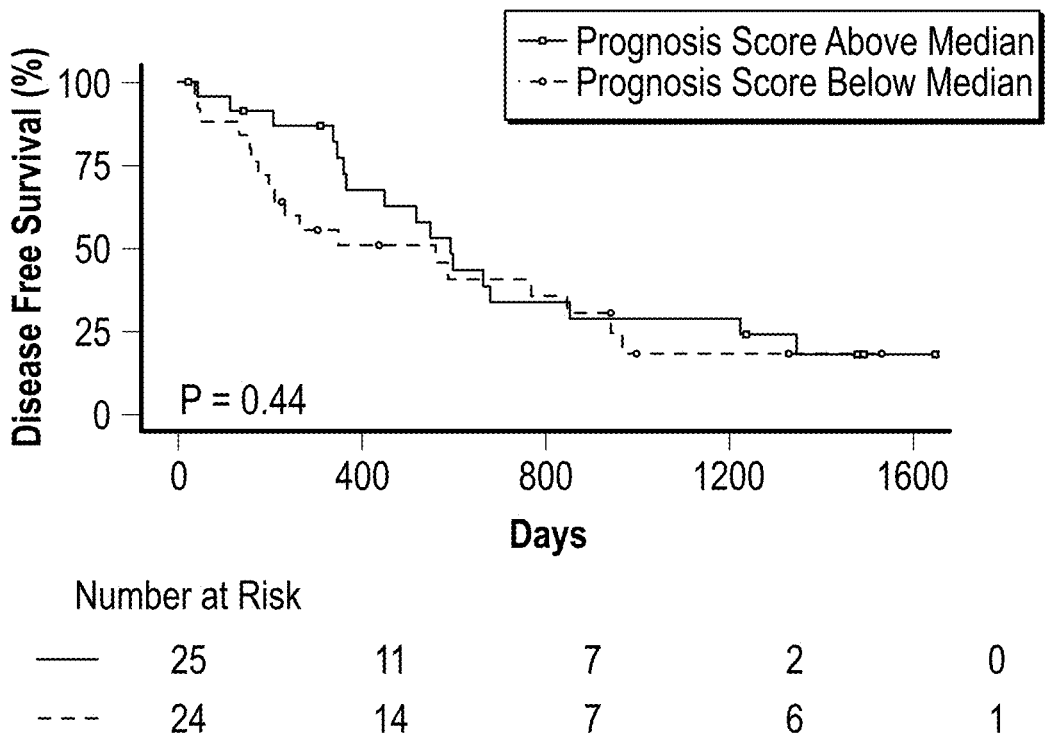
FIG. 16A shows the red peak (RED/(CTRL—CGH))
Figure 16B:
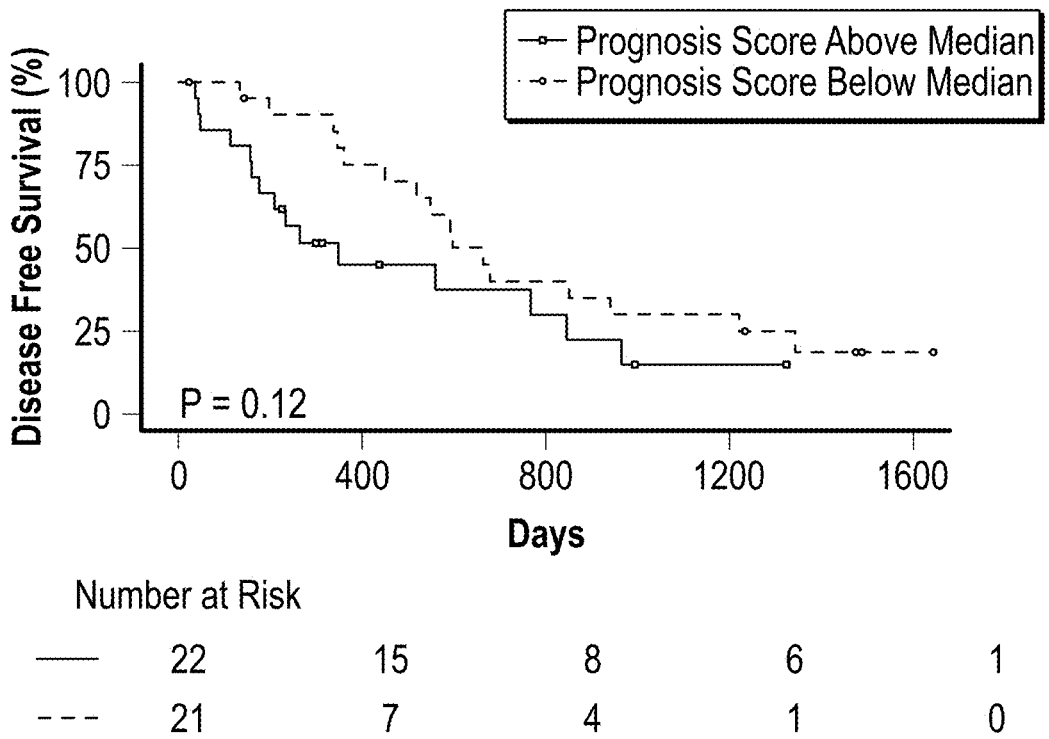
FIG. 16B shows the difference between blue and red peaks ((BLUE—RED)/(CTRL—CGH)) were not as discriminative as the normalized intensity of the blue peaks (BLUE/(CTRL—CGH) as displayed in FIG. 7F. (RED/(CTRL—CGH) log-rank (Mantel-Cox) test P-0.44, HR 0.77, 95% CI 0.3943 to 1.504; and (BLUE—RED)/(CTRL—CGH) log-rank (Mantel-Cox) test P=0.12, HR 1.771, 95% CI: 0.8556-3.664, respectively.
Figure 17A:
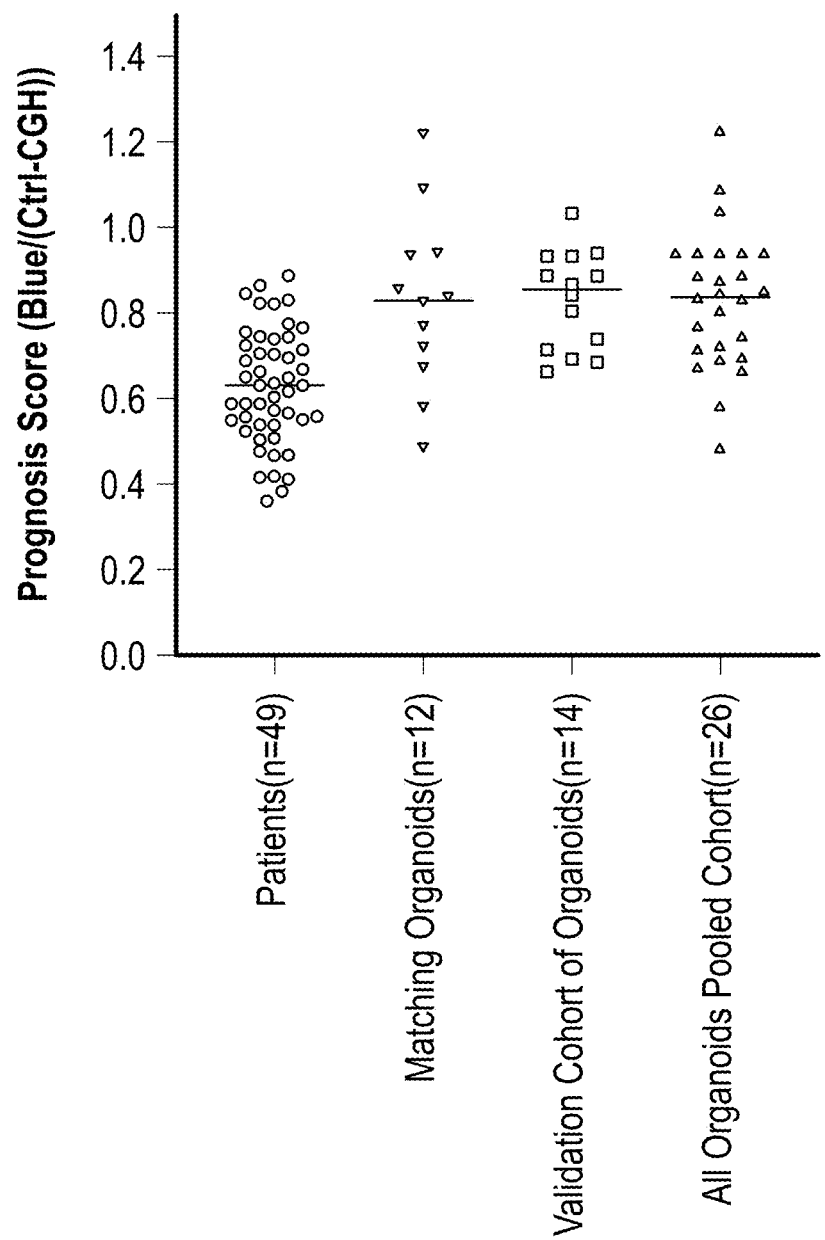
FIG. 17A shows ranking of the Prognosis Scores derived from ATAC-array on freshly sorted patient tumor cells (n=49), matching patient-derived organoids (n=12), organoids from an independent validation cohort (n=14), and pooled organoid cohort (n=26).

Derivation of ATAC-array prognosis score: For each ATAC-array analysis, four hybridization intensity distributions were measured relative to distinct probe sets and these distributions were summarized by their median values, as exemplified by ATAC-array output results in two representative patients with good prognosis (PT67) and with bad prognosis (PT60), as shown in FIGS. 7D and 7E respectively. The dashed distribution represents the positive control probes (median value denoted by CTRL) covering 312 regulatory regions open in all PDAC tumors; solid represents the negative control comprising over 7000 probes covering the CGH-backbone as provided by Agilent (median value, CGH); Blue comprises the 688 regulatory regions open in patients with good prognosis (median value, BLUE); and Red comprises of 244 regulatory regions open in patients with poor prognosis (median value, RED). The discriminative value of the BLUE and RED scores were compared individually, as well as that of the difference in distribution median values, (BLUE—RED), all normalized by the difference between positive and negative control distribution medians (CTRL—CGH). For each individual patient, the ratios of (BLUE/(CTRL—CGH)), (RED/(CTRL—CGH)), and ((BLUE—RED)/(CTRL—CGH)) were calculated, and it was found that the score (BLUE/(CTRL—CGH)) displayed the best performance for stratifying patients according to prognosis (FIGS. 16A and 16B, RED/(CTRL—CGH) log-rank (Mantel-Cox) test P=0.44, HR 0.77, 95% CI 0.3943 to 1.504, median DFS 559 days (n=25), and median DFS 592 days (n=24) respectively; and (BLUE—RED)/(CTRL—CGH) log-rank (Mantel-Cox) test P=0.12, HR 1.771, 95% CI: 0.8556-3.664, median DFS 663 days (n=22), and median DFS 348 days (n=21) respectively). In particular, patients were separated into two groups using the median value of (BLUE/(CTRL—CGH)) (median=0.6, range=0.36 to 0.88), which is referred to as the "Prognosis Score" (FIG. 17A), and compared their DFS by Cox proportional hazards regression. With a median 4.15 (min=3.18, max=4.75)-year follow-up among the original discovery cohort (n=49), Kaplan-Meier survival analysis showed a significant segregation of the two groups (FIG. 7F, log-rank (Mantel-Cox) test P=0.0022, Gchan-Breslow-Wilcoxon test, P=0.0009, HR 2.896, 95% CI 1.426 to 5.878, median DFS 264 and 845 days respectively).

Figure 7G:
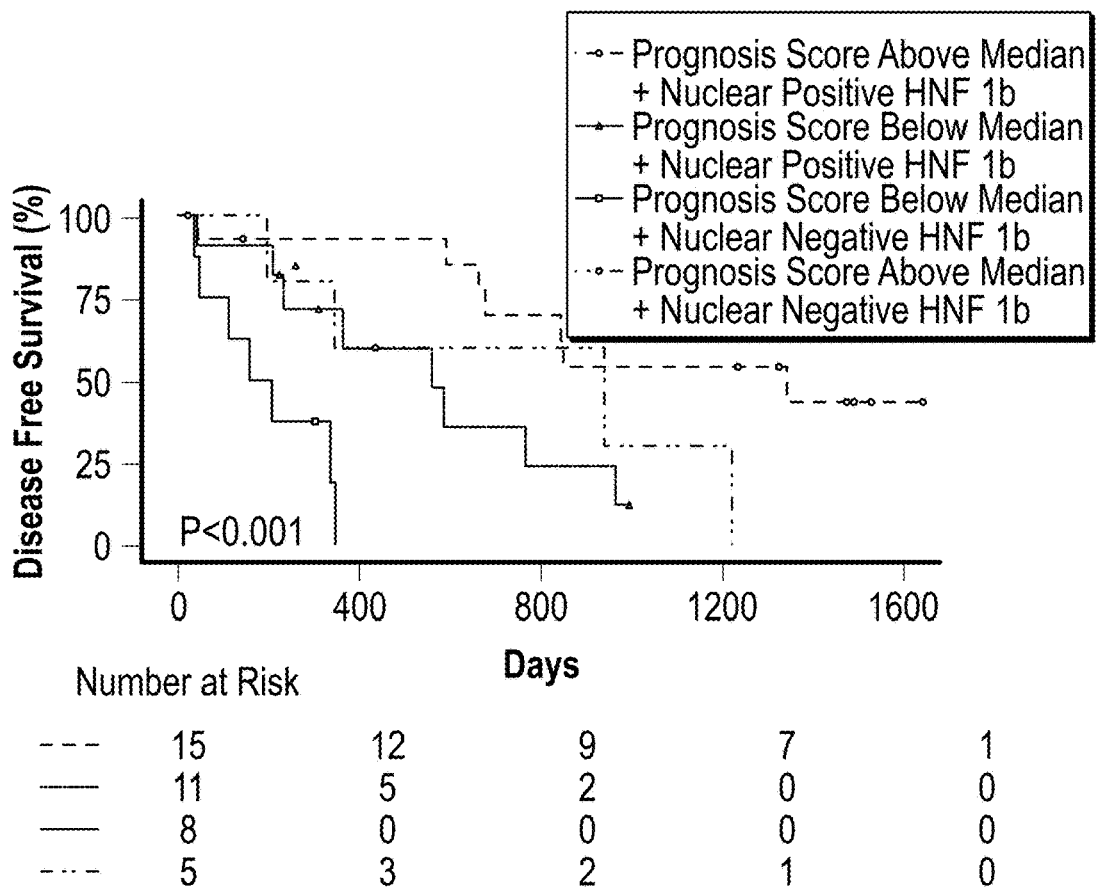
FIG. 7G is a Kaplan-Meier curve shows combination of ATAC-array and HNF1b nuclear localization segregates PDAC patients into four different groups with significantly different median DFS (log-rank (Mantel-Cox) test P<0.0001, and log-rank test for trend P<0.0001).

ATAC-array prognosis score combined with HNF1b nuclear localization: The 3.2-fold difference in DFS based on ATAC-array prognosis score was further increased to 7.4-fold when the ATAC-array score was combined with immunohistochemical HNF1b nuclear localization as an additional biomarker (FIG. 7G), log-rank (Mantel-Cox) test P<0.0001, Gchan-Breslow-Wilcoxon test P=0.0004 and log-rank test for trend P<0.0001). It was found that 38.4% of patients ($15/39$) displayed an ATAC-array good prognosis signature (Prognosis Score higher than the median) in combination with HNF1b localized to nuclei, with median DFS 1343 days; 12.8% ($5/39$) displayed an ATAC-array good prognosis signature but no nuclear localization of HNF1b, with median DFS 940 days; 28.2% ($11/39$) showed an ATAC-array poor prognosis signature (Prognosis Score lower than the median) but positive nuclear localization of HNF1b, with median DFS 559 days; and the remaining 20.5% ($8/39$) showed an ATAC-array poor prognosis signature and no nuclear localization of HNF1b, with median DFS 183 days. Thus, two simple prognostic methodologies (ATAC-array and immunohistochemical determination of HNF1b nuclear positivity), both derived from the ATAC-seq analysis of chromatin accessibility signatures in resected pancreatic cancer, combine to stratify patients into prognostic groups with more than 7-fold differences in DFS.

Figure 7H:
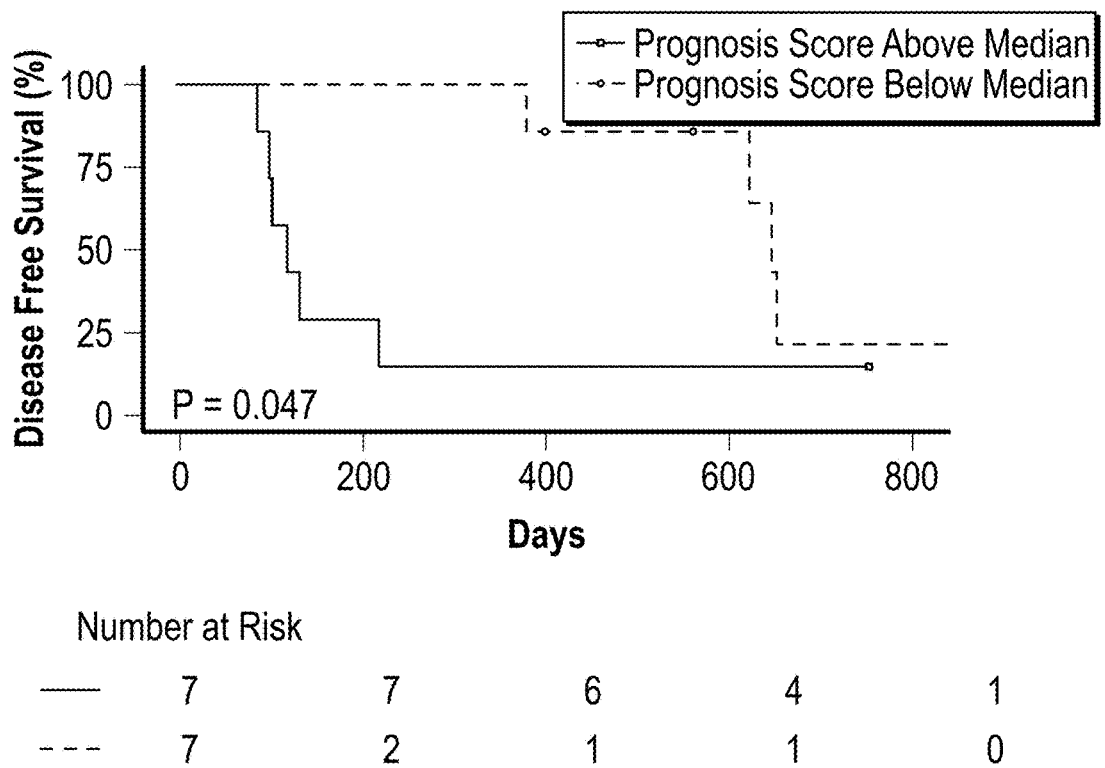
FIG. 7H is a Kaplan-Meier curve showing significant segregation of PDAC organoids on the basis of ATAC-array Prognosis Score in an independent validation cohort (n=14) (log-rank (Mantel-Cox) test P=0.0475, HR 3.228, 95% CI 0.8523 to 12.23).
Figure 7I:
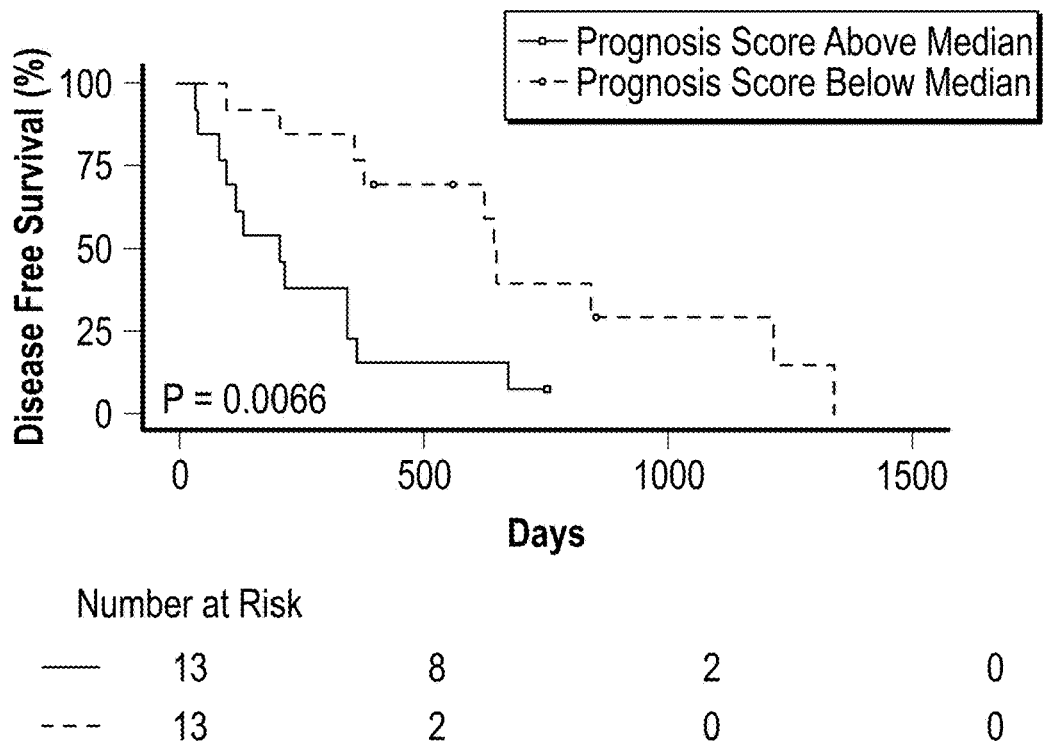
FIG. 7I is a Kaplan-Meier curve showing significant segregation of PDAC organoids on the basis of ATAC-array Prognosis Score in the pooled cohort (n=26) (log-rank (Mantel-Cox) test P=0.0066, HR 2.860, 95% CI 1.144 to 7.145).
Figure 17B:
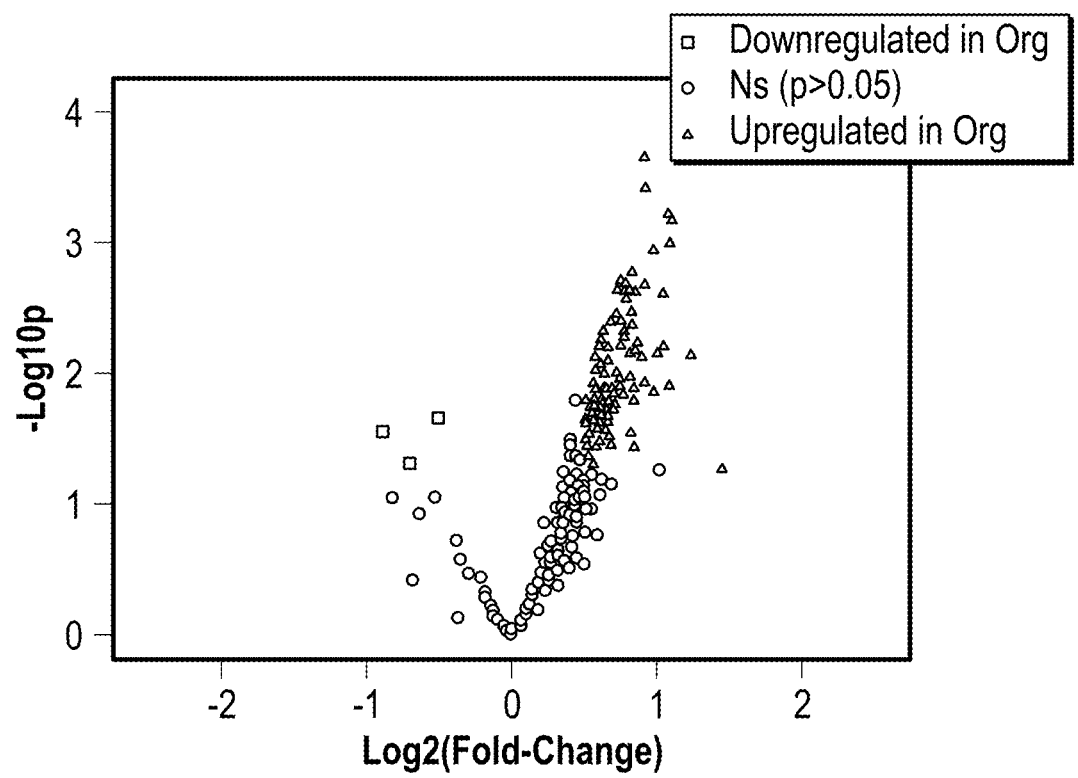
FIG. 17B is a volcano plot comparing the Green (CTRL) region intensities between organoids and their tumors of origin showing more significantly open regions in organoids (orange dots on right) than closed regions (purple dots on left).
Figure 17C:
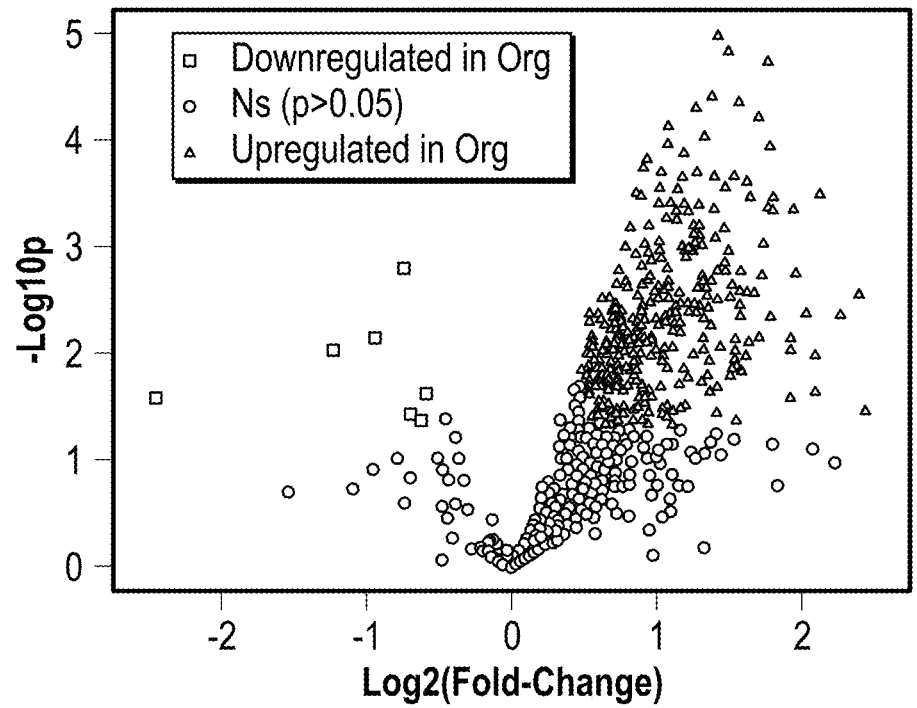
FIG. 17C is a volcano plot comparing the Blue regions between organoids and their tumors of origin showing significantly more open regions in organoids (orange dots on right) than closed regions (purple dots on left).
Figure 17D:
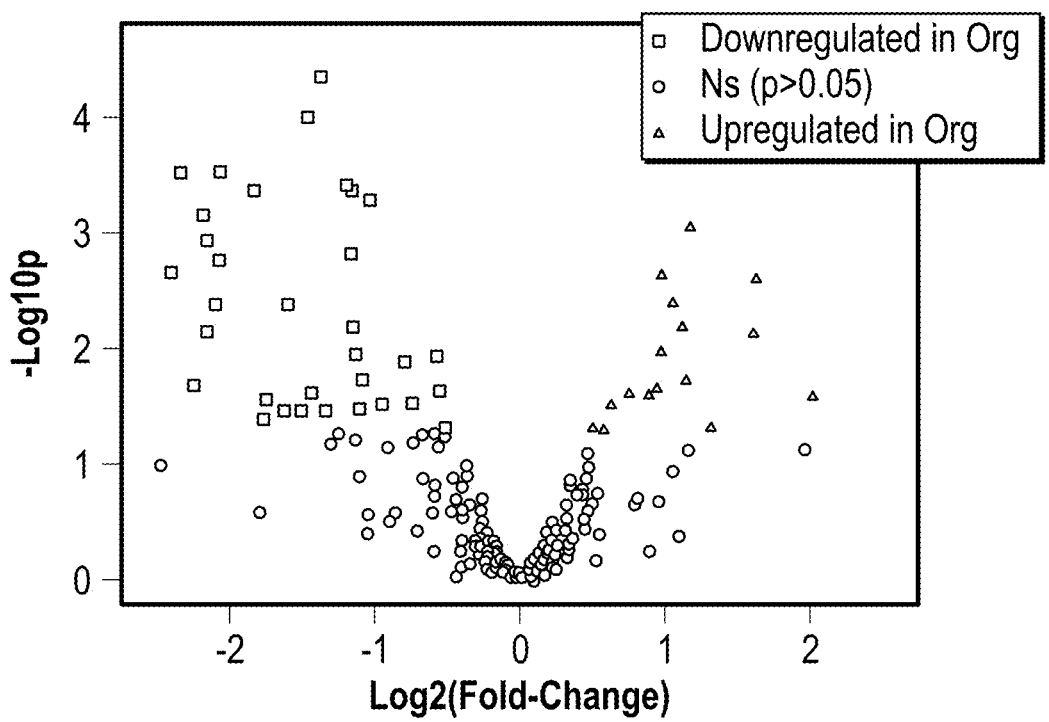
FIG. 17D is a volcano plot comparing the Red region intensities between organoids and their tumors of origin showing significantly more closed regions in organoids (purple dots on left) than open regions (orange dots on right).
Figure 17E:
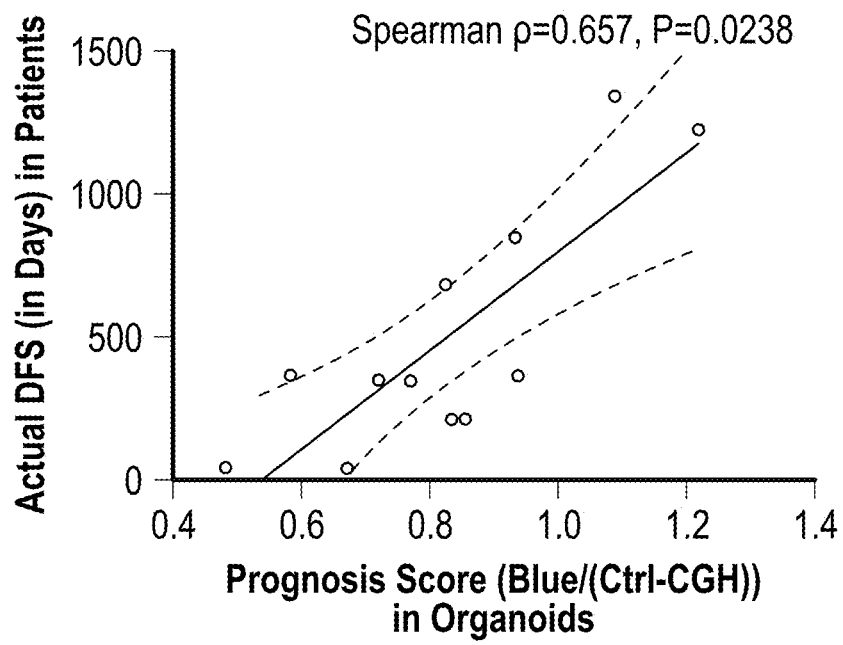
FIG. 17E shows ATAC-array Prognosis Score (BLUE/(CTRL-CGH)) derived from matching organoids correlate with the actual DFS of the patients from which they were derived (Spearman p=0.657, 95% CI 0.1150 to 0.8978, P=0.0238, n=12).

Validation of ATAC-array prognosis score on PDAC organoids: In order to validate the ATAC-array results on an independent validation cohort, ATAC libraries were created from patient-derived PDAC organoids, representing cultures of enriched malignant epithelial cells derived from individual patients. In an initial comparison of ATAC-array chromatin accessibility signatures between organoids and freshly isolated EpCAM$^+$ tumor epithelial cells in 12 patients for which libraries were available from both, significant changes were observed in chromatin accessibility in organoids compared to their tumors of origin, likely representing predictable epigenetic reprogramming of tumor cells occurring during organoid culture. These changes most frequently involved increased accessibility of the "Blue" and "Green" chromatin loci and decreasing accessibility of "Red" regions in organoids (FIG. 17B, 17C, 17D). It was found that even after taking organoid culture-induced epigenetic alterations into consideration, the Prognosis Score as estimated by ATAC-array on each organoid significantly correlated with the actual DFS of each patient (Spearman p=0.657, 95% CI 0.1150 to 0.8978, P=0.0238, n=12, (FIG. 17E). Additionally, chromatin accessibility was analyzed in 14 organoids from an independent validation cohort derived from resected PDAC patients treated with adjuvant Gemcitabine. As shown in FIG. 7H, when this cohort was separated into two groups using the median Prognosis Score (median=0.86, range=0.66 to 1.04), Kaplan-Meier survival analysis confirmed a significant segregation in DFS (log-rank (Mantel-Cox) test P=0.0475, Gehan-Breslow-Wilcoxon test, P=0.0080, HR 3.228, 95% CI 0.8523 to 12.23, median DFS 119 and 649 days respectively). When organoids from both groups were pooled together to create a larger cohort (12+14=26) as shown in FIG. 71, the segregation of the organoids on the basis of the Prognosis Score (median=0.84, range=0.48 to 1.22, FIG. 17A) was statistically more significant (log-rank (Mantel-Cox) test P=0.0066, Gehan-Breslow-Wilcoxon test, P=0.0039, HR 2.860, 95% CI 1.144 to 7.145, median DFS 209 and 649 days respectively).

ATAC-array is a hybridization-based technology and, therefore, inexpensive and more suitable to use as a diagnostic tool in clinical setting. Unlike other microarrays, the ATAC-array approach described herein provides for (i) probing the specific signature set of genomic regions encompassing promoter, intronic, exonic and inter-genic regions and (ii) hybridizing with fluorescent-labeled ATAC libraries which are specially prepared to contain amplicon sequences that only represent the TN5-transposase-accessible regions of the genome rather than the whole genome or whole transcriptome. The read out of this technology gives information on differential chromatin accessibility; such information is not available by other microarray technology. In other words, ATAC-array is the first microarray technology capable of reading the chromatin accessibility patterns. One further advantage of ATAC-array is that since the ATAC libraries contain only the accessible regions, hybridization with the ATAC-array provides specific enrichment of signal intensities corresponding to the relative quantities of the accessible regions (or amplicon copies thereof) as represented in each library.

Example 3: Prediction of DFS Using ATAC-Array

Figure 8A:
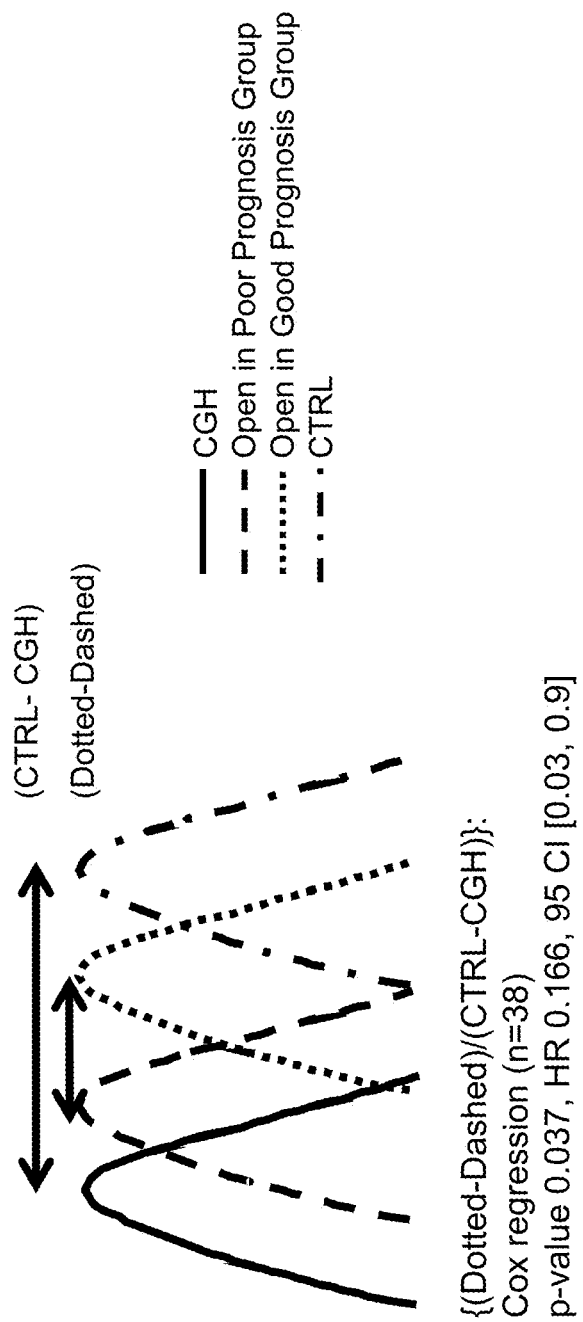
FIG. 8A depicts a schematic representation of four fluorescence intensity peaks generated using the ATAC-array approach described herein.

Samples from 38 patients were analyzed using the ATAC-array approach described herein. Four peaks were detected in every array for every patient sample (ATAC-libraries), which is represented in FIG. 8A.

The solid peak represents a negative control (Agilent-provided CGH backbone). The dash-dot peak represents a positive control. In this example, the positive control (CTRL) was derived from 336 chromatin regions that are open in all patients (similar to "house-keeping" elements). The dotted peak represents the 723 regions that are silenced in the bad-prognosis-group but open in the good-prognosis-group patients. The dashed peak represents the 369 regions that are silenced in good-prognosis-group but open in bad-prognosis-group patients.

It was observed that a significantly higher median intensity for the dashed peak as compared to the dotted peak is associated with a poor prognosis; similarly, a significantly higher median intensity for the dotted peak as compared to the dashed peak is associated with a good prognosis.

Disease-free survival is a continuous variable. The distance between the two peaks (the difference between the median intensities) was normalized with the distance between the controls {(dotted—dashed)/(CTRL—CGH)}. Here, the denominator (CTRL—CGH) was used as a QC parameter for predictive calls in the array.

Patient-level data are shown in Table 4.

TABLE 4

Training Set.

| Patient ID | Control Differential (CTRL-CGH) | Test Differential (Blue-Red) | Normalized Differential {(Blue-Red)/(CTRL-CGH)} | DFS (days) | Recurrence |
|---|---|---|---|---|---|
| PT4 L2R | 1.9672 | −0.3863 | −0.1963705 | 252 | 1 |
| PT5 L2R | 2.1617 | 0.1064 | 0.04922052 | 365 | 1 |
| PT6 L2R | 1.7002 | −0.2793 | −0.1642748 | 158 | 1 |
| PT7 L2R | 1.7849 | 0.0674 | 0.03776122 | 1180 | 0 |
| PT9 L2R | 1.6263 | 0.238 | 0.14634446 | 678 | 1 |
| PT10 L2R | 1.141 | −0.3227 | −0.2828221 | 42 | 1 |
| PT12 L2R | 1.5904 | 0.3293 | 0.20705483 | 1191 | 0 |
| PT13 L2R | 2.4152 | −0.8316 | −0.3443193 | 175 | 1 |
| PT14 L2R | 1.2645 | −0.4239 | −0.3352313 | 209 | 1 |
| PT17 L2R | 2.0392 | −0.3211 | −0.1574637 | 156 | 1 |
| PT18 L2R | 1.9272 | −0.245 | −0.1271274 | 108 | 1 |
| PT20 L2R | 1.2294 | −0.2506 | −0.2038393 | 688 | 0 |
| PT21 L2R | 2.0491 | −0.2097 | −0.1023376 | 348 | 1 |
| PT23 L2R | 2.6042 | −0.0517 | −0.0198525 | 36 | 1 |
| PT25 L2R | 1.7679 | 0.6491 | 0.36715878 | 518 | 1 |
| PT26 L2R | 2.3486 | 0.8457 | 0.36008686 | 422 | 1 |
| pT35 L2R | 2.934 | 1.1348 | 0.38677573 | 923 | 0 |
| PT36 L2R | 2.9764 | 1.2819 | 0.43068808 | 836 | 1 |
| PT37 L2R | 1.2408 | −0.0799 | −0.0643939 | 596 | 0 |
| PT42 L2R | 2.7013 | 0.5862 | 0.21700663 | 996 | 0 |
| PT43 L2R | 2.2171 | 0.497 | 0.2241667 | 1049 | 0 |
| PT44 L2R | 1.1648 | 0.2568 | 0.22046703 | 925 | 0 |
| PT45 L2R | 3.5507 | 1.5784 | 0.44453206 | 629 | 1 |
| PT46 L2R | 1.2151 | 0.1034 | 0.08509588 | 309 | 0 |
| PT47 L2R | 1.5167 | −0.4858 | −0.3203007 | 567 | 1 |
| PT49 L2R | 1.3459 | 0.122 | 0.09064566 | 436 | 0 |
| PT50 L2R | 0.9377 | −0.616 | −0.6569265 | 58 | 1 |
| PT52 L2R | 2.6186 | 0.5141 | 0.19632628 | 583 | 1 |
| PT53 L2R | 1.7337 | −0.4718 | −0.2721347 | 752 | 1 |
| PT55 L2R | 1.6023 | 0.1109 | 0.06921301 | 43 | 1 |
| PT56 L2R | 2.5785 | 0.3581 | 0.13887919 | 360 | 1 |
| PT57 L2R | 1.8123 | −0.0896 | −0.0494399 | 467 | 1 |
| PT58 L2R | 1.5074 | 0.2023 | 0.13420459 | 197 | 1 |

TABLE 4-continued

Training Set.

| Patient ID | Control Differential (CTRL-CGH) | Test Differential (Blue-Red) | Normalized Differential {(Blue-Red)/ (CTRL-CGH)} | DFS (days) | Recurrence |
|---|---|---|---|---|---|
| PT59 L2R | 1.5672 | −0.1994 | −0.1272333 | 845 | 1 |
| PT60 L2R | 1.9405 | −0.6056 | −0.3120845 | 214 | 1 |
| PT61 L2R | 1.6743 | −0.2927 | −0.1748193 | 797 | 0 |
| PT62 L2R | 1.7416 | 0.4251 | 0.2440859 | 706 | 0 |
| PT63 L2R | 0.9916 | 0.204 | 0.20572812 | 154 | 1 |
| Median | 1.75475 | | | | |
| Max | 3.5507 | | | | |
| Min | 0.9377 | | | | |

Cox regression analysis was performed to confirm that the parameter qualifies for being a predictor. Using all patients (n=38), it was found to be significant (Cox regression n=38, p-value 0.037, HR 0.166, 95 CI [0.03, 0.9].

Figure 8B:
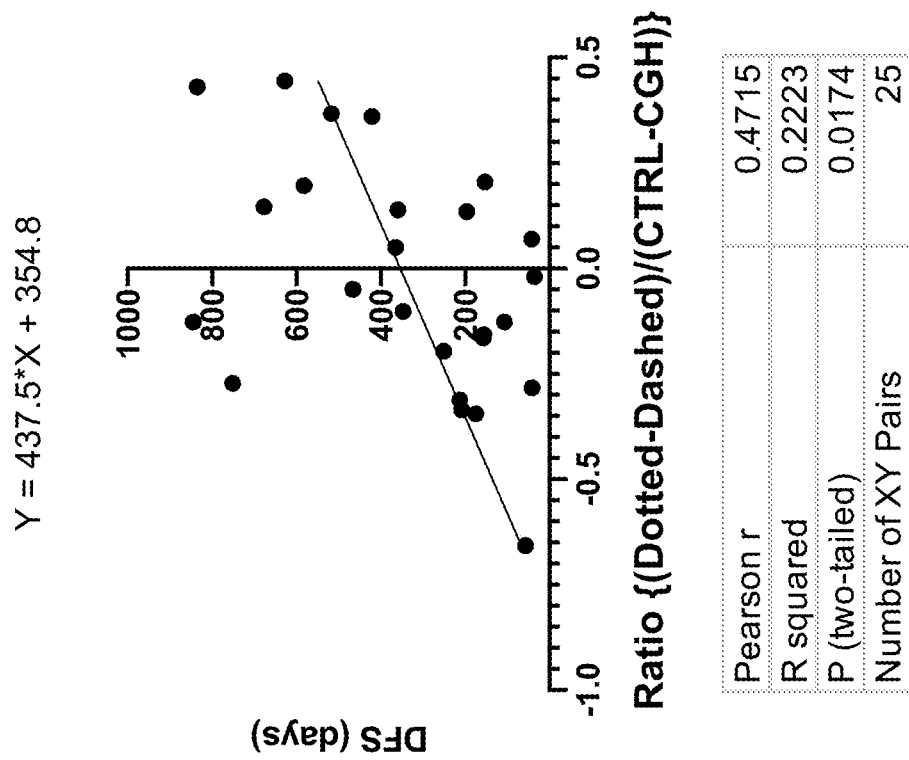
FIG. 8B shows a linear regression with confirmed recurred cases (n=25).
Figure 10A:
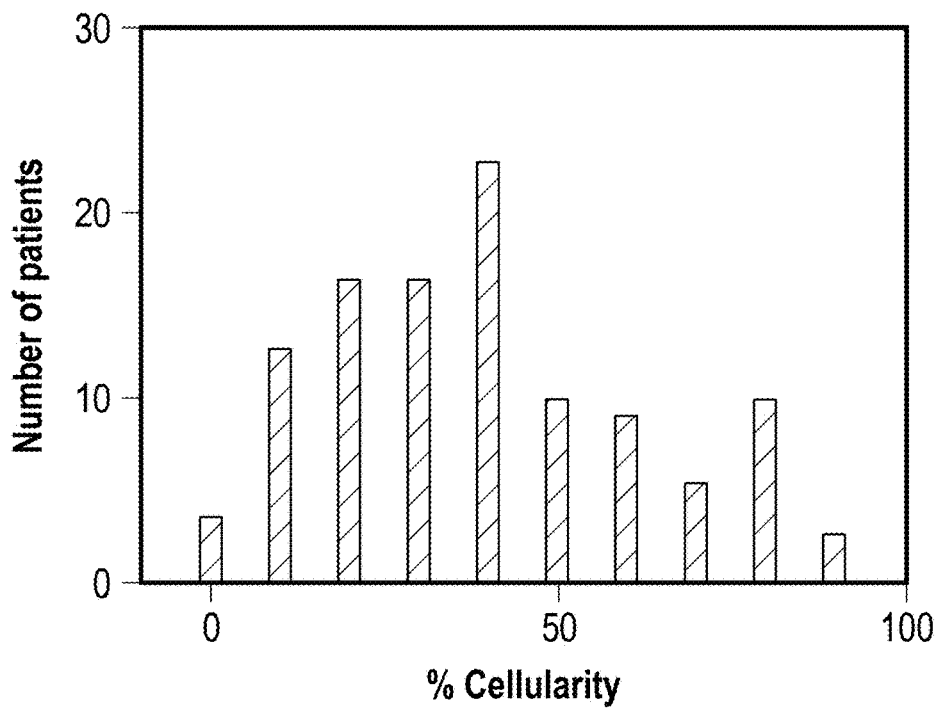
FIG. 10A shows tumor epithelial cellularity in the bulk tumors (estimated on frozen sections—at least two sections each of n=120) showing median 40% cellularity with high tumor-to-tumor variability.
Figure 10B:
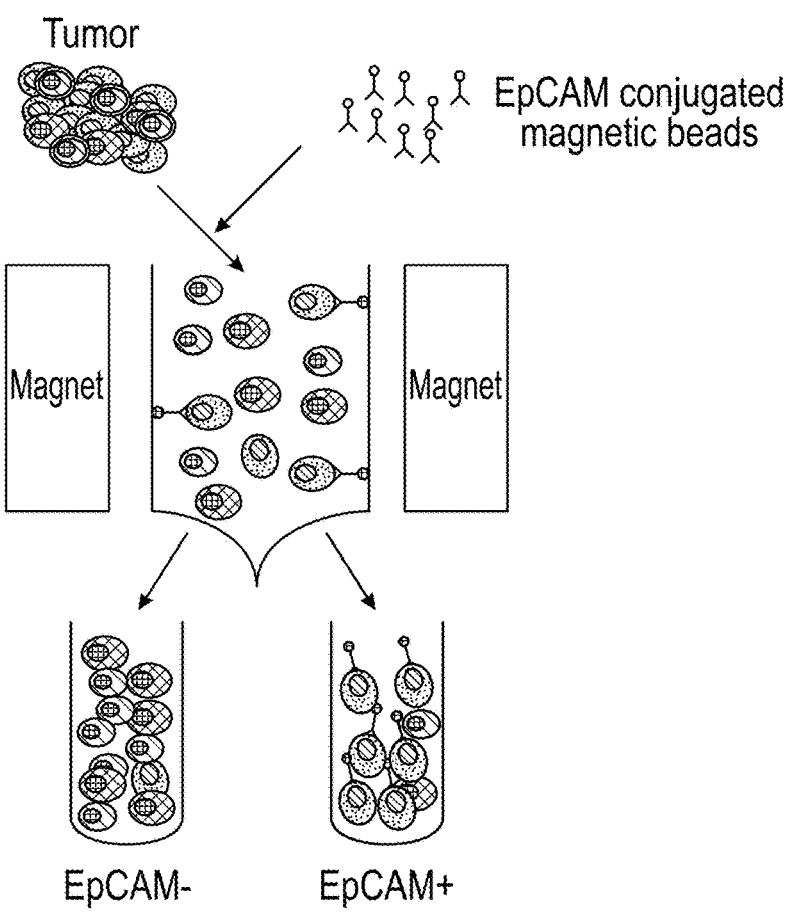
FIG. 10B is a schematic diagram shows the sorting of PDAC malignant cells from freshly resected tumors using EpCAM antibody-conjugated magnetic beads.
Figure 10C:
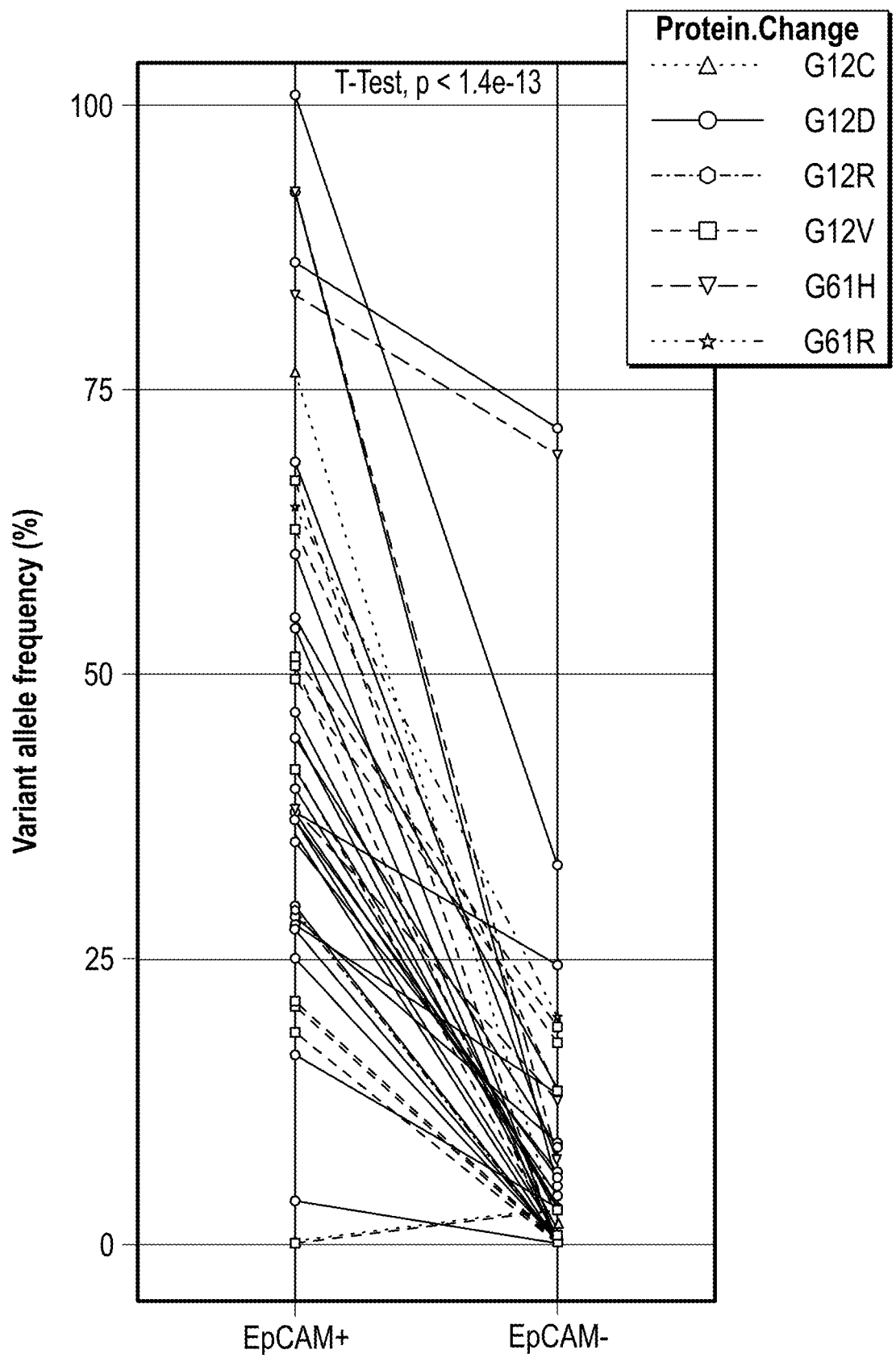
FIG. 10C shows canonical variant allele frequencies of KRAS comparing the EpCAM$^+$ and EpCAM- subpopulations from each tumor.
Figure 10D:
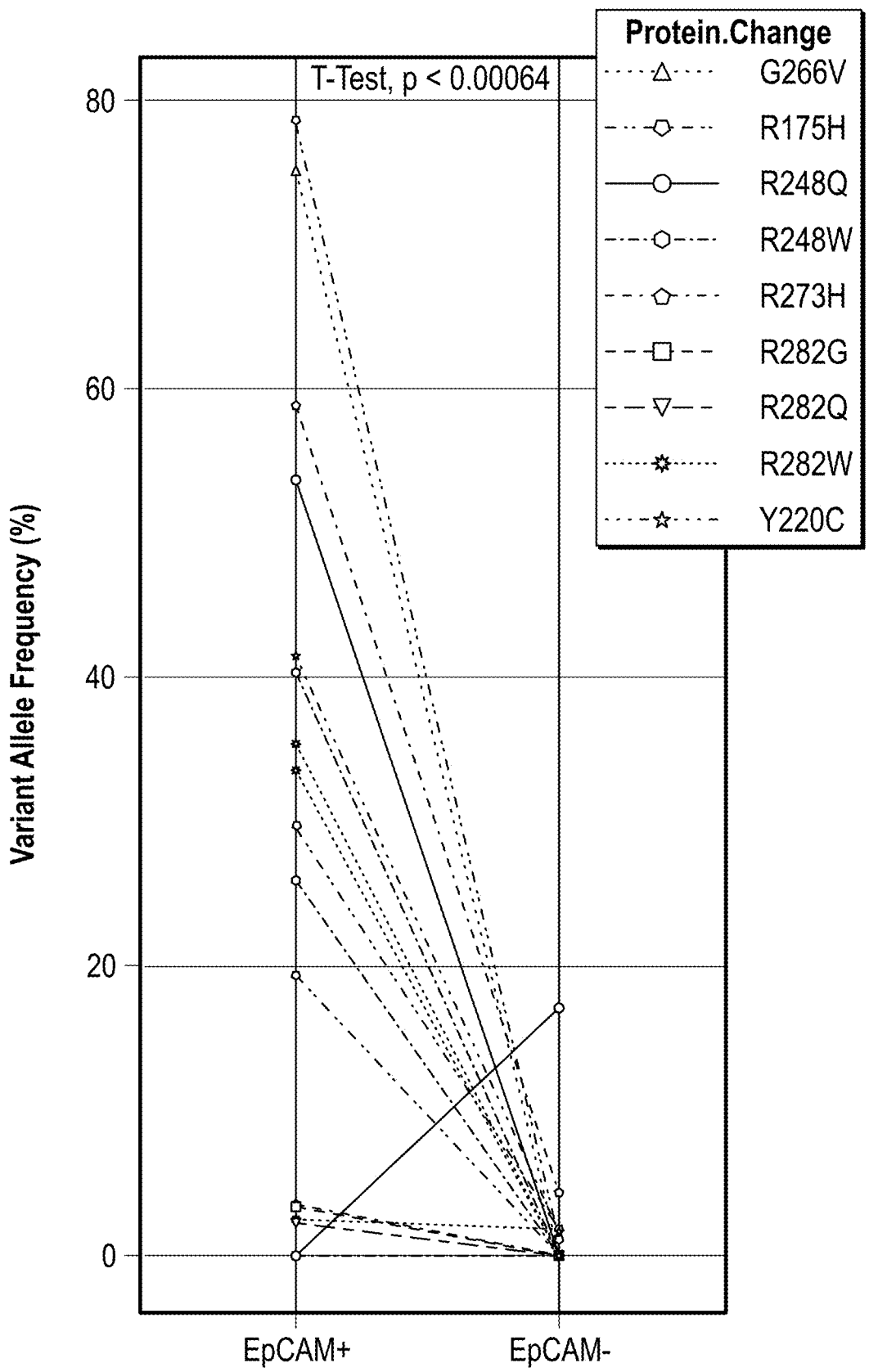
Figure 11A:
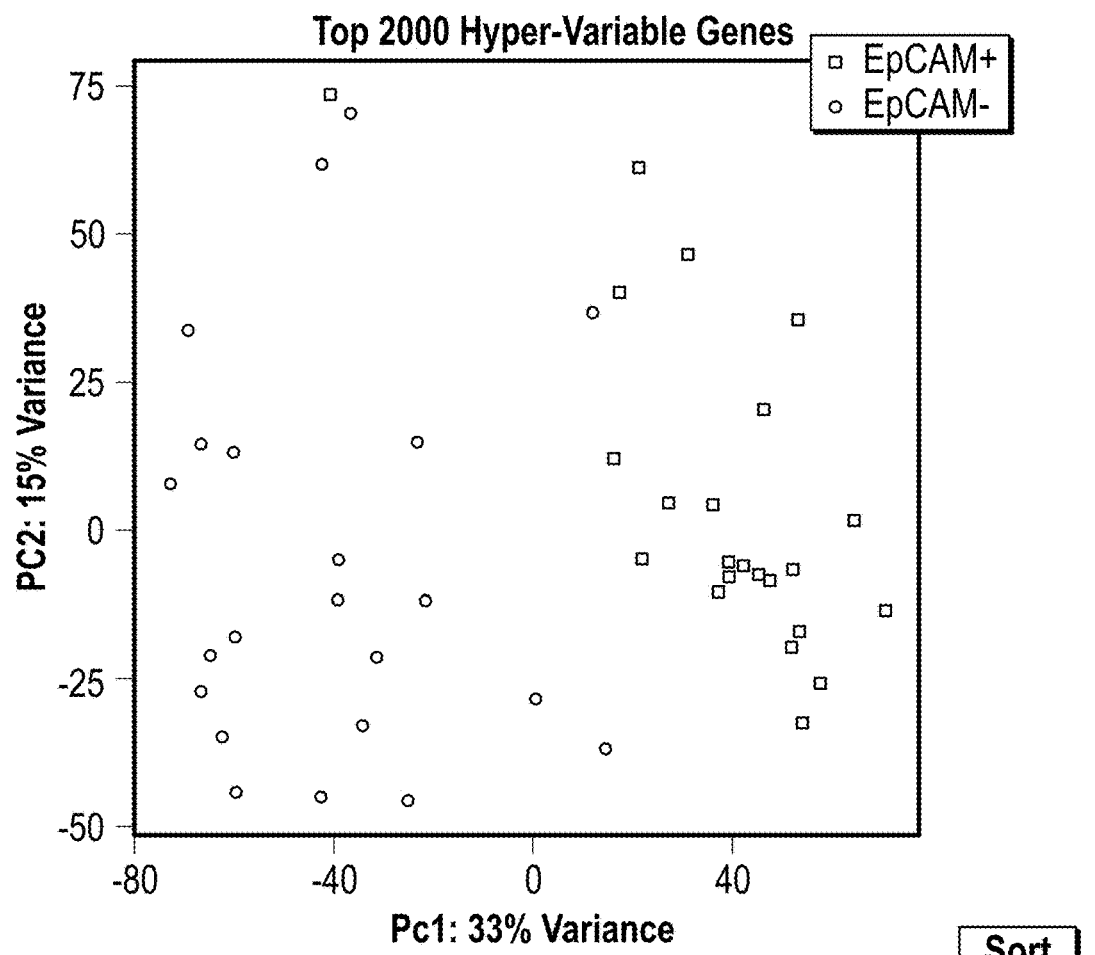
FIG. 11A shows Principal Component Analysis of the expression of top 2000 hypervariable genes in EpCAM$^+$ and EpCAM cells from each tumor.
Figure 11B:
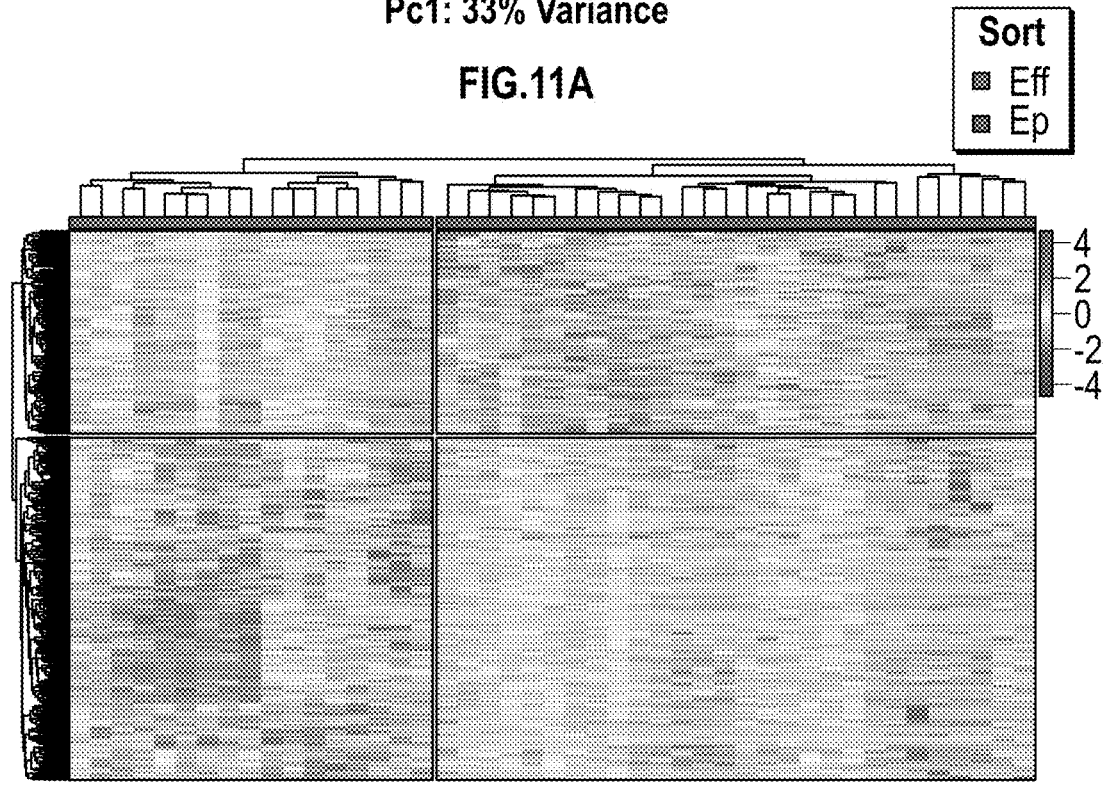
FIG. 11B is a heatmap showing differential expression of genes between EpCAM$^+$ and EpCAM$^-$ cells.
Figure 11C:
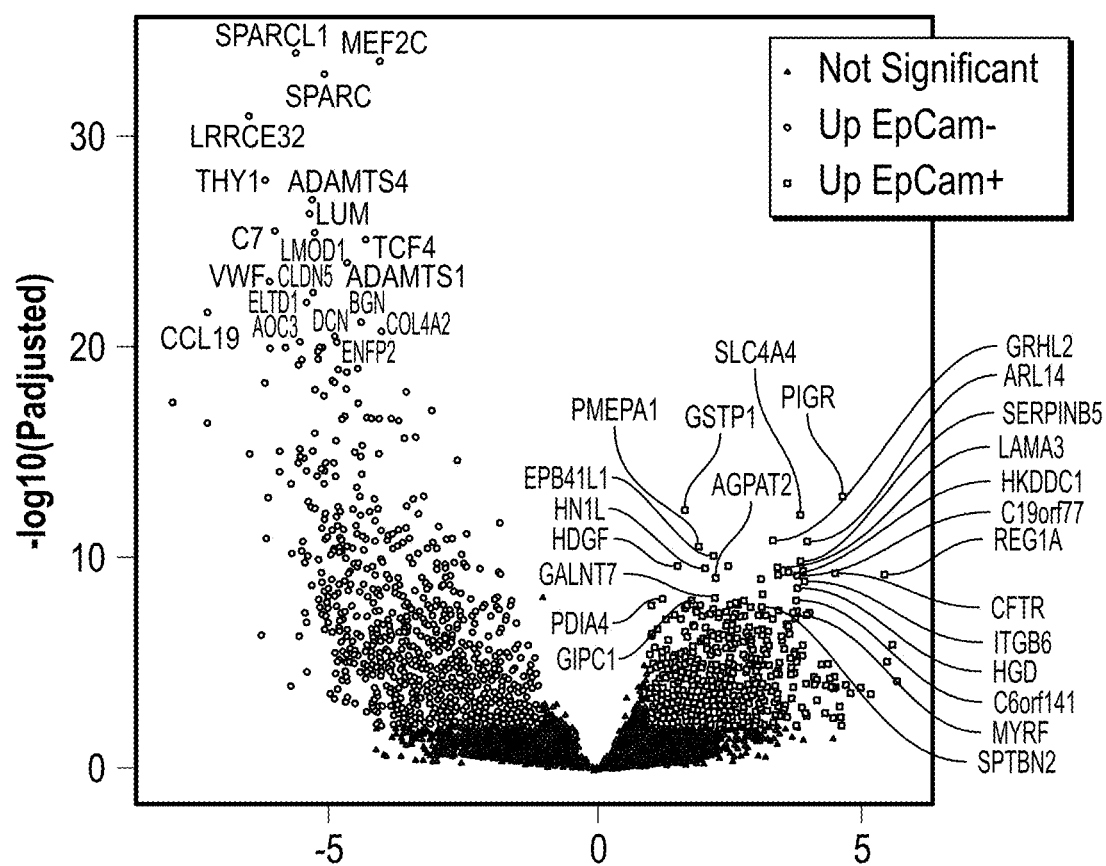
FIG. 11C is a volcano plot showing upregulated genes in EpCAM$^+$(red) and EpCAM$^-$ (blue) cells.
Figure 11D:
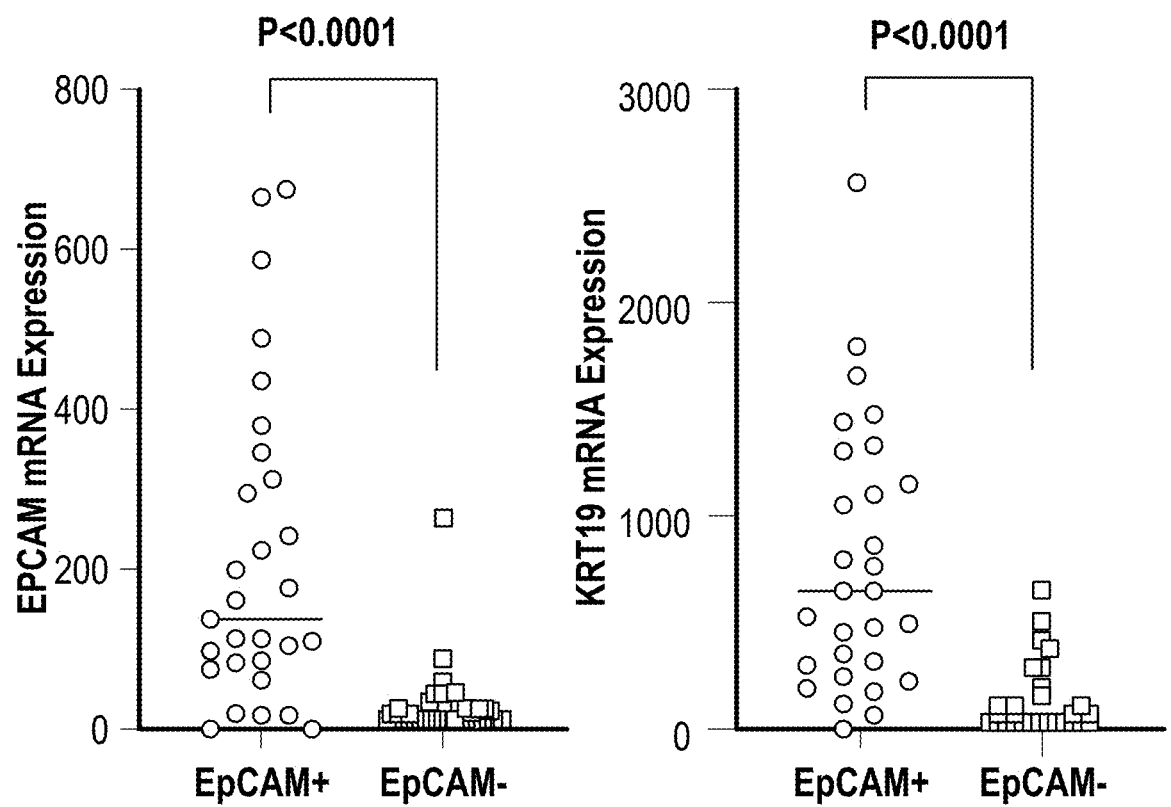
FIG. 11D shows expression of selected epithelial genes EpCAM and KRT19 mRNA in EpCAM$^+$ and EpCAM$^-$ subpopulations. Statistical tests are unpaired two tailed t-test with P<0.05 is significant, comparing EpCAM$^+$ (n=29) and EpCAM$^-$ (n=29) subpopulations.
Figure 12A:
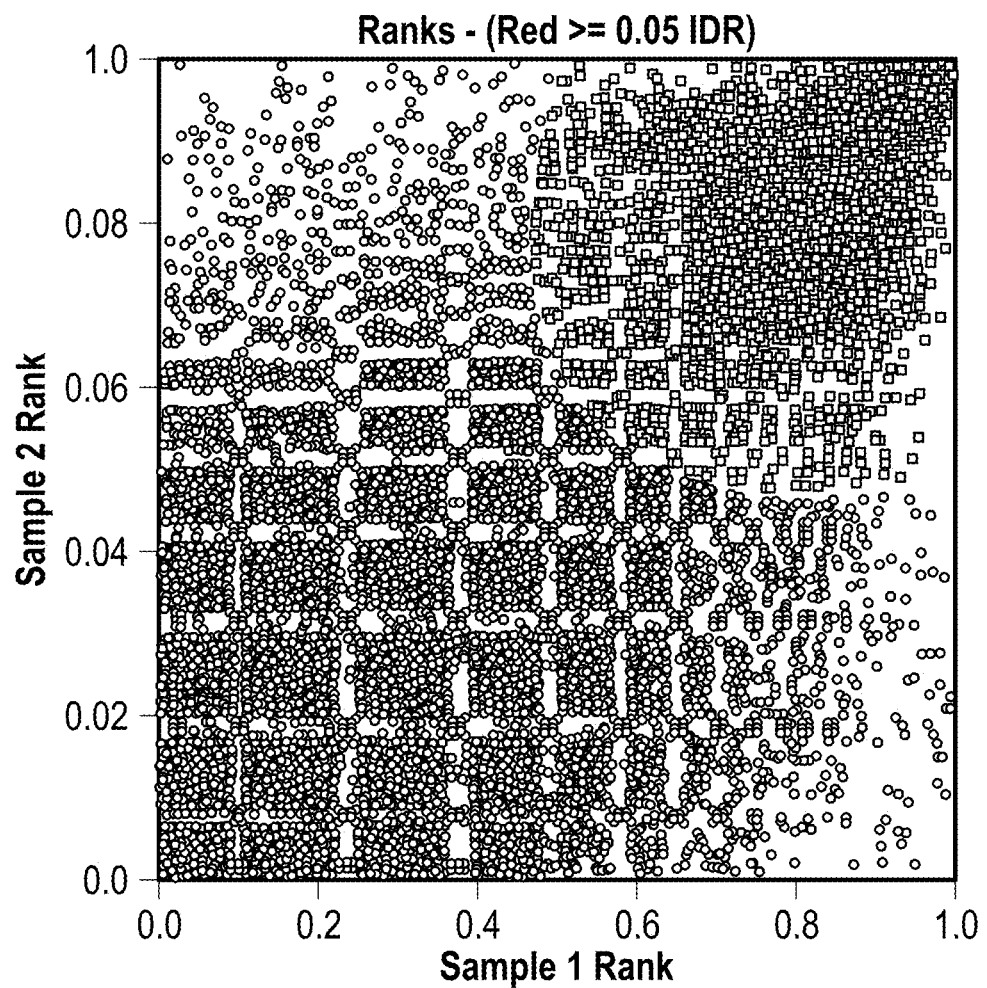
FIG. 12A shows Irreproducible Discovery Rate (IDR) depicting representative good quality and bad quality ATAC-seq libraries.
Figure 12A:
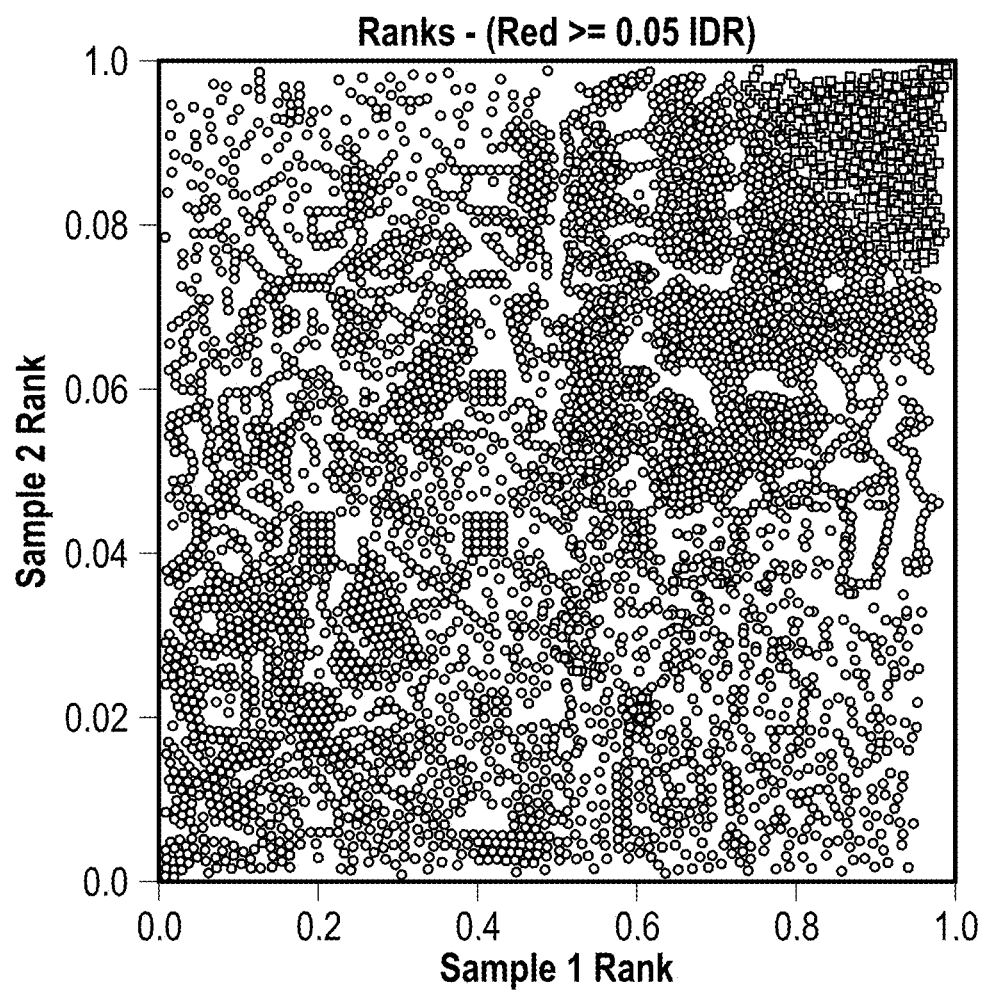
Figure 12B:
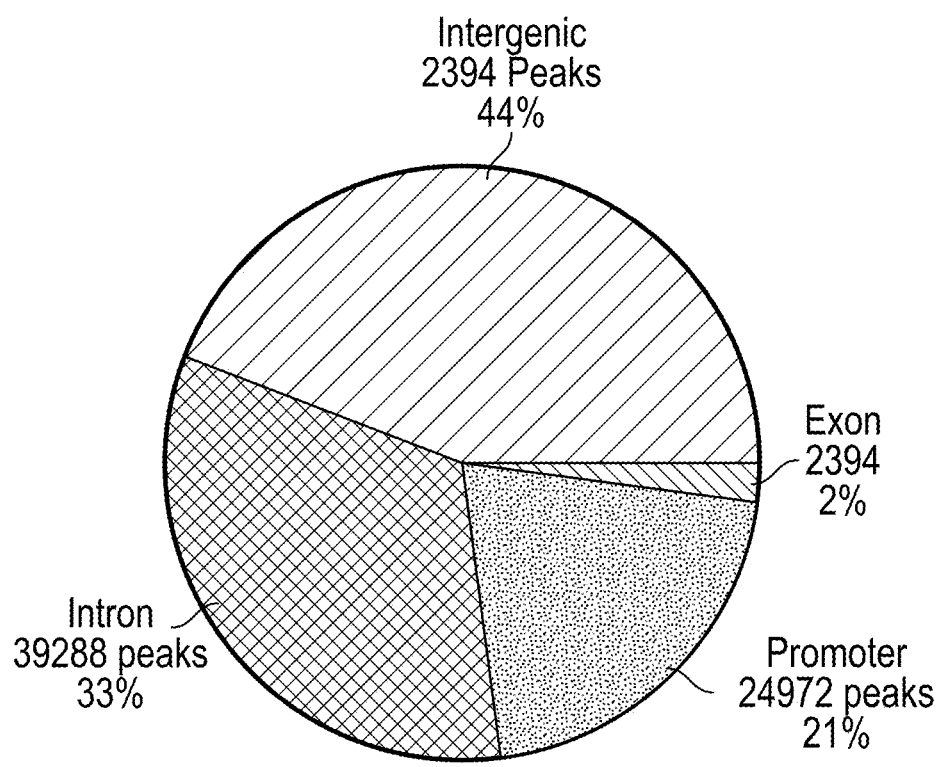
FIG. 12 B shows distribution of accessible promoter, intronic, exonic and intergenic peaks, as mapped on gene loci following ATAC-seq.
FIG. 12C is a bean plot showing the distribution of the ATAC-seq peaks among patients (n=40).
FIG. 12D shows exclusion of the lowest quartile of 14 samples from the complete cohort (n=54) by ranking them on the basis of number of (IDR) reproducible ATAC-seq peaks contributed by each patient, in order to selecting the best quality samples with which to form the global atlas (n=40).
Figure 12C:
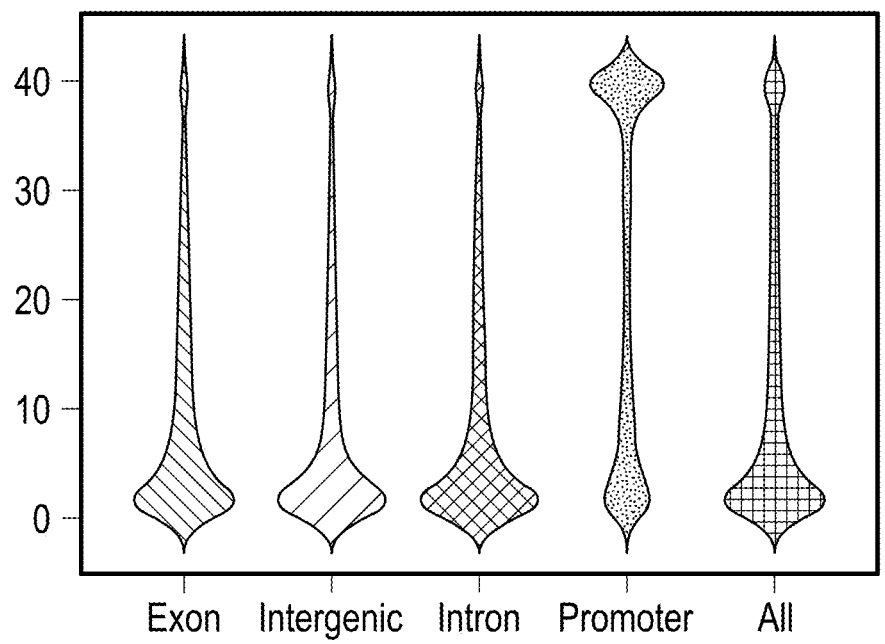
Figure 12D:
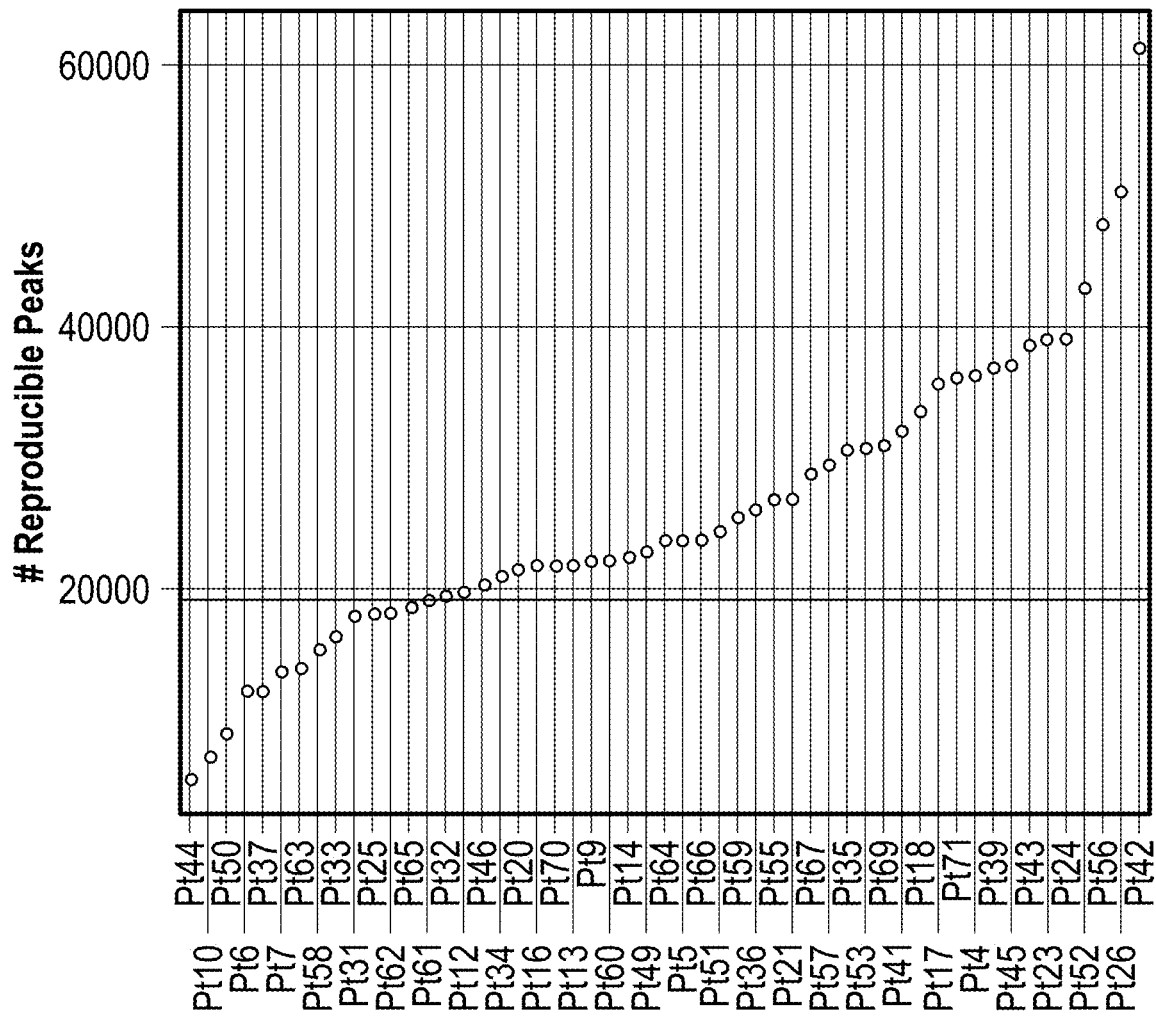

A linear regression model was established including only the patients where the day of recurrence was known (n=25) and excluding patients still surviving disease-free. The equation was y=437.5*X+354.8. See FIG. 8B. This equation and others generated in a similar manner are useful to predict the actual duration of DFS (days) in any patient at the time of diagnosis.

The chromatin accessibility signature and associated TFs that were significantly correlated with PDAC prognosis, offer a new chromatin organization-based prognostic paradigm for precision oncology. Although chromatin accessibility patterns have been reported in malignant diseases based on epigenetic analyses of bulk tumors, to date these analyses have excluded pancreatic cancer, based upon the notoriously low cellularity of these tumors. The results presented herein suggest that tumor-intrinsic chromatin accessibility patterns of PDAC and associated nuclear localization of TFs may predict outcome in this disease. The ATAC-array technology disclosed herein, combined with immunohistochemical determination of HNF1b nuclear localization, provides a simple and clinically achievable prediction of favorable vs unfavorable epigenetic states in PDAC.

F. SPECIFIC EMBODIMENTS (A1) A method for identifying a differentially accessible chromatin region, comprising: (a) obtaining a cellular sample from each of a plurality of subjects; (b) interrogating a genome-wide chromatin accessibility landscape; and (c) identifying a plurality of chromatin regions, wherein each of the plurality of chromatin regions is differentially accessible between a first subset of the plurality of subjects and a second subset of the plurality of subjects.

(A2) The method of embodiment A1, wherein the first subset comprises treatment resistant subjects and the second subset comprises treatment responsive subjects.

(A3) The method of embodiment A1, wherein the first subset comprises recurrent, and particularly early recurrent, subjects and the second subset comprises non-recurrent or late recurrent subjects.

(A4) The method of embodiment A1, wherein the first subset comprises short-term survivors and the second subset comprises long-term survivors.

(A5) The method of embodiment A1, wherein the first subset comprises subjects responsive to a first treatment modality (e.g., surgical resection with an adjuvant chemotherapeutic regimen) and the second subset comprises subjects that may benefit from treatment with a second treatment modality (e.g., an epigenetic drug or epigenetic reprogramming).

(B1) An assay comprising a plurality of oligonucleotides, optionally anchored to a solid support, wherein the plurality of oligonucleotides are complementary to a plurality of pre-selected differentially accessible chromatin regions.

(B2) The assay of embodiment B1, wherein each of the plurality of pre-selected differentially accessible chromatin regions is differentially accessible between a first subset of cancer patients and a second subset of cancer patients.

(B3) The assay of embodiment B1, wherein the plurality of pre-selected differentially accessible chromatin regions comprises at least 100 differentially accessible chromatin regions.

(B4) The assay of embodiment B1, wherein the plurality of pre-selected differentially accessible chromatin regions comprises at least 500 differentially accessible chromatin regions.

(B5) The assay of any of embodiments B1 to B4, where the plurality of oligonucleotides are anchored to a solid support.

(B6) The assay of any of embodiments B1 to B4, where the plurality of oligonucleotides are for use to hybridization with the differentially accessible chromatin regions in situ.

(C1) A method for treating cancer in a patient in need thereof, the method comprising: providing one or more treatment modalities to the patient, wherein prior to providing the treatment modality, a cellular sample from the patent has been tested to determine an epigenetic landscape of the cellular sample.

(C2) The method of embodiment C1, wherein the epigenetic landscape comprises a plurality of pre-selected differentially accessible chromatin regions.

(C3) The method of embodiment C1, wherein the epigenetic landscape comprises a plurality of pre-selected differentially accessible chromatin regions and the plurality of pre-selected differentially accessible chromatin regions comprise at least 100 differentially accessible chromatin regions.

(C4) The method of embodiment C1, wherein the epigenetic landscape comprises a plurality of pre-selected differentially accessible chromatin regions and the plurality of pre-selected differentially accessible chromatin region comprise at least 500 differentially accessible chromatin regions.

(D1) A method for treating PDAC in a patient in need thereof, the method comprising: treating the patient with a chemotherapeutic regimen, wherein prior to treating the patient with a chemotherapeutic regimen, a cellular sample from the patent has been tested to determine an epigenetic landscape of the cellular sample.

(D2) The method of embodiment D1, further comprising a histopathological investigation.

(D3) The method of embodiment D1, wherein the patient does not undergo surgical resection.

(D4) The method of embodiment D1, wherein the epigenetic landscape comprises a plurality of pre-selected differentially accessible chromatin regions from Table 1.

(D5) The method of embodiment D1, wherein the epigenetic landscape comprises a plurality of pre-selected differentially accessible chromatin regions and the plurality of pre-selected differentially accessible chromatin regions comprises at least 100 differentially accessible chromatin regions from Table 1.

(D6) The method of embodiment D1, wherein the epigenetic landscape comprises a plurality of pre-selected differentially accessible chromatin regions and the plurality of pre-selected differentially accessible chromatin regions comprises at least 500 differentially accessible chromatin regions from Table 1.

(D7) The method of embodiment D1, further comprising: (c) assessing expression and/or nuclear localization of one or more transcription factors.

(D8) The method of embodiment D7, wherein the one or more transcription factors comprise HNF1b and/or ZKSCAN1.

(E1) A method for treating PDAC in a patient in need thereof, the method comprising: resecting cancerous tissue, wherein prior to resecting the cancerous tissue, a cellular sample from the patent has been tested to determine an epigenetic landscape of the cellular sample.

(E2) The method of embodiment E1, further comprising a histopathological investigation.

(E3) The method of embodiment E1, wherein the epigenetic landscape comprises a plurality of pre-selected differentially accessible chromatin regions from Table 1.

(E4) The method of embodiment E1, wherein the epigenetic landscape comprises a plurality of pre-selected differentially accessible chromatin regions and the plurality of pre-selected differentially accessible chromatin regions comprises at least 100 differentially accessible chromatin regions from Table 1.

(E5) The method of embodiment E1, wherein the epigenetic landscape comprises a plurality of pre-selected differentially accessible chromatin regions and the plurality of pre-selected differentially accessible chromatin regions comprises at least 500 differentially accessible chromatin regions from Table 1.

(E6) The method of embodiment E1, further comprising: (c) assessing expression and/or nuclear localization of one or more transcription factors.

(E7) The method of embodiment E6, wherein the one or more transcription factors comprise HNF1b and/or ZKSCAN1.

(F1) A method for assessing an epigenetic landscape of a tumor sample, the method comprising: (a) obtaining a tumor sample, or derivative thereof; (b) contacting the tumor sample, or derivative thereof, to a plurality of oligonucleotides, wherein the plurality of oligonucleotides are anchored to a solid support and wherein the plurality of oligonucleotides are complementary to a plurality of pre-selected differentially accessible chromatin regions.

(F2) The method of embodiment F1, wherein the plurality of pre-selected differentially accessible chromatin regions comprises at least 100 differentially accessible chromatin regions.

(F3) The method of embodiment F1, wherein the plurality of pre-selected differentially accessible chromatin regions comprises at least 500 differentially accessible chromatin regions.

(F4) The method of embodiment F1, further comprising: (c) assessing expression and/or nuclear localization of one or more transcription factors.

(F5) The method of any one of embodiments F1-F4, wherein the tumor sample is from a pancreatic ductal adenocarcinoma.

(F6) The method of embodiment F5, wherein the one or more transcription factors comprise HNF1b and/or ZKSCAN1.

(G1) A method for determining an epigenetic landscape associated with a specific phenotypic trait of a biological sample, the method comprising: (a) providing a biological sample obtained from a patient, said biological sample comprising morphologically intact nuclei from cells of patient; (b) contacting the intact nuclei to a transposase complex to produce a population of tagged DNA fragments representing accessible chromatin regions (ACRs) of the intact nuclei; (c) attaching a detectable label to the tagged DNA fragments to produce labeled fragments; and (d) contacting the labeled fragments to a set of oligonucleotides probes, wherein said set of oligonucleotide probes are bound to a solid support.

(G2) The method of embodiment G1, further comprising: (b') amplifying said tagged DNA fragments.

(G3) The method of embodiment G1 or embodiment G2, wherein the set of oligonucleotide probes comprises (i) a first subset of oligonucleotide probes representative of accessible chromatin regions associated with a first phenotype and (ii) a second subset of oligonucleotide probes representative of accessible chromatin regions associated with a second phenotype.

(G4) The method of embodiment G3, wherein the first phenotype is recurrence of a cancer within one year of surgical resection and the second phenotype is non-recurrence of a cancer within one year of surgical resection.

(G5) The method of any of embodiments G1 to G4, further comprising: assessing nuclear localization of one or more transcription factors.

(G6) The method of any of embodiments G1 to G5, wherein step (d) further comprises substantially simultaneously or sequentially contacting labeled reference DNA to the set of oligonucleotide probes and normalizing hybridization intensity based on the labeled reference DNA.

(G7) The method of any of embodiments G1 to G6, wherein the biological sample comprises malignant cells.

(G8) The method of any of embodiments G1 to G7, wherein the biological sample is pancreatic ductal adenocarcinoma tissue.

(G9) The method of any of embodiments G1 to G8, wherein the phenotypic trait is responsiveness to a treatment modality.

(G10) The method of any of embodiments G1 to G9, wherein the ACRs comprise a promoter, an enhancer, or other regulatory element.

(G11) The method of any of embodiments G1 to G10, wherein the method does not include sequencing the tagged fragments or amplicons thereof.

(H1) A method for identifying an epigenetic landscape characteristic of resistance to a cancer treatment modality, the method comprising: (a) providing a first sample comprising cells from a treatment-resistant tumor and a second sample comprising cells from a treatment-sensitive tumor; (b) identifying accessible chromatin regions (ACRs) in both samples; and (c) comparing the ACRs identified in the first sample to the ACRs identified in the second sample.

(H2) The method of embodiment H1, wherein step (b) comprises: (i) contacting morphologically intact nuclei from the first sample to a transposase complex to produce a first population of tagged DNA fragments representing ACRs of the intact nuclei of the first sample; (ii) contacting morphologically intact nuclei from the second sample to a transposase complex to produce a second population of tagged DNA fragments representing ACRs of the intact nuclei of the second sample; (iii) attaching a first detectable label to the tagged DNA fragments representing ACRs of the first sample to produce a first population of labeled fragments; (iv) attaching a second detectable label to the tagged DNA fragments representing ACRs of the second sample to produce a second population of labeled fragments; (v) contacting the first population of labeled fragments to a first set of oligonucleotides probes, wherein said first set of oligonucleotide probes are bound to a solid support; (vi) contacting the second population of labeled fragments to a second set of oligonucleotides probes, wherein said second set of oligonucleotide probes are bound to a solid support; wherein said first set of oligonucleotide probes and the second set of oligonucleotide probes are substantially the same and comprise at least one chromatin region that is differentially accessible between the treatment-resistant tumor and the treatment-sensitive tumor.

(H3) The method of embodiment H2, wherein step (b) further comprises: (i') amplifying said tagged DNA fragments representing ACRs of the intact nuclei of the first sample and/or (ii') amplifying said tagged DNA fragments representing ACRs of the intact nuclei of the second sample.

(H4) The method of any of embodiments H1 to H3, wherein the cancer treatment modality is surgical resection with or without adjuvant chemotherapy.

(H5) The method of any of embodiments H1 to H4, wherein the method does not include sequencing the tagged fragments or amplicons thereof.

(I1) A method for treating pancreatic ductal adenocarcinoma in a patient in need thereof, the method comprising: resecting cancerous tissue, wherein prior to resecting the cancerous tissue, a biological sample from the patent has been tested to determine an epigenetic landscape of the biological sample.

(I2) The method of embodiment I1, further comprising: nuclear localization of one or more transcription factors, wherein the one or more transcription factors optionally comprise HNF1b and/or ZKSCAN1.

(I3) The method of embodiment I2 or I3, wherein the epigenetic landscape comprises a plurality of pre-selected differentially accessible chromatin regions from Table 1.

(J1) A method for treating pancreatic ductal adenocarcinoma in a patient in need thereof, the method comprising: administering an epigenetic drug to the patient, wherein prior to administering the epigenetic drug, a biological sample from the patent has been tested to determine an epigenetic landscape of the biological sample.

(J2) The method of embodiment J1, further comprising: nuclear localization of one or more transcription factors, wherein the one or more transcription factors optionally comprise HNF1b and/or ZKSCAN1.

(J3) The method of embodiment J2 or J3, wherein the epigenetic landscape comprises a plurality of pre-selected differentially accessible chromatin regions from Table 1.

(K1) A method of predicting a duration of disease-free survival in a patient having, or suspected of having, cancer or another malignant disease, the method comprising: (a) determining or having determined a first epigenetic signature value based on chromatin accessibility of a first group of differentially accessible chromatin regions in a biological sample obtained from the patient and a second epigenetic signature value based on chromatin accessibility of a second group of differentially accessible chromatin regions in the biological sample obtained from the patient; (b) comparing the first epigenetic signature value to the second epigenetic signature value to obtain a differential epigenetic value; (c) normalizing the differential value to obtain a normalized differential epigenetic value; and (d) predicting a duration of disease-free survival of the patient.

(K2) The method of embodiment K1, wherein the method includes comparing the normalized differential epigenetic value to a value or set of values derived from a population of confirmed recurred patients.

(K3) The method of embodiment K1, wherein the biological specimen is a biopsy sample, preferably a fine needle biopsy sample, or a bodily fluid sample that contains cancer cells.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

The invention claimed is:

1. A method of diagnosing and treating an epigenetic drug treatment-sensitive pancreatic ductal adenocarcinoma (PDAC) tumor in a subject in need thereof, the method comprising:
  (a) obtaining a tumor sample from a treatment-naïve subject and enriching for Epithelial Cell Adhesion Molecule (EpCAM) positive (EpCAM+) tumor cells from the tumor sample to generate an EpCAM+ tumor sample;
  (b) contacting the EpCAM+ tumor sample with a transposase complex to produce a population of tagged Accessible Chromatin Regions (ACRs);
  (c)(i) contacting the tagged ACRs with a solid support comprising a first plurality of oligonucleotide probes bound thereto, the first plurality of oligonucleotide probes are complementary to a first set of ACRs selected from:

| Chromosome (chr) | Genomic Location Start | Genomic Location End | Transcript ID | Gene symbol |
| --- | --- | --- | --- | --- |
| chr4 | 164471320 | 164471761 | ENST00000510786 | MARCHF1 |
| chr7 | 87198356 | 87198910 | ENST00000543898 | ABCB1 |
| chr15 | 89668375 | 89668644 | ENST00000562073 | ABHD2 |
| chr7 | 115979679 | 115980039 | ENST00000446355 | AC002066.1 |
| chr17 | 46018633 | 46019210 | ENST00000433001 | AC003665.1 |
| chr2 | 211054239 | 211055494 | ENST00000412065 | AC006994.2 |
| chr16 | 52288281 | 52288983 | ENST00000408588 | AC007333.1 |
| chr16 | 52290147 | 52290849 | ENST00000408588 | AC007333.1 |
| chr2 | 66800612 | 66801208 | ENST00000433396 | AC007392.3 |

| Chromosome (chr) | Genomic Location Start | Genomic Location End | Transcript ID | Gene symbol |
|---|---|---|---|---|
| chr2 | 43232429 | 43233212 | ENST00000457457 | AC016735.1 |
| chr2 | 151828282 | 151829233 | ENST00000425983 | AC023469.2 |
| chr4 | 111751532 | 111751971 | ENST00000515999 | AC024198.1 |
| chr17 | 76334969 | 76335254 | ENST00000586321 | AC061992.2 |
| chr2 | 183956117 | 183956559 | ENST00000444562 | AC064871.3 |
| chrX | 16328282 | 16328968 | ENST00000516839 | AC078993.1 |
| chr18 | 55102256 | 55103165 | ENST00000581316 | AC090340.1 |
| chr18 | 19577616 | 19577921 | ENST00000577673 | AC091043.1 |
| chr2 | 101441977 | 101442437 | ENST00000430586 | AC092168.2 |
| chr4 | 24384043 | 24384371 | ENST00000410330 | AC092846.1 |
| chr7 | 16961496 | 16961960 | ENST00000419352 | AC098592.7 |
| chr3 | 43255202 | 43255564 | ENST00000410399 | AC104434.1 |
| chr5 | 40485204 | 40485821 | ENST00000583717 | AC108105.1 |
| chr4 | 74548559 | 74549428 | ENST00000436089 | AC112518.3 |
| chr3 | 18799504 | 18799922 | ENST00000425799 | AC144521.1 |
| chr3 | 18699491 | 18700274 | ENST00000595388 | AC144521.1 |
| chr17 | 40074968 | 40075633 | ENST00000590735 | ACLY |
| chr10 | 112835917 | 112837154 | ENST00000280155 | ADRA2A |
| chr14 | 23029755 | 23030313 | ENST00000557595 | AE000662.92 |
| chr21 | 16512741 | 16513203 | ENST00000449746 | AF127577.12 |
| chr21 | 16513635 | 16514425 | ENST00000449746 | AF127577.12 |
| chr4 | 87863404 | 87863696 | ENST00000511442 | AFF1 |
| chr4 | 87933836 | 87934323 | ENST00000544085 | AFF1 |
| chr18 | 12376764 | 12377928 | ENST00000590811 | AFG3L2 |
| chr15 | 86106408 | 86107073 | ENST00000558811 | AKAP13 |
| chrX | 1710260 | 1710695 | ENST00000381261 | AKAP17A |
| chr6 | 131579205 | 131579893 | ENST00000474850 | AKAP7 |
| chr6 | 131579943 | 131580553 | ENST00000474850 | AKAP7 |
| chr21 | 29628568 | 29629059 | ENST00000453420 | AL035610.2 |
| chr9 | 78528856 | 78529314 | ENST00000459505 | AL359253.1 |
| chr1 | 244231070 | 244231550 | ENST00000598000 | AL590483.1 |
| chr4 | 71450043 | 71450658 | ENST00000322937 | AMBN |
| chr18 | 14178703 | 14179225 | ENST00000581181 | ANKRD20A5P |
| chr3 | 15900398 | 15901920 | ENST00000439830 | ANKRD28 |
| chr18 | 21207297 | 21207674 | ENST00000587763 | ANKRD29 |
| chr18 | 21209345 | 21209877 | ENST00000587763 | ANKRD29 |
| chr18 | 21189439 | 21189988 | ENST00000591617 | ANKRD29 |
| chr11 | 22213851 | 22215484 | ENST00000324559 | ANO5 |
| chr18 | 13823915 | 13824237 | ENST00000390194 | AP001525.1 |
| chr18 | 12657581 | 12658532 | ENST00000400512 | AP005482.1 |
| chrX | 15872339 | 15873736 | ENST00000421527 | AP1S2 |
| chr15 | 83349039 | 83349480 | ENST00000543938 | AP3B2 |
| chr14 | 31503002 | 31503435 | ENST00000555417 | AP4S1 |
| chrX | 23925684 | 23926349 | ENST00000490078 | APOO |
| chr18 | 24337137 | 24337871 | ENST00000579964 | AQP4-AS1 |
| chr8 | 1878704 | 1879351 | ENST00000522435 | ARHGEF10 |
| chr17 | 44656868 | 44657529 | ENST00000336125 | ARL17A |
| chr17 | 44438927 | 44439708 | ENST00000450673 | ARL17B |
| chr6 | 15949256 | 15950233 | ENST00000448802 | ARPC3P5 |
| chr15 | 98491142 | 98491429 | ENST00000538249 | ARRDC4 |
| chrX | 2815696 | 2816658 | ENST00000381154 | ARSD |
| chr4 | 94763615 | 94764289 | ENST00000306011 | ATOH1 |
| chr13 | 52532098 | 52532856 | ENST00000542656 | ATP7B |
| chr12 | 646923 | 647267 | ENST00000535680 | B4GALNT3 |
| chr3 | 118930104 | 118930466 | ENST00000483209 | B4GALT4 |
| chr5 | 17114415 | 17114792 | ENST00000606445 | BASP1 |
| chr18 | 60766821 | 60767604 | ENST00000398117 | BCL2 |
| chr12 | 12223581 | 12224233 | ENST00000308721 | BCL2L14 |
| chr10 | 60228227 | 60229121 | ENST00000373886 | BICC1 |
| chr13 | 77498752 | 77499091 | ENST00000426582 | BTF3P11 |
| chr17 | 56477290 | 56477780 | ENST00000583841 | BZRAP1-AS1 |
| chr12 | 13539722 | 13539939 | ENST00000532841 | C12orf36 |
| chr12 | 13539993 | 13540519 | ENST00000531049 | C12orf36 |
| chr13 | 113339543 | 113340006 | ENST00000356049 | C13orf35 |
| chr14 | 50453931 | 50454479 | ENST00000530176 | C14orf182 |
| chr15 | 90401815 | 90402255 | ENST00000559629 | C15orf38-AP3S2 |
| chr18 | 21082967 | 21083951 | ENST00000592119 | C18orf8 |
| chr18 | 21075012 | 21075330 | ENST00000269221 | C18orf8 |
| chr22 | 19434714 | 19435523 | ENST00000333059 | C22orf39 |
| chr4 | 37491862 | 37492339 | ENST00000508175 | C4orf19 |
| chr5 | 37165920 | 37166523 | ENST00000511824 | C5orf42 |
| chr8 | 40013191 | 40014286 | ENST00000315792 | C8orf4 |
| chrX | 15755897 | 15756576 | ENST00000380319 | CA5B |
| chrX | 15692727 | 15694099 | ENST00000380333 | CA5BP1 |
| chr18 | 20695658 | 20696122 | ENST00000400473 | CABLES1 |
| chr18 | 20679542 | 20679947 | ENST00000400473 | CABLES1 |
| chr18 | 20714210 | 20714563 | ENST00000579963 | CABLES1 |
| chr18 | 21718709 | 21719338 | ENST00000327201 | CABYR |
| chr13 | 99300363 | 99300982 | ENST00000430810 | CALM2P4 |
| chr7 | 116452899 | 116453499 | ENST00000464223 | CAPZA2 |
| chr12 | 18951259 | 18952375 | ENST00000317658 | CAPZA3 |
| chr8 | 128309764 | 128310584 | ENST00000523825 | CASC8 |
| chr18 | 2654993 | 2656229 | ENST00000579647 | CBX3P2 |
| chr19 | 11545786 | 11546623 | ENST00000586836 | CCDC151 |
| chr14 | 60043166 | 60043680 | ENST00000281581 | CCDC175 |
| chr18 | 52613423 | 52613785 | ENST00000587148 | CCDC68 |
| chr1 | 160512233 | 160512642 | ENST0000053496-8_54273 | CD84 |
| chrX | 2608934 | 2609490 | ENST00000381180 | CD99 |
| chrX | 2526973 | 2527761 | ENST00000527459 | CD99P1 |
| chr7 | 90350197 | 90350681 | ENST00000436577 | CDK14 |
| chr17 | 72987700 | 72988299 | ENST00000337231 | CDR2L |
| chr10 | 8610021 | 8610921 | ENST00000425516 | CHCHD3P1 |
| chr5 | 98215879 | 98216617 | ENST00000284049 | CHD1 |
| chr14 | 24777038 | 24777597 | ENST00000554411 | CIDEB |
| chr8 | 8547367 | 8547711 | ENST00000519106 | CLDN23 |
| chr8 | 8543551 | 8544101 | ENST00000519106 | CLDN23 |
| chr8 | 8549498 | 8549897 | ENST00000519106 | CLDN23 |
| chr12 | 9880385 | 9880890 | ENST00000327839 | CLECL1 |
| chr6 | 56263991 | 56264896 | ENST00000370819 | COL21A1 |
| chr4 | 109875916 | 109876470 | ENST00000399126 | COL25A1 |
| chr16 | 4464103 | 4464762 | ENST00000576457 | CORO7 |
| chr8 | 4195706 | 4196553 | ENST00000539096 | CSMD1 |
| chr8 | 4188712 | 4189987 | ENST00000539096 | CSMD1 |
| chr22 | 39317071 | 39317566 | ENST00000450216 | CTA-150C2.13 |
| chr9 | 27625883 | 27626853 | ENST00000400348 | CTAGE12P |
| chr5 | 156874176 | 156874688 | ENST00000519499 | CTB-109A12.1 |
| chr19 | 45198585 | 45199263 | ENST00000590796 | CTB-171A8.1 |
| chr5 | 156692779 | 156693779 | ENST00000517634 | CTC-248O19.1 |
| chr17 | 10640501 | 10640980 | ENST00000583012 | CTC-297N7.5 |
| chr5 | 73704005 | 73704568 | ENST00000507781 | CTC-419K13.1 |
| chr5 | 60550923 | 60551655 | ENST00000503882 | CTC-436P18.3 |
| chr5 | 98360931 | 98361324 | ENST00000513175 | CTD-2007H13.3 |
| chr5 | 81931049 | 81932003 | ENST00000510845 | CTD-2015A6.2 |
| chr11 | 22174396 | 22174976 | ENST00000530837 | CTD-2019O4.1 |
| chr5 | 56731545 | 56732157 | ENST00000506106 | CTD-2023N9.1 |
| chr5 | 92414020 | 92415132 | ENST00000515153 | CTD-2091N23.1 |
| chr15 | 64540179 | 64540500 | ENST00000606793 | CTD-2116N17.1 |
| chr5 | 58145773 | 58146112 | ENST00000510198 | CTD-2176I21.2 |
| chr19 | 7489776 | 7490370 | ENST00000593531 | CTD-2207O23.3 |
| chr5 | 50521576 | 50522552 | ENST00000468490 | CTD-2312P21.1 |
| chr4 | 125127833 | 125128704 | ENST00000507299 | CTD-2325B11.1 |
| chr5 | 50728721 | 50729673 | ENST00000505723 | CTD-2335O3.2 |
| chr5 | 95429064 | 95430289 | ENST00000511775 | CTD-2337A12.1 |
| chr18 | 71007537 | 71008213 | ENST00000583942 | CTD-2354A18.1 |
| chr18 | 70985941 | 70986635 | ENST00000563172 | CTD-2354A18.1 |
| chr18 | 71068317 | 71068856 | ENST00000563172 | CTD-2354A18.1 |
| chr17 | 71856589 | 71857110 | ENST00000580370 | CTD-2532D12.5 |
| chr7 | 117356474 | 117357412 | ENST00000445366 | CTTNBP2 |
| chr4 | 105415971 | 105416096 | ENST00000466963 | CXXC4 |
| chr7 | 121037949 | 121038214 | ENST00000411715 | CYCSP19 |
| chr5 | 139598938 | 139599611 | ENST00000509789 | CYSTM1 |
| chr9 | 90184915 | 90185347 | ENST00000489291 | DAPK1 |
| chrX | 110580244 | 110581078 | ENST00000496551 | DCX |
| chr14 | 100625737 | 100626234 | ENST00000553834 | DEGS2 |
| chr13 | 60181712 | 60182550 | ENST00000400324 | DIAPH3 |
| chr13 | 60586478 | 60586983 | ENST00000435636 | DIAPH3-AS1 |
| chr18 | 4004111 | 4004976 | ENST00000582051 | DLGAP1 |
| chr18 | 4017581 | 4018096 | ENST00000577430 | DLGAP1 |
| chr19 | 10859669 | 10860777 | ENST00000586939 | DNM2 |
| chr1 | 172137033 | 172137953 | ENST00000523513 | DNM3 |
| chr18 | 28591355 | 28591777 | ENST00000434452 | DSC3 |
| chr6 | 56558773 | 56559190 | ENST00000521104 | DST |
| chr5 | 158122586 | 158122909 | ENST00000519890 | EBF1 |
| chr13 | 32519681 | 32520190 | ENST00000428783 | EEF1DP3 |
| chr5 | 106810443 | 106811097 | ENST00000505499 | EFNA5 |
| chr3 | 24640233 | 24640703 | ENST00000415266 | EIF3KP2 |
| chr2 | 42422735 | 42423150 | ENST00000401738 | EML4 |
| chr12 | 15815552 | 15815954 | ENST00000540613 | EPS8 |
| chr12 | 15865506 | 15866240 | ENST00000543612 | EPS8 |

| Chromosome (chr) | Genomic Location Start | Genomic Location End | Transcript ID | Gene symbol |
|---|---|---|---|---|
| chr12 | 15842656 | 15843267 | ENST00000544064 | EPS8 |
| chr17 | 62161429 | 62162290 | ENST00000584041 | ERN1 |
| chr14 | 53167381 | 53167871 | ENST00000556039 | ERO1L |
| chr21 | 40174479 | 40175013 | ENST00000360214 | ETS2 |
| chr8 | 118958604 | 118959299 | ENST00000436216 | EXT1 |
| chr8 | 118959719 | 118960347 | ENST00000436216 | EXT1 |
| chr5 | 14581642 | 14582228 | ENST00000274217 | FAM105A |
| chr4 | 89897580 | 89898181 | ENST00000509094 | FAM13A |
| chr4 | 187027154 | 187027446 | ENST00000508379 | FAM149A |
| chr13 | 108686039 | 108687002 | ENST00000375915 | FAM155A |
| chr13 | 108486621 | 108487030 | ENST00000449551 | FAM155A-IT1 |
| chr4 | 187564825 | 187565498 | ENST00000441802 | FAT1 |
| chr4 | 15679072 | 15679693 | ENST00000514541 | FBXL5 |
| chr4 | 175181121 | 175181620 | ENST00000513696 | FBXO8 |
| chr13 | 102392011 | 102392599 | ENST00000376143 | FGF14 |
| chr13 | 102399458 | 102399928 | ENST00000376143 | FGF14 |
| chr5 | 176513355 | 176514471 | ENST00000513166 | FGFR4 |
| chr14 | 75749392 | 75750562 | ENST00000303562 | FOS |
| chr13 | 39260761 | 39261550 | ENST00000280481 | FREM2 |
| chr15 | 90877324 | 90877942 | ENST00000412799 | GABARAPL3 |
| chr4 | 174112844 | 174113342 | ENST00000512285 | GALNT7 |
| chr4 | 173647115 | 173647791 | ENST00000508122 | GALNTL6 |
| chr18 | 29738048 | 29738594 | ENST00000583696 | GAREM |
| chr18 | 29740444 | 29740915 | ENST00000583696 | GAREM |
| chr18 | 30050445 | 30051372 | ENST00000399218 | GAREM |
| chr18 | 29952163 | 29952949 | ENST00000269209 | GAREM |
| chr11 | 22696063 | 22696714 | ENST00000433790 | GAS2 |
| chr18 | 19774213 | 19774529 | ENST00000581694 | GATA6 |
| chr18 | 19770500 | 19771301 | ENST00000581694 | GATA6 |
| chr18 | 19748853 | 19749787 | ENST00000583490 | GATA6-AS1 |
| chr18 | 19748357 | 19748632 | ENST00000579431 | GATA6-AS1 |
| chr5 | 74332978 | 74333338 | ENST00000322348 | GCNT4 |
| chr4 | 175547466 | 175548242 | ENST00000274093 | GLRA3 |
| chr1 | 68345690 | 68346295 | ENST00000413628 | GNG12-AS1 |
| chrX | 132843583 | 132844339 | ENST00000406757 | GPC3 |
| chr13 | 93125967 | 93126657 | ENST00000377067 | GPC5 |
| chr5 | 90184384 | 90184958 | ENST00000425867 | GPR98 |
| chr4 | 90226929 | 90227192 | ENST00000609048 | GPRIN3 |
| chr14 | 65409340 | 65409856 | ENST00000557323 | GPX2 |
| chr2 | 165477406 | 165478493 | ENST00000446413 | GRB14 |
| chr7 | 86475603 | 86476697 | ENST00000439827 | GRM3 |
| chr3 | 7246159 | 7246840 | ENST00000435689 | GRM7 |
| chrX | 15624226 | 15624853 | ENST00000421585 | GS1-594A7.3 |
| chr4 | 156625042 | 156625531 | ENST00000513574 | GUCY1A3 |
| chr4 | 156679791 | 156681400 | ENST00000513437 | GUCY1B3 |
| chr10 | 115312349 | 115312929 | ENST00000541666 | HABP2 |
| chrX | 7050318 | 7051134 | ENST00000498474 | HDHD1 |
| chr15 | 63969949 | 63970349 | ENST00000559715 | HERC1 |
| chr17 | 72970801 | 72971274 | ENST00000532900 | HID1 |
| chr6 | 126265396 | 126265975 | ENST00000229633 | HINT3 |
| chr6 | 143160084 | 143160736 | ENST00000367604 | HIVEP2 |
| chr6 | 30226869 | 30227564 | ENST00000420110 | HLA-L |
| chr17 | 36070163 | 36070788 | ENST00000560016 | HNF1B |
| chr5 | 78791005 | 78791692 | ENST00000535690 | HOMER1 |
| chr4 | 84255872 | 84256464 | ENST00000513463 | HPSE |
| chr16 | 82061215 | 82061820 | ENST00000563491 | HSD17B2 |
| chr4 | 83316004 | 83316436 | ENST00000503202 | IGBP1P4 |
| chrX | 117907769 | 117908146 | ENST00000371637 | IL13RAJ |
| chr13 | 21277892 | 21278693 | ENST00000468605 | IL17D |
| chr18 | 12000289 | 12000722 | ENST00000588863 | IMPA2 |
| chr4 | 106772105 | 106772882 | ENST00000510876 | INTS12 |
| chr1 | 59246541 | 59247091 | ENST0000037122-2_43680 | JUN |
| chr1 | 59245356 | 59246066 | ENST00000371222 | JUN |
| chr8 | 103941579 | 103942473 | ENST00000517996 | KB-1507C5.2 |
| chr3 | 19189370 | 19190217 | ENST00000452398 | KCNH8 |
| chr3 | 19188141 | 19189179 | ENST00000328405 | KCNH8 |
| chr14 | 88715001 | 88715398 | ENST00000556282 | KCNK10 |
| chr18 | 24235854 | 24237453 | ENST00000584630 | KCTD1 |
| chr18 | 24060728 | 24061749 | ENST00000578973 | KCTD1 |
| chr18 | 24159844 | 24160367 | ENST00000580191 | KCTD1 |
| chr18 | 24067372 | 24067793 | ENST00000578973 | KCTD1 |
| chrX | 44731642 | 44733410 | ENST00000475233 | KDM6A |
| chr4 | 57107532 | 57108067 | ENST00000264229 | KIAA1211 |
| chr7 | 86688557 | 86689480 | ENST00000423294 | KIAA1324L |
| chr18 | 34408158 | 34409506 | ENST00000587139 | KIAA1328 |
| chr18 | 9673064 | 9673873 | ENST00000581937 | KRT18P8 |
| chr17 | 39686341 | 39686778 | ENST00000361566 | KRT19 |
| chr17 | 39058236 | 39058611 | ENST00000167588 | KRT20 |
| chr18 | 6413976 | 6415319 | ENST00000580162 | L3MBTL4 |
| chr18 | 6315695 | 6316404 | ENST00000580162 | L3MBTL4 |
| chr8 | 71578881 | 71579614 | ENST00000276590 | LACTB2 |
| chr18 | 21453249 | 21453428 | ENST00000587184 | LAMA3 |
| chr18 | 21408398 | 21408763 | ENST00000591749 | LAMA3 |
| chr18 | 21452574 | 21453145 | ENST00000587184 | LAMA3 |
| chr18 | 21269015 | 21270342 | ENST00000399516 | LAMA3 |
| chr18 | 21464667 | 21465113 | ENST00000586751 | LAMA3 |
| chr18 | 21450963 | 21451245 | ENST00000269217 | LAMA3 |
| chr8 | 98861557 | 98862712 | ENST00000521545 | LAPTM4B |
| chr22 | 34142384 | 34142996 | ENST00000416275 | LARGE-AS1 |
| chr10 | 98623698 | 98624364 | ENST00000371097 | LCOR |
| chr5 | 132208952 | 132209463 | ENST00000485457 | LEAP2 |
| chr17 | 39956851 | 39957456 | ENST00000355468 | LEPREL4 |
| chr20 | 22471368 | 22471859 | ENST00000420070 | LINC00261 |
| chr13 | 106458613 | 106459355 | ENST00000415294 | LINC00343 |
| chr13 | 30682897 | 30683442 | ENST00000432770 | LINC00365 |
| chr13 | 30646504 | 30647236 | ENST00000413591 | LINC00365 |
| chr17 | 48845654 | 48846094 | ENST00000502517 | LINC00483 |
| chr17 | 70514867 | 70515633 | ENST00000580861 | LINC00511 |
| chr17 | 70613945 | 70614728 | ENST00000581549 | LINC00511 |
| chr17 | 70462355 | 70462619 | ENST00000580861 | LINC00511 |
| chr14 | 56298766 | 56299226 | ENST00000560336 | LINC00520 |
| chr8 | 29595979 | 29596739 | ENST00000506121 | LINC00589 |
| chr1 | 168769107 | 168770153 | ENST00000420691 | LINC00626 |
| chr14 | 39308853 | 39309445 | ENST00000557440 | LINC00639 |
| chr18 | 40105871 | 40106286 | ENST00000589068 | LINC00907 |
| chr6 | 2986172 | 2986575 | ENST00000450238 | LINC01011 |
| chr13 | 76583584 | 76584230 | ENST00000448806 | LINC01034 |
| chr18 | 68048808 | 68049145 | ENST000000058225-1_572674 | LINCO1910 |
| chr13 | 76334271 | 76334966 | ENST00000465261 | LMO7 |
| chr4 | 54457506 | 54458027 | ENST00000512247 | LNX1 |
| chr12 | 12550932 | 12551724 | ENST00000298571 | LOH12CR1 |
| chr12 | 12556572 | 12557059 | ENST00000298571 | LOH12CR1 |
| chr18 | 14430668 | 14431655 | ENST00000584783 | LONRF2P1 |
| chr4 | 62406648 | 62407173 | ENST00000514996 | LPHN3 |
| chr18 | 2939329 | 2939618 | ENST00000261596 | LPIN2 |
| chr18 | 2984812 | 2985290 | ENST00000584915 | LPIN2 |
| chr4 | 155547868 | 155548555 | ENST00000499392 | LRAT |
| chr4 | 155664739 | 155665500 | ENST00000510733 | LRAT |
| chr4 | 151435655 | 151436697 | ENST00000513021 | LRBA |
| chr3 | 66543117 | 66543788 | ENST00000475366 | LRIG1 |
| chr6 | 53719637 | 53720021 | ENST00000370882 | LRRC1 |
| chr4 | 52883991 | 52884363 | ENST00000343457 | LRRC66 |
| chr20 | 15119226 | 15119713 | ENST00000310348 | MACROD2 |
| chr3 | 65938946 | 65939447 | ENST00000460754 | MAGI1-IT1 |
| chr6 | 119915982 | 119916519 | ENST00000368468 | MAN1A1 |
| chr2 | 102353912 | 102354557 | ENST00000417294 | MAP4K4 |
| chr14 | 50908246 | 50909117 | ENST00000013125 | MAP4K5 |
| chr13 | 73899238 | 73900358 | ENST00000420129 | MARK2P12 |
| chr5 | 66381100 | 66381787 | ENST00000447738 | MAST4 |
| chrX | 21816665 | 21817660 | ENST00000465888 | MBTPS2 |
| chr3 | 169022989 | 169023782 | ENST00000485957 | MECOM |
| chr3 | 169097224 | 169097849 | ENST00000485957 | MECOM |
| chr1 | 28648608 | 28649153 | ENST00000479574 | MED18 |
| chr6 | 78359808 | 78360616 | ENST00000602452 | MEI4 |
| chr13 | 103553441 | 103553830 | ENST00000605100 | METTL21EP |
| chr2 | 134946547 | 134947309 | ENST00000409645 | MGAT5 |
| chr1 | 165614855 | 165615573 | ENST00000461759 | MGST3 |
| chr10 | 74209572 | 74210383 | ENST00000489666 | MICU1 |
| chr17 | 62700725 | 62701052 | ENST00000604003 | MINOS1P2 |
| chr14 | 37798337 | 37798669 | ENST00000556940 | MIPOL1 |
| chr17 | 72746567 | 72746861 | ENST00000585285 | MIR3615 |
| chr12 | 1779737 | 1779986 | ENST00000577921 | MIR3649 |
| chr5 | 89316952 | 89317321 | ENST00000584845 | MIR3660 |
| chr5 | 170176920 | 170177427 | ENST00000521965 | MIR4454 |
| chr5 | 170184196 | 170184589 | ENST00000521965 | MIR4454 |
| chr5 | 54467950 | 54468191 | ENST00000516047 | MIR449C |
| chr3 | 24565803 | 24566193 | ENST00000580344 | MIR4792 |
| chr9 | 28915264 | 28915864 | ENST00000401120 | MIR873 |

| Chromosome (chr) | Genomic Location Start | Genomic Location End | Transcript ID | Gene symbol |
| --- | --- | --- | --- | --- |
| chr12 | 122595449 | 122596247 | ENST00000319080 | MLXIP |
| chr17 | 53510366 | 53511001 | ENST00000262065 | MMD |
| chr11 | 102800546 | 102801385 | ENST00000260302 | MMP13 |
| chr9 | 27371349 | 27371791 | ENST00000603061 | MOB3B |
| chr9 | 27385265 | 27386040 | ENST00000603061 | MOB3B |
| chr2 | 36008748 | 36009185 | ENST00000431951 | MRPL50P1 |
| chr6 | 43663358 | 43663937 | ENST00000372133 | MRPS18A |
| chr17 | 55740045 | 55740953 | ENST00000579505 | MSI2 |
| chr5 | 32302570 | 32303291 | ENST00000513622 | MTMR12 |
| chr17 | 56591826 | 56592157 | ENST00000582390 | MTMR4 |
| chr8 | 17652219 | 17652783 | ENST00000381862 | MTUS1 |
| chr8 | 17646298 | 17647375 | ENST00000381862 | MTUS1 |
| chr1 | 40357889 | 40358640 | ENST00000397332 | MYCL |
| chr18 | 3250757 | 3251051 | ENST00000578562 | MYL12A |
| chr17 | 73597354 | 73597809 | ENST00000584323 | MYO15B |
| chr17 | 73613416 | 73613713 | ENST00000578300 | MYO15B |
| chr17 | 31121546 | 31122070 | ENST00000583621 | MYO1D |
| chr15 | 59548285 | 59548587 | ENST00000558571 | MYO1E |
| chr18 | 3051740 | 3052729 | ENST00000356443 | MYOM1 |
| chr18 | 3218007 | 3218215 | ENST00000261606 | MYOM1 |
| chr18 | 3117490 | 3118235 | ENST00000261606 | MYOM1 |
| chr15 | 57899754 | 57900281 | ENST00000569089 | MYZAP |
| chr12 | 7950400 | 7950813 | ENST00000229307 | NANOG |
| chr13 | 35923722 | 35924281 | ENST00000379939 | NBEA |
| chr13 | 35515748 | 35516975 | ENST00000379939 | NBEA |
| chr8 | 71115117 | 71115743 | ENST00000518287 | NCOA2 |
| chr10 | 51566723 | 51567262 | ENST00000414907 | NCOA4 |
| chr13 | 80055053 | 80055742 | ENST00000457171 | NDFIP2-AS1 |
| chr4 | 103541806 | 103542546 | ENST00000226574 | NFKB1 |
| chrX | 17613238 | 17614124 | ENST00000380060 | NHS |
| chr4 | 85420209 | 85421036 | ENST00000295886 | NKX6-1 |
| chr4 | 85432843 | 85433341 | ENST00000295886 | NKX6-1 |
| chr18 | 21166005 | 21167139 | ENST00000540608 | NPC1 |
| chr4 | 72978120 | 72978772 | ENST00000358454 | NPFFR2 |
| chr4 | 106816201 | 106816854 | ENST00000503451 | NPNT |
| chr4 | 106830892 | 106831539 | ENST00000506056 | NPNT |
| chr4 | 106818891 | 106819676 | ENST00000513430 | NPNT |
| chr1 | 27240311 | 27240999 | ENST00000254227 | NROB2 |
| chr4 | 149366324 | 149366956 | ENST00000344721 | NR3C2 |
| chr4 | 149297345 | 149297623 | ENST00000511528 | NR3C2 |
| chr4 | 149352458 | 149353065 | ENST00000511528 | NR3C2 |
| chr18 | 21851298 | 21852369 | ENST00000585247 | OSBPL1A |
| chr18 | 21977090 | 21978175 | ENST00000582618 | OSBPL1A |
| chr8 | 107630045 | 107630587 | ENST00000497705 | OXR1 |
| chr22 | 43336262 | 43336736 | ENST00000453079 | PACSIN2 |
| chr6 | 52254401 | 52254862 | ENST00000360726 | PAQR8 |
| chr12 | 3982194 | 3982816 | ENST00000450737 | PARP11 |
| chr8 | 127836689 | 127837275 | ENST00000519319 | PCAT1 |
| chr13 | 61989175 | 61989676 | ENST00000409204 | PCDH20 |
| chr4 | 30964479 | 30964886 | ENST00000509759 | PCDH7 |
| chr4 | 31148080 | 31148352 | ENST00000511884_155940 | PCDH7 |
| chr4 | 30903182 | 30904207 | ENST00000511884 | PCDH7 |
| chr4 | 30954382 | 30954826 | ENST00000509759 | PCDH7 |
| chr4 | 120549649 | 120550511 | ENST00000354960 | PDE5A |
| chr4 | 157873335 | 157873855 | ENST00000422544 | PDGFC |
| chrX | 19352288 | 19352590 | ENST00000379806 | PDHA1 |
| chrX | 24517071 | 24517405 | ENST00000493226 | PDK3 |
| chrX | 24482963 | 24483767 | ENST00000441463 | PDK3 |
| chr13 | 73544410 | 73545113 | ENST00000469712 | PIBF1 |
| chr18 | 11005554 | 11005954 | ENST00000582913 | PIEZO2 |
| chr18 | 10798713 | 10799240 | ENST00000579112 | PIEZO2 |
| chr12 | 33049306 | 33050344 | ENST00000546741 | PKP2 |
| chr14 | 67878683 | 67879198 | ENST00000557388 | PLEK2 |
| chr12 | 6419391 | 6420221 | ENST00000396988 | PLEKHG6 |
| chr16 | 57298954 | 57299312 | ENST00000564018 | PLLP |
| chr15 | 74305515 | 74306058 | ENST00000564725 | PML |
| chr22 | 41983726 | 41984326 | ENST00000466645 | PMM1 |
| chrX | 7894985 | 7896017 | ENST00000442940 | PNPLA4 |
| chr12 | 89900906 | 89901589 | ENST00000546830 | POC1B |
| chr8 | 38124767 | 38125231 | ENST00000530193 | PPAPDC1B |
| chr4 | 23789895 | 23790557 | ENST00000509702 | PPARGCIA |
| chr8 | 26165314 | 26165833 | ENST00000523964 | PPP2R2A |
| chr8 | 22312699 | 22313062 | ENST00000522000 | PPP3CC |
| chr13 | 39210941 | 39211343 | ENST00000447765 | PRDX3P3 |
| chr5 | 144843814 | 144844163 | ENST00000510259 | PRELID2 |
| chr5 | 40784185 | 40784659 | ENST00000397006 | PRKAA1 |
| chr17 | 64382980 | 64383423 | ENST00000284384 | PRKCA |
| chr10 | 52753171 | 52754401 | ENST00000373985 | PRKG1 |
| chrX | 3615234 | 3616144 | ENST00000262848 | PRKX |
| chrX | 3631095 | 3632157 | ENST00000262848 | PRKX |
| chr4 | 119273882 | 119274465 | ENST00000296498 | PRSS12 |
| chr9 | 79249252 | 79250114 | ENST00000223609 | PRUNE2 |
| chr13 | 73614637 | 73615691 | ENST00000437000 | PSMD10P3 |
| chr18 | 12659958 | 12660445 | ENST00000589405 | PSMG2 |
| chr5 | 40679080 | 40680306 | ENST00000514343 | PTGER4 |
| chr12 | 6873219 | 6873910 | ENST00000540667 | PTMS |
| chr12 | 7055207 | 7055997 | ENST00000538318 | PTPN6 |
| chr18 | 7926531 | 7927006 | ENST00000400053 | PTPRM |
| chr18 | 8341512 | 8342175 | ENST00000577827 | PTPRM |
| chr18 | 7878650 | 7879298 | ENST00000400053 | PTPRM |
| chr18 | 8329209 | 8329564 | ENST00000577827 | PTPRM |
| chr3 | 191194228 | 191194546 | ENST00000518817 | PYDC2 |
| chr12 | 21597079 | 21597766 | ENST00000538582 | PYROXD1 |
| chr1 | 180126329 | 180127241 | ENST00000367600 | QSOX1 |
| chr15 | 66124847 | 66125582 | ENST00000568850 | RAB11A |
| chr17 | 29816786 | 29817073 | ENST00000578694 | RAB11FIP4 |
| chr18 | 52434366 | 52434770 | ENST00000586570 | RAB27B |
| chr14 | 68987627 | 68988132 | ENST00000478014 | RAD51B |
| chr14 | 68631120 | 68631904 | ENST00000557045 | RAD51B |
| chr14 | 68658282 | 68659082 | ENST00000557045 | RAD51B |
| chrX | 17878644 | 17879810 | ENST00000545871 | RAI2 |
| chr18 | 9474785 | 9475995 | ENST00000383432 | RALBP1 |
| chr17 | 38501710 | 38502341 | ENST00000475125 | RARA |
| chr4 | 53728083 | 53728700 | ENST00000515677 | RASL11B |
| chr1 | 65210283 | 65210996 | ENST00000371072 | RAVER2 |
| chr18 | 20558174 | 20558672 | ENST00000585177 | RBBP8 |
| chr21 | 15588231 | 15588966 | ENST00000400577 | RBM11 |
| chr4 | 40475810 | 40476436 | ENST00000507180 | RBM47 |
| chr4 | 40578882 | 40579574 | ENST00000513044 | RBM47 |
| chr7 | 12969053 | 12969525 | ENST00000441256 | RBMX2P4 |
| chr7 | 13005419 | 13005842 | ENST00000441256 | RBMX2P4 |
| chr4 | 37684772 | 37685026 | ENST00000454158 | RELL1 |
| chrX | 17027964 | 17029048 | ENST00000380064 | REPS2 |
| chrX | 17050088 | 17050991 | ENST00000380064 | REPS2 |
| chr12 | 15323979 | 15324554 | ENST00000393736 | RERG |
| chr12 | 15427333 | 15427966 | ENST00000393736 | RERG |
| chr12 | 15373831 | 15374573 | ENST00000537717 | RERG |
| chr12 | 15305835 | 15306272 | ENST00000541243 | RERG-AS1 |
| chr17 | 30533043 | 30533564 | ENST00000581148 | RHOT1 |
| chr18 | 21032725 | 21033693 | ENST00000577501 | RIOK3 |
| chrX | 20396229 | 20397054 | ENST00000517169 | RN7SKP183 |
| chrX | 20392961 | 20393546 | ENST00000517169 | RN7SKP183 |
| chr4 | 74889262 | 74890088 | ENST00000464637 | RN7SL218P |
| chr18 | 71892391 | 71892807 | ENST00000480810 | RN7SL551P |
| chr2 | 228626684 | 228627219 | ENST00000516537 | RNA5SP121 |
| chr6 | 106894847 | 106895225 | ENST00000365516 | RNA5SP211 |
| chrX | 105961933 | 105962318 | ENST00000324342 | RNF128 |
| chr18 | 59561256 | 59561922 | ENST00000588396 | RNF152 |
| chr17 | 56494818 | 56495308 | ENST00000580014 | RNF43 |
| chr13 | 73745224 | 73745935 | ENST00000364383 | RNU4-10P |
| chrX | 35457520 | 35458562 | ENST00000516602 | RNU6-1087P |
| chrY | 297421 | 298266 | ENST00000516032 | RNU6-1334P |
| chrY | 2558421 | 2558773 | ENST00000516032 | RNU6-1334P |
| chrY | 2476943 | 2477666 | ENST00000516032 | RNU6-1334P |
| chrY | 2558832 | 2559585 | ENST00000516032 | RNU6-1334P |
| chr17 | 69325178 | 69326441 | ENST00000410631 | RNU6-305P |
| chr4 | 55896756 | 55897737 | ENST00000517006 | RNU6-410P |
| chr18 | 21795580 | 21796435 | ENST00000384039 | RNU6-435P |
| chr15 | 54081718 | 54082628 | ENST00000383914 | RNU6-449P |
| chr18 | 54937345 | 54938049 | ENST00000365370 | RNU6-737P |
| chr4 | 45648854 | 45650096 | ENST00000363850 | RNU6-931P |
| chr4 | 149908119 | 149908467 | ENST00000458836 | RNU7-197P |
| chr13 | 74861868 | 74862243 | ENST00000383890 | RNY1P5 |
| chr13 | 74864507 | 74864895 | ENST00000383890 | RNY1P5 |
| chr14 | 56355837 | 56356276 | ENST00000569625 | RP11-1012E15.1 |
| chr5 | 34212911 | 34213718 | ENST00000512782 | RP11-1023L17.1 |
| chr4 | 42658842 | 42659808 | ENST00000562054 | RP11-109E24.2 |
| chr14 | 59296342 | 59296858 | ENST00000555378 | RP11-112J1.2 |
| chr8 | 23039576 | 23039972 | ENST00000518308 | RP11-1149O23.2 |

-continued

| Chromosome (chr) | Genomic Location Start | Genomic Location End | Transcript ID | Gene symbol |
|---|---|---|---|---|
| chr4 | 69598563 | 69599228 | ENST00000509261 | RP11-1267H10.4 |
| chr5 | 34466571 | 34467442 | ENST00000503549 | RP11-1325J9.1 |
| chr5 | 70743142 | 70743357 | ENST00000502659 | RP11-136K7.2 |
| chr5 | 103398196 | 103398978 | ENST00000514769 | RP11-138J23.1 |
| chr12 | 89466458 | 89467244 | ENST00000549278 | RP11-13A1.3 |
| chr8 | 17658296 | 17659254 | ENST00000522768 | RP11-156K13.1 |
| chr8 | 135029476 | 135029978 | ENST00000605278 | RP11-157E21.2 |
| chr5 | 111869063 | 111869538 | ENST00000514243 | RP11-159K7.1 |
| chr16 | 1031471 | 1032054 | ENST00000565467 | RP11-161M6.2 |
| chr5 | 162110217 | 162110778 | ENST00000517722 | RP11-167P20.1 |
| chr9 | 116333099 | 116333705 | ENST00000428429 | RP11-168K11.2 |
| chr10 | 65479858 | 65480099 | ENST00000444770 | RP11-170M17.1 |
| chr10 | 65479061 | 65479739 | ENST00000444770 | RP11-170M17.1 |
| chr18 | 22067707 | 22067934 | ENST00000583122 | RP11-178F10.2 |
| chr15 | 36469921 | 36470501 | ENST00000561394 | RP11-184D12.1 |
| chr4 | 129495033 | 129495556 | ENST00000514265 | RP11-184M15.1 |
| chr11 | 91530137 | 91530591 | ENST00000581290 | RP11-201M22.1 |
| chr3 | 27683392 | 27684170 | ENST00000607601 | RP11-222K16.1 |
| chrX | 64416588 | 64417229 | ENST00000451184 | RP11-231N9.1 |
| chr4 | 120651110 | 120651691 | ENST00000503266 | RP11-236P13.1 |
| chr15 | 63343399 | 63343882 | ENST00000561241 | RP11-244F12.3 |
| chr12 | 12603953 | 12604650 | ENST00000605743 | RP11-253I19.4 |
| chr18 | 28551397 | 28551656 | ENST00000583580 | RP11-25I11.1 |
| chr12 | 22741552 | 22742171 | ENST00000535801 | RP11-268P4.2 |
| chr12 | 26421726 | 26422408 | ENST00000540392 | RP11-283G6.4 |
| chr4 | 185269668 | 185270393 | ENST00000511465 | RP11-290F5.2 |
| chr17 | 45393737 | 45394013 | ENST00000575039 | RP11-290H9.4 |
| chr17 | 48770069 | 48771000 | ENST00000574246 | RP11-294J22.6 |
| chr18 | 18970975 | 18971689 | ENST00000584611 | RP11-296E23.1 |
| chrX | 33780745 | 33780788 | ENST00000445233 | RP11-305F18.1 |
| chr13 | 24758417 | 24758918 | ENST00000382141 | RP11-307N16.6 |
| chr13 | 24606606 | 24607289 | ENST00000382141 | RP11-307N16.6 |
| chr4 | 169019178 | 169019931 | ENST00000506926 | RP11-310I9.1 |
| chr4 | 158954507 | 158955331 | ENST00000513850 | RP11-312A15.3 |
| chr15 | 97862475 | 97863361 | ENST00000559394 | RP11-315L6.1 |
| chr11 | 102364324 | 102364756 | ENST00000529278 | RP11-315O6.2 |
| chr4 | 48946273 | 48946960 | ENST00000507399 | RP11-317G22.2 |
| chr8 | 86375420 | 86376638 | ENST00000517697 | RP11-317J10.2 |
| chr8 | 86459177 | 86459730 | ENST00000520459 | RP11-317J10.4 |
| chr14 | 87265459 | 87266198 | ENST00000557527 | RP11-322L20.1 |
| chr18 | 29522315 | 29523852 | ENST00000580420 | RP11-326K13.4 |
| chr4 | 170121436 | 170122132 | ENST00000510225 | RP11-327O17.2 |
| chr12 | 60566172 | 60566790 | ENST00000551882 | RP11-335M9.1 |
| chr9 | 105629671 | 105630230 | ENST00000430854 | RP11-338N12.1 |
| chr4 | 13703459 | 13704075 | ENST00000510907 | RP11-341G5.1 |
| chr15 | 57619201 | 57619605 | ENST00000567319 | RP11-358M11.4 |
| chr12 | 22715040 | 22716069 | ENST00000542742 | RP11-359J14.3 |
| chr4 | 142271254 | 142271697 | ENST00000511213 | RP11-362F19.1 |
| chr16 | 63651192 | 63652144 | ENST00000563855 | RP11-368L12.1 |
| chr4 | 139833077 | 139833445 | ENST00000507038 | RP11-371F15.3 |
| chr9 | 45008582 | 45009082 | ENST00000421848 | RP11-374M1.4 |
| chr12 | 13158692 | 13159059 | ENST00000543321 | RP11-377D9.3 |
| chr6 | 82547755 | 82548150 | ENST00000418567 | RP11-379B8.1 |
| chr4 | 124467237 | 124467606 | ENST00000508291 | RP11-381N20.1 |
| chr18 | 21544367 | 21545241 | ENST00000582300 | RP11-403A21.1 |
| chr18 | 21594009 | 21595594 | ENST00000579713 | RP11-403A21.2 |
| chr5 | 67497853 | 67498258 | ENST00000520762 | RP11-404L6.2 |
| chr16 | 57286027 | 57286608 | ENST00000564376 | RP11-407G23.3 |
| chr4 | 22970649 | 22971618 | ENST00000511453 | RP11-412P11.1 |
| chr4 | 22943322 | 22944138 | ENST00000511453 | RP11-412P11.1 |
| chr4 | 36352766 | 36353045 | ENST00000504344 | RP11-431M7.2 |
| chr8 | 74219833 | 74220352 | ENST00000520894 | RP11-434I12.2 |
| chr17 | 35281035 | 35281678 | ENST00000529264 | RP11-445F12.1 |
| chr10 | 108273148 | 108273531 | ENST00000399415 | RP11-446H13.2 |
| chr4 | 184276391 | 184276972 | ENST00000514910 | RP11-451F20.1 |
| chr3 | 151576923 | 151578197 | ENST00000475855 | RP11-454C18.2 |
| chr8 | 22601135 | 22601604 | ENST00000519624 | RP11-459E5.1 |
| chr14 | 77589823 | 77590311 | ENST00000557752 | RP11-463C8.4 |
| chr12 | 105711706 | 105711997 | ENST00000549251 | RP11-474B16.1 |
| chr3 | 80745459 | 80745848 | ENST00000482003 | RP11-47P18.1 |
| chr17 | 79823676 | 79823948 | ENST00000576021 | RP11-498C9.3 |
| chr4 | 2420021 | 2420910 | ENST00000382849 | RP11-503N18.1 |
| chr18 | 26372413 | 26372889 | ENST00000582726 | RP11-510D21.1 |
| chr18 | 26374435 | 26374857 | ENST00000582726 | RP11-510D21.1 |
| chr12 | 43309649 | 43310455 | ENST00000603420 | RP11-510P12.1 |
| chr17 | 60266034 | 60266758 | ENST00000577881 | RP11-51L5.3 |
| chr8 | 37159582 | 37160492 | ENST00000518765 | RP11-527N22.1 |
| chr18 | 28981489 | 28981834 | ENST00000581452 | RP11-534N16.1 |
| chr18 | 29665002 | 29665389 | ENST00000583184 | RP11-53I6.2 |
| chr18 | 29665492 | 29665879 | ENST00000583184 | RP11-53I6.2 |
| chr4 | 105862880 | 105863326 | ENST00000515649 | RP11-556I14.1 |
| chr4 | 105979088 | 105979826 | ENST00000506386 | RP11-556I14.1 |
| chr10 | 6343519 | 6344014 | ENST00000399868 | RP11-563J2.2 |
| chr15 | 23095116 | 23095978 | ENST00000559762 | RP11-566K19.5 |
| chr18 | 19624260 | 19625733 | ENST00000584898 | RP11-595B24.1 |
| chr18 | 19664513 | 19664896 | ENST00000579830 | RP11-595B24.2 |
| chr18 | 19686422 | 19686904 | ENST00000579830 | RP11-595B24.2 |
| chr12 | 17795043 | 17795272 | ENST00000539105 | RP11-606D9.1 |
| chr4 | 18814749 | 18815500 | ENST00000503815 | RP11-608B3.1 |
| chr4 | 19557727 | 19558281 | ENST00000511431 | RP11-608O21.1 |
| chr15 | 39565852 | 39566905 | ENST00000561058 | RP11-624L4.1 |
| chr18 | 19790101 | 19790813 | ENST00000578741 | RP11-627G18.4 |
| chr18 | 65288323 | 65288979 | ENST00000583687 | RP11-638L3.1 |
| chr4 | 122791099 | 122792004 | ENST00000567769 | RP11-63B13.1 |
| chr18 | 60087362 | 60088390 | ENST00000591796 | RP11-640A1.4 |
| chr15 | 29966880 | 29967293 | ENST00000536835 | RP11-680F8.1 |
| chr4 | 98353586 | 98354125 | ENST00000518105 | RP11-681L8.1 |
| chr18 | 9736984 | 9737287 | ENST00000578806 | RP11-692N5.2 |
| chr17 | 46024345 | 46024764 | ENST00000580372 | RP11-6N17.6 |
| chr18 | 20512914 | 20514073 | ENST00000578831 | RP11-739L10.1 |
| chr18 | 20284179 | 20284604 | ENST00000578831 | RP11-739L10.1 |
| chr18 | 20263110 | 20263735 | ENST00000578831 | RP11-739L10.1 |
| chr18 | 25236246 | 25236678 | ENST00000584546 | RP11-739N10.1 |
| chr18 | 25185269 | 25185490 | ENST00000584546 | RP11-739N10.1 |
| chr4 | 171147427 | 171147816 | ENST00000504509 | RP11-789C1.1 |
| chr18 | 21699037 | 21699241 | ENST00000583782 | RP11-799B12.2 |
| chr4 | 38387157 | 38387752 | ENST00000503465 | RP11-83C7.1 |
| chr1 | 157210261 | 157210939 | ENST00000449345 | RP11-85G21.1 |
| chr11 | 94335540 | 94336653 | ENST00000537874 | RP11-867G2.8 |
| chr18 | 3773069 | 3773731 | ENST00000584060 | RP11-874J12.3 |
| chr18 | 59402679 | 59403762 | ENST00000590968 | RP11-879F14.1 |
| chr11 | 104322692 | 104323628 | ENST00000536529 | RP11-886D15.1 |
| chr5 | 43893907 | 43894383 | ENST00000508829 | RP11-8L21.1 |
| chr4 | 125353676 | 125354469 | ENST00000506481 | RP11-93I21.2 |
| chr14 | 73928913 | 73929398 | ENST00000561382 | RP1-240K6.3 |
| chr9 | 140188004 | 140189043 | ENST00000566954 | RP13-122B23.8 |
| chr18 | 3230353 | 3230820 | ENST00000580139 | RP13-270P17.2 |
| chr17 | 79486402 | 79486780 | ENST00000442532 | RP13-766D20.2 |
| chr12 | 6387233 | 6388200 | ENST00000539998 | RP1-96H9.5 |
| chr22 | 50228082 | 50228576 | ENST00000565177 | RP3-522J7.6 |
| chrX | 77192772 | 77193146 | ENST00000602791 | RP5-1000K24.2 |
| chr20 | 22392204 | 22392600 | ENST00000377121 | RP5-1004I9.1 |
| chr22 | 40783623 | 40784186 | ENST00000607915 | RP5-1042K10.10 |
| chr10 | 9866325 | 9867152 | ENST00000419836 | RP5-1051H14.2 |
| chr6 | 43894454 | 43895332 | ENST00000422059 | RP5-1120P11.1 |
| chr12 | 13025022 | 13026103 | ENST00000459725 | RPL13AP20 |
| chr2 | 146971789 | 146972404 | ENST00000413391 | RPL17P12 |
| chr5 | 31020930 | 31021844 | ENST00000495944 | RPL19P11 |
| chr5 | 31048491 | 31049119 | ENST00000495944 | RPL19P11 |
| chr3 | 66692481 | 66692800 | ENST00000459863 | RPL21P41 |
| chr18 | 21290854 | 21291433 | ENST00000588044 | RPL23AP77 |
| chr12 | 19219371 | 19219904 | ENST00000449390 | RPL7P6 |
| chr4 | 67440362 | 67441524 | ENST00000470993 | RPS23P3 |
| chr7 | 98013278 | 98014497 | ENST00000398259 | RPS3AP26 |
| chrX | 83441953 | 83443818 | ENST00000460730 | RPS6KA6 |
| chr21 | 36391861 | 36392371 | ENST00000416754 | RUNX1 |
| chr21 | 36250878 | 36251125 | ENST00000486278 | RUNX1 |
| chr21 | 36168889 | 36169428 | ENST00000399240 | RUNX1 |
| chr1 | 237963084 | 237963484 | ENST00000466626 | RYR2 |
| chr2 | 167231978 | 167233085 | ENST00000375387 | SCN9A |
| chr4 | 141264454 | 141264871 | ENST00000506322 | SCOC |
| chr4 | 25864064 | 25865011 | ENST00000513364 | SEL1L3 |
| chr4 | 25789258 | 25790342 | ENST00000502949 | SEL1L3 |
| chr5 | 42811882 | 42812507 | ENST00000508937 | SEPP1 |
| chr4 | 108729691 | 108730105 | ENST00000506462 | SGMS2 |
| chr14 | 64137369 | 64137812 | ENST00000247225 | SGPP1 |
| chr4 | 170106361 | 170107215 | ENST00000508685 | SH3RF1 |
| chr4 | 170035695 | 170036113 | ENST00000284637 | SH3RF1 |
| chr4 | 77625261 | 77626040 | ENST00000486758 | SHROOM3 |
| chr4 | 77613059 | 77614188 | ENST00000486758 | SHROOM3 |

| Chromosome (chr) | Genomic Location Start | Genomic Location End | Transcript ID | Gene symbol |
|---|---|---|---|---|
| chr4 | 77521435 | 77522140 | ENST00000485780 | SHROOM3 |
| chr4 | 77510524 | 77510923 | ENST00000485780 | SHROOM3 |
| chr17 | 46342828 | 46343603 | ENST00000581419 | SKAP1 |
| chr5 | 54660393 | 54660916 | ENST00000545714 | SKIV2L2 |
| chr13 | 78271260 | 78272125 | ENST00000466548 | SLAIN1 |
| chr13 | 103782751 | 103783563 | ENST00000245312 | SLC10A2 |
| chrX | 1510891 | 1512012 | ENST00000484026 | SLC25A6 |
| chr4 | 41992323 | 41992873 | ENST00000510460 | SLC30A9 |
| chr2 | 165770474 | 165770888 | ENST00000483641 | SLC38A11 |
| chr5 | 55053665 | 55054839 | ENST00000504880 | SLC38A9 |
| chr8 | 22222876 | 22223300 | ENST00000359741 | SLC39A14 |
| chr9 | 108081065 | 108081533 | ENST00000607692 | SLC44A1 |
| chr4 | 72052163 | 72052582 | ENST00000264485 | SLC4A4 |
| chr4 | 72003550 | 72004695 | ENST00000264485 | SLC4A4 |
| chr22 | 32475114 | 32475693 | ENST00000543737 | SLC5A1 |
| chr13 | 30122775 | 30123280 | ENST00000450494 | SLC7A1 |
| chr4 | 139120636 | 139121025 | ENST00000509248 | SLC7A11 |
| chr4 | 103811017 | 103811934 | ENST00000514972 | SLC9B1 |
| chr4 | 103994568 | 103995223 | ENST00000508136 | SLC9B2 |
| chr17 | 33759489 | 33760107 | ENST00000304905 | SLFN12 |
| chrX | 22003441 | 22003730 | ENST00000415881 | SMS |
| chr7 | 65226259 | 65226827 | ENST00000384058 | SNORA15 |
| chr7 | 64532350 | 64532740 | ENST00000384334 | SNORA15 |
| chr9 | 89951812 | 89952262 | ENST00000391119 | SNORA26 |
| chrX | 23522303 | 23522698 | ENST00000458766 | snoU13 |
| chr18 | 19866602 | 19866925 | ENST00000459476 | snoU13 |
| chr18 | 19862218 | 19863030 | ENST00000459476 | snoU13 |
| chr8 | 42082268 | 42083254 | ENST00000459183 | snoU13 |
| chr12 | 92940036 | 92940836 | ENST00000459090 | snoU13 |
| chr17 | 36507408 | 36508157 | ENST00000577233 | SOCS7 |
| chr18 | 8890911 | 8891510 | ENST00000359865 | SOGA2 |
| chr18 | 8794410 | 8794963 | ENST00000518815 | SOGA2 |
| chr4 | 186639663 | 186640609 | ENST00000456060 | SORBS2 |
| chr4 | 7404260 | 7404679 | ENST00000329016 | SORCS2 |
| chr3 | 172635673 | 172636396 | ENST00000351008 | SPATA16 |
| chr4 | 177114274 | 177114599 | ENST00000515234 | SPATA4 |
| chr4 | 168139291 | 168139787 | ENST00000512042 | SPOCK3 |
| chr14 | 65346358 | 65347344 | ENST00000542845 | SPTB |
| chr18 | 23669906 | 23671402 | ENST00000578595 | SS18 |
| chr14 | 38677991 | 38678610 | ENST00000267377 | SSTR1 |
| chr8 | 134440828 | 134441594 | ENST00000393673 | ST13P6 |
| chrX | 123540218 | 123540808 | ENST00000469481 | STAG2 |
| chr4 | 26828299 | 26828789 | ENST00000494628 | STIM2 |
| chr12 | 27425172 | 27426386 | ENST00000543246 | STK38L |
| chr14 | 81769514 | 81770277 | ENST00000556280 | STON2 |
| chr4 | 99064059 | 99065056 | ENST00000295268 | STPG2 |
| chr4 | 4501198 | 4501552 | ENST00000512780 | STX18 |
| chr12 | 10826411 | 10827032 | ENST00000541561 | STYK1 |
| chr2 | 109002050 | 109002496 | ENST00000409309 | SULT1C4 |
| chr9 | 114827947 | 114828604 | ENST00000374264 | SUSD1 |
| chr14 | 64330729 | 64331355 | ENST00000556725 | SYNE2 |
| chr8 | 38624299 | 38625022 | ENST00000348567 | TACC1 |
| chr18 | 23806089 | 23807166 | ENST00000418698 | TAF4B |
| chr4 | 38134715 | 38135185 | ENST00000492180 | TBC1D1 |
| chr4 | 37978642 | 37979668 | ENST00000446803 | TBC1D1 |
| chr22 | 42709789 | 42710226 | ENST00000515426 | TCF20 |
| chr22 | 42579385 | 42580044 | ENST00000404876 | TCF20 |
| chr4 | 48261077 | 48261668 | ENST00000381501 | TEC |
| chr6 | 155649620 | 155650370 | ENST00000475849 | TFB1M |
| chr18 | 3456781 | 3457062 | ENST00000472042 | TGIF1 |
| chr3 | 24358451 | 24358695 | ENST00000418247 | THRB |
| chr15 | 71438884 | 71439471 | ENST00000261862 | THSD4 |
| chr15 | 30110396 | 30110856 | ENST00000473741 | TJP1 |
| chr4 | 1722559 | 1723411 | ENST00000536901 | TMEM129 |
| chr5 | 87564239 | 87565285 | ENST00000512724 | TMEM161B-AS1 |
| chr5 | 110072468 | 110072845 | ENST00000512886 | TMEM232 |
| chr18 | 21017554 | 21018179 | ENST00000399707 | TMEM241 |
| chr17 | 31281498 | 31281947 | ENST00000578289 | TMEM98 |
| chrX | 13006739 | 13007333 | ENST00000451311 | TMSB4X |
| chrX | 13012317 | 13012875 | ENST00000451311 | TMSB4X |
| chr8 | 119890394 | 119891274 | ENST00000297350 | TNFRSF11B |
| chr1 | 201374557 | 201374865 | ENST00000361379_57596 | TNNI1 |
| chr17 | 48968048 | 48968736 | ENST00000514358 | TOB1-AS1 |
| chr17 | 52977819 | 52978913 | ENST00000575909 | TOM1L1 |
| chr2 | 73944031 | 73944360 | ENST00000489476 | TPRKB |
| chr4 | 154140059 | 154140489 | ENST00000338700 | TRIM2 |
| chr4 | 154110178 | 154111052 | ENST00000437508 | TRIM2 |
| chr17 | 57069125 | 57069558 | ENST00000393066 | TRIM37 |
| chr4 | 99582947 | 99583241 | ENST00000056992-7_160528 | TSPAN5 |
| chr12 | 71556548 | 71557645 | ENST00000549421 | TSPAN8 |
| chr12 | 71557965 | 71558303 | ENST00000549421 | TSPAN8 |
| chr12 | 71555389 | 71555659 | ENST00000549421 | TSPAN8 |
| chr4 | 147866860 | 147867427 | ENST00000502319 | TTC29 |
| chr18 | 21692827 | 21693592 | ENST00000540918 | TTC39C |
| chr14 | 38438045 | 38438416 | ENST00000533625 | TTC6 |
| chr14 | 38063747 | 38065628 | ENST00000556845 | TTC6 |
| chr4 | 122369404 | 122369799 | ENST00000512282 | TUBB4BP5 |
| chr8 | 15397612 | 15398367 | ENST00000503731 | TUSC3 |
| chr18 | 9422752 | 9423417 | ENST00000262120 | TWSG1 |
| chrX | 16804037 | 16805127 | ENST00000398155 | TXLNG |
| chr15 | 52199610 | 52200183 | ENST00000606352 | U6 |
| chrX | 47052740 | 47053352 | ENST00000335972 | UBA1 |
| chr4 | 103701581 | 103701969 | ENST00000453744 | UBE2D3 |
| chr17 | 74392058 | 74392341 | ENST0000058640-9_558822 | UBE2O |
| chr4 | 69817171 | 69817631 | ENST00000251566 | UGT2A3 |
| chr4 | 115484596 | 115485293 | ENST00000310836 | UGT8 |
| chr4 | 115433283 | 115434630 | ENST00000310836 | UGT8 |
| chr5 | 139544548 | 139545540 | ENST00000060785-0_189600 | UNCATEGORIZED |
| chr5 | 60954962 | 60955315 | ENST0000050562-3_198864 | Uncharacterized |
| chr7 | 38903200 | 38903772 | ENST00000457055 | VPS41 |
| chr17 | 618801 | 619322 | ENST00000437048 | VPS53 |
| chr13 | 42270599 | 42271143 | ENST00000478987 | VWA8 |
| chr4 | 176986570 | 176987383 | ENST00000280190 | WDR17 |
| chr15 | 53745621 | 53746295 | ENST00000567224 | WDR72 |
| chr15 | 53746791 | 53747925 | ENST00000567224 | WDR72 |
| chr17 | 38439964 | 38440892 | ENST00000323571 | WIPF2 |
| chrX | 10087464 | 10087962 | ENST00000454666 | WWC3 |
| chr21 | 18899540 | 18900000 | ENST00000363884 | Y_RNA |
| chr14 | 31697679 | 31698056 | ENST00000365532 | Y_RNA |
| chr4 | 79548832 | 79549112 | ENST00000364128 | Y_RNA |
| chr14 | 90114844 | 90115344 | ENST00000516846 | Y_RNA |
| chr17 | 48774453 | 48774711 | ENST00000364470 | Y_RNA |
| chr22 | 23744503 | 23745176 | ENST00000420968 | ZDHHC8P1 |
| chrX | 24167349 | 24168808 | ENST00000427551 | ZFX-AS1 |
| chrX | 24163828 | 24164250 | ENST00000427551 | ZFX-AS1 |
| chr14 | 68205454 | 68206247 | ENST00000394455 | ZFYVE26 |
| chr10 | 43137085 | 43137382 | ENST00000486614 | ZNF33B |
| chr5 | 60757258 | 60757764 | ENST00000252744 | ZSWIM6 |

(c)(ii) contacting the tagged ACRs with the solid support comprising a second plurality of oligonucleotide probes bound thereto, the second plurality of oligonucleotide probes are complementary to a second set of ACRs selected from:

| Chromosome (chr) | Genomic Location Start | Genomic Location End | Transcript ID | Gene symbol |
|---|---|---|---|---|
| chr10 | 134254015 | 134254324 | ENST00000450206 | RP11-432J24.3 |
| chr10 | 1506248 | 1507137 | ENST00000381312 | ADARB2 |
| chr14 | 105698636 | 105698888 | ENST00000550208 | BRF1 |
| chr7 | 401254 | 401879 | ENST00000515213 | AC226118.1 |
| chr7 | 4652611 | 4652868 | ENST00000446823 | FOXK1 |
| chr17 | 104433 | 104716 | ENST00000570638 | RPH3AL |
| chr2 | 1420825 | 1421839 | ENST00000382198 | TPO |
| chr16 | 12895395 | 12895819 | ENST00000539677 | CPPED1 |
| chr16 | 89495481 | 89495932 | ENST00000566973 | ANKRD11 |
| chr16 | 1389753 | 1390364 | ENST00000421665 | BAIAP3 |
| chr6 | 2504483 | 2504975 | ENST00000606884 | GMDS-AS1 |
| chr2 | 2016399 | 2016710 | ENST00000479156 | MYT1L |
| chr17 | 75480980 | 75481368 | ENST00000585638 | 9-Sep |

-continued

| Chromosome (chr) | Genomic Location Start | Genomic Location End | Transcript ID | Gene symbol |
|---|---|---|---|---|
| chr22 | 30601850 | 30602161 | ENST00000432360 | RP3-43804.4 |
| chr1 | 3594879 | 3595126 | ENST00000357733 | TP73 |
| chr11 | 460271 | 461039 | ENST00000526878 | PTDSS2 |
| chr9 | 138020994 | 138021355 | ENST00000371796 | OLFM1 |
| chr12 | 123933887 | 123934119 | ENST00000605712 | RP11-972P1.8 |
| chr18 | 56179682 | 56180292 | ENST00000361673 | ALPK2 |
| chr17 | 106478 | 107040 | ENST00000570638 | RPH3AL |
| chr11 | 70454 | 70919 | ENST00000519787 | RP11-304M2.1 |
| chr2 | 242869770 | 242871341 | ENST00000429947 | AC131097.3 |
| chr19 | 40421670 | 40422156 | ENST00000221347 | FCGBP |
| chr11 | 92438452 | 92438798 | ENST00000525166 | FAT3 |
| chr11 | 128149728 | 128150176 | ENST00000608492 | RP11-702B10.1 |
| chr20 | 5344571 | 5345402 | ENST00000363443 | RNA5-8SP7 |
| chr10 | 106087848 | 106088405 | ENST00000358187 | ITPRIP |
| chr20 | 17540069 | 17540372 | ENST00000377868 | BFSP1 |
| chr7 | 66017307 | 66017790 | ENST00000445080 | GS1-124K5.12 |
| chr2 | 9445224 | 9446284 | ENST00000315273 | ASAP2 |
| chr19 | 4084177 | 4084702 | ENST00000262948 | MAP2K2 |
| chr7 | 36555230 | 36555979 | ENST00000471806 | AOAH |
| chr16 | 33345278 | 33346583 | ENST00000568752 | RP11-989E6.10 |
| chr7 | 63220603 | 63221633 | ENST00000605464 | CICP24 |
| chr2 | 87651678 | 87651939 | ENST00000444323 | AC068279.3 |
| chr3 | 126945866 | 126946636 | ENST00000492080 | RP11-305F5.2 |
| chr11 | 2011127 | 2011556 | ENST00000419080 | MRPL23-AS1 |
| chr11 | 119612823 | 119613563 | ENST00000533253 | CTD-2523D13.2 |
| chr1 | 1293633 | 1294442 | ENST00000445648 | MXRA8 |
| chr1 | 117900726 | 117901380 | ENST00000604156 | RP11-188D8.1 |
| chr7 | 102091876 | 102092500 | ENST0000035638-7_249477 | ORAI2 |
| chr10 | 92690759 | 92691502 | ENST00000364734 | RNU6-740P |
| chr10 | 135342280 | 135342918 | ENST00000599428 | AL161645.2 |
| chr12 | 124857925 | 124858331 | ENST00000448614 | NCOR2 |
| chr1 | 2111576 | 2112325 | ENST00000505322 | PRKCZ |
| chr11 | 1086528 | 1086937 | ENST00000359046 | MUC2 |
| chr2 | 10539305 | 10539660 | ENST00000419810 | HPCAL1 |
| chr16 | 33348985 | 33350971 | ENST00000568752 | RP11-989E6.10 |
| chr21 | 47410321 | 47410540 | ENST00000361866 | COL6A1 |
| chr19 | 36774890 | 36775141 | ENST00000586345 | CTD-3162L10.1 |
| chr19 | 36790418 | 36790944 | ENST00000586345 | CTD-3162L10.1 |
| chr19 | 36791007 | 36791167 | ENST00000586345 | CTD-3162L10.1 |
| chr16 | 32297453 | 32298796 | ENST00000568567 | RP11-17M15.2 |
| chr19 | 36785355 | 36785870 | ENST00000586345 | CTD-3162L10.1 |
| chr12 | 9558298 | 9559027 | ENST00000540982 | RP11-599J14.2 |
| chr3 | 125726687 | 125727535 | ENST00000504118 | SLC41A3 |
| chr10 | 129058797 | 129060504 | ENST00000464466 | DOCK1 |
| chr2 | 87642804 | 87643025 | ENST00000444323 | AC068279.3 |
| chr1 | 11296642 | 11297523 | ENST00000361445 | MTOR |
| chr12 | 31871662 | 31871945 | ENST00000509386 | AMN1 |
| chr5 | 1521927 | 1522688 | ENST00000514484 | LPCAT1 |
| chr1 | 4692485 | 4692949 | ENST00000378190 | AJAP1 |
| chr1 | 66655817 | 66656717 | ENST00000412480 | PDE4B |
| chr1 | 16970486 | 16970660 | ENST00000362058 | CROCCP2 |
| chr19 | 6677696 | 6678735 | ENST00000601475 | C3 |
| chr1 | 56933904 | 56934476 | ENST00000371250 | PPAP2B |
| chr1 | 4693158 | 4693721 | ENST00000378190 | AJAP1 |
| chr12 | 123333197 | 123333659 | ENST00000536772 | HIP1R |
| chr1 | 193406539 | 193407729 | ENST00000420807 | LINC01031 |
| chr3 | 121723306 | 121724477 | ENST00000462014 | ILDR1 |
| chr2 | 209676292 | 209676942 | ENST00000419079 | PTH2R |
| chr12 | 3306839 | 3307985 | ENST00000011898 | TSPAN9 |
| chr11 | 94615832 | 94616486 | ENST00000545958 | RP11-856F16.2 |
| chr1 | 3604957 | 3605264 | ENST00000378280 | TP73 |
| chr2 | 1391878 | 1392649 | ENST00000497517 | TPO |
| chr1 | 811189 | 812119 | ENST00000427857 | FAM41C |
| chr19 | 38468627 | 38469128 | ENST00000476317 | SIPA1L3 |
| chr1 | 238292984 | 238293512 | ENST00000445891 | YWHAQP9 |
| chr2 | 1560598 | 1560978 | ENST00000438247 | AC144450.1 |
| chr12 | 132815639 | 132815889 | ENST00000328957 | GALNT9 |
| chr9 | 115846414 | 115847424 | ENST00000439875 | FAM225B |
| chr19 | 54613041 | 54613311 | ENST00000482960 | NDUFA3 |
| chr2 | 239204444 | 239205433 | ENST00000437372 | AC012485.2 |
| chr11 | 397903 | 398909 | ENST00000526971 | PKP3 |
| chr1 | 1912821 | 1913709 | ENST00000468610 | C1orf222 |
| chr19 | 37782096 | 37782418 | ENST00000586442 | CTD-3220F14.1 |
| chr2 | 11776847 | 11777488 | ENST00000396123 | GREB1 |
| chr12 | 132813440 | 132813985 | ENST00000328957 | GALNT9 |
| chr1 | 110663023 | 110663256 | ENST00000334179 | UBL4B |
| chr7 | 155893958 | 155894405 | ENST00000384333 | Y_RNA |
| chr20 | 36202030 | 36202951 | ENST00000423261 | GLRXP |
| chr1 | 228778123 | 228778480 | ENST00000365055 | RNA5S15 |
| chr1 | 4503130 | 4503709 | ENST00000423197 | RP5-1166F10.1 |
| chr20 | 62781169 | 62781776 | ENST00000360149 | MYT1 |
| chr3 | 195509793 | 195510202 | ENST0000047815-6_152007 | MUC4 |
| chr11 | 134831292 | 134832253 | ENST00000528497 | RP11-555G19.1 |
| chr5 | 11443246 | 11443549 | ENST00000508761 | CTNND2 |
| chr9 | 140244387 | 140245281 | ENST00000484392 | EXD3 |
| chr19 | 39648485 | 39649257 | ENST00000599657 | PAK4 |
| chr10 | 132271970 | 132272400 | ENST00000439421 | RP11-540N6.1 |
| chr11 | 41553950 | 41554439 | ENST00000526978 | RP11-124G5.3 |
| chr1 | 247292118 | 247293363 | ENST00000476312 | ZNF124 |
| chr20 | 61588799 | 61589615 | ENST00000411611 | SLC17A9 |
| chr19 | 30056819 | 30058660 | ENST00000335523 | VSTM2B |
| chr19 | 49317650 | 49318689 | ENST00000595764 | HSD17B14 |
| chr1 | 37259254 | 37259535 | ENST00000373091 | GRIK3 |
| chr12 | 131780776 | 131781831 | ENST00000508505 | RP11-495K9.3 |
| chr19 | 32223716 | 32224929 | ENST00000365024 | RNU6-967P |
| chr1 | 37449602 | 37450029 | ENST00000373093 | GRIK3 |
| chr1 | 40128961 | 40129465 | ENST00000235628 | NT5C1A |
| chr1 | 4769995 | 4770757 | ENST00000466761 | AJAP1 |
| chr21 | 47318748 | 47319014 | ENST00000468429 | PCBP3 |
| chr19 | 34280154 | 34280686 | ENST00000587658 | KCTD15 |
| chr1 | 224136990 | 224138052 | ENST00000424045 | CICP5 |
| chr11 | 1796937 | 1797410 | ENST00000449749 | AC068580.7 |
| chr11 | 132947949 | 132948284 | ENST00000529038 | OPCML |
| chr1 | 1276059 | 1277202 | ENST00000472445 | DVL1 |
| chr14 | 72448205 | 72449425 | ENST00000402788 | RGS6 |
| chr7 | 158995654 | 158996480 | ENST00000437005 | PIP5K1P2 |
| chr18 | 77005558 | 77006476 | ENST00000587878 | ATP9B |
| chr1 | 247526375 | 247526698 | ENST00000478225 | ZNF496 |
| chr11 | 134526444 | 134526989 | ENST00000529417 | RP11-469N6.3 |
| chr12 | 132401688 | 132401954 | ENST00000540647 | ULK1 |
| chr1 | 2688970 | 2690000 | ENST00000401095 | TTC34 |
| chr15 | 41324040 | 41324393 | ENST00000558357 | INO80 |
| chr7 | 57265415 | 57265595 | ENST00000423752 | RP11-1217F2.13 |
| chr1 | 73361638 | 73361801 | ENST00000445976 | RP4-660H19.1 |
| chr2 | 15499821 | 15500945 | ENST00000442506 | NBAS |
| chr6 | 97944099 | 97944304 | ENST00000574739 | RP3-418C23.2 |
| chr19 | 31869090 | 31869843 | ENST00000585336 | AC007796.1 |
| chr17 | 80544014 | 80544489 | ENST00000575578 | FOXK2 |
| chr7 | 148469337 | 148470194 | ENST00000325222 | CUL1 |
| chr10 | 129595626 | 129595975 | ENST00000388920 | FOXI2 |
| chr2 | 217237783 | 217238658 | ENST00000273067 | 4-Mar |
| chr19 | 38489929 | 38490545 | ENST00000476317 | SIPA1L3 |
| chr10 | 133797280 | 133797729 | ENST00000368636 | BNIP3 |
| chr10 | 133661124 | 133661318 | ENST00000341866 | AL450307.1 |
| chr2 | 36129295 | 36129643 | ENST00000431951 | MRPL50P1 |
| chr10 | 96989136 | 96989837 | ENST00000451737 | RP11-310E22.4 |
| chr11 | 117109912 | 117110426 | ENST0000052986-9_361297 | RNF214 |
| chr9 | 137494257 | 137495098 | ENST00000371817 | COL5A1 |
| chr19 | 35809800 | 35810562 | ENST00000601414 | CD22 |
| chr19 | 38530496 | 38531253 | ENST00000476317 | SIPA1L3 |
| chr10 | 108876411 | 108877044 | ENST00000502160 | RP11-13G14.4 |
| chr1 | 210612139 | 210613054 | ENST00000367009 | HHAT |
| chr7 | 157599753 | 157600564 | ENST00000404321 | PTPRN2 |
| chr17 | 68185179 | 68185450 | ENST00000243457 | KCNJ2 |
| chr19 | 30019124 | 30019835 | ENST00000579268 | CTC-525D6.2 |
| chr7 | 154861699 | 154862044 | ENST00000287907 | HTR5A |
| chr7 | 2915618 | 2916223 | ENST00000396946 | CARD11 |
| chr3 | 168602522 | 168603249 | ENST00000484765 | RP11-368I23.2 |
| chr2 | 15309734 | 15310359 | ENST00000485694 | NBAS |
| chr19 | 33367595 | 33368355 | ENST00000586628 | CTD-2085J24.4 |
| chr11 | 117151727 | 117152451 | ENST00000524917 | RNF214 |
| chr11 | 116400382 | 116401203 | ENST00000549725 | RP11-493P1.2 |
| chr19 | 37793700 | 37794465 | ENST00000591471 | HKR1 |
| chr3 | 183894085 | 183894896 | ENST00000431779 | AP2M1 |
| chr16 | 86985326 | 86986094 | ENST00000566109 | RP11-107C10.1 |
| chr3 | 14203211 | 14203401 | ENST00000477324 | XPC |
| chr16 | 28394898 | 28395627 | ENST00000398943 | EIF3CL |

| Chromosome (chr) | Genomic Location Start | Genomic Location End | Transcript ID | Gene symbol |
|---|---|---|---|---|
| chr19 | 42617722 | 42618169 | ENST00000531773 | POU2F2 |
| chr1 | 165868016 | 165868540 | ENST00000463772 | UCK2 |
| chr5 | 79715065 | 79715253 | ENST00000510995 | ZFYVE16 |
| chr19 | 36095937 | 36096410 | ENST00000589603 | AC002115.9 |
| chr16 | 28742292 | 28743038 | ENST00000569005 | EIF3C |
| chr11 | 12185010 | 12186343 | ENST00000379612 | MICAL2 |
| chr14 | 76815171 | 76815651 | ENST00000390772 | AC016543.1 |
| chr17 | 21305235 | 21305901 | ENST00000583088 | KCNJ12 |
| chr9 | 137394472 | 137395015 | ENST00000444936 | RP11-473E2.2 |
| chr19 | 38704515 | 38705167 | ENST00000488378 | DPF1 |
| chr8 | 143273979 | 143275177 | ENST00000517704 | LINC00051 |
| chr11 | 20118774 | 20119500 | ENST00000311043 | NAV2 |
| chr19 | 39564251 | 39564693 | ENST00000601575 | PAPL |
| chr3 | 126326051 | 126326334 | ENST00000519162 | TXNRD3 |
| chr11 | 117069701 | 117070445 | ENST00000278968 | TAGLN |
| chr1 | 19586986 | 19587534 | ENST00000330263 | MRTO4 |
| chr15 | 26020460 | 26021175 | ENST00000555815 | ATP10A |
| chr2 | 242054831 | 242055272 | ENST00000493544 | PASK |
| chr19 | 33236950 | 33238144 | ENST00000421545 | TDRD12 |
| chr10 | 81239097 | 81239352 | ENST00000557620 | TPRX1P1 |
| chr20 | 36919560 | 36920024 | ENST0000045143-5_619426 | UNCATEGORIZED |
| chr10 | 126028465 | 126028958 | ENST00000539214 | OAT |
| chr11 | 120088623 | 120089064 | ENST00000531220 | OAF |
| chr15 | 51369174 | 51369713 | ENST00000559909 | RP11-108K3.1 |
| chr16 | 19843028 | 19843331 | ENST00000568061 | IQCK |
| chr3 | 71591682 | 71592117 | ENST00000408337 | MIR1284 |
| chr19 | 33963942 | 33964303 | ENST00000590408 | PEPD |
| chr17 | 64536177 | 64536808 | ENST00000284384 | PRKCA |
| chr11 | 1078428 | 1079839 | ENST00000359501 | MUC2 |
| chr12 | 98793216 | 98793758 | ENST00000364426 | RNU4-41P |
| chr1 | 15322511 | 15323031 | ENST00000400797 | KAZN |
| chr2 | 208352490 | 208352976 | ENST00000418850 | AC007879.5 |
| chr3 | 128914473 | 128915151 | ENST00000422453 | CNBP |
| chr6 | 110064994 | 110065287 | ENST00000230124 | FIG4 |
| chr3 | 127453590 | 127454743 | ENST00000398101 | MGLL |
| chr9 | 127105090 | 127105743 | ENST00000539416 | NEK6 |
| chr11 | 70496478 | 70496740 | ENST00000445654 | SHANK2 |
| chr11 | 1691687 | 1692395 | ENST00000382167 | FAM99A |
| chr14 | 102172379 | 102172956 | ENST00000557778 | RP11-1029J19.5 |
| chr7 | 150810759 | 150811221 | ENST00000335367 | AGAP3 |
| chr2 | 74010590 | 74010935 | ENST00000400564 | C2orf78 |
| chr10 | 133759398 | 133760269 | ENST00000472664 | PPP2R2D |
| chr8 | 101635463 | 101636150 | ENST00000520661 | SNX31 |
| chr13 | 114579128 | 114579433 | ENST00000449453 | RP11-199F6.4 |
| chr12 | 47488676 | 47488915 | ENST00000546455 | PCED1B |
| chr15 | 102215274 | 102215634 | ENST00000539112 | TARSL2 |
| chr16 | 88840365 | 88840766 | ENST00000301015 | PIEZO1 |
| chr2 | 239835989 | 239836732 | ENST00000455228 | AC114788.2 |
| chr2 | 129063639 | 129064276 | ENST00000494089 | HS6ST1 |
| chr1 | 230994632 | 230995105 | ENST00000522201 | C1orf198 |
| chr1 | 12100647 | 12101031 | ENST00000496974 | RN7SL649P |
| chr1 | 178877654 | 178877828 | ENST00000478871 | RALGPS2 |
| chr17 | 15917197 | 15917706 | ENST00000497842 | TTC19 |
| chr8 | 142158141 | 142158130 | ENST00000523215 | DENND3 |
| chr10 | 121010086 | 121010469 | ENST00000392870 | GRK5 |
| chr7 | 63212550 | 63212945 | ENST00000605464 | CICP24 |
| chr12 | 131851320 | 131852149 | ENST00000539209 | RP13-507P19.1 |
| chr7 | 63217941 | 63218533 | ENST00000605464 | CICP24 |
| chr7 | 155199524 | 155200087 | ENST00000569431 | RP5-912I13.1 |
| chr5 | 628422 | 629006 | ENST00000444221 | CEP72 |
| chr17 | 81140434 | 81141322 | ENST00000572343 | AC139099.4 |
| chr7 | 63216118 | 63216460 | ENST00000605464 | CICP24 |
| chr17 | 105730 | 106265 | ENST00000570638 | RPH3AL |
| chr16 | 86878909 | 86879904 | ENST00000566109 | RP11-107C10.1 |
| chr21 | 33157360 | 33157791 | ENST00000610276 | AP000255.6 |
| chr16 | 33293693 | 33295127 | ENST00000573021 | RP11-23E10.5 |
| chr5 | 2490324 | 2490714 | ENST00000560688 | RP11-129I19.2 |
| chr19 | 1164280 | 1165046 | ENST00000587655 | SBNO2 |
| chr13 | 113680424 | 113680653 | ENST00000473345 | MCF2L |
| chr7 | 206405 | 206816 | ENST00000477004 | FAM20C |
| chr7 | 63222975 | 63223858 | ENST00000605464 | CICP24 |
| chr18 | 77393621 | 77394083 | ENST00000317008 | RP11-567M16.3 |
| chr15 | 102432818 | 102433991 | ENST00000560907 | WBP1LP5 |
| chr3 | 195487289 | 195487523 | ENST00000480843 | MUC4 |
| chr19 | 2128409 | 2128837 | ENST00000590683 | AP3D1 |
| chr4 | 38735730 | 38736026 | ENST00000410298 | RNA5SP158 |
| chr19 | 51898699 | 51898961 | ENST00000600765 | CTD-2616J11.14 |
| chr2 | 241564963 | 241565884 | ENST00000407714 | GPR35 |
| chr9 | 115851492 | 115852115 | ENST00000439875 | FAM225B |
| chr10 | 35838253 | 35839249 | ENST00000497692 | CCNY |
| chr16 | 32351227 | 32353593 | ENST00000562853 | RP11-17M15.4 |
| chr10 | 482220 | 483506 | ENST00000425723 | RP11-490E15.2 |
| chr12 | 132060998 | 132062024 | ENST00000541343 | RP11-292I17.1 |
| chr20 | 61695692 | 61696532 | ENST00000607802 | RP11-305P22.9 |
| chr4 | 7541341 | 7542231 | ENST00000329016 | SORCS2 |
| chr16 | 88366497 | 88367260 | ENST00000563190 | LA16c-444G7.1 |
| chr1 | 30664002 | 30664591 | ENST00000442774 | RP3-357I16.1 |
| chr16 | 84558648 | 84558989 | ENST00000565079 | TLDC1 |
| chr3 | 195542062 | 195542854 | ENST00000463781 | MUC4 |
| chr15 | 29269492 | 29270164 | ENST00000560531 | RP13-126C7.1 |
| chr8 | 143026250 | 143026924 | ENST00000408196 | AC104417.1 |
| chr2 | 233755631 | 233756268 | ENST00000461944 | NGEF |
| chrX | 130712602 | 130713291 | ENST00000444577 | OR13K1P |
| chr2 | 242838585 | 242839046 | ENST00000429947 | AC131097.3 |
| chr19 | 38943593 | 38944148 | ENST00000359596 | RYR1 |
| chr19 | 50215579 | 50216042 | ENST00000598072 | CPT1C |
| chr10 | 132897016 | 132897650 | ENST00000368642 | TCERG1L |
| chr16 | 10394727 | 10395216 | ENST00000564797 | ATF7IP2 |
| chr19 | 34112310 | 34112461 | ENST00000591231 | CHST8 |
| chr11 | 45149239 | 45150097 | ENST00000530656 | PRDM11 |
| chr2 | 60524652 | 60525178 | ENST00000457668 | AC007381.3 |
| chr2 | 3497474 | 3498028 | ENST00000607415 | RP11-1293J14.1 |
| chr20 | 55201436 | 55201906 | ENST00000201031 | TFAP2C |
| chr19 | 39569172 | 39569875 | ENST00000601575 | PAPL |
| chr19 | 51893704 | 51894598 | ENST00000570516 | C19orf84 |
| chr10 | 133908226 | 133908803 | ENST00000298622 | JAKMIP3 |
| chr7 | 101321102 | 101321282 | ENST00000223167 | MYL10 |
| chr3 | 139289513 | 139290376 | ENST00000381790 | RP11-319G6.1 |
| chr7 | 6116687 | 6117343 | ENST00000436915 | AC004895.4 |
| chr1 | 117635514 | 117636236 | ENST00000492682 | TTF2 |
| chr12 | 132816724 | 132819336 | ENST00000328957 | GALNT9 |
| chr1 | 16005038 | 16005519 | ENST00000606262 | RP4-680D5.9 |
| chr1 | 17574935 | 17575827 | ENST00000375460 | PADI3 |
| chr9 | 104053040 | 104053880 | ENST00000463206 | LPPR1 |
| chr15 | 80164774 | 80165510 | ENST00000494999 | ST20-MTHFS |
| chr20 | 44978838 | 44979690 | ENST000004935-9_627499 | SLC35C2 |
| chr16 | 56641008 | 56641623 | ENST00000245185 | MT2A |
| chr1 | 61105637 | 61106487 | ENST00000439156 | RP11-776H12.1 |
| chr9 | 139240060 | 139240754 | ENST00000354753 | GPSM1 |
| chr16 | 53453058 | 53453646 | ENST00000567964 | RBL2 |
| chr1 | 19724621 | 19725289 | ENST00000482808 | CAPZB |
| chr19 | 52645300 | 52645902 | ENST00000597886 | CTC-471J1.9 |
| chr11 | 33202571 | 33203188 | ENST00000500025 | CSTF3-AS1 |
| chr11 | 9567258 | 9568184 | ENST00000396602 | ZNF143 |
| chr2 | 237573927 | 237574674 | ENST00000455068 | AC011286.1 |
| chr7 | 114670431 | 114671261 | ENST00000257724 | MDFIC |
| chr19 | 31899364 | 31900164 | ENST00000585336 | AC007796.1 |
| chr20 | 45887465 | 45888269 | ENST00000468376 | ZMYND8 |
| chr4 | 54342467 | 54343100 | ENST00000507166 | FIP1L1 |
| chr1 | 25296870 | 25297681 | ENST00000568143 | RP11-84D1.2 |
| chr1 | 92791916 | 92792644 | ENST00000610020 | RPAP2 |
| chr11 | 70270264 | 70270817 | ENST00000393747 | CTTN |
| chr3 | 195890536 | 195890927 | ENST00000457079 | LINC00885 |
| chr10 | 133849722 | 133850635 | ENST00000368636 | BNIP3 |
| chr1 | 29839867 | 29840197 | ENST00000515851 | RP11-810H18.1 |
| chr12 | 132280700 | 132281100 | ENST00000537582 | SFSWAP |
| chr10 | 132892787 | 132893240 | ENST00000436942 | TCERG1L-AS1 |
| chr8 | 142597388 | 142597870 | ENST00000427937 | AC138647.1 |
| chr2 | 233124653 | 233125150 | ENST0000043343-0_85344 | DIS3L2 |
| chr1 | 6305892 | 6306263 | ENST00000377898 | HES3 |
| chr20 | 59832756 | 59833009 | ENST00000360469 | CDH4 |
| chr2 | 241811517 | 241811995 | ENST00000476698 | AGXT |
| chr16 | 73116469 | 73116806 | ENST00000569990 | HCCAT5 |
| chr16 | 32639949 | 32640460 | ENST00000564327 | RP11-96K14.1 |
| chr7 | 151169967 | 151170459 | ENST00000482053 | RHEB |
| chr19 | 30154965 | 30155734 | ENST00000436066 | PLEKHF1 |
| chr7 | 5635384 | 5635656 | ENST00000405801 | FSCN1 |

-continued

| Chromosome (chr) | Genomic Location Start | Genomic Location End | Transcript ID | Gene symbol |
|---|---|---|---|---|
| chr11 | 2008321 | 2008791 | ENST00000419080 | MRPL23-AS1 |
| chr19 | 34760796 | 34761482 | ENST00000585833 | KIAA0355 |
| chr3 | 188506277 | 188507139 | ENST00000459897 | LPP |
| chr19 | 38538873 | 38540260 | ENST00000476317 | SIPA1L3 |
| chr11 | 64512396 | 64512888 | ENST00000377485 | RASGRP2 |
| chr18 | 77679919 | 77680340 | ENST00000478144 | PQLC1 |
| chr19 | 38524195 | 38525390 | ENST00000476317 | SIPA1L3 |
| chr19 | 36760064 | 36760513 | ENST00000355114 | ZNF565 |
| chr7 | 534134 | 534368 | ENST00000434541 | AC147651.1 |
| chr7 | 30829073 | 30829346 | ENST00000451002 | INMT-FAM188B |
| chr3 | 195510841 | 195511431 | ENST0000047815-6_152007 | MUC4 |
| chr16 | 4394345 | 4394677 | ENST00000575848 | PAM16 |
| chr10 | 11927228 | 11927674 | ENST00000445498 | PROSER2-AS1 |
| chr22 | 43892550 | 43892910 | ENST00000538182 | MPPED1 |
| chr20 | 59950361 | 59951203 | ENST00000360469 | CDH4 |
| chr20 | 31208975 | 31209164 | ENST00000360785 | C20orf203 |
| chr7 | 158995289 | 158995591 | ENST00000437005 | PIP5K1P2 |
| chr19 | 1144620 | 1144966 | ENST00000587655 | SBNO2 |
| chr2 | 97117403 | 97117850 | ENST00000310865 | NEURL3 |
| chr1 | 245100328 | 245100603 | ENST00000364888 | RN7SKP55 |
| chr19 | 38735536 | 38736387 | ENST00000590510 | SPINT2 |
| chr19 | 34809126 | 34810741 | ENST00000588338 | KIAA0355 |
| chr17 | 854896 | 856177 | ENST00000575171 | NXN |
| chr19 | 31830912 | 31831630 | ENST00000558569 | TSHZ3 |
| chr19 | 38905395 | 38905919 | ENST00000588708 | RASGRP4 |
| chr3 | 152974102 | 152975125 | ENST00000582522 | RN7SL300P |
| chr20 | 55363228 | 55363724 | ENST00000384429 | RNU6-929P |
| chr19 | 36799597 | 36800084 | ENST00000600983 | CTD-3162L10.1 |
| chr19 | 31828906 | 31829306 | ENST00000558569 | TSHZ3 |
| chr1 | 148929648 | 148931757 | ENST00000457390 | RP11-14N7.2 |
| chr5 | 170224689 | 170225199 | ENST00000519598 | GABRP |
| chr1 | 8800026 | 8800575 | ENST00000480342 | RERE |
| chr1 | 165742556 | 165743015 | ENST000000042312-1_23045 | TMCO1-AS1 |
| chr3 | 195627548 | 195627967 | ENST00000468819 | TNK2 |
| chr12 | 113342092 | 113342931 | ENST00000202917 | OAS1 |
| chr16 | 56687942 | 56688603 | ENST00000334346 | MT1B |
| chr1 | 11999122 | 11999719 | ENST00000196061 | PLOD1 |
| chr2 | 237791572 | 237792049 | ENST00000413385 | AC011286.1 |
| chr1 | 4016604 | 4017089 | ENST00000412674 | RP13-614K11.1 |
| chr10 | 14862005 | 14862511 | ENST00000465530 | CDNF |
| chr1 | 227947119 | 227947769 | ENST00000478768 | SNAP47 |
| chr3 | 126678871 | 126679767 | ENST00000510044 | CHCHD6 |
| chr3 | 141133388 | 141134001 | ENST00000513570 | ZBTB38 |
| chr10 | 79115617 | 79115970 | ENST00000418515 | RP11-619F23.2 |
| chr19 | 51596977 | 51597664 | ENST00000421832 | CTU1 |
| chr11 | 68847695 | 68848373 | ENST00000442692 | TPCN2 |
| chr5 | 34717596 | 34718270 | ENST00000502736 | RAI14 |
| chr1 | 204616727 | 204616979 | ENST00000496057 | LRRN2 |
| chr9 | 132105932 | 132106561 | ENST00000423122 | RP11-65J3.1 |
| chr9 | 131821742 | 131822331 | ENST00000474639 | FAM73B |
| chr2 | 187426114 | 187426881 | ENST00000261023 | ITGAV |
| chr10 | 3598428 | 3598998 | ENST00000426811 | RP11-482E14.2 |
| chr12 | 123129219 | 123129801 | ENST00000356987 | HCAR1 |
| chr1 | 12050437 | 12051116 | ENST00000412236 | MFN2 |
| chr19 | 39646961 | 39647663 | ENST00000599657 | PAK4 |
| chr8 | 142140988 | 142141629 | ENST00000517908 | RP11-809O17.1 |
| chr12 | 113905094 | 113906232 | ENST00000261731 | LHX5 |
| chr3 | 194353440 | 194353664 | ENST00000447139 | AC046143.3 |
| chr3 | 194432537 | 194433012 | ENST00000423318 | AC090505.6 |
| chr2 | 306486 | 306655 | ENST00000592090 | AC079779.5 |
| chr16 | 83983871 | 83984533 | ENST00000361711 | OSGIN1 |
| chr7 | 591580 | 592225 | ENST00000517177 | AC147651.2 |

(d) calculating a prognostic score, the prognostic score determined by:
  i. detecting a first median hybridization intensity value from the contacting of (c)(i);
  ii. detecting a second median hybridization intensity value from the contacting of (c)(ii);
  iii. detecting a third median hybridization intensity value from contacting the tagged ACRs with the solid support comprising a third plurality of complementary oligonucleotide probes bound thereto, the third plurality of oligonucleotide probes are complementary to a third set of ACRs present in PDAC tumors;
  iv. detecting a fourth median hybridization intensity value from contacting the tagged ACRs with the solid support comprising a plurality of comparative genomic hybridization (CGH) probes;
  wherein the prognostic score is calculated by:
    determining a first subtractive difference between the second median hybridization intensity value and the first median hybridization intensity value, determining a second subtractive difference between the fourth median hybridization intensity value and the third median hybridization intensity value, and dividing the first subtractive difference by the second subtractive difference;
(e) diagnosing the subject with an epigenetic drug treatment-sensitive PDAC tumor when the prognostic score is less than 0.6; and
(f) administering an epigenetic drug to the diagnosed subject of (e)
wherein the epigenetic drug is selected from histone deacetylase (HDAC) inhibitors comprising (1S,4S,7Z, 10S,16E,21R)-7-ethylidene-4,21-di (propan-2-yl)-2-oxa-12,13-dithia-5,8,20,23-tetrazabicyclo[8.7.6] tricos-16-ene-3,6,9,19,22-pentone, N'-hydroxy-N-phenyloctanediamide, (E)-N-hydroxy-3-[3-(phenylsulfamoyl) phenyl]prop-2-enamide, (E)-N-hydroxy-3-[4-[[2-(2-methyl-1H-indol-3-yl) ethylamino]methyl]phenyl]prop-2-enamide, pyridin-3-ylmethyl N-[[4-[(2-aminophenyl) carbamoyl]phenyl] methyl]carbamate, N-(2-aminophenyl)-4-[[(4-pyridin-3-ylpyrimidin-2-yl) amino]methyl]benzamide, 7-[4-(3-ethynylanilino)-7-methoxyquinazolin-6-yl]oxy-N-hydroxyheptanamide, cyclopentyl (2S)-2-[[4-[[8-(hydroxyamino)-8-oxooctanoyl]amino]phenyl] methylamino]-2-phenylacetate, 3-[(dimethylamino) methyl]-N-[2-[4-(hydroxycarbamoyl) phenoxy] ethyl]-1-benzofuran-2-carboxamide, N-hydroxy-2-[4-[[(1-methylindol-3-yl) methylamino]methyl]piperidin-1-yl] pyrimidine-5-carboxamide, and [6-(diethylaminomethyl) naphthalen-2-yl]methyl N-[4-(hydroxycarbamoyl) phenyl]carbamate;
wherein the epigenetic drug is selected from DNA methyltransferase (DNMT) inhibitors comprising 4-amino-1-[(2R,3R,4S,5R)-3,4-dihydroxy-5-(hydroxymethyl) oxolan-2-yl]-1,3,5-triazin-2-one, 4-amino-1-[(2R,4S, 5R)-4-hydroxy-5-(hydroxymethyl) oxolan-2-yl]-1,3,5-triazin-2-on, or [(2R,3S,5R)-5-(2-amino-6-oxo-1H-purin-9-yl)-3-hydroxyoxolan-2-yl]methyl [(2R,3S,5R)-5-(4-amino-2-oxo-1,3,5-triazin-1-yl)-2-(hydroxymethyl) oxolan-3-yl]hydrogen phosphate;
wherein the epigenetic drug is selected from bromodomain and extra-terminal motif (BET) inhibitors comprising tert-butyl 2-[(9S)-7-(4-chlorophenyl)-4,5,13-trimethyl-3-thia-1,8,11,12-tetrazatricyclo[8.3.0.02,6] trideca-2 (6),4,7,10, 12-pentaen-9-yl]acetate and 2-[7-(4-chlorophenyl)-4,5,13-trimethyl-3-thia-1,8,11, 12-tetrazatricyclo[8.3.0.02,6] trideca-2 (6),4,7,10,12-pentaen-9-yl]-N-(4-hydroxyphenyl) acetamide;
wherein the epigenetic drug is selected from Enhancer of Zeste Homolog 2 (EZH2) inhibitors comprising 1-isopropyl-6-(6-(4-isopropylpiperazin-1-yl) pyridin-3-yl)-N-((6-methyl-2-oxo-4-propyl-1,2-dihydropyridin-3-yl) methyl)-1H-indazole-4-carboxamide, 1-[(2S)-butan-2-yl]-N-[(4,6-dimethyl-2-oxo-1H-pyridin-3-yl) methyl]-

3-methyl-6-(6-piperazin-1-yl-3-pyridinyl) indole-4-carboxamide, 1-cyclopentyl-N-[(4,6-dimethyl-2-oxo-1H-pyridin-3-yl) methyl]-6-[4-(morpholin-4-ylmethyl) phenyl]indazole-4-carboxamide, and N-[(4,6-dimethyl-2-oxo-1H-pyridin-3-yl) methyl]-3-[ethyl (oxan-4-yl) amino]-2-methyl-5-[4-(morpholin-4-ylmethyl) phenyl]benzamide;

wherein the epigenetic drug is selected from histone lysine methyltransferase (KMT) inhibitors, comprising (2R,3R,4S,5R)-2-(6-aminopurin-9-yl)-5-[[[3-[2-(6-tert-butyl-1H-benzimidazol-2-yl) ethyl]cyclobutyl]-propan-2-ylamino]methyl]oxolane-3,4-diol; and wherein the epigenetic drug is selected from PRMT inhibitors comprising (2S,4R)-1-[(2S)-2-[[2-[3-[2-[[2-[(9S)-7-(4-chlorophenyl)-4,5,13-trimethyl-3-thia-1,8,11,12-tetrazatricyclo[8.3.0.02,6] trideca-2 (6),4,7,10,12-pentaen-9-yl]acetyl]amino]ethoxy]propoxy] acetyl] amino]-3,3-dimethylbutanoyl]-4-hydroxy-N-[(1S)-1-[4-(4-methyl-1,3-thiazol-5-yl) phenyl]ethyl] pyrrolidine-2-carboxamide, 2-[(9S)-7-(4-chlorophenyl)-4,5,13-trimethyl-3-thia-1,8,11,12-tetrazatricyclo[8.3.0.02,6] trideca-2 (6),4,7,10,12-pentaen-9-yl]-N-[4-[2-[2-[2-[2-[[2-(2,6-dioxopiperidin-3-yl)-1,3-dioxoisoindol-4-yl]amino]ethoxy] ethoxy]ethoxy]ethoxy]phenyl]acetamide, and (2S,4R)-1-[(2S)-2-[[2-[2-[2-[[4-[(2S,4R)-1-acetyl-4-(4-chloroanilino)-2-methyl-3,4-dihydro-2H-quinolin-6-yl]benzoyl]amino]ethoxy]ethoxy]acetyl]amino]-3,3-dimethylbutanoyl]-4-hydroxy-N-[[4-(4-methyl-1,3-thiazol-5-yl) phenyl]methyl]pyrrolidine-2-carboxamide.

2. The method of claim 1, wherein the tumor sample is a biopsied tissue sample, tissue section, cytological sample, or blood sample.

* * * * *